(12) United States Patent
Kmak et al.

(10) Patent No.: US 8,510,198 B2
(45) Date of Patent: Aug. 13, 2013

(54) SYSTEM AND METHOD FOR EVALUATING DEFINED CONTRIBUTION PLANS

(75) Inventors: Thomas R. Kmak, Olathe, KS (US); Ronald B. Eisen, Portland, OR (US); Edna O. Lacy, Placitas, NM (US); Matthew A. Golda, Sherwood, OR (US); Craig S. Rosenthal, Southbury, CT (US)

(73) Assignee: Fiduciary Benchmarks, Inc., Portland, OR (US)

( * ) Notice: Subject to any disclaimer, the term of this patent is extended or adjusted under 35 U.S.C. 154(b) by 52 days.

(21) Appl. No.: 12/819,079

(22) Filed: Jun. 18, 2010

(65) Prior Publication Data

US 2011/0145166 A1 Jun. 16, 2011

Related U.S. Application Data

(60) Provisional application No. 61/218,313, filed on Jun. 18, 2009.

(51) Int. Cl.
*G06Q 40/00* (2012.01)

(52) U.S. Cl.
USPC .......................................... 705/36 R; 705/35

(58) Field of Classification Search
USPC ......................................................... 705/35
See application file for complete search history.

(56) References Cited

U.S. PATENT DOCUMENTS

| | | | |
|---|---|---|---|
| 7,590,582 B2 | 9/2009 | Dunne | |
| 8,060,428 B1 | 11/2011 | Abrahamson | |
| 2002/0007332 A1* | 1/2002 | Johnson et al. | 705/36 |
| 2002/0032639 A1* | 3/2002 | Hausken et al. | 705/37 |
| 2004/0138950 A1* | 7/2004 | Hyman et al. | 705/14 |
| 2004/0225548 A1* | 11/2004 | Aldrich et al. | 705/8 |
| 2005/0187804 A1* | 8/2005 | Clancy et al. | 705/8 |
| 2007/0168302 A1* | 7/2007 | Giovinazzo et al. | 705/36 R |
| 2009/0030740 A1* | 1/2009 | Robinson | 705/4 |
| 2010/0121780 A1* | 5/2010 | Sheridan | 705/36 R |

OTHER PUBLICATIONS

The Spark Institute; Testimony of Larry H. Goldburm, Esq., General Counsel, The SPARK Institute Before the United States Department of Labor Employee Benefits Security Administration Regarding the "Proposed 408(b)(2) Regulations Amendment"; Mar. 31, 2008; 4 pages; Simsbury, CT.
BrightScope Homepage. Web page [online]. BrightScope, Inc., 2008-2009 [retrieved on Feb. 9, 2009]. Retrieved from the Internet: <URL: www.brightscope.com/>.

(Continued)

*Primary Examiner* — William Rankins
(74) *Attorney, Agent, or Firm* — Neal, Gerber & Eisenberg LLP

(57) ABSTRACT

A system and method for comparing retirement plans against a selected group of similar plans is disclosed. In one embodiment, a computer system for evaluating a retirement plan comprises a computer server having a database comprising a plurality of data defining a plurality of characteristics of each of a plurality of retirement plans, software configured for identifying a subset of the plurality of retirement plans having characteristics comparable to characteristics of a selected retirement plan, software configured for permitting the selection of at least one report from a plurality of report types, and software configured for automatically generating the selected at least one report, where the at least one report comprises an evaluation of the characteristics of the selected retirement plan against the characteristics of the subset of the plurality of retirement plans.

44 Claims, 158 Drawing Sheets

(56) References Cited

OTHER PUBLICATIONS

BrightScope About Page. Web page [online]. BrightScope, Inc., 2008-2009 [retrieved on Feb. 9, 2009]. Retrieved from the Internet: <URL: www.brightscope.com/about/>.

BrightScope Newsroom. Web page [online]. BrightScope, Inc., 2008-2009 [retrieved on Feb. 9, 2009]. Retrieved from the Internet: <URL: www.brightscope.com/newsroom/>.

BrightScope Press Releases. Web page [online]. BrightScope, Inc., 2008-2009 [retrieved on Feb. 9, 2009]. Retrieved from the Internet: <URL: www.brightscope.com/newsroom/press-releases/>.

BrightScope Fact Sheet. Web page [online]. BrightScope, Inc., 2008-2009 [retrieved on Feb. 9, 2009]. Retrieved from the Internet: <URL: www.brightscope.com/newsroom/fact-sheet/>.

BrightScope History. Web page [online]. BrightScope, Inc., 2008-2009 [retrieved on Feb. 9, 2009]. Retrieved from the Internet: <URL: www.brightscope.com/newsroom/history/>.

BrightScope Press Contact. Web page [online]. BrightScope, Inc., 2008-2009 [retrieved on Feb. 9, 2009]. Retrieved from the Internet: <URL: www.brightscope.com/newsroom/press-contact/>.

BrightScope Qualcomm Incorporated 401k Rating. Web page [online]. BrightScope, Inc., 2008-2009 [retrieved on Feb. 9, 2009]. Retrieved from the Internet: <URL: www.brightscope.com/401k-rating/429990/Qualcomm-Incorporated/>.

BrightScope Snap-On Incorporated 401k Rating. Web page [online]. BrightScope, Inc., 2008-2009 [retrieved on Feb. 9, 2009]. Retrieved from the Internet: <URL: www.brightscope.com/401k-rating/200054/Snap-On-Incorporated/>.

BrightScope Frequently Asked Questions (FAQ). Web page [online]. BrightScope, Inc., 2008-2009 [retrieved on Feb. 9, 2009]. Retrieved from the Internet: <URL: www.brightscope.com/faq/>.

BrightScope Ratings. Web page [online]. BrightScope, Inc., 2008-2009 [retrieved on Feb. 9, 2009]. Retrieved from the Internet: <URL: www.brightscope.com/ratings/>.

BrightScope Glossary. Web page [online]. BrightScope, Inc., 2008-2009 [retrieved on Feb. 9, 2009]. Retrieved from the Internet: <URL: www.brightscope.com/glossary/>.

BrightScope in the News. Web page [online]. BrightScope, Inc., 2008-2009 [retrieved on Feb. 9, 2009]. Retrieved from the Internet: <URL: www.brightscope.com/newsroom/in-the-news/>.

* cited by examiner

Benchmarks Report
Fees, Plan Design and Participant Success Measures
ABC Company 401(k) Plan Report Provided by:

— 220

Jane Jones
Acme Consulting
jjones@acmeconsulting.com
— 230

Benchmarks Report: Fees, Plan Design, & Participant Success Measures

Table of Contents

| | | Page |
|---|---|---|
| The Benchmarks Report | Reader's Guide and Benchmark Group | 1 |
| | Plan Fees Summary | 2 |
| | Service Providers' Fee Disclosure | 3 |
| | Investment Lineup Summary | 4 |
| | Relative Plan Complexity | 5 |
| | Participant Success Measures | 6 |
| Appendix | Investment Offering Summary | A-1 |
| | Total Expense Ratio | A-2 |
| | Fee Detail | A-3 to A-10 |
| | Glossary | A-11 |

ABOUT FIDUCIARY BENCHMARKS, INC.

Fiduciary Benchmarks, Inc. (FBi) is a leading authority on fees, participant success measures, support, and services for defined contribution plans. FBi is building a database of current information for a large cross-section of retirement plans, using proprietary expert software to build the comparisons in this report.

The company has headquarters in Portland, Oregon, and offices in Kansas City and Albuquerque.

REPORT KEY

Throughout this report, numbers have been rounded to the nearest 100th of one percent and the following designations have been used:

| Benchmark Group Fees | | Chart Designations | |
|---|---|---|---|
| Low | = 5th percentile | ▨ | = This Plan |
| Below average | = 25th percentile | ■ | = Better than average |
| Average | = 50th percentile | ■ | = Worse than average |
| Above average | = 75th percentile | | |
| High | = 95th percentile | Blue | = Better than average |
| | | Red | = Worse than average |

FIG. 4b

*Note: Data and examples used in this sample report are for illustrative purposes only.*

Reader's Guide and Benchmark Group

WHAT IS THIS REPORT?

The Fiduciary Benchmarks Fees, Plan Design, and Participant Success Measures Report provides comprehensive "apples-to-apples" comparisons of a plan's fees, design, and participant success measures to those of a Benchmark Group of 576 similar plans. The report has two sections: a 6-page report and an 11-page appendix.

*Note: Your report does not include performance evaluations of the plan's investment options. This important information is beyond the scope of this report and will typically be provided by the plan's advisor/consultant or recordkeeper.*

WHY IS IT IMPORTANT?

Department of Labor regulations under ERISA and, specifically, section 408(b)(2) require that plan sponsors obtain fee disclosures for their plan and that all such fees be "reasonable" for the services being provided. The information in this report and other FBi reports can help in working with service providers to meet these requirements and improve the plan.

*Note: The Department of Labor (DOL) has stated that fees aren't everything. In effect, it can be reasonable to pay higher fees if a plan is receiving more or higher quality services or is attaining higher participant success measures than similar plans.*

HOW WAS THIS REPORT BUILT?

We used a four-step process to build the report:

1. We identified 576 similar plans ("Benchmark Group") for comparison.
2. We identified all fees being paid for this plan.
3. We examined the plan's design and associated complexity.
4. We examined 12 participant success measures that indicate how well plan participants are preparing for retirement.

HOW WAS THE BENCHMARK GROUP DETERMINED?

We considered 9 relevant sort factors to identify the 576 similar plans that comprise the Benchmark Group.

Table 1

| Benchmark Group Sort Factors | This Plan | Benchmark Group |
|---|---|---|
| Plan Assets | $54,360,000 | $50mm - $100mm |
| Number of Participants | 1,085 | 1,000-1,500 |
| Last Year You Bid or Reviewed Your Plan | 2006 | Last 3 years |
| Company Industry | Manufacturing | 100% |
| Plan Type | 401(k) | 100% |
| Uses Auto-Enrollment | For New Hires | 100% |
| Maximum Employer Matching Contribution | 3% | 2% to 3% |
| % of Plan Assets in Index Funds | 9% | 1% to 10% |
| % of Plan Assets in Managed Accounts | 15% | 10% to 20% |

(1)     (2)     (3)

THIS PLAN'S SERVICE PROVIDERS

Table 2

| | Service Providers Used Across the Benchmark Group | |
|---|---|---|
| Service Provider Type | % of Benchmark Group Using Service Provider Type | This Plan's Specific Service Providers |
| Recordkeeper | 100% | Accurate Recordkeeping, Inc. |
| Advisor / Consultant | 51% | Acme Consulting |
| Third-Party Administrator | 28% | None |
| Other Service Providers | 27% | Multiple |

(1)     (2)     (3)

HOW IS THIS REPORT BEST USED?

FBi Reports are a key element in an annual plan review process. Maximum value is achieved when the plan's sponsor, its advisor or consultant, recordkeeper and other plan service providers participate.

FIG. 4c

Reader's Guide and Benchmark Group

WHAT IS THIS REPORT?

The Fiduciary Benchmarks Fees, Plan Design, and Participant Success Measures Report provides comprehensive "apples-to-apples" comparisons of a plan's fees, design, and participant success measures to those of a Benchmark Group of 41 similar plans.

*Note: Your report does not include performance evaluations of the plan's investment options. This important information is beyond the scope of this report.*

WHY IS IT IMPORTANT?

Department of Labor regulations under ERISA and, specifically, section 408(b)(2) require that all fees be "reasonable" for services being provided. The information in this report can help in working with service providers to meet these requirements and improve the plan.

HOW WAS THIS REPORT BUILT?

We used a four-step process to build the report:

1. We identified 41 similar plans for comparison ("Benchmark Group").
2. We summarized fees being paid for the plan based on information provided by the plan sponsor and the plan's service providers.
3. We examined the plan's design and associated complexity.
4. We examined 10 participant success measures that indicate how well plan participants are preparing for retirement.

HOW WAS THE BENCHMARK GROUP DETERMINED?

We considered 9 relevant sort factors to identify the 41 similar plans that comprise the Benchmark Group.

Table 1

| Benchmark Group Sort Factors | This Plan | Benchmark Group |
|---|---|---|
| Plan Assets | $6,327,657 | $3mm - $10mm |
| Number of Participants | 114 | 100 to 1000 |
| Last Year You Bid or Reviewed Your Plan | 2006 | Last 3 years |
| Company Industry | Metal Manufacturing | All |
| Plan Type | 401(k) | Defined Contribution |
| Uses Auto-Enrollment | For few things | 29% |
| Has Employer Match | Yes | 80% |
| % of Plan Assets in Index Funds | 16% | 2% to 25% |
| % of Plan Assets in Managed Accounts | 0% | 0% to 15% |

(1)  (2)  (3)

THIS PLAN'S SERVICE PROVIDERS

| Service Provider Type | Service Providers Used Across the Benchmark Group | | |
|---|---|---|---|
| | % of Benchmark Group with Service Provider Type | This Plan's Specific Service Providers | |
| Recordkeeper | 100% | Recordkeeper, Inc. | |
| Advisor / Consultant | 100% | Acme Consulting | |
| Third-Party Administrator | 0% | None | |
| Other Service Providers | 2% | None | |

HOW IS THIS REPORT BEST USED?

FBi Reports are a key element in an annual plan review process. Maximum value is achieved when the plan's sponsor, its advisor or consultant, recordkeeper and other plan service providers participate.

*See important Information and Disclosures at the end of this document for additional information, including key considerations about the information reflected in this report.*

FIG. 4d

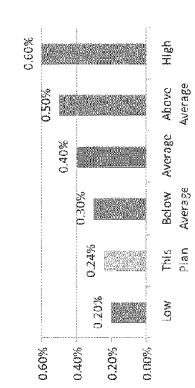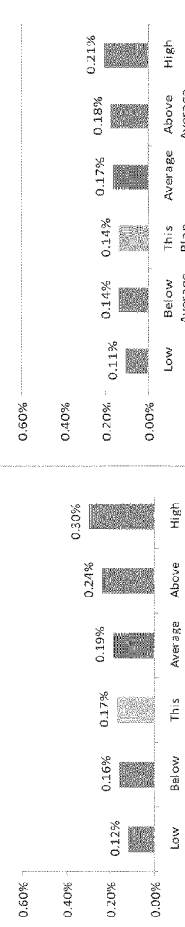
FIG. 4f

Investment Lineup Summary

*This page provides a high-level comparison of the investment expenses for this plan versus the Benchmark Group. Investment expenses are typically the largest component of plan costs. These costs, however, should always be considered in conjunction with investment performance. Additional important investment fee data is available in the appendix and should be reviewed carefully as part of an investment review and monitoring process.*

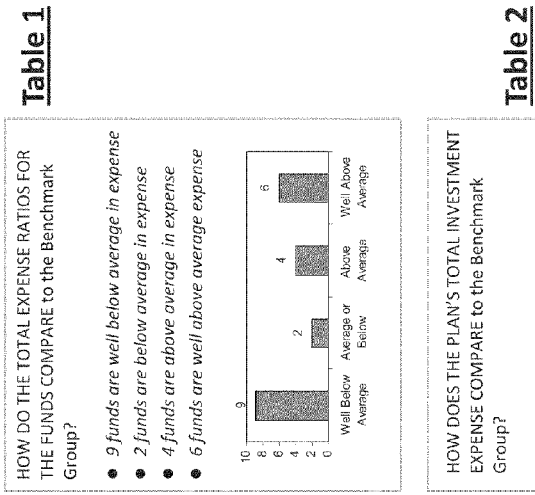

Table 1

HOW DO THE TOTAL EXPENSE RATIOS FOR THE FUNDS COMPARE to the Benchmark Group?
- 9 funds are well below average in expense
- 2 funds are below average in expense
- 4 funds are above average in expense
- 6 funds are well above average expense

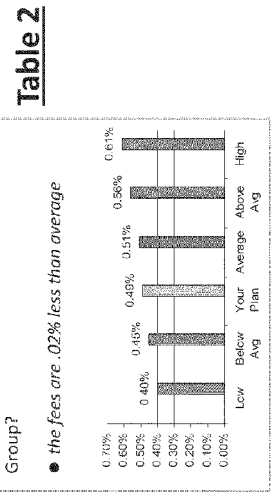

Table 2

HOW DOES THE PLAN'S TOTAL INVESTMENT EXPENSE COMPARE to the Benchmark Group?
- the fees are .02% less than average Table 3

FIG. 4g

Relative Plan Complexity

Plan Complexity is an indicator of how the plan's design compares to other plan designs. Plan Complexity is neither good nor bad since every plan is designed to suit each employer's individual situation. What is important to know, however, is that a plan that is more complex can cost more to administer.

Table 1

| Plan Provisions | This Plan's Provisions | Percentage of Plans in Benchmark Group with a "Yes" for Plan Provision | Maximum Cost Impact | The Plan's Cost Impact |
|---|---|---|---|---|
| Eligibility | | | | |
| - Service Requirement | No | 71% | 1 | 0 |
| - Age Requirement | No | 71% | 1 | 0 |
| - Automatic Enrollment | New Hires | 100% new hires | 4 | 2 |
| Employee Contributions | | | | |
| - Employee Pre-Tax | Yes | 100% | 5 | 5 |
| - Automatic Increase | Yes | 9% | 1 | 1 |
| - Employee Catch-up | Yes | 48% | 2 | 2 |
| - Employee After-Tax | Yes | 13% | 3 | 3 |
| - Employee Roth | Yes | 8% | 3 | 3 |
| - Employee Rollover | Yes | 93% | 1 | 1 |
| Employer Contributions | | | | |
| - Employer Matching | Graded Formula | 76% graded | 3 | 2 |
| - Employer Matching Vesting Schedule | Immediate vesting | 27% immediate | 2 | 0 |
| - Employer Profit Sharing | Yes | 36% | 3 | 1 |
| - Employer Profit Sharing Vesting Schedule | Cliff vesting | 21% Cliff | 2 | 1 |
| - Employer Required Basic | No | 33% | 3 | 0 |
| - Employer Required Basic Vesting Schedule | No | 58% | 2 | 0 |
| Investments | | | | |
| - Number of Investment Options | 23 | Avg: 28 | 5 | 3 |
| - Auto Rebalancing | No | 41% | 1 | 0 |
| - Risk Based or Target Retirement Date Funds | Yes | 97% | 1 | 1 |
| - Managed Account | Yes | 100% | 3 | 3 |
| - Mutual Fund Window or Self-Directed Account | Yes | 11% | 3 | 3 |
| - Company Stock | Unit accounting | 46% unit | 4 | 4 |
| Distributions | | | | |
| - Multiple Loans | Yes - up to 3 | Avg: 2 | 5 | 4 |
| - In-Service Withdrawals | Yes | 99% | 2 | 2 |
| - Hardship Withdrawals | Yes | 98% | 2 | 2 |
| - Installments | No | 63% | 2 | 0 |
| - Lifetime Income Option | No | 2% | 1 | 0 |
| | | | | 43 |

(1)    (2)    (3)    (4)    (5)

Table 2

HOW DOES FBi USE MAXIMUM COST IMPACT TO DETERMINE RELATIVE PLAN COMPLEXITY?

Maximum cost impact expresses how much difficulty a certain plan provision adds to a plan's design. For example, multiple loans adds quite a bit of complexity to a plan versus an auto-enrollment feature. In addition, for a provision like "Number of Investment Options," a plan with a high number of investment options compared to industry standards would receive 5 points. Alternatively, a plan with a low number of investment options would receive only 1 point.

Relative Plan Complexity Score vs. the Benchmark

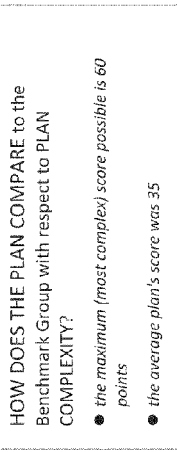

Table 3

HOW DOES THE PLAN COMPARE to the Benchmark Group with respect to PLAN COMPLEXITY?

- the maximum (most complex) score possible is 60 points
- the average plan's score was 35

FIG. 4h

Participant Success Measures

*Participant Success Measures refers to 12 recognized industry statistics that measure how well a plan helps participants prepare for retirement. This page lists each of these 12 statistics and compares them to the Benchmark Group. Few areas are more central to reviewing fees from the perspective of "what you get for what you pay." Here, small changes can make big differences for participants.*

Table 1

| Participant Success Measures | % Plans Measuring | This Plan | This Plan's Participant Success Measures vs. The Benchmark Group | | | | |
|---|---|---|---|---|---|---|---|
| | | | Low | Below Average | Average | Above Average | High | Difference from Average |
| Plan's Current Participation Rate | 100% | 81% | 23% | 45% | 60% | 74% | 95% | 21% |
| Average Deferral Percentage for Non-Highly Compensated Employees | 100% | 6.7% | 2.12% | 3.20% | 4.55% | 5.90% | 8.10% | 2% |
| Average Deferral Percentage for Highly Compensated Employees | 100% | 8.7% | 1.75% | 4.20% | 5.75% | 7.30% | 9.40% | 3% |
| % of Participants Maximizing Company Match | 100% | 52% | 28% | 38% | 54% | 69% | 89% | -2% |
| % of Plan Assets in Automatically Diversified Options* | 98% | 36% | 6% | 11% | 17% | 22% | 44% | 19% |
| % of Participants Invested through Plan's Advice Program | 43% | 7% | 0% | 4% | 8% | 11% | 19% | -1% |
| % of Participants Using the Plan's Advice Program | 63% | 15% | 0% | 3% | 6% | 9% | 16% | 9% |
| % of Eligible Participants Making Catch-up Contributions | 100% | 14% | 9% | 13% | 16% | 22% | 39% | -2% |
| % of Participants Using Auto-Rebalance Option | 8% | 4% | 2% | 4% | 6% | 8% | 10% | -1% |
| % of Terminated Participants NOT "Cashing Out" | 100% | 50% | 29% | 39% | 52% | 65% | 87% | -2% |
| % of Participants with a Personal Retirement Goal | 6% | N/A | 0% | 2% | 5% | 8% | 15% | N/A |
| % of Participants On Track to Achieve That Goal | 6% | N/A | 0% | 3% | 6% | 9% | 16% | N/A |

*Includes balanced funds, risk or target based retirement choices, model portfolios, and managed accounts.*

Table 2

| # of Participant Success Measures Average or Better | 0 for 12 | 1 for 12 | 2 for 12 | 3 for 12 (Average Plan) | 4 for 12 | 5 for 12 | 6 for 12 | 7 or more for 12 |
|---|---|---|---|---|---|---|---|---|
| Percentage of Plans in Benchmark Group | 4% | 9% | 13% | 33% | 18% | 14% | 9% | 0% |

Table 3

HOW DOES THE PLAN COMPARE to the Benchmark Group with respect to these 12 important participant success measures?

- *this plan ranks average or better in 5 out of 12 categories*
- *77% of plans rank lower than this plan*
- *9% of plans rank above this plan*
- *NO PLAN ranks average or better in more than 6 categories*

FIG. 4i

Appendix

Table of Contents

| | | Page |
|---|---|---|
| Fee Detail | Investment Offering Summary | A-1 |
| | Total Expense Ratio | A-2 |
| | Investment Fees Paid to Recordkeeper | A-3 |
| | Investment Fees Paid to Advisor/Consultant | A-4 |
| | Investment Fees Paid to Investment Managers | A-5 |
| | Investment Fees Paid to Others | A-6 |
| | Managed Accounts | A-7 |
| | Self-Directed Accounts | A-8 |
| | Participant Fees and Other Fees | A-9 |
| | ERISA Spending Account | A-10 |
| | Glossary | A-11 |

FIG. 4j

Investment Offering Summary

*This page assists plan sponsors and their advisors in comparing the scope of their investment offerings. It also provides additional details on investment program fees. This information provides perspective on what similar plans are offering.*

INVESTMENT PROGRAM STRUCTURE

For participants who prefer to have someone else build their investment portfolios

| Automatically Diversified Options | This Plan Offers | Percentage of Benchmark Group Offering |
|---|---|---|
| Target Retirement Date Funds* | Yes | 90% |
| Risk-Based Funds | No | 18% |
| Managed Accounts | Yes | 100% |
| Total Number of Choices | 8 | Average: 6 |

For participants who prefer to build their own investment portfolios
*(This plan may have more than one fund in any category.)*

| Core Options | This Plan Offers | Percentage of Benchmark Group Offering |
|---|---|---|
| Stable Value | Yes | 89% |
| Money Market | No | 17% |
| Fixed Income | Yes | 37% |
| S&P 500 Index Fund | Yes | 61% |
| Large Cap US Stock | Yes | 100% |
| Mid Cap US Stock | Yes | 38% |
| Small Cap US Stock | Yes | 42% |
| Multi Cap Stock | No | 17% |
| Foreign Stock | Yes | 93% |
| Real Estate | No | 11% |
| Total Number of Choices | 17 | Average: 17 |

For participants who want more choice than is available in the Core Options

| Flexible Options | This Plan Offers | Percentage of Benchmark Group Offering |
|---|---|---|
| Mutual Fund Window | No | 3% |
| Self-Directed Account | Yes | 11% |

Additional investments made available

| Other Options | This Plan Offers | Percentage of Benchmark Group Offering |
|---|---|---|
| Company Stock | Yes | 100% |
| Lifetime Income Option | No | 2% |

*Default fund for this plan. Target Retirement Date Funds are the default for 54% of the Benchmark Group.

INVESTMENT PROGRAM FEES

| Investment Fees on Contributions | This Plan | | Benchmark Group | | Detail Page |
|---|---|---|---|---|---|
| | Fee Applies to Funds | Total Fee Paid | % of Plans Subject to Fee | Average Fee When Paid | |
| Commissions | None | * | 11% | 0.15% | A-4 |
| Finders' Fees | Some | 0.00% | 9% | 0.05% | A-4 |

| Investment Fees on Plan Assets | This Plan | | Benchmark Group | | Detail Page |
|---|---|---|---|---|---|
| | Fee Applies to Funds | Total Fee Paid | % of Plans Subject to Fee | Average Fee When Paid | |
| Investment fees to recordkeeper | All | 0.11% | 86% | 0.16% | A-3 |
| Wrap fees to recordkeeper | None | * | 29% | 0.10% | A-3 |
| Investment fees to advisor/consultant | All | 0.12% | 51% | 0.15% | A-4 |
| Wrap fees to advisor/consultant | All | 0.02% | 18% | 0.10% | A-4 |
| Fees to investment managers | All | 0.24% | 100% | 0.40% | A-5 |

| Potential Investment Fees | Fee May Apply if Investment Changes Are Made | | Detail Page |
|---|---|---|---|
| | This Plan | % of Benchmark Group | |
| Surrender and withdrawal charges | No | 15% Yes | --- |
| Contingent deferred sales charges | No | 12% Yes | --- |
| Market value adjustment | Yes | 28% Yes | A-2 |

* not applicable to this plan

WHERE CAN WE FIND ADDITIONAL INFORMATION about this plan's investment choices?

- Total Expense Ratio for all funds offered — see page A-2
- Identification of choices proprietary to plan's recordkeeper — see page A-2
- Identification of inactive plan choices — see page A-2
- Managed Account programs — see page A-7
- Self-Directed Account options — see page A-8

Table 1 — Total Expense Ratio

| Investment Program Category | Fund Name (1) | Asset Category for This Fund (1) | Benchmark Plans with This Asset Category (2) | Assets as of 6/30/08 | Disclosure of Total Expense in percent — Recordkeeper (3) | Advisor/ Consultant | Investment Manager | Other | Total Fee (4) | Reasonableness of Total Expense in percent — Low (5) | Below Average | Average | Above Average | High | Difference from Average (6)(a) |
|---|---|---|---|---|---|---|---|---|---|---|---|---|---|---|---|
| Core | PIMCO Stable Value (1) | Stable Value | 89% | $ 6,000,000 | 0.14% | 0.00% | 0.16% | 0.00% | 0.30% | 0.12% | 0.17% | 0.22% | 0.26% | 0.32% | 0.08% |
| | JPMorgan Core Bond | Fixed Income | 28% | $ 1,600,000 | 0.14% | 0.00% | 0.28% | 0.00% | 0.42% | 0.40% | 0.45% | 0.50% | 0.55% | 0.60% | -0.03% |
| | Proprietary Large Value (2) | Large Cap Value | 32% | $ 4,000,000 | 0.14% | 0.20% | 0.29% | 0.00% | 0.63% | 0.67% | 0.72% | 0.77% | 0.82% | 0.87% | -0.14% |
| | Vanguard S&P 500 Index | Large Cap Core | 61% | $ 4,400,000 | 0.04% | 0.00% | 0.08% | 0.00% | 0.12% | 0.08% | 0.12% | 0.16% | 0.20% | 0.24% | -0.04% |
| | Growth Fund of America | Large Cap Growth | 82% | $ 7,200,000 | 0.15% | 0.20% | 0.24% | 0.06% | 0.65% | 0.60% | 0.65% | 0.70% | 0.75% | 0.80% | -0.05% |
| | Proprietary Mid Cap Value (2) | Mid Cap Value | 14% | $ 2,800,000 | 0.14% | 0.20% | 0.31% | 0.00% | 0.65% | 0.66% | 0.71% | 0.76% | 0.81% | 0.86% | 0.11% |
| | Dodge & Cox Mid Company | Mid Cap Core | 17% | $ 3,200,000 | 0.14% | 0.20% | 0.36% | 0.00% | 0.70% | 0.55% | 0.62% | 0.69% | 0.74% | 0.81% | 0.02% |
| | T. Rowe Price Growth | Mid Cap Growth | 9% | $ 4,400,000 | 0.08% | 0.20% | 0.35% | 0.00% | 0.63% | 0.67% | 0.74% | 0.82% | 0.89% | 0.97% | -0.19% |
| | ACI Small Cap Value | Small Cap Value | 11% | $ 400,000 | 0.24% | 0.20% | 0.81% | 0.00% | 1.25% | 1.10% | 1.20% | 1.30% | 1.40% | 1.50% | -0.05% |
| | Vanguard Russell 2000 | Small Cap Core | 38% | $ 400,000 | 0.04% | 0.00% | 0.24% | 0.00% | 0.28% | 0.13% | 0.15% | 0.18% | 0.20% | 0.23% | 0.10% |
| | Janus | Small Cap Growth | 16% | $ 800,000 | 0.24% | 0.20% | 0.36% | 0.00% | 0.80% | 0.87% | 0.97% | 1.07% | 1.16% | 1.25% | -0.27% |
| | Harbor International | International | 93% | $ 2,000,000 | 0.24% | 0.20% | 0.83% | 0.00% | 1.27% | 0.93% | 1.03% | 1.13% | 1.23% | 1.33% | 0.14% |
| | American Century Ultra (4) | Large Cap Growth | 82% | $ 2,800,000 | 0.00% | 0.00% | 0.78% | 0.00% | 0.78% | 0.60% | 0.65% | 0.70% | 0.75% | 0.80% | 0.08% |
| Automatically Diversified | T. Rowe Price 2010 Fund (3) | Trgt Retire Date | 89% | $ 600,000 | 0.14% | 0.20% | 0.31% | 0.00% | 0.65% | 0.53% | 0.58% | 0.63% | 0.68% | 0.73% | 0.07% |
| | T. Rowe Price 2015 Fund (3) | Trgt Retire Date | 87% | $ 100,000 | 0.14% | 0.20% | 0.33% | 0.00% | 0.67% | 0.53% | 0.58% | 0.63% | 0.68% | 0.73% | 0.04% |
| | T. Rowe Price 2020 Fund (3) | Trgt Retire Date | 82% | $ 400,000 | 0.14% | 0.20% | 0.35% | 0.00% | 0.69% | 0.54% | 0.60% | 0.65% | 0.70% | 0.75% | 0.04% |
| | T. Rowe Price 2025 Fund (3) | Trgt Retire Date | 82% | $ 440,000 | 0.14% | 0.20% | 0.37% | 0.00% | 0.71% | 0.54% | 0.60% | 0.65% | 0.70% | 0.75% | 0.06% |
| | T. Rowe Price 2030 Fund (3) | Trgt Retire Date | 81% | $ 720,000 | 0.14% | 0.20% | 0.39% | 0.00% | 0.73% | 0.54% | 0.60% | 0.65% | 0.70% | 0.75% | 0.08% |
| | T. Rowe Price 2035 Fund (3) | Trgt Retire Date | 21% | $ 280,000 | 0.14% | 0.20% | 0.41% | 0.00% | 0.75% | 0.66% | 0.71% | 0.76% | 0.81% | 0.86% | -0.01% |
| | T. Rowe Price 2040 Fund (3) | Trgt Retire Date | 83% | $ 320,000 | 0.14% | 0.20% | 0.42% | 0.00% | 0.76% | 0.76% | 0.81% | 0.86% | 0.91% | 0.97% | -0.10% |
| | T. Rowe Price 2050 Fund (3) | Trgt Retire Date | 19% | $ 440,000 | 0.14% | 0.20% | 0.42% | 0.00% | 0.76% | 0.76% | 0.81% | 0.86% | 0.91% | 0.97% | -0.10% |
| Other | ABC Company Stock (5) | Company Stock | 100% | $ 10,000,000 | 0.04% | 0.00% | 0.00% | 0.00% | 0.04% | 0.01% | 0.05% | 0.10% | 0.15% | 0.20% | -0.06% |
| | Self-Directed Account | SDA | 11% | $ 1,500,000 | 0.00% | 0.00% | 0.00% | 0.00% | 0.00% | 0.00% | 0.00% | 0.00% | 0.00% | 0.00% | 0.00% |
| Grand Totals | | | | $ 54,360,000 | 0.11% | 0.14% | 0.24% | 0.01% | 0.49% | 0.40% | 0.45% | 0.51% | 0.56% | 0.61% | 0.02% |
| Total Expense Ratio in dollars | | | | $ 268,493 | | | | | | | | | | | |

(1) This fund may be subject to a market value adjustment upon termination.
(2) A proprietary fund is defined as "investments that are managed by the recordkeeper or its affiliates and includes choices where a sub-advisor has been hired." The amount of assets or number of funds that are managed by the recordkeeper should not be the determining factor of the plan's final investment lineup. Ultimately, each option must be able to withstand the normal fiduciary due diligence of people, process, performance, cost, and other factors. This plan's allocation to proprietary choices is 12% of plan assets. The Benchmark Group average amount of assets in proprietary choices (where applicable) is 30%.
(3) Default option for the plan.
(4) This fund, referred to as an inactive choice, is no longer accepting new contributions.
(5) Average percentage of company stock in Benchmark Group when company stock exists is 16% with a range of 10% to 20%.

Total Expense Ratio

Table 1

| Fund Name | Assets as of Sept - 09 | Credits to Participants | This Plan — Disclosure of Total Expense in percent | | | | Credits to ERISA | Other | Total Fee | Benchmark Group — Comparison of Total Expense in percent | | | | | Difference from Average |
|---|---|---|---|---|---|---|---|---|---|---|---|---|---|---|---|
| | | | Recordkeeper | Advisor / Consultant | Investment Manager | | | | | Low | Below Average | Average | Above Average | High | |
| Core Options | | | | | | | | | | | | | | | |
| Stable Asset Fund (1) | $1,399,961.28 | 0% | 0.54% | 0.25% | 0.35% | | 0.00% | 0.00% | 1.14% | 0.45% | 0.60% | 0.65% | 1.16% | 2.78% | 0.49% |
| Harbor Bond Instl | $407,417.46 | 0% | 0.54% | 0.25% | 0.48% | | 0.00% | 0.12% | 1.39% | 0.28% | 0.66% | 0.90% | 1.15% | 1.74% | 0.49% |
| T. Rowe Price Equity Income | $386,101.29 | 0% | 0.54% | 0.25% | 0.56% | | 0.00% | 0.00% | 1.35% | 0.45% | 0.95% | 0.98% | 1.29% | 1.68% | 0.37% |
| Vanguard 500 Index Signal | $422,729.87 | 0% | 0.54% | 0.25% | 0.06% | | 0.00% | 0.03% | 0.88% | 0.11% | 0.35% | 0.82% | 1.22% | 2.13% | 0.06% |
| T. Rowe Price Blue Chip Growth | $485,390.16 | 0% | 0.54% | 0.25% | 0.61% | | 0.00% | 0.04% | 1.44% | 0.65% | 0.90% | 1.10% | 1.38% | 1.66% | 0.34% |
| Vanguard PRIMECAP | $188,441.38 | 0% | 0.54% | 0.25% | 0.47% | | 0.00% | 0.03% | 1.29% | 0.65% | 0.90% | 1.10% | 1.38% | 1.66% | 0.19% |
| JPMorgan Mid Cap Value Instl | $329,192.90 | 0% | 0.54% | 0.25% | 0.65% | | 0.00% | 0.00% | 1.44% | 0.76% | 0.90% | 1.19% | 1.41% | 1.94% | 0.25% |
| Federated Mid-Cap Index | $567,871.22 | 0% | 0.54% | 0.25% | 0.25% | | 0.00% | 0.00% | 1.04% | 0.25% | 0.48% | 0.90% | 1.26% | 1.93% | 0.14% |
| T. Rowe Price Mid-Cap Growth | $564,670.10 | 0% | 0.54% | 0.25% | 0.65% | | 0.00% | 0.02% | 1.47% | 0.74% | 1.17% | 1.32% | 1.55% | 1.95% | 0.15% |
| Allianz NFJ Small Cap Value Instl | $263,649.86 | 0% | 0.54% | 0.25% | 0.81% | | 0.00% | 0.01% | 1.61% | 0.63% | 1.07% | 1.26% | 1.54% | 2.69% | 0.35% |
| Vanguard Explorer Adm | $346,922.82 | 0% | 0.54% | 0.25% | 0.28% | | 0.00% | 0.04% | 1.11% | 0.69% | 1.14% | 1.34% | 1.58% | 2.97% | -0.23% |
| Habor International Instl | $575,867.31 | 0% | 0.54% | 0.25% | 0.69% | | 0.00% | 0.12% | 1.60% | 0.82% | 1.01% | 1.14% | 1.48% | 2.24% | 0.46% |
| Automatically Diversified Options | | | | | | | | | | | | | | | |
| Vanguard Wellington Adm (3) | $390,441.61 | 0% | 0.54% | 0.25% | 0.20% | | 0.00% | 0.03% | 1.02% | 0.34% | 0.79% | 1.18% | 1.53% | 2.02% | -0.16% |
| Grand Totals | $6,327,657.26 | 0% | 0.54% | 0.25% | 0.45% | | 0.00% | 0.03% | 1.27% | 0.59% | 0.72% | 0.97% | 1.25% | 1.69% | |
| Total Expense Ratio in dollars | $80,205.64 | | | | | | | | | | | | | | |

(1)

(2)

(1) This fund may be subject to a market value adjustment upon termination. If due to its structure, this investment does not report an explicit expense ratio and/or fee credit, a market based average will be applied. In addition, any applicable plan asset charges or wrap fees will also be applied. The resulting combined total expense ratio will be used for benchmarking. The characteristics and associated value of Guaranteed Rate investments varies based on such things as the current guaranteed rate, the minimum guaranteed rate, the terms and conditions of rate resets, the credit quality of the guarantor and other accruing benefits associated with investment. Accordingly, cost should always be considered in conjunction with an investment's overall value characteristics.

(2) A proprietary fund is defined as "investments that are managed by the recordkeeper or its affiliates and includes choices where a sub-advisor has been hired." The amount of assets or number of funds that are managed by the recordkeeper should not be the determining factor of the plan's final investment lineup. Ultimately, each option must be able to withstand the normal fiduciary due diligence of people, process, performance, cost, and other factors. This plan's allocation to proprietary choices is 0.00% of plan assets. The Benchmark Group average amount of assets in proprietary choices (where applicable) is 8%.

(3) Default option for the plan.

(4) This fund, referred to as an inactive choice, is no longer accepting new contributions.

(5) Average percentage of company stock in Benchmark Group when company stock exists is 0.00% with a range of 0.00% to 0.00%.

*See Important Information and Disclosures at the end of this document for additional information, including key considerations about the information reflected in this report.*

Investment Fees Paid to Recordkeeper

Table 1

| Investment Program Category | Fund Name | Assets as of 6/30/08 | This Plan - Disclosure of Recordkeeper Fee in percent | | | | Benchmark Group - Reasonableness of Recordkeeper Fee in percent (when it is being paid) | | | | | | Percentage of Plans Paying Fee to Recordkeeper |
|---|---|---|---|---|---|---|---|---|---|---|---|---|---|
| | | | Fees from Investments* | Wrap Fee | Expense Rebate | Total Fee for Recordkeeper | Low | Below Average | Average | Above Average | High | Difference from Average | |
| Core | PIMCO Stable Value | $ 6,000,000 | 0.14% | 0.00% | 0.00% | 0.14% | 0.09% | 0.11% | 0.13% | 0.15% | 0.17% | 0.01% | 81% |
| | JPMorgan Core Bond | $ 1,600,000 | 0.14% | 0.00% | 0.00% | 0.14% | 0.10% | 0.14% | 0.20% | 0.23% | 0.26% | -0.06% | 61% |
| | Proprietary Large Value | $ 4,000,000 | 0.14% | 0.00% | 0.00% | 0.14% | 0.12% | 0.16% | 0.21% | 0.27% | 0.31% | -0.07% | 88% |
| | Vanguard S&P 500 Index | $ 4,400,000 | 0.04% | 0.00% | 0.00% | 0.04% | 0.01% | 0.04% | 0.06% | 0.08% | 0.12% | -0.02% | 21% |
| | Growth Fund of America | $ 7,200,000 | 0.15% | 0.00% | 0.00% | 0.15% | 0.15% | 0.20% | 0.25% | 0.30% | 0.35% | -0.10% | 88% |
| | Proprietary Mid Cap Value | $ 2,800,000 | 0.14% | 0.00% | 0.00% | 0.14% | 0.15% | 0.20% | 0.25% | 0.30% | 0.35% | -0.11% | 89% |
| | Dodge & Cox Mid Company | $ 3,200,000 | 0.14% | 0.00% | 0.00% | 0.14% | 0.15% | 0.20% | 0.25% | 0.30% | 0.35% | -0.11% | 56% |
| | T. Rowe Price Growth | $ 4,400,000 | 0.08% | 0.00% | 0.00% | 0.08% | 0.20% | 0.25% | 0.30% | 0.35% | 0.40% | -0.22% | 87% |
| | ACI Small Cap Value | $ 400,000 | 0.24% | 0.00% | 0.00% | 0.24% | 0.20% | 0.25% | 0.30% | 0.35% | 0.40% | -0.06% | 93% |
| | Vanguard Russell 2000 | $ 400,000 | 0.04% | 0.00% | 0.00% | 0.04% | 0.01% | 0.02% | 0.03% | 0.04% | 0.05% | 0.01% | 20% |
| | Janus | $ 800,000 | 0.24% | 0.00% | 0.00% | 0.24% | 0.15% | 0.25% | 0.35% | 0.40% | 0.45% | -0.11% | 94% |
| | Harbor International | $ 2,000,000 | 0.24% | 0.00% | 0.00% | 0.24% | 0.20% | 0.30% | 0.40% | 0.45% | 0.50% | -0.16% | 97% |
| | American Century Ultra | $ 2,800,000 | 0.04% | 0.00% | 0.00% | 0.04% | 0.02% | 0.04% | 0.04% | 0.05% | 0.06% | 0.00% | 89% |
| Automatically Diversified | T. Rowe Price 2010 Fund | $ 600,000 | 0.14% | 0.00% | 0.00% | 0.14% | 0.15% | 0.20% | 0.25% | 0.30% | 0.35% | -0.11% | 61% |
| | T. Rowe Price 2015 Fund | $ 160,000 | 0.14% | 0.00% | 0.00% | 0.14% | 0.15% | 0.20% | 0.25% | 0.30% | 0.35% | -0.11% | 62% |
| | T. Rowe Price 2020 Fund | $ 400,000 | 0.14% | 0.00% | 0.00% | 0.14% | 0.15% | 0.20% | 0.25% | 0.30% | 0.35% | -0.11% | 63% |
| | T. Rowe Price 2025 Fund | $ 440,000 | 0.14% | 0.00% | 0.00% | 0.14% | 0.15% | 0.20% | 0.25% | 0.30% | 0.35% | -0.11% | 63% |
| | T. Rowe Price 2030 Fund | $ 720,000 | 0.14% | 0.00% | 0.00% | 0.14% | 0.15% | 0.20% | 0.25% | 0.30% | 0.35% | -0.11% | 62% |
| | T. Rowe Price 2035 Fund | $ 280,000 | 0.14% | 0.00% | 0.00% | 0.14% | 0.15% | 0.20% | 0.25% | 0.30% | 0.35% | -0.11% | 61% |
| | T. Rowe Price 2040 Fund | $ 320,000 | 0.14% | 0.00% | 0.00% | 0.14% | 0.15% | 0.20% | 0.25% | 0.30% | 0.35% | -0.11% | 51% |
| | T. Rowe Price 2050 Fund | $ 440,000 | 0.14% | 0.00% | 0.00% | 0.14% | 0.15% | 0.20% | 0.25% | 0.30% | 0.35% | -0.11% | 41% |
| Other | ABC Company Stock | $ 10,000,000 | 0.04% | 0.00% | 0.00% | 0.04% | 0.02% | 0.04% | 0.04% | 0.05% | 0.06% | 0.00% | 6% |
| | Self-Directed Account | $ 1,500,000 | 0.00% | 0.00% | 0.00% | 0.00% | 0.00% | 0.00% | 0.00% | 0.00% | 0.00% | 0.00% | 0% |
| Grand Totals | | $ 54,860,000 | 0.11% | 0.00% | 0.00% | 0.11% | 0.08% | 0.12% | 0.16% | 0.20% | 0.24% | | |
| | Total Recordkeeper Fee in $ | $ 57,664 | (1) | | | (2) | | | (3) | | | (4) | (5) |

(a)

* Note: Fees are inclusive of amounts referred to as revenue sharing, payments from insurance companies, and subsidiaries from investment managers.

Table 1

Investment Fees Paid to Recordkeeper

| Fund Name | Assets as of Sept- 09 | This Plan - Disclosure of Recordkeeper Fee in percent | | | | | | Benchmark Group - Comparison of Recordkeeper Fee in percent (when it is being paid) | | | | | | Percentage of Plans Paying Fee to Recordkeeper |
|---|---|---|---|---|---|---|---|---|---|---|---|---|---|---|
| | | Fees from Investments* | Wrap Fee | Credits to ERISA | Credits to Participants | Payments to Advisor | Total Fee for Recordkeeper | Low | Below Average | Average | Above Average | High | Difference from Average | |
| Core Options | | | | | | | | | | | | | | |
| Stable Asset Fund | $1,399,961.28 | 0.25% | 0.54% | 0.00% | 0.00% | 0.25% | 0.54% | 0.12% | 0.30% | 0.48% | 0.60% | 2.50% | 0.06% | 68% |
| Harbor Bond Instl | $407,417.46 | 0.00% | 0.79% | 0.00% | 0.00% | 0.25% | 0.54% | 0.08% | 0.19% | 0.31% | 0.58% | 1.01% | 0.23% | 88% |
| T. Rowe Price Equity Income | $386,101.29 | 0.15% | 0.64% | 0.00% | 0.00% | 0.25% | 0.54% | 0.10% | 0.22% | 0.35% | 0.60% | 0.36% | 0.19% | 90% |
| Vanguard 500 Index Signal | $421,729.87 | 0.00% | 0.79% | 0.00% | 0.00% | 0.25% | 0.54% | 0.06% | 0.24% | 0.39% | 0.54% | 1.86% | 0.15% | 90% |
| T. Rowe Price Blue Chip Growth | $485,390.16 | 0.15% | 0.64% | 0.00% | 0.00% | 0.25% | 0.54% | 0.10% | 0.21% | 0.35% | 0.52% | 0.72% | 0.19% | 90% |
| Vanguard PRIMECAP | $188,441.38 | 0.00% | 0.79% | 0.00% | 0.00% | 0.25% | 0.54% | 0.10% | 0.25% | 0.35% | 0.52% | 0.72% | 0.19% | 90% |
| JPMorgan Mid Cap Value Instl | $329,192.90 | 0.10% | 0.69% | 0.00% | 0.00% | 0.25% | 0.54% | 0.18% | 0.25% | 0.31% | 0.50% | 1.31% | 0.23% | 76% |
| Federated Mid Cap Index | $567,871.22 | 0.30% | 0.49% | 0.00% | 0.00% | 0.25% | 0.54% | 0.08% | 0.28% | 0.43% | 0.62% | 0.86% | 0.11% | 54% |
| T. Rowe Price Mid-Cap Growth | $564,670.10 | 0.15% | 0.64% | 0.00% | 0.00% | 0.25% | 0.54% | 0.12% | 0.25% | 0.40% | 0.55% | 0.70% | 0.14% | 80% |
| Allianz NFJ Small Cap Value Instl | $263,649.86 | 0.00% | 0.79% | 0.00% | 0.00% | 0.25% | 0.54% | 0.10% | 0.22% | 0.32% | 0.55% | 2.02% | 0.22% | 63% |
| Vanguard Explorer Adm | $346,922.82 | 0.00% | 0.79% | 0.00% | 0.00% | 0.25% | 0.54% | 0.12% | 0.25% | 0.43% | 0.62% | 2.00% | 0.11% | 68% |
| Harbor International Instl | $575,867.31 | 0.00% | 0.79% | 0.00% | 0.00% | 0.25% | 0.54% | 0.12% | 0.27% | 0.52% | 0.67% | 2.22% | 0.02% | 63% |
| Automatically Diversified Options | | | | | | | | | | | | | | |
| Vanguard Wellington Adm | $390,441.61 | 0.00% | 0.79% | 0.00% | 0.00% | 0.25% | 0.54% | 0.14% | 0.25% | 0.40% | 0.60% | 0.88% | 0.14% | 56% |
| Grand Totals | $6,327,657.26 | 0.12% | 0.67% | 0.00% | 0.00% | 0.25% | 0.54% | 0.17% | 0.24% | 0.30% | 0.53% | 1.00% | | |
| Total Recordkeeper Fee in dollars | $34,169.35 | | | | | | | | | | | | | |

(1)

\* *Note: Fees are inclusive of amounts referred to as revenue sharing, payments from insurance companies, and subsidiaries from investment managers.*

*See Important Information and Disclosures at the end of this document for additional information, including key considerations about the information reflected in this report.*

Investment Fees Paid to Advisor/Consultant

| Investment Program Category | Fund Name | Assets as of 6/30/08 | This Plan Disclosure of Advisor/Consultant Fee in percent | | | | Benchmark Group Reasonableness of Advisor/Consultant Fee in percent (when it is being paid) | | | | | Percentage of Plans Paying Fee to Advisor/Consultant |
|---|---|---|---|---|---|---|---|---|---|---|---|---|
| | | | Fees from Investments | Wrap Fee | Total Fee for Advisor/Consultant | Other Payments | Low | Average Below | Average | Average Above | High | Difference from Average | |
| Core | PIMCO Stable Value | $ 6,000,000 | 0.00% | 0.03% | 0.03% | | 0.02% | 0.04% | 0.06% | 0.08% | 0.10% | -0.03% | 12% |
| | JPMorgan Core Bond | $ 1,600,000 | 0.00% | 0.03% | 0.03% | | 0.02% | 0.04% | 0.06% | 0.08% | 0.10% | -0.03% | 11% |
| | Proprietary Large Value | $ 4,000,000 | 0.20% | 0.00% | 0.20% | FF | 0.14% | 0.20% | 0.25% | 0.29% | 0.35% | -0.05% | 52% |
| | Vanguard S&P 500 Index | $ 4,400,000 | 0.00% | 0.03% | 0.03% | | 0.01% | 0.02% | 0.03% | 0.04% | 0.05% | 0.00% | 10% |
| | Growth Fund of America | $ 7,200,000 | 0.20% | 0.00% | 0.20% | | 0.14% | 0.20% | 0.25% | 0.29% | 0.35% | -0.05% | 53% |
| | Proprietary Mid Cap Value | $ 2,800,000 | 0.20% | 0.00% | 0.20% | FF | 0.14% | 0.20% | 0.25% | 0.29% | 0.35% | -0.05% | 54% |
| | Dodge & Cox Mid Company | $ 3,200,000 | 0.20% | 0.03% | 0.23% | | 0.14% | 0.20% | 0.25% | 0.29% | 0.35% | -0.02% | 56% |
| | T. Rowe Price Growth | $ 4,400,000 | 0.20% | 0.03% | 0.23% | | 0.14% | 0.20% | 0.25% | 0.29% | 0.35% | -0.02% | 38% |
| | ACI Small Cap Value | $ 400,000 | 0.20% | 0.03% | 0.23% | | 0.14% | 0.20% | 0.25% | 0.29% | 0.35% | -0.02% | 52% |
| | Vanguard Russell 2000 | $ 400,000 | 0.00% | 0.03% | 0.03% | | 0.01% | 0.02% | 0.03% | 0.04% | 0.05% | 0.00% | 11% |
| | Janus | $ 800,000 | 0.20% | 0.03% | 0.23% | | 0.14% | 0.20% | 0.25% | 0.29% | 0.35% | -0.02% | 52% |
| | Harbor International | $ 2,000,000 | 0.20% | 0.03% | 0.23% | | 0.14% | 0.20% | 0.25% | 0.29% | 0.35% | -0.02% | 53% |
| | American Century Ultra | $ 2,800,000 | 0.20% | 0.03% | 0.23% | | 0.14% | 0.20% | 0.25% | 0.29% | 0.35% | -0.02% | 53% |
| Automatically Diversified | T. Rowe Price 2010 Fund | $ 600,000 | 0.20% | 0.03% | 0.23% | | 0.14% | 0.20% | 0.25% | 0.29% | 0.35% | -0.02% | 38% |
| | T. Rowe Price 2015 Fund | $ 160,000 | 0.20% | 0.03% | 0.23% | | 0.14% | 0.20% | 0.25% | 0.29% | 0.35% | -0.02% | 37% |
| | T. Rowe Price 2020 Fund | $ 400,000 | 0.20% | 0.03% | 0.23% | | 0.14% | 0.20% | 0.25% | 0.29% | 0.35% | -0.02% | 38% |
| | T. Rowe Price 2025 Fund | $ 440,000 | 0.20% | 0.03% | 0.23% | | 0.14% | 0.20% | 0.25% | 0.29% | 0.35% | -0.02% | 36% |
| | T. Rowe Price 2030 Fund | $ 720,000 | 0.20% | 0.03% | 0.23% | | 0.14% | 0.20% | 0.25% | 0.29% | 0.35% | -0.02% | 36% |
| | T. Rowe Price 2035 Fund | $ 280,000 | 0.20% | 0.03% | 0.23% | | 0.14% | 0.20% | 0.25% | 0.29% | 0.35% | -0.02% | 37% |
| | T. Rowe Price 2040 Fund | $ 320,000 | 0.20% | 0.03% | 0.23% | | 0.14% | 0.20% | 0.25% | 0.29% | 0.35% | -0.02% | 38% |
| | T. Rowe Price 2050 Fund | $ 440,000 | 0.20% | 0.03% | 0.23% | | 0.14% | 0.20% | 0.25% | 0.29% | 0.35% | -0.02% | 37% |
| Other | ABC Company Stock | $ 10,000,000 | 0.00% | 0.00% | 0.00% | | 0.00% | 0.00% | 0.00% | 0.00% | 0.00% | 0.00% | 0% |
| | Self-Directed Account | $ 1,500,000 | 0.00% | 0.00% | 0.00% | | 0.00% | 0.00% | 0.00% | 0.00% | 0.00% | 0.00% | 0% |
| Grand Totals | | $ 54,860,000 | 0.12% | 0.02% | 0.14% | | 0.08% | 0.12% | 0.15% | 0.18% | 0.22% | | |
| Total Advisor/Consultant Fee in $ | | 76,740 | | | | | | | | | | | |

* FF = Finders' Fee applies to this fund; C = Commissions apply to this fund; Calculated on New Contributions into the plan.

Note: Total Advisor/Consultant fees of $76,740 include the investment fees paid to advisor ($75,945) and the finders' fees ($795).

Table 1

Investment Fees Paid to Advisor/Consultant

| Fund Name | Assets as of Sept - 09 | This Plan - Disclosure of Advisor/Consultant Fee in percent - Fee for Advisor/Consultant | This Plan - Other Payments* | Benchmark Group - Comparison of Advisor/Consultant Fee in percent (when it is being paid) - Low | Below Average | Average | Above Average | High | Difference from Average | Percentage of Plans Paying Fee to Advisor/Consultant |
|---|---|---|---|---|---|---|---|---|---|---|
| Core Options | | | | | | | | | | |
| Stable Asset Fund | $1,399,961.28 | 0.25% | | 0.10% | 0.20% | 0.25% | 0.28% | 0.52% | 0.00% | 68% |
| Harbor Bond Instl | $407,417.46 | 0.25% | | 0.10% | 0.20% | 0.25% | 0.25% | 0.50% | 0.00% | 88% |
| T. Rowe Price Equity Income | $386,101.29 | 0.25% | | 0.10% | 0.20% | 0.25% | 0.30% | 0.50% | 0.00% | 90% |
| Vanguard 500 Index Signal | $421,729.87 | 0.25% | | 0.10% | 0.20% | 0.25% | 0.25% | 0.45% | 0.00% | 90% |
| T. Rowe Price Blue Chip Growth | $485,390.16 | 0.25% | | 0.11% | 0.24% | 0.25% | 0.29% | 0.50% | 0.00% | 90% |
| Vanguard PRIMECAP | $188,441.38 | 0.25% | | 0.11% | 0.24% | 0.25% | 0.29% | 0.50% | 0.00% | 90% |
| JPMorgan Mid Cap Value Instl | $329,192.90 | 0.25% | | 0.10% | 0.21% | 0.25% | 0.30% | 0.55% | 0.00% | 76% |
| Federated Mid-Cap Index | $567,871.22 | 0.25% | | 0.10% | 0.17% | 0.25% | 0.30% | 0.48% | 0.00% | 54% |
| T.Rowe Price Mid-Cap Growth | $564,670.10 | 0.25% | | 0.10% | 0.25% | 0.25% | 0.30% | 0.53% | 0.00% | 80% |
| Allianz NFJ Small Cap Value Instl | $263,649.86 | 0.25% | | 0.11% | 0.25% | 0.25% | 0.26% | 0.41% | 0.00% | 63% |
| Vanguard Explorer Adm | $346,922.82 | 0.25% | | 0.14% | 0.20% | 0.25% | 0.30% | 0.58% | 0.00% | 68% |
| Harbor International Instl | $575,867.31 | 0.25% | | 0.10% | 0.20% | 0.25% | 0.30% | 0.55% | 0.00% | 63% |
| Automatically Diversified Options | | | | | | | | | | |
| Vanguard Wellington Adm | $390,441.61 | 0.25% | | 0.13% | 0.25% | 0.25% | 0.27% | 0.56% | 0.00% | 49% |
| Grand Totals | $6,327,657.26 | 0.25% | | 0.10% | 0.20% | 0.25% | 0.25% | 0.50% | | |
| Total Advisor/Consultant Fee in dollars | $15,819.14 | (1) | | | | | | | | |

\* FF = Finders' Fee applies to this fund; Calculated on New Contributions into the plan.

*Mutual Fund note: Finders fees are generally not deducted from investments and are not paid directly by the plan. They are paid from managers' resource.*

*See important Information and Disclosures at the end of this document, including key considerations about this report.*

Investment Fees Paid to Investment Managers

| Investment Program Category | Fund Name | Assets as of 6/30/08 | This Plan Disclosure of Investment Manager Fee in percent | | | Benchmark Group Reasonableness of Investment Manager Fee in percent | | | | Difference from Average |
|---|---|---|---|---|---|---|---|---|---|---|
| | | | Fee From Investment Mgmt Prospectus | Any Subsidy* Being Applied | Net Fee for Investment Manager | Low | Average Below | Average | Above Average | High | |
| Core | PIMCO Stable Value | $ 6,000,000 | 0.16% | 0.00% | 0.16% | 0.06% | 0.09% | 0.12% | 0.14% | 0.17% | 0.04% |
| | JPMorgan Core Bond | $ 1,600,000 | 0.28% | 0.00% | 0.28% | 0.27% | 0.30% | 0.33% | 0.37% | 0.40% | -0.05% |
| | Proprietary Large Value | $ 4,000,000 | 0.38% | 0.00% | 0.38% | 0.41% | 0.45% | 0.48% | 0.51% | 0.54% | -0.10% |
| | Vanguard S&P 500 Index | $ 4,400,000 | 0.08% | 0.00% | 0.08% | 0.05% | 0.08% | 0.11% | 0.13% | 0.16% | -0.03% |
| | Growth Fund of America | $ 7,200,000 | 0.24% | 0.00% | 0.24% | 0.36% | 0.39% | 0.42% | 0.45% | 0.48% | -0.18% |
| | Proprietary Mid Cap Value | $ 2,800,000 | 0.40% | 0.00% | 0.40% | 0.42% | 0.45% | 0.48% | 0.51% | 0.54% | -0.08% |
| | Dodge & Cox Mid Company | $ 3,200,000 | 0.36% | 0.00% | 0.36% | 0.36% | 0.41% | 0.45% | 0.49% | 0.53% | -0.09% |
| | T. Rowe Price Growth | $ 4,400,000 | 0.35% | 0.00% | 0.35% | 0.48% | 0.53% | 0.59% | 0.64% | 0.69% | -0.24% |
| | ACI Small Cap Value | $ 400,000 | 0.81% | 0.00% | 0.81% | 0.80% | 0.87% | 0.95% | 1.02% | 1.09% | -0.14% |
| | Vanguard Russell 2000 | $ 400,000 | 0.24% | 0.00% | 0.24% | 0.11% | 0.13% | 0.25% | 1.17% | 0.20% | -0.01% |
| | Janus | $ 800,000 | 0.36% | 0.00% | 0.36% | 0.50% | 0.56% | 0.63% | 0.67% | 0.72% | -0.27% |
| | Harbor International | $ 2,000,000 | 0.83% | 0.00% | 0.83% | 0.68% | 0.75% | 0.83% | 0.90% | 0.97% | 0.00% |
| | American Century Ultra | $ 2,800,000 | 0.78% | -0.15% | 0.63% | 0.42% | 0.45% | 0.48% | 0.52% | 0.55% | 0.15% |
| Automatically Diversified | T. Rowe Price 2010 Fund | $ 600,000 | 0.31% | 0.00% | 0.31% | 0.33% | 0.37% | 0.40% | 0.43% | 0.45% | -0.09% |
| | T. Rowe Price 2015 Fund | $ 160,000 | 0.33% | 0.00% | 0.33% | 0.34% | 0.37% | 0.40% | 0.44% | 0.47% | 0.07% |
| | T. Rowe Price 2020 Fund | $ 400,000 | 0.35% | 0.00% | 0.35% | 0.35% | 0.39% | 0.42% | 0.46% | 0.49% | -0.07% |
| | T. Rowe Price 2025 Fund | $ 440,000 | 0.37% | 0.00% | 0.37% | 0.36% | 0.40% | 0.43% | 0.46% | 0.50% | -0.06% |
| | T. Rowe Price 2030 Fund | $ 720,000 | 0.39% | 0.00% | 0.39% | 0.36% | 0.40% | 0.44% | 0.47% | 0.50% | -0.05% |
| | T. Rowe Price 2035 Fund | $ 280,000 | 0.41% | 0.00% | 0.41% | 0.45% | 0.48% | 0.52% | 0.55% | 0.58% | -0.11% |
| | T. Rowe Price 2040 Fund | $ 320,000 | 0.42% | 0.00% | 0.42% | 0.52% | 0.55% | 0.59% | 0.62% | 0.66% | -0.17% |
| | T. Rowe Price 2050 Fund | $ 440,000 | 0.42% | 0.00% | 0.42% | 0.52% | 0.55% | 0.59% | 0.62% | 0.66% | -0.17% |
| Other | ABC Company Stock | $ 10,000,000 | 0.00% | 0.00% | 0.00% | 0.00% | 0.00% | 0.00% | 0.00% | 0.00% | 0.00% |
| | Self-Directed Account | $ 1,500,000 | 0.00% | 0.00% | 0.00% | 0.00% | 0.00% | 0.00% | 0.00% | 0.00% | 0.00% |
| Grand Totals | | $ 54,860,000 | 0.24% | 0.00% | 0.24% | 0.20% | 0.30% | 0.40% | 0.50% | 0.63% | |
| Net Investment Mgr Fee in $ | | $ 130,564 | | | | | | | | | |

* Note: Periodically, investment managers apply a subsidy, which in effect reduces the cost of money management.

Investment Fees Paid to Investment Managers

Table 1

| | | This Plan | Benchmark Group | | | | |
|---|---|---|---|---|---|---|---|
| | | Disclosure of Investment Manager Fee in percent | Comparison of Investment Manager Fee in percent | | | | |
| Fund Name | Assets as of Sept - 09 | Net Fee for Investment Manager | Low | Below Average | Average | Above Average | High | Difference from Average |
| Core Options | | | | | | | | |
| Stable Asset Fund | $1,399,961.28 | 0.35% | 0.04% | 0.13% | 0.35% | 0.38% | 0.54% | 0.00% |
| Harbor Bond Instl | $407,417.46 | 0.48% | 0.19% | 0.26% | 0.43% | 0.50% | 0.64% | 0.05% |
| T. Rowe Price Equity Income | $386,101.29 | 0.56% | 0.24% | 0.36% | 0.46% | 0.62% | 0.72% | 0.10% |
| Vanguard 500 Index Signal | $421,729.87 | 0.06% | 0.05% | 0.07% | 0.27% | 0.45% | 0.96% | -0.21% |
| T. Rowe Price Blue Chip Growth | $485,390.16 | 0.61% | 0.24% | 0.27% | 0.53% | 0.64% | 1.01% | 0.08% |
| Vanguard PRIMECAP | $188,441.38 | 0.47% | 0.24% | 0.27% | 0.53% | 0.64% | 1.01% | -0.06% |
| JPMorgan Mid Cap Value Instl | $329,192.90 | 0.65% | 0.39% | 0.45% | 0.66% | 0.74% | 0.92% | -0.01% |
| Federated Mid-Cap Index | $567,871.22 | 0.25% | 0.05% | 0.06% | 0.28% | 0.50% | 0.91% | -0.03% |
| T. Rowe Price Mid-Cap Growth | $564,670.10 | 0.66% | 0.44% | 0.64% | 0.72% | 0.75% | 1.11% | -0.06% |
| Allianz NFJ Small Cap Value Instl | $263,649.86 | 0.81% | 0.23% | 0.70% | 0.75% | 0.81% | 0.93% | 0.06% |
| Vanguard Explorer Adm | $346,922.82 | 0.28% | 0.27% | 0.50% | 0.78% | 0.95% | 1.03% | -0.50% |
| Harbor International Instl | $575,867.31 | 0.69% | 0.39% | 0.43% | 0.53% | 0.69% | 0.80% | 0.16% |
| Automatically Diversified Options | | | | | | | | |
| Vanguard Wellington Adm | $390,441.61 | 0.20% | 0.19% | 0.26% | 0.34% | 0.83% | 0.95% | -0.14% |
| Grand Totals | $6,327,657.26 | 0.45% | 0.23% | 0.37% | 0.42% | 0.49% | 0.59% | |
| Net Investment Mgr Fee in dollars | $28,264.80 | | | | | | | |

*See Important Information and Disclosures at the end of this document for additional information, including key considerations about the information reflected in this report.*

Investment Fees Paid to Others

| Investment Program Category | Fund Name | Assets as of 6/30/08 | This Plan Disclosure in percent - Other Fee* | Benchmark Group - Reasonableness of Other Fee (in percent when it is being paid) Low | Below Average | Average | Above Average | High | Difference from Average | Percentage of Plans Paying Fee to "Others" |
|---|---|---|---|---|---|---|---|---|---|---|
| Core | PIMCO Stable Value | $ 6,000,000 | 0.00% | 0.01% | 0.02% | 0.03% | 0.04% | 0.05% | -0.03% | 94% |
| | JPMorgan Core Bond | $ 1,600,000 | 0.00% | 0.01% | 0.02% | 0.03% | 0.04% | 0.05% | -0.03% | 93% |
| | Proprietary Large Value | $ 4,000,000 | 0.00% | 0.04% | 0.05% | 0.06% | 0.07% | 0.08% | -0.06% | 94% |
| | Vanguard S&P 500 Index | $ 4,400,000 | 0.00% | 0.04% | 0.05% | 0.06% | 0.07% | 0.08% | -0.06% | 95% |
| | Growth Fund of America | $ 7,200,000 | 0.00% | 0.04% | 0.05% | 0.06% | 0.07% | 0.08% | -0.06% | 95% |
| | Proprietary Mid Cap Value | $ 2,800,000 | 0.00% | 0.04% | 0.05% | 0.06% | 0.07% | 0.08% | -0.06% | 95% |
| | Dodge & Cox Mid Company | $ 3,200,000 | 0.00% | 0.04% | 0.05% | 0.06% | 0.07% | 0.08% | -0.06% | 93% |
| | T. Rowe Price Growth | $ 4,400,000 | 0.00% | 0.04% | 0.05% | 0.06% | 0.07% | 0.08% | -0.06% | 94% |
| | ACI Small Cap Value | $ 400,000 | 0.00% | 0.04% | 0.05% | 0.06% | 0.07% | 0.08% | -0.06% | 97% |
| | Vanguard Russell 2000 | $ 400,000 | 0.00% | 0.04% | 0.05% | 0.06% | 0.07% | 0.08% | -0.06% | 96% |
| | Janus | $ 800,000 | 0.00% | 0.04% | 0.05% | 0.06% | 0.07% | 0.08% | -0.06% | 96% |
| | Harbor International | $ 2,000,000 | 0.00% | 0.04% | 0.05% | 0.06% | 0.07% | 0.08% | -0.06% | 95% |
| | American Century Ultra | $ 2,800,000 | 0.00% | 0.04% | 0.05% | 0.06% | 0.07% | 0.08% | -0.06% | 18% |
| Automatically Diversified | T. Rowe Price 2010 Fund | $ 600,000 | 0.00% | 0.03% | 0.04% | 0.05% | 0.06% | 0.07% | -0.05% | 96% |
| | T. Rowe Price 2015 Fund | $ 160,000 | 0.00% | 0.03% | 0.04% | 0.05% | 0.06% | 0.07% | -0.05% | 96% |
| | T. Rowe Price 2020 Fund | $ 400,000 | 0.00% | 0.03% | 0.04% | 0.05% | 0.06% | 0.07% | -0.05% | 96% |
| | T. Rowe Price 2025 Fund | $ 440,000 | 0.00% | 0.03% | 0.04% | 0.05% | 0.06% | 0.07% | -0.05% | 96% |
| | T. Rowe Price 2030 Fund | $ 720,000 | 0.00% | 0.03% | 0.04% | 0.05% | 0.06% | 0.07% | -0.05% | 96% |
| | T. Rowe Price 2035 Fund | $ 280,000 | 0.00% | 0.03% | 0.04% | 0.05% | 0.06% | 0.07% | -0.05% | 96% |
| | T. Rowe Price 2040 Fund | $ 320,000 | 0.00% | 0.03% | 0.04% | 0.05% | 0.06% | 0.07% | -0.05% | 98% |
| | T. Rowe Price 2050 Fund | $ 440,000 | 0.00% | 0.03% | 0.04% | 0.05% | 0.06% | 0.07% | -0.05% | 96% |
| Other | ABC Company Stock | $ 10,000,000 | 0.00% | 0.00% | 0.00% | 0.00% | 0.00% | 0.00% | 0.00% | 6% |
| | Self-Directed Account | $ 1,500,000 | 0.00% | 0.00% | 0.00% | 0.00% | 0.00% | 0.00% | 0.00% | 0% |
| Grand Totals | | $ 54,860,000 | 0.01% | 0.04% | 0.05% | 0.06% | 0.07% | 0.08% | | |
| Total Other Fee in $ | | $ 4,320 | | | | | | | | |

*The fees on this page represent the portion of total expense ratio for each investment choice paid out for custodial, legal, accounting, transfer agent, insurance and annuity, and other administrative expenses.

Managed Accounts

Your Managed Account Program

| | |
|---|---|
| % Plans Offering in Benchmark Group: | 100% |
| Managed Account Provider | Managed Accounts Inc. |
| Number of Plan Participants Using: | 167 |
| Assets in Managed Accounts | $8,229,000 |
| Total Fees Paid for Managed Accounts | $49,374 |
| Average Fee per Participant | $296 |

Table 1

| | | Benchmark Group | | | |
|---|---|---|---|---|---|
| | This Plan | Low | Below Average | Average | Above Average | High |
| % of Participants Using Managed Accounts | 16% | 8% | 10% | 13% | 15% | 17% |
| % of Assets in Managed Accounts | 15% | 11% | 13% | 15% | 18% | 19% |

Plans that use the Managed Account as the default option may benefit from a lower fee schedule than what is shown.

In addition, not all Managed Account programs are alike. These are some of the factors that distinguish one Managed Account program from another:

- the ability to consider a participant's complete financial picture
- the ability to modify savings and investment recommendations based on that complete picture
- the ability to modify investment recommendations before and after retirement All these items may combine to generate more customized portfolios and higher levels of confidence that

Fee Disclosure and Reasonableness

Table 2

| | | Benchmark Group | | | | |
|---|---|---|---|---|---|---|
| | This Plan | Low | Below Average | Average | Above Average | High |
| Employer Annual Fee | $0 | $0 | $500 | $1,000 | $1,500 | $2,000 |
| Employee Minimum Fee | $0 | $0 | $25 | $50 | $75 | $100 |
| Fee for $10,000 participant account | 0.60% | 0.40% | 0.50% | 0.60% | 0.75% | 0.90% |
| Fee for $25,000 participant account | 0.60% | 0.30% | 0.35% | 0.50% | 0.75% | 0.85% |
| Fee for $50,000 participant account | 0.60% | 0.25% | 0.30% | 0.50% | 0.75% | 0.80% |
| Fee for $100,000 participant account | 0.45% | 0.20% | 0.25% | 0.45% | 0.70% | 0.75% |
| Fee for $250,000 participant account | 0.25% | 0.10% | 0.15% | 0.35% | 0.60% | 0.65% |
| Fee for $500,000 participant account | 0.20% | 0.05% | 0.10% | 0.30% | 0.55% | 0.60% |
| (a) Total Fees Paid for Managed Accounts | $49,374 | | | | | |
| (b) % of Fees Paid to Recordkeeper or Their Affiliates | 50% | | | 51% | | |
| (c) % of Fees to Managed Accounts Inc. | 50% | | | 49% | | |

Self-Directed Accounts

Your Self-Directed Account (SDA)

| | |
|---|---|
| % Plans Offering in Benchmark Group: | 11% |
| SDA Provider | Brokerage Inc. |
| Assets in SDA | $1,500,000 |
| Number of Plan Participants Using: | 21 |
| % of Participants Using SDA | 2% |
| % of Assets in SDA | 3% |

| | | Benchmark Group | | | |
|---|---|---|---|---|---|
| | This Plan | Low | Below Average | Average | Above Average | High |
| % of Participants Using SDA | 2% | 0% | 1% | 2% | 3% | 4% |
| % of Assets in SDAs | 3% | 0% | 1% | 2% | 3% | 6% |

*Not all Self-Directed Account programs are alike. These are some of the features that distinguish one Self-Directed Account program from another:*

- *fewer steps required*
- *easier to use*
- *more robust financial planning*
- *better investment information*
- *more sophisticated web-trading tools*
- *more in-person assistance*

*All of these, as well as other factors, are important to the types of investors who use a Self-Directed Account*

Fee Disclosure and Reasonableness*

| | | | Benchmark Group | | | |
|---|---|---|---|---|---|---|
| | This Plan | Low | Below Average | Average | Above Average | High |
| Employer Annual Fee | $2,500 | $0 | $500 | $1,000 | $1,500 | $2,000 |
| Participant Annual Fee | $25 | $0 | $25 | $50 | $75 | $100 |
| Internet Trades | $7.95 | $7.95 | $7.95 | $10.95 | $10.95 | $15.95 |
| Phone-Assisted Trades | $25.00 | $25.00 | $25.00 | $49.00 | $49.00 | $65.00 |
| % of Revenues to SDA Provider | 50% | | | 52% | | |
| % of Revenues Paid to Recordkeeper | 50% | | | 48% | | |

* Applicable to mutual fund windows and brokerage accounts.

*Note: Fees from Self-Directed Accounts are not included in Plan Level Fee totals.*

Participant Fees and Other Fees

This page provides a detailed list of the other fees being paid by participants, the plan, or the plan sponsor.

- Note that the page is organized by which fees are being paid to each of your service providers, starting with your recordkeeper
- Look at "% of Plans Paying This Fee" to see if your plan is paying a fee that is not being paid by most of the plans in your Benchmark Group

Table 1

| Participant Paid Fees | % of Plans Paying This Fee | This Plan's Unit Cost* | Benchmark Group Unit Cost ||||| Difference from Average |
|---|---|---|---|---|---|---|---|
| | | | Low | Below Average | Average | Above Average | High | |
| - Annual per participant charge | 73% | $ 10 | $ 3 | $ 5 | $ 25 | $ 45 | $ 65 | $ (15) |
| - Annual per participant advice charge | 58% | $ 7 | $ 3 | $ 5 | $ 10 | $ 15 | $ 15 | $ (3) |
| - Loan origination fee (per occurrence) | 76% | $ 50 | $ 10 | $ 25 | $ 35 | $ 45 | $ 75 | $ 15 |
| - Loan maintenance fee (annual) | 23% | $ 10 | $ 5 | $ 10 | $ 15 | $ 25 | $ 35 | $ (5) |
| - Hardship approval fee (per occurrence) | 34% | $ - | $ 150 | $ 175 | $ 250 | $ 300 | $ 400 | $ (250) |
| - QDRO approval fee (per occurrence) | 48% | $ - | $ 150 | $ 175 | $ 250 | $ 300 | $ 400 | $ (250) |
| - QDRO processing fee (per occurrence) | 47% | $ 250 | $ 50 | $ 200 | $ 250 | $ 300 | $ 500 | $ - |
| - Periodic payment processing fee (per occurrence) | 78% | $ 50 | $ 15 | $ 25 | $ 35 | $ 50 | $ 75 | $ 15 |
| - Non-Periodic payment processing fee (per occurrence) | 82% | $ 50 | $ 15 | $ 25 | $ 40 | $ 60 | $ 80 | $ 10 |

* "-" indicates that no participant-paid fee was identified for this service

| Other Fees | % of Plans Paying This Fee | This Plan's Other Fees | How Fee is Paid |
|---|---|---|---|
| - Other Fees to Recordkeeper, Inc. | 58% | $ 37,650 | By Sponsor |
| - Annual Retainer Fee to Acme Consulting | 68% | $ 2,500 | By Plan |
| - Annual Retainer Fee to Attorneys, Inc. (A) | 75% | $ 10,000 | By Plan |
| - Annual Retainer Fees to Accountants, Inc. (B) | 23% | $ 8,000 | By Plan |
| Total Other Fees | | $ 58,150 | |

For reference on Report page 2: A + B + the fees from page A-6 total $22,320

ERISA Spending Account

*Also referred to as a Plan Expense Reimbursement Account or PERA*

ERISA Spending Account Credits
*for the 12 months prior to the as of date of this report*

| | This Plan |
|---|---|
| $ | 25,000 |

Table 1

| Basic ERISA Spending Account Questions | Benchmark Group Response | |
|---|---|---|
| | Yes | No |
| Do You Have an ERISA Spending Account? | 12% | 88% |

Table 2

| What Are the Most Common Expenses Paid from ERISA Spending Accounts? | Benchmark Group Response | |
|---|---|---|
| | Yes | No |
| Plan Administration Services (including compliance) | 75% | 25% |
| Plan Document Services | 69% | 31% |
| Start-up, Conversion, and M&A Services | 55% | 45% |
| Trust and Custody Services | 53% | 47% |
| Plan Communication Services | 47% | 53% |
| On-site Education Services | 44% | 56% |

Table 3

| If a Remainder Exists at Year End, How is it Dispursed? | Benchmark Group Response |
|---|---|
| Carried Over to Next Year | 60% |
| Reverts Back to the Recordkeeper | 25% |
| Credited to Participant Accounts | 15% |

Glossary

*This page provides definitions for selected terms used in this report. If a term is not included here, you can refer to a more expansive list available on the FBi web site, www.fiduciarybenchmarks.com.*

Auto-Pilot Investment Options
These options provide participants an appropriately diversified investment strategy through a single choice or a bundle of choices. In some cases, these options also self adjust as participants age, based on assumed changes in risk tolerance.

Auto-Rebalancing
An optional feature of a retirement plan that re-sets a participant's asset allocation back to the percentages originally selected. Rebalancing can be triggered at specific times, such as every quarter or annually, or based upon a percentage deviation from the original allocation.

Benchmark Group
A representative sample of plans with characteristics similar to your plan. The Benchmark Group is used to rank your plan against plans of similar characteristics.

Contingent Deferred Sales Charges
Sales charges that may be due upon the sale of an investment option. Generally the charges are reduced or eliminated after certain holding periods are met.

Core Options
A menu of investment choices pre-selected by the plan sponsor and/or advisors to provide participants ample ability to appropriately diversify their investments. Core options must consist of at least three choices with distinct risk and return characteristics.

Default Option
The investment option within your plan that receives contributions when the participant has not made a selection (including auto enrollment programs).

ERISA Spending Accounts
Excess fees paid by the plan to the recordkeeper, which are used to offset charges

Finders' Fees
Compensation paid to an intermediary such as an advisor or service provider to introduce parties involved in a retirement plan-related transaction. Compensation is generally a percentage of the dollar value of the plan and may also include new money added to the plan over time.

Market-Value Adjustment
The gain or loss incurred for terminating a service provider's fixed rate investment product as an option under the plan prior to the product's maturity. The adjustment is based on the current level of interest rates and the investment's structure. These fees can be reduced or avoided by holding the option until maturity or staggering the redemptions.

Surrender and withdrawal charges
Charges that may apply as changes are made to investment options held by the plan that are subject to restrictions on their liquidation. These fees are most applicable to plans offering group and individual annuity contracts, but also may be incurred in mutual fund plans when participants move out of an option shortly after moving in. In this case the fee is known as a "redemption fee" and is intended to discourage short-term market timing.

Wrap fees
Fees charged generally as a percentage of total plan assets. These fees may be used to pay for a variety of services including administrative or recordkeeping and advisor compensation. The term "wrap" means that they are in addition to the expenses charged by the investments in the plan.

Disclosure

/240

IMPORTANT INFORMATION AND DISCLOSURES

This report was prepared solely by Fiduciary Benchmarks ("FB"), without input from <<Broker/Dealer Name>>, its affiliates or its representatives (including your Financial Advisor)(collectively, "<<BD Short Name>>").

The information set forth in this report is based upon (1) information that FB received from you (and/or your advisers or agents, including your plan's service providers) regarding your retirement plan and the investment options offered thereunder (the "Subject Plan Data") and (2) information that FB received from third party sources, including other retirement plan sponsors and their service providers, regarding retirement plans sponsored by third parties and the investment options offered thereunder (the "Benchmark Group Data"). FB and <<BD SHORT NAME>> cannot be responsible for any inaccuracies in the Subject Plan Data or the Benchmark Group Data. Furthermore, it may be that certain investment options have been made available under our plan and that certain fees have been charged in connection with your plan and/or the investment options offered thereunder, but they are not reflected in this report. Please refer to the separate disclosures regarding these investment options and fees and include them in your evaluation of your plan and its investment options.

This report includes a number of comparisons between your retirement plan and plans sponsored by other employers that have certain similarities with your plan (the "Benchmark Group"). FB made a number of assumptions, which are described in the report, in compiling the plans in the Benchmark Group. You should review this report carefully and independently analyze whether the Benchmark Group includes plans that are sufficiently similar to your plan to make the information set forth in this report useful to you in carrying out your fiduciary functions. Furthermore, you should notify us if you believe that any of the assumptions or information reflected in this report are incorrect.

This report is based partially on the methodology utilized by FB to gather, compile and present information. The methodology is more completely described at www.fiduciarybenchmarks.com. You should review the description in order to understand the approaches taken by FB in preparing this report and in order to properly evaluate the report and the information in the report.

This report is for informational purposes only. You must independently determine how to use and interpret the information set forth in this report, including whether you need the assistance of any professionals to assist you in your interpretation of that information and if so, the nature of professional assistance that you may need. FB and <<BDSHORT NAME>> cannot be responsible for the manner in which you interpret the information in this report.

This report is prepared as of the date shown on its cover. Generally, the data has been updated within 90 days of this date. However, certain information such as fund expense ratios was obtained from the fund's most recent prospectus/annual report. Some, and perhaps all, of the information may be the time-sensitive (including the information that was provided to us about your plan). Over time, different data will be available to FB and enhancements may be made to its report generation process and thus results may vary with each report generated (i.e., a report requested on a different date may include additional and/or different information). You should keep all of this in mind when using this report. FB and <<BD SHORT NAME>> have no responsibility and are under no obligation to monitor or update this report in the future unless expressly engaged by you to do so at that time.

Again, please remember that FB and <<Broker/Dealer Name>> have not independently verified the accuracy or completeness of the information in this report. While this report is a tool to aid you in evaluating your plan, it should not be the sole source of information that you use to review your plan's fees, design and success measures.

The production of this report may have been paid for by a third party provider, such as an Investment provider, in support of your Financial Advisor's sales and servicing efforts. While the party paying for this report is unable to affect the output and overall results, please be aware that they may in the future be included for your consideration as an investment option under your plan's investment menu. For specific information, please ask you Financial Advisor whether the production of this report was financed by a third party provider.

To learn more about the mutual funds in your retirement plan including the fund's investment objectives, risks, charges and expenses read the respective prospectus. The prospectus contains this and the other information about the fund that must be carefully considered. To obtain a free prospectus, please call your financial professional. Please read the prospectus carefully before investing.

When investing in mutual funds, there is no guarantee that a fund's investment objective will be met, and you should understand that the principal value of mutual fund investment will fluctuate and may be worth more or less than your original purchase price when redeemed.

Tax laws are complex and subject to change, <<Broker/Dealer Name>>, its affiliates and <<Broker/Dealer Name>> Financial Advisors do not provide tax or legal advice and are not "fiduciaries" (under ERISA, the Internal Revenue Code or otherwise) with respect to the services or activities described herein except as otherwise agreed to in writing by <<Broker/Dealer Name>>. This material was not intended or written to be used for the purpose of avoiding tax penalties that may be imposed on the taxpayer. Individuals are urged to consult their tax or legal advisors before establishing a retirement plan and to understand the tax; ERISA and related consequences of any investments made under such plan.

<<Broker/Dealer Name>>, Member SIPC

Benchmarks Report
Sponsor and Advisor Provided Services
ABC Company 401(k) Plan Report Provided by:

— 220

Jane Jones
Acme Consulting
jjones@acmeconsulting.com
— 230

Benchmarks Report: Sponsor and Advisor Provided Services

Table of Contents

The Benchmarks Report

| | Page |
|---|---|
| Reader's Guide and Benchmark Group | 1 |
| Fiduciary Oversight and Best Practices Support | 2 |
| Plan Design & Administration | 3 |
| Communications | 4 |
| Investments | 5 |
| Fees | 6 |
| Company Stock | 7 |
| Additional Advisor/Consultant Services | 8 |
| Advisor/Consultant Fees and Services Summary | 9 |
| Recordkeeper Services Satisfaction Survey | 10-12 |

ABOUT FIDUCIARY BENCHMARKS, INC.

Fiduciary Benchmarks, Inc. (FBi) is a leading authority on fees, success measures, support, and services for defined contribution plans. FBi is building a database of current information for a large cross-section of retirement plans, using proprietary expert software to build the comparisons in this report.

The company has headquarters in Portland, Oregon, and offices in Kansas City and Albuquerque.

REPORT KEY

Throughout this report, numbers have been rounded to the nearest 100th of one percent and the following designations have been used:

| Benchmark Group Fees | |
|---|---|
| Low | = 5th percentile |
| Below average | = 25th percentile |
| Average | = 50th percentile |
| Above average | = 75th percentile |
| High | = 95th percentile |

Chart Designations

■ = This Plan
■ = Better than average
■ = Worse than average

Blue = Better than average
Red = Worse than average

*Note: Data and examples used in this sample report are for illustrative purposes only.*

FIG. 5b

Reader's Guide and Benchmark Group

WHAT IS THIS REPORT?

The Fiduciary Benchmarks Sponsor and Advisor Provided Services Report provides comprehensive "apples-to-apples" comparisons of a plan's fiduciary oversight and best practices support to those of a Benchmark Group of 576 similar plans. The information details the plan's support by service area (e.g., Plan Design & Administration) and by service provider (e.g., recordkeeper.)

WHY IS IT IMPORTANT?

Department of Labor regulations under ERISA and, specifically, section 408(b)(2) require that plan sponsors obtain fee disclosures for their plan and that all such fees be "reasonable" for the services being provided. The information in this report and other FBi reports can help in working with service providers to meet these requirements and improve the plan.

HOW WAS THIS REPORT BUILT?

1. We identified 576 similar plans ("Benchmark Group") for comparison.
2. We identified the support this plan is receiving in plan design & administration, communications, investments, fees, and company stock (if applicable).
3. We examined the fiduciary oversight and best practice issues in each of these service areas, by service provider.
4. We identified the additional services this plan is receiving from the advisor/consultant.
5. We summarized advisor/consultant provided services and fees.
6. We included a three-part assessment of satisfaction with the plan's recordkeeper services team, participant services, and sponsor services (if completed).

HOW WAS THE BENCHMARK GROUP DETERMINED?

We considered 9 relevant sort factors to identify the 576 similar plans that comprise the Benchmark Group.

| Benchmark Group Sort Factors | This Plan | Benchmark Group |
|---|---|---|
| Plan Assets | $54,860,000 | $50mm - $100mm |
| Number of Participants | 1,085 | 1,000-1,500 |
| Last Year You Bid or Reviewed Your Plan | 2006 | Last 3 years |
| Company Industry | Manufacturing | 100% |
| Plan Type | 401(k) | 100% |
| Uses Auto-Enrollment | For New Hires | 100% |
| Maximum Employer Matching Contribution | 3% | 2% to 3% |
| % of Plan Assets in Index Funds | 9% | 1% to 10% |
| % of Plan Assets in Managed Accounts | 15% | 10% to 20% |

| Service Provider Type | % of Benchmark Group Using Service Provider Type | This Plan's Specific Service Providers |
|---|---|---|
| Recordkeeper | 100% | Accurate Recordkeeping, Inc. |
| Advisor / Consultant | 51% | Acme Consulting |
| Third-Party Administrator | 28% | None |
| Other Service Providers | 27% | Multiple |

Service Providers Used Across the Benchmark Group

HOW IS THIS REPORT BEST USED?

FBi Reports are a key element in an annual plan review process. Maximum value is achieved when the plan's sponsor, its advisor or consultant, recordkeeper and other plan service providers participate.

Fiduciary Oversight and Best Practices Support

*Every plan has a named fiduciary whose job it is to make sure the plan stays in compliance and runs properly. This page summarizes the support this plan is receiving from FBi's master list of Fiduciary Oversight and Best Practice issues. Paying attention to these issues can help minimize fiduciary liability as well as improve the performance of the plan.*

ADVISOR/CONSULTANT

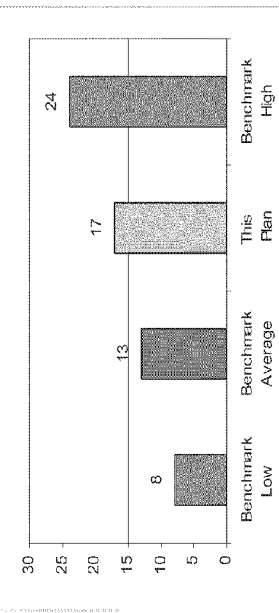

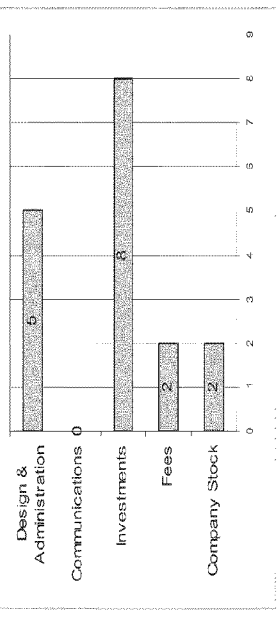

RECORDKEEPER

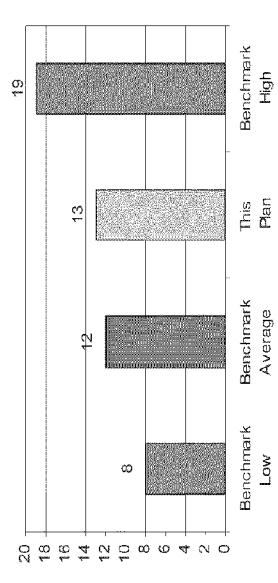

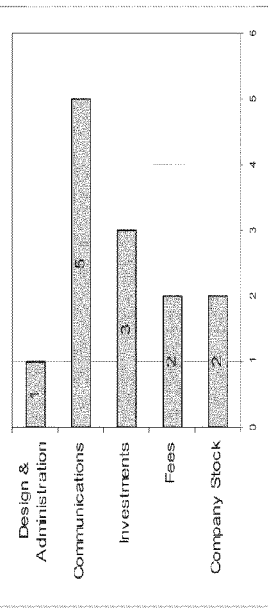

FIG. 5d

Additional Advisor/Consultant Services

*This page summarizes the additional services this plan is receiving from the advisor/consultant relative to the Benchmark Group.*

Services Provided by Advisor/Consultant

| | This Plan | % of Benchmark Group |
|---|---|---|
| Acts as a Fiduciary under 1940 Act | Yes | 12% |
| Acts as a Fiduciary under ERISA | No | 3% |
| Provides Financial Planning Services | Yes | 10% |
| Provides Group Meetings | Yes | 85% |
| Provides One-on-One Meetings | Yes | 38% |

Amount of Service Provided by Advisor/Consultant

| | | The Benchmark Group | | | |
|---|---|---|---|---|---|
| | This Plan | Low | Below Average | Average | Above Average | High |
| # of Group Meetings | 17 | 4 | 8 | 14 | 22 | 36 |
| # of One-on-Ones | 162 | 34 | 59 | 75 | 80 | 175 |

Other Services provided to this plan by the advisor/consultant
*Individual completing survey: jjones@acmeconsulting.com*

1. Provide newsletters for participants quarterly

2. Provide a website with financial planning tools for participant use

3. Accept phone calls directly from participants to address plan questions.

Table 1

Advisor/Consultant Services

Table 1
Select Service Delivery Items

This section details a variety of key services that an Advisor/Consultant may be providing a plan. When assessing fees reasonableness, these services (and other services provided) should be considered - along with service quality, volume and associated impact on plan and participant success.

| Select Service Delivery Items | Services Provided | | | Benchmark Group Comparison of Fee (when it is being paid) | | | | | % of plans paying added fee for service |
|---|---|---|---|---|---|---|---|---|---|
| | This Plan | One-time or ongoing? | % of plans in Benchmark Group Receiving | This Plan's unit Cost or Incl'd in plan level fee | Low | Below Average | Average | Above Average | High | Difference From Average | |
| Plan investment services: | | | | | | | | | | |
| Develops IPS | ✓ | | 78% | Incl'd | | | | | | | 0% |
| Monitors IPS | ✓ | | 78% | Incl'd | $500 | $1,900 | $2,400 | $3,700 | $5,000 | - | 18% |
| Structures Investment Program | | | 47% | | | | | | | | 0% |
| Default fund selection support | - | | 14% | - | | | | | | | 0% |
| Annuity/Lifetime income support | - | | 3% | - | | | | | | | 0% |
| Builds investment menu | ✓ | | 92% | Incl'd | | | | | | | 0% |
| Performance reporting | ✓ | | 100% | Incl'd | | | | | | | 0% |
| Manager searches | ✓ | | 48% | Incl'd | $2,500 | $5,000 | $8,750 | $10,000 | $12,000 | - | 27% |
| Builds model portfolios | - | | 18% | - | 0.10% | 0.15% | 0.25% | 0.35% | 0.60% | - | 10% |
| Company stock support | - | | 6% | - | $1,500 | $3,000 | $3,700 | $5,750 | $7,500 | - | 12% |
| Vendor Management: | | | | | | | | | | | |
| Recordkeeper performance monitoring | - | | 39% | - | | | | | | | 0% |
| Full fee disclosure reporting | ✓ | | 42% | Incl'd | $225 | $250 | $375 | $500 | $750 | - | 10% |
| Fees reasonableness reporting | ✓ | | 37% | Incl'd | $200 | $225 | $500 | $1,000 | $2,500 | - | 17% |
| ERISA spending account use support | - | | 5% | - | | | | | | | 0% |
| Recordkeeper/Vendor RFI | - | | 33% | - | | | | | | | 0% |
| Recordkeeper/Vendor search | ✓ | | 37% | $18,000 | $12,000 | $18,000 | $22,000 | $34,000 | $50,000 | -$4,000 | 30% |
| Recordkeeper/vendor contract support | ✓ | | 0% | $5,000 | $1,500 | $3,000 | $4,000 | $10,000 | $12,000 | $1,000 | 0% |
| Vendor transition support | - | | 5% | - | | | | | | | 0% |
| Plan Design and Communications: | | | | | | | | | | | |
| Plan Design Support | ✓ | | 9% | Incl'd | | | | | | | 0% |
| Participant Goal Setting Support | ✓ | | 3% | Incl'd | | | | | | | 0% |
| Fiduciary Status: | | | | | | | | | | | |
| Acts as a Fiduciary Under 1940 Act (RIA) | ✓ | | 19% | Incl'd | | | | | | | 0% |
| ERISA 3(21) Fiduciary - Limited Scope | - | | 10% | - | 0.01% | 0.10% | 0.10% | 0.15% | 0.18% | - | 10% |
| ERISA 3(21) Fiduciary - Full Scope | - | | 0% | - | | | | | | | 0% |
| ERISA 3(38) Fiduciary | - | | 7% | - | 0.05% | 0.10% | 0.25% | 0.35% | 0.50% | - | 7% |

Footnotes (1) (2) (3)

FIG. 5k

Advisor/Consultant Services

*This section details a variety of key services that an Advisor/Consultant may be providing a plan. When assessing fees reasonableness, these services (and other services provided) should be considered - along with service quality, volume and associated impact on plan and participant success.*

Table 1
Select Service Delivery Items

| | Services Provided | | This Plan's unit Cost or Incl'd in plan level fee | Benchmark Group - Comparison of Fee (when it is being paid) | | | | | % of plans paying added fee for service |
|---|---|---|---|---|---|---|---|---|---|
| | This Plan | One-time or ongoing? | % of plans in Benchmark Group Receiving | | Low | Below Average | Average | Above Average | High | Difference From Average | |
| Participant Education Services: | | | | | | | | | | |
| Group Meetings | ✓ | | 0% | Incl'd | - | - | - | - | - | - | 0% |
| One-on-One Meetings | - | | 0% | Incl'd | - | - | - | - | - | - | 0% |
| Financial Planning Services | - | | 7% | Incl'd | $500 | $1,900 | $2,400 | $3,700 | $5,000 | - | 7% |
| Participant phone support | - | | 0% | Incl'd | - | - | - | - | - | - | 0% |
| Participant newsletter | - | | 4% | - | - | - | - | - | - | - | 0% |

Select Service Delivery Volumes

| | This Plan's Service Volume | Benchmark Group – Range of Service Volumes | | | | | Difference from Average |
|---|---|---|---|---|---|---|---|
| | | Low | Below Average | Average | Above Average | High | |
| Participant Education Volumes: | | | | | | | |
| Number of locations served | 3 | 1 | 1 | 1 | 3 | 7 | 2 |
| Number of full days on site | 4 | 2 | 4 | 5 | 6 | 15 | -1 |
| Number of group meetings | 16 | 4 | 5 | 8 | 15 | 24 | 8 |
| Number of 1 on 1 meetings | - | - | - | - | - | - | - |
| Number of financial plans | - | 1 | 1 | 2 | 3 | 4 | - |
| Number of participant calls taken | - | 3 | 6 | 10 | 12 | 18 | - |
| Plan Investment Volumes: | | | | | | | |
| # of Investment manager searches | 3 | 1 | 1 | 2 | 4 | 5 | 1 |
| Vendor Management Volumes: | | | | | | | |
| # of vendor Requests for Information | - | - | - | - | - | - | - |
| # of Vendor searches | 1 | 1 | 1 | 1 | 1 | 1 | - |

Footnotes

FIG. 51

Advisor/Consultant Services

*This section is available to outline additional services provided and previously provided by the plan's advisor/consultant, as well as any explanatory notes related to the advisor/consultant's delivery of services to the plan.*

Other Services Provided (as completed by jjones@acme.com).

1)
2)
3)
4)
5)

Relationship Notes/Timeline (as completed by jjones@acme.com).

FIG. 5m

Advisor/Consultant Fees and Services Summary

*This page summarizes the fees, services, and success measures for the plan's advisor/consultant and provides comparison to the Benchmark Group. Plan sponsors have the responsibility to assess the reasonableness of fees for their service providers. This information should assist plan sponsors in making those judgments.*

ADVISOR/CONSULTANT

| Disclosure of Advisor/Consultant Fees | Plan Fees in Dollars | Page Reference* |
|---|---|---|
| Investment Fees | $ 75,945 | A-4 |
| Commissions | $ — | A-4 |
| Finders' Fees | $ 795 | A-4 |
| Other Fees | $ 2,500 | A-9 |
| Total Fees | $ 79,240 | |

*Page Reference for detail located in FBi's *Benchmarks Report*:

HOW DO THE PLAN FEES COMPARE to the average in the Benchmark Group?
- the plan's advisor/consultant fees are .03% less per year
- this is equal to $16,458 less per year
- this is $15 less per participant per

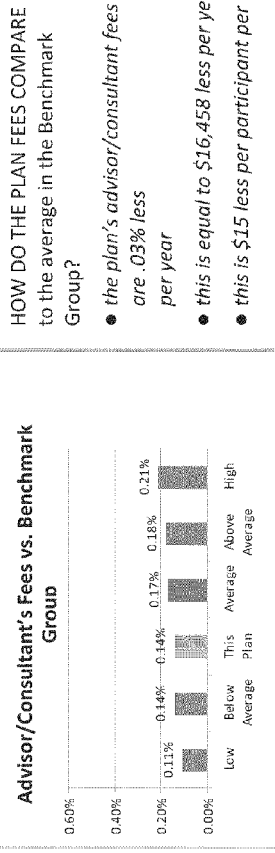

SUCCESS MEASURES, SUPPORT, and SERVICES

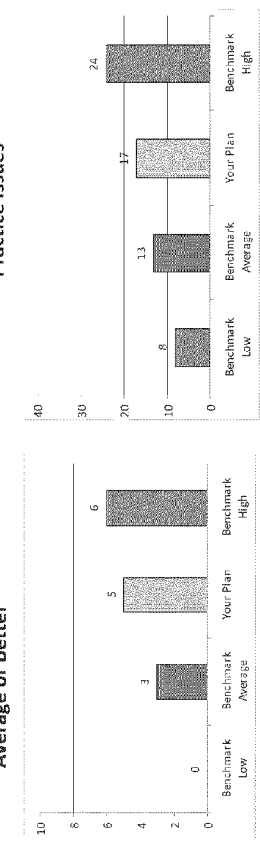

FIG. 5n

Satisfaction: Recordkeeper Service Team

*A satisfaction survey has been completed for this plan.*
*This portion of the FBi Satisfaction Survey assesses the scope, coverage, and/or quality of the plan's assigned recordkeeper relationship team.*
*Individual completing survey: jjones@acmeconsulting.com*

THE BOTTOM LINE

| | Insightful and Adds Value | Adds Value | Satisfactory | Needs Improvement | Not applicable |
|---|---|---|---|---|---|
| What is the overall assessment of the service team? | | ☑ | | | |
| Service Team | | | | | |

| | World Class | Very Good | Satisfactory | Needs Improvement | Not applicable |
|---|---|---|---|---|---|
| Does the service team's work product meet the plan's needs? | | | ☑ | | |
| Service Team | | | | | |

Table 1

LOGISTICS

| | Not at all | A little | A lot | Not applicable |
|---|---|---|---|---|
| Has turnover in the service team negatively impacted service quality? | | ☑ | | |
| Service Team | | | | |

| | Yes | Almost | No | Not applicable |
|---|---|---|---|---|
| Does the frequency with which the service team is onsite meet the plan's needs? | | ☑ | | |
| Service Team | | | | |

Table 2

APTITUDE and APPROACH

| | A True Expert | Adds Value | Satisfactory | Needs Improvement | Not Applicable |
|---|---|---|---|---|---|
| Rate the service team's overall expertise and knowledge level | | ☑ | | | |
| Service Team | | | | | |

| | An Advocate | Proactive | Satisfactory | Needs Improvement | Not Applicable |
|---|---|---|---|---|---|
| Rate the service team's overall approach | | ☑ | | | |
| Service Team | | | | | |

☑ = Response

Satisfaction: Participant Services Provided by Recordkeeper

This portion of the FBi Satisfaction Survey assesses the scope, coverage, and/or quality of the plan's participant services.
Individual completing survey:   jjones@acmeconsulting.com

| Level of Satisfaction - Internet Services (i.e., website) | World Class | Very Good | Satisfactory | Needs Improvement | Not applicable |
|---|---|---|---|---|---|
| Availability | ☑ | | | | |
| Speed | | ☑ | | | |
| Easy to find what you want | | | ☑ | | |
| Range of available information | | | | ☑ | |
| Quality of information available | | | ☑ | | |
| Ease of conducting a transaction | | | ☑ | | |
| Ease of using the advice program | | ☑ | | | |
| Range of educational materials | | ☑ | | | |
| Quality of educational materials | | ☑ | | | |
| OVERALL SATISFACTION - Internet Services | | ☑ | | | |

| Level of Satisfaction - Participant Print Materials (content, clarity, accuracy, and timeliness) | World Class | Very Good | Satisfactory | Needs Improvement | Not applicable |
|---|---|---|---|---|---|
| Participant statements | ☑ | | | | |
| Enrollment Kits | ☑ | | | | |
| Newsletters and other education materials | ☑ | | | | |
| Loan paperwork | | ☑ | | | |
| Withdrawal paperwork | | ☑ | | | |
| Distribution paperwork | | ☑ | | | |
| Confirmations | | | ☑ | | |
| OVERALL SATISFACTION - Print Materials | | ☑ | | | |

| Level of Satisfaction - 800 number phone services | World Class | Very Good | Satisfactory | Needs Improvement | Not applicable |
|---|---|---|---|---|---|
| Hours of availability | | ☑ | | | |
| Answers call in an acceptable amount of time | | ☑ | | | |
| Ease of use of automated phone system | | | ☑ | | |
| Range of services of automated phone system | | | ☑ | | |
| Ease of accessing a customer service representative | | ☑ | | | |
| Phone rep's knowledge of your retirement plan | | ☑ | | | |
| Able to resolve an issue on the first call | ☑ | | | | |
| Processes transactions accurately | | ☑ | | | |
| Treats our participants as valued customers | ☑ | | | | |
| OVERALL SATISFACTION - Phone Services | | ☑ | | | |

| Level of Satisfaction - In-person Services (i.e., group workshops and one-on-one meetings) | World Class | Very Good | Satisfactory | Needs Improvement | Not applicable |
|---|---|---|---|---|---|
| Availability of group workshops | | ☑ | | | |
| Accuracy of content of group workshops | | ☑ | | | |
| Range and clarity of content for group workshops | | ☑ | | | |
| Willingness to answer questions in group workshops | | | ☑ | | |
| OVERALL SATISFACTION - Group Workshops | | | ☑ | | |
| Availability of one-on-one meetings | | ☑ | | | |
| Accuracy of content of one-on-one meetings | | ☑ | | | |
| Range and clarity of content for one-on-one meetings | ☑ | | | | |
| Willingness to answer questions for one-on-one meetings | | | | | |
| OVERALL SATISFACTION - One-on-One Meetings | | ☑ | | | |

11

☑ = Response

FIG. 5p

Satisfaction: Plan-Level Services Provided by Recordkeeper

*This portion of the FBi Satisfaction Survey assesses the scope, coverage, and/or quality of plan-level services.*
*Individual completing survey: jjones@acmeconsulting.com*

| Level of Satisfaction – Plan Sponsor Portal Services | World Class | Very Good | Satisfactory | Needs Improvement | Not Applicable |
|---|---|---|---|---|---|
| Availability | | | ☑ | | |
| Speed | | | ☑ | | |
| Ease of use | | | ☑ | | |
| Range of information | | | ☑ | | |
| Quality of information | | | ☑ | | |
| Range of available reports | | ☑ | | | |
| Ad hoc reporting tool | | | ☑ | | |
| Range of educational materials | | ☑ | | | |
| Clarity of educational materials | | ☑ | | | |
| OVERALL SATISFACTION – Sponsor Portal | | | ☑ | | |

| Level of Satisfaction – Plan Sponsor Reporting | World Class | Very Good | Satisfactory | Needs Improvement | Not Applicable |
|---|---|---|---|---|---|
| Accuracy | ☑ | | | | |
| Timeliness | | ☑ | | | |
| Quantity | | ☑ | | | |
| Clarity | | ☑ | | | |
| OVERALL SATISFACTION – Sponsor Reports | | ☑ | | | |

| Level of Satisfaction – Administrative Transactions (i.e., flexibility, accuracy, timeliness, and responsiveness) | World Class | Very Good | Satisfactory | Needs Improvement | Not applicable |
|---|---|---|---|---|---|
| Enrolling employees in the plan | | ☑ | | | |
| Processing employee contributions | ☑ | | | | |
| Processing employer contributions | ☑ | | | | |
| Processing loans, withdrawals, distributions, etc. | ☑ | | | | |
| Producing participant statements | | | | | |
| Producing compliance testing | | ☑ | | | |
| Producing year-end 5500 and audit package | ☑ | | | | |
| OVERALL SATISFACTION – Plan Administration | | | | | |

| Level of Satisfaction – Plan Sponsor Education (e.g., services such as webinars, newsletters, & legislative updates) | World Class | Very Good | Satisfactory | Needs Improvement | Not applicable |
|---|---|---|---|---|---|
| Accuracy | | ☑ | | | |
| Timeliness | ☑ | | | | |
| Quantity | | ☑ | | | |
| Clarity | ☑ | | | | |
| OVERALL SATISFACTION – Educational Services | | ☑ | | | |

☑ = Response

Benchmarks Report
Plan and Participant Services
ABC Company 401(k) Plan

Report Provided by:

220

Jane Jones
Acme Consulting
jjones@acmeconsulting.com
230

Benchmarks Report: Plan and Participant Services

Table of Contents

| | Page |
|---|---|
| The Benchmarks Report | |
| Reader's Guide and Benchmark Group | 1 |
| Plan and Participant Services | |
| Plan Services | 2 |
|     Plan-driven Services | 3 |
|     Participant-driven Administration Services | 4 |
|     Participant-driven Communications Services | 5 |
| Accuracy Standards | 6 |
| Timeliness Standards | 7 |
| Service Provider Summaries | |
| Recordkeeper Fees and Services Summary | 8 |

ABOUT FIDUCIARY BENCHMARKS, INC.

Fiduciary Benchmarks, Inc. (FBi) is a leading authority on fees, success measures, support, and services for defined contribution plans. FBi is building a database of current information for a large cross-section of retirement plans, using proprietary expert software to build the comparisons in this report.

The company has headquarters in Portland, Oregon, and offices in Kansas City and Albuquerque.

REPORT KEY

Throughout this report, numbers have been rounded to the nearest 100th of one percent and the following designations have been used:

| Benchmark Group Fees | | Chart Designations | |
|---|---|---|---|
| Low | = 5th percentile | ▓ | = This Plan |
| Below average | = 25th percentile | ■ | = Better than average |
| Average | = 50th percentile | ■ | = Worse than average |
| Above average | = 75th percentile | | |
| High | = 95th percentile | Blue = Better than average | |
| | | Red = Worse than average | |

*Note: Data and examples used in this sample report are for illustrative purposes only.*

FIG. 6b

Reader's Guide and Benchmark Group

WHAT IS THIS REPORT?

The Fiduciary Benchmarks Plan and Participant Services Report examines the amount of services being provided to this plan and how well those services are meeting industry standards. The report provides "apples-to-apples" comparisons of the plan's services and standards to a Benchmark Group of 576 similar plans.

WHY IS IT IMPORTANT?

Department of Labor regulations under ERISA and, specifically, section 408(b)(2) require that plan sponsors obtain fee disclosures for their plan and that all such fees be "reasonable" for the services being provided. The information in this report and other FBi reports can help in working with service providers to meet these requirements and improve the plan.

*Note: The Department of Labor (DOL) has stated that fees aren't everything. In effect, it can be reasonable to pay higher fees if a plan is receiving more or higher quality services or is attaining higher participant success measures than similar plans.*

HOW WAS THIS REPORT BUILT?

We used a three-step process to build the report:

1. We identified 576 similar plans ("Benchmark Group") for comparison.
2. We examined the services being provided to this plan, both by service area and by service provider.
3. We reviewed the service standards of the plan's recordkeeper.
4. We summarized recordkeeper provided services and fees.

HOW IS THIS REPORT BEST USED?

FBi Reports are a key element in an annual plan review process. Maximum value is achieved when the plan's sponsor, its advisor or consultant, recordkeeper and other plan service providers participate.

HOW WAS THE BENCHMARK GROUP DETERMINED?

We considered 9 relevant sort factors to identify the 576 similar plans that comprise the Benchmark Group.

| Benchmark Group Sort Factors | This Plan | Benchmark Group |
|---|---|---|
| Plan Assets | $54,860,000 | $50mm - $100mm |
| Number of Participants | 1,085 | 1,000-1,500 |
| Last Year You Bid or Reviewed Your Plan | 2006 | Last 3 years |
| Company Industry | Manufacturing | 100% |
| Plan Type | 401(k) | 100% |
| Uses Auto-Enrollment | For New Hires | 100% |
| Maximum Employer Matching Contribution | 3% | 2% to 3% |
| % of Plan Assets in Index Funds | 9% | 1% to 10% |
| % of Plan Assets in Managed Accounts | 15% | 10% to 20% |

THIS PLAN'S SERVICE PROVIDERS

| | Service Providers Used Across the Benchmark Group | | This Plan's Specific Service Providers |
|---|---|---|---|
| Service Provider Type | % of Benchmark Group Using Service Provider Type | | |
| Recordkeeper | 100% | | Accurate Recordkeeping, Inc. |
| Advisor / Consultant | 51% | | Acme Consulting |
| Third-Party Administrator | 28% | | None |
| Other Service Providers | 27% | | Multiple |

FIG. 6c

Plan Services

*The charts below represent the amount of work being done by the plan's recordkeeper versus the Benchmark Group in three critical service areas: Plan-Driven Services, Participant-Driven Administration Services, and Participant-Driven Communications services. This information is important because a plan that requires more services may cost more to administer.*

HOW WAS THIS CALCULATED?

We multiplied the number of transactions for each service (called "volumes") by the degree of difficulty to complete that work (called "difficulty factor"). For example, if 26 payrolls are processed in a plan year with each payroll having a complexity factor of 50, the services score for Payroll Processing would be 1,300 points. Or, if only 5% of plan participants took a loan and each loan had a complexity factor of 75, the services score for Loans would be 3.75. Adding the scores for all services allowed us to compare the amount of work being done for this plan versus the Benchmark Group.

PLAN-DRIVEN SERVICES

Examples of plan-driven services include plan design changes, Mergers & Acquisitions, and ADP/ACP testing.

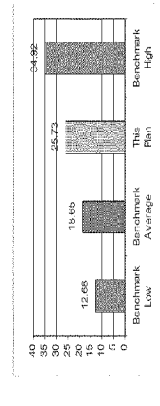

Table 1

For more detail, see page 3.

PARTICIPANT-DRIVEN ADMINISTRATION

Examples of administration services include loans, withdrawals, and QDROs.

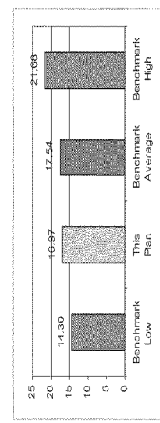

Table 2

For more detail, see page 4.

PARTICIPANT-DRIVEN COMMUNICATIONS

Examples of communications services include quarterly statements and 800-number customer support.

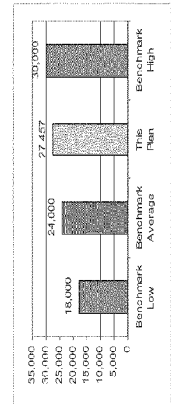

Table 3

For more detail, see page 5.

HOW TO USE THE PLAN SERVICES INFORMATION on Pages 3 to 5:

The next three pages include detailed information regarding the services received by this plan. When reviewing this list of services, close attention should be paid to the following two columns on each page:

- "Scope of Service": This is important because the plan may be receiving services that are uncommon to the Benchmark Group.
- "Service Volumes": This is important because the plan may have higher or lower service volumes than the average of the Benchmark Group.

FIG. 6d

Participant-Driven Administration Services

| Participant-Driven Administration Services | Scope of Service — This Plan's Services (percentage of plans in Benchmark Group receiving each service) | Service Volumes — Percentage of Participants Using Service vs. Benchmark Group Average | This Plan's Service Provider (% of Benchmark Group supported by provider) Recordkeeper | Other | Other Party | Calculating This Plan's Recordkeeper Service Score — Difficulty Factor (A) | This Plan's Service Volumes (B) | Recordkeeper Service Score (A) times (B) |
|---|---|---|---|---|---|---|---|---|
| - Originates Loans | 97% | 5% vs. 8% | 73% | 27% | | 75 | 5.0% | 3.75 |
| - Provides Participant Recordkeeping - Actives | 100% | 56% vs. 67% | 100% | 0% | | 7 | 56.0% | 3.92 |
| - Provides Loan Maintenance (payments, payoffs, defaults) | 97% | 17% vs. 25% | 100% | 0% | | 15 | 17.0% | 2.55 |
| - Provides Participant Recordkeeping - Terminateds | 100% | 44% vs. 33% | 100% | 0% | | 4 | 44.0% | 1.76 |
| - Monitors 402(g) Limit on Contributions | 84% | Same | 100% | 0% | | 1 | 100.0% | 1.00 |
| - Monitors 414(s) Limit on Compensation | 73% | Same | 73% | 27% | | 1 | 100.0% | 1.00 |
| - Processes QDROs | 100% | 5% vs. 4% | 82% | 18% | | 12 | 5.0% | 0.60 |
| - Processes Distributions | 100% | 6% vs. 10% | 83% | 17% | | 5 | 6.0% | 0.30 |
| - Processes In-Service Withdrawals | 99% | 1% vs. 2% | 83% | 17% | | 5 | 1.0% | 0.05 |
| - Approves Hardship Withdrawals | 98% | 6% vs. 7% | 80% | 20% | | 12 | 6.0% | 0.72 |
| - Processes 401(a)(9) Minimum Distributions | 100% | 10% vs. 6% | 83% | 17% | | 6 | 10.0% | 0.60 |
| - Processes Hardship Withdrawals | 98% | 6% vs. 7% | 82% | 18% | | 6 | 6.0% | 0.36 |
| - Processes Rollovers | 99% | 6% vs. 3% | 82% | 18% | | 6 | 6.0% | 0.36 |
| - Processes Investment Transfers | 100% | 20% vs. 10% | 100% | 0% | | 0 | 20.0% | 0.00 |
| - Approves QDROs | 100% | 5% vs. 4% | 68% | 32% | Attorneys Inc. | | | |
| - Mails Enrollment Kit | 97% | 6% vs. 10% | 83% | 17% | Accountants Inc. | | | |
| - Calculates When Employees Become Eligible | 50% | 8% vs. 10% | 79% | 21% | Accountants Inc. | | | |
| - Maintains Beneficiary Files | 95% | Same | 85% | 15% | Accountants Inc. | | | |

| | |
|---|---|
| This Plan | 16.97 |
| Benchmark Group Low | 14.30 |
| Benchmark Group Average | 17.54 |
| Benchmark Group High | 21.68 |

FIG. 6f

Participant-Driven Communications Services

| Participant-Driven Communication Services | Scope of Service — This Plan's Services (percentage of plans in Benchmark Group receiving each service) | Service Volumes — Percentage of Participants Using Service or This Plan's Service Volume vs. Benchmark Group | This Plan's Service Provider (% of Benchmark Group supported by provider) | | | Paper-based | Delivery Method * | Calculating This Plan's Recordkeeper Service Score — Difficulty Factor (A) | This Plan's Service Volumes (B) | Recordkeeper Service Score (A) times (B) |
|---|---|---|---|---|---|---|---|---|---|---|
| | | | Recordkeeper | Other | Other Party | | | | | |
| - Delivers Quarterly Paper Statements | 95% | Same | 100% | 0% | | Yes | B | 2.00 | 4 | 8.00 |
| - Delivers Investment Advice | 61% | Same | 85% | 15% | | No | S | 5.00 | 100% | 5.00 |
| - Creates Paper-based Message Campaigns | 34% | 2 vs. 1 | 79% | 21% | | Yes | B | 2.00 | 2 | 4.00 |
| - Provides Internet Services | 100% | Same | 100% | 0% | | N/A | B | 4.00 | 1 | 4.00 |
| - Provides 800-Number Services*** | 100% | Same | 100% | 0% | | N/A | C | 3.00 | 1 | 3.00 |
| - Delivers Newsletter | 67% | 2 vs. 4 | 97% | 3% | | Yes | B | 0.50 | 2 | 1.00 |
| - Produces Enrollment Kits** | 62% | 6% vs. 10% | 92% | 8% | | Yes | B | 7.00 | 6% | 0.42 |
| - Creates Electronic Message Campaigns | 5% | 2 vs. 4 | 98% | 2% | | N/A | C | 0.10 | 2 | 0.20 |
| - Provides Personal Access Codes** | 100% | 30% vs. 40% | 100% | 0% | | Yes | S | 0.30 | 30% | 0.09 |
| - Produces Prospectuses | 100% | 70% vs. 80% | 100% | 0% | | No | S | 0.02 | 70% | 0.01 |
| - Delivers On-Demand Statements | 97% | 8% vs. 10% | 100% | 0% | | No | B | 0.02 | 8% | 0.00 |
| - Provides Self-Directed Account Materials | 6% | 3% vs. 2% | 100% | 0% | | No | S | 0.02 | 3% | 0.00 |
| - Holds Enrollment Meetings/Group Meetings** | 94% | Same | 63% | 37% | Acme Consulting | N/A | N/A | | | |
| - Holds One-on-One Meetings | 24% | 5% vs. 2% | 62% | 38% | Acme Consulting | N/A | N/A | | | |
| - Delivers Quarterly Electronic Statements | 37% | 0 vs. 2 | 100% | 0% | | No | N/A | | | |
| - Provides Investment Transfer Confirmations | 23% | 0% vs. 6% | 100% | 0% | | N/A | N/A | | | |
| - Produces Annual Benefit Statements | 14% | 0 vs. 1 | 79% | 21% | | N/A | N/A | | | |
| - Produces Quick Enrollment Card*^ | 38% | 0% vs. 4% | 91% | 100% | | N/A | N/A | | | |

| | |
|---|---|
| This Plan | 25.73 |
| Benchmark Group Low | 12.68 |
| Benchmark Group Average | 18.65 |
| Benchmark Group High | 34.92 |

* S = Standard, B = Branded, C = Custom

** Includes impact of merger and acquisition (M&A) activity.

FIG. 6g

Accuracy Standards

*This page shows 17 services where accuracy is very important. Recordkeepers that are very accurate allow plan sponsors to concentrate on more important issues like Participant Success Measures.*

| Service Category | Accuracy Standard | | | | |
|---|---|---|---|---|---|
| | This Plan's Recordkeeper's Standard | Average for Benchmark Group | Plan Rating versus Average | Best in Benchmark Group | Worst in Benchmark Group |
| Contributions | | | | | |
| - Processing of Payroll Tapes | 99% | 98% | Better | 100% | 95% |
| - Employer Match Calculations | 99% | 98% | Better | 100% | 95% |
| - Profit Sharing Calculations | 99% | 98% | Better | 100% | 95% |
| - Required Contribution Calculations | 99% | 98% | Better | 100% | 95% |
| Distribution Processing | | | | | |
| - New Loans | 99% | 99% | Same | 100% | 95% |
| - In-Service Withdrawals | 99% | 99% | Same | 100% | 95% |
| - Hardship Withdrawals | 99% | 99% | Same | 100% | 95% |
| - Termination Distributions | 99% | 99% | Same | 100% | 95% |
| - QDROs | 99% | 99% | Same | 100% | 95% |
| - MRDs | 99% | 99% | Same | 100% | 95% |
| Compliance | | | | | |
| - ADP/ACP Testing | 98% | 99% | Worse | 100% | 95% |
| - 415 Testing | 98% | 99% | Worse | 100% | 95% |
| - Signature-ready 5500 | 98% | 99% | Worse | 100% | 95% |
| Communications | | | | | |
| - Newsletters | 95% | 97% | Worse | 100% | 95% |
| - Custom Communication Campaigns | 95% | 97% | Worse | 100% | 95% |
| - Quarterly Statements | 95% | 97% | Worse | 100% | 95% |
| - Annual Statements | 95% | 97% | Worse | 100% | 95% |

| Number of Accuracy Standards Average or Better | |
|---|---|
| This Plan | 10 out of 17 |
| Benchmark Group Low | 2 out of 17 |
| Benchmark Group Average | 7 out of 17 |
| Benchmark Group High | 15 out of 17 |

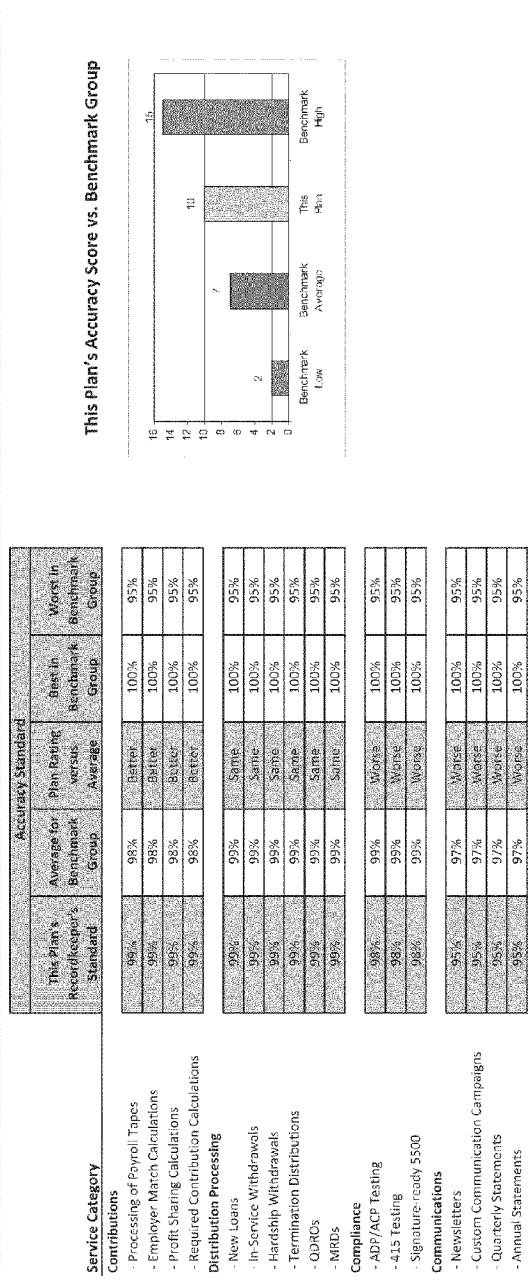

This Plan's Accuracy Score vs. Benchmark Group

FIG. 6h

Recordkeeper Fees and Services Summary

This page summarizes the fees, services, and success measures for the plan's recordkeeper and provides comparison to the Benchmark Group. Plan sponsors have the responsibility to assess the reasonableness of fees for their service providers. This information should assist plan sponsors in making those judgments.

RECORDKEEPER

Disclosure of Recordkeeper Fees

| | Plan Fees In Dollars | Page Reference* |
|---|---|---|
| Investment Fees | $ 7,664 | A-3 |
| Managed Account Fees | $ 24,687 | A-7 |
| Other Fees | $ 37,650 | A-9 |
| ERISA Spending Account Credit | $ (25,000) | A-10 |
| Total Fees | $ 95,001 | |

*Page Reference for detail located in FBI's Benchmarks Report: Fees, Plan Design, and Participant Success Measures

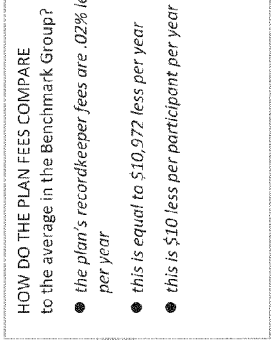

Recordkeeper's Fees vs. Benchmark Group in percent

HOW DO THE PLAN FEES COMPARE to the average in the Benchmark Group?
- the plan's recordkeeper fees are .02% less per year
- this is equal to $10,972 less per year
- this is $10 less per participant per year

SUCCESS MEASURES, SUPPORT, and SERVICES

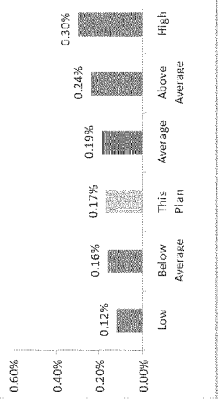

| Summary of Success Measures, Support, and Services* | This Plan's Success Measures, Support, & Services vs. Benchmark Group | FBI Report^ | Page Reference |
|---|---|---|---|
| Number of Participant Success Measures Average or Better | 66% | Report 2 | p. 6 |
| Number of Fiduciary Oversight and Best Practice Issues Supported | 8% | Report 3 | p. 2 |
| Complexity of Your Plan Design | 23% | Report 2 | p. 5 |
| Amount of Plan-Driven Services Received | 14% | Report 4 | p. 3 |
| Amount of Participant-Driven Administration Services Received | -3% | Report 4 | p. 4 |
| Amount of Participant-Driven Communication Services Received | 38% | Report 4 | p. 5 |
| Number of Accuracy Standards Average or Better | 43% | Report 4 | p. 6 |
| Number of Timeliness Standards Average or Better | 46% | Report 4 | p. 7 |

*If your plan is more complex to administer and receives a higher level of services, your plan costs may be above average.

^Report 2 refers to FBI's Benchmarks Report: Fees, Plan Design and Participant Success Measures
^Report 3 refers to FBI's Benchmarks Report: Sponsor Services
^Report 4 refers to FBI's Benchmarks Report: Participant Services

FIG. 6j

User Registration

| Please enter the following User Registration Information | | | |
|---|---|---|---|
| User Type* | First Name* | Last Name* | Job Title | Company Name* |
| Select | | | | |
| Adress Line 1* | Adress Line 2 * | City * | State* | Zip* |
| | | | Select | |
| Work Phone Number | Alternate Phone Number | Fax | | |
| Email (This will be your user ID) | Password* | Confirm Password* | | |

171

173

172

*Information required

FIG. 8

| Home | Sponsors | Plans | Dashboard | Welcome Advisorconsultant, Jim of Advisorconsultant, Inc. Logout! Change Password ? |

← 181

Step 1 – Add a Plan

Sponsor Details

Sponsor Name: ? ← 182

Code that best describes the nature of the plan sponsor's business (as indicated on Form 5500) ?

[ Select ]

EIN/TIN (xx-xxxxxxx): ?

Plans — 183

Add more plans with this sponsor — 189 / 184

| Plan name * ? | Recordkeeper * ? | TPA ? | Plan Type ? | Approx. Participant ? | Delete |
|---|---|---|---|---|---|
| | Select | Select | Select | 0 | X |

185  186  187  188

* Information is required.

FIG. 10

Guide to Survey Questions and Data Elements

Add A Plan    182

Sponsor Name
The name of the company sponsoring the retirement plan. A sponsor name is associated with each plan in FBi's system.

EIN/TIN
The nine digit Employer Identification Number of the company sponsoring the retirement plan. This number is sometimes referred to as the Tax Identification Number (TIN), but they are one and the same. FBi's system uses the EIN/TIN to uniquely identify each plan sponsor. A plan sponsor's EIN/TIN can be found on their retirement plan's Form 5500 filing - line 2b. FBi automatically populates the EIN/TIN by cross referencing the provided plan sponsor name with public records.

Principal Business Activity
The 6 digit code from the Form 5500 Filing that best describes the nature of the plan sponsor's business. The codes are one of multiple factors considered by FBI's in building benchmark groups of similar plans to support valid comparisons. A plan sponsor's 6 digit code can be found on their retirement plan's Form 5500 filing—line 2d. To find a list of codes, see pages 66, 67, and 68 of the 2008 Form 5500 Instructions booklet at http://www.irs.gov/pub/irs-pdf/i5500.pdf. FBi automatically populates the 6 digit code by cross referencing the provided plan sponsor name with public records.

Plan Name
The formal name of the retirement plan being benchmarked. Plan name is used to identify the plan within FBi's system and on FBi reports. A plan's formal name can be found on its Form 5500 Filing - 1a. FBi automatically populates plan name(s) by cross referencing the provided plan sponsor name with public records
            183

Recordkeeper
The name of the entity

FIG. 11a

TPA
A "TPA" or "Third Party Administrator" is an organization that supports a Recordkeeper in delivering services to the plan. If the plan is supported by a TPA, select the TPA from the pull down list. FBi's TPA pull down list is populated with over 400 firms that act as TPAs. If you cannot locate your TPA, email FBi's help desk to add them to the list. FBi's help desk is available from 9am to 5pm eastern time. They can be reached via email at support@fiduciarybenchmarks.com.

Plan Type
The plan type as defined by the Internal Revenue Code for the plan being benchmarked. FBi currently supports benchmarking on three types of defined contribution plans: Profit Sharing, Money Purchase, and 401(k) (which include 401(k)/profit sharing combinations). Plan type is one of multiple factors considered by FBi in building benchmark groups of similar plans to support valid comparisons. Plan type can be found on a plan's Summary Plan Description document or on the plan's Form 5500 filing - line 8a. To find a list of codes, see page 18 of the 2008 Form 5500 Instructions booklet at http://www.irs.gov/pub/irspdf/i5500.pdf.

Approximate Participants
Being requested here is the approximate number of participants in the plan.

Edit Plan Data

Basic Plan Information
Basic Plan Information builds on the plan's profile started through the "Add A Plan" step. This information is used primarily to determine benchmark group comparisons, but also supports plan design information. Basic Plan information is required for all FBi reports.

1. How large is the plan in dollars?
Being requested is the total amount of dollar assets for the plan.

2. How many Participants does the plan have?
The number of participants in the plan with an account balance. This Is one of multiple" factors considered by FBI In building benchmark groups of similar plans to support valid comparisons.

3. Does the plan use Auto Enrollment?
Being requested is whether the plan offers auto enrollment, and if yes what type. A plan offers Automatic Enrollment when an employer automatically enrolls participants into the plan thereby deferring a portion of their pay. For plans that choose auto-enrollment, there are two approaches. Plans either auto-enroll new hires or auto enroll all participants in the plan. Auto-enrollment is one of multiple factors considered by FBI in building benchmark groups of similar plans to support valid comparisons.

4. Does the plan provide Employer Matching Contributions?
Being requested is whether the plan offers employer matching contributions. An employer matching contribution is the amount that a company contributes to its employees' retirement accounts, in proportion to each employee's contribution. Matches can be made in the form of percentages or flat dollar amounts (dollar for dollar up to $1,000 for example). Employer match is one of multiple factors considered by FBi in building benchmark groups of similar plans to support valid comparisons.

5. If applicable, what is the maximum match the plan provides as a percentage of employee pay?
Being requested is the maximum possible employer matching contribution as a percentage of employee pay. For example, if a plan matches 50% of the first 4% of an employee's. pay, and 100% of the next 2%, the maximum match is 4%.

FIG. 11b

6. If applicable, how much would an employee contribute to maximize the employer match as a percentage of pay?
Being requested is the amount of employee contribution needed to receive the maximum employer matching contribution. For example, if a plan matches 50% upto 6%, an employee has to contribute 6% to obtain the maximum employer match. Thus, the answer is 6%.

7. When was the last comprehensive review of this Plan's fees and services or when the plan last went to bid (MM/OD/YYVY)?
Being, requested is the date when the plan last comprehensively reviewed its fees and services or went to bid. Please indicate the most recent date of the two. The date last reviewed or went to bid is an important factor considered by FBi in building benchmark groups of similar plans to support valid comparisons.

8. What is the Plan's three-digit 10 Number (found on Line 1b of Tax form 5.500)?
Being requested is the plan's three digit plan number that the employer or administrator assigned to the plan. FBi's system uses this three digit number, in conjunction with the employer identification number (EIN) to uniquely identify each plan. A plan's three digit number can be found on the plan's Form 5500 filing - line' lb. FBi automatically populates the plan number field by cross referencing the provided plan sponsor name with public records.

For non-advisor users these two questions are also presented:

Is the plan supported by an advisor/consultant?
Being collected here is whether the plan is supported by an advisor/consultant.

Who is the plan's advisor/consultant firm?
Being collected here is the name of the plan's advisor/consultant's firm.

Participant Success Measures

Participant success measures are 12 key industry statistics that measures how well a plan helps participants prepare for retirement.

1. What is the plan's participation rate?
Being requested is the plan's participation rate. Participation rate is calculated by dividing the number of active participants by the number of eligible participants. An active participant is defined as any eligible employee making a deferral into the plan. This measure should be taken from the last compliance test.

2. What was the Plan's deferral rate for "non-Highly Compensated Employees (non-HCEs)" as of last compliance test?
Being requested is the plan's deferral rate for non-Highly Compensated Employees (non-HCE). A deferral rate is the percentage of compensation deferred into the retirement plan. Non-Highly Compensated employees are those that do not fall under the category of Highly Compensated as defined by ERISA. This measure should be taken from the last compliance test.

3. What was the Plan's deferral rate for "Highly Compensated Employees (HCEs)" as of last compliance test?
Being requested is the plan's deferral rate for Highly Compensated Employees (HCE). A deferral rate is the percentage of compensation deferred into the retirement plan. Highly Compensated employees are those that fall under the category of Highly Compensated as defined by ERISA. This measure should be taken from the last compliance test.

FIG. 11c

4. What percentage of plan participants are maximizing the company match?
Being requested is the percentage of participants contributing enough to the plan to receive the maximum employer matching contribution.

5. What percentage of catch-up eligible participants are making catch-up contributions?
Being requested is the number of catch-up eligible participants that are making catch-up contributions. To calculate this measure, sum the total number of participants making catch-up contributions and divide by the total number of Participants who are over the age of 50 and are eligible to make catch-up contributions.

6. What percentage of PLAN ASSETS is invested in automatically diversified options?
Being requested is the percentage of plan assets that are invested in automatically diversified options. FBI defines automatically diversified options to include: balanced funds, risk or target date retirement choices, model portfolios, and "managed accounts. To calculate this measure, sum the percentage of plan assets held in all automatically diversified options and divide by total plan assets. If you are ordering FBI Report 2 – Plan Fees, Design and Participant Success Measures, this will be calculated for you.

7. What percentage of plan assets are invested through the Plan's Advice programs?
Being requested is the percentage of plan assets that are invested through the plan's" advice programs. A plan's advice program can be a combination of the following: 1) Services that help participants identify and select an Investment strategy and allocation using an internet service model (like Financial Engines) or 2) Services that help participants identify and select an Investment strategy and allocation using a "Face to Face" service model. To calculate this measure, sum the percentage of plan assets invested through advice programs and divide by total plan assets.

8. What percentage of plan participants are invested through the Plan's Advice programs?
Being requested is the percentage of plan participants that are invested through the plan's advice programs. A plan's advice program can be either or a combination of the following: 1) Services that help participants identify and select an investment strategy and allocation using an internet service model (like Financial Engines) or 2) Services that help participants identify and select an investment strategy and allocation using a "Face to Face" service model. To calculate this measure, divide those participants served through the plan's advice program(s) by the total number of participants within an account balance.

9. What percentage of plan participants are using Auto re-balancing?
Being requested is the percentage of plan participants that are using the auto-rebalance Feature associated with the plan. An auto-rebalance feature automatically and on a set schedule rebalances a -participant's account back to an established target asset allocation. To calculate this measure, divide the number of participants using the auto-rebalance feature by the total number of participants with an account balance.

10. What percentage of plan participants terminated in the last 12 months "cashed out" their retirement plan?
Being requested is the percentage of participants terminated in the last 12 months, who cashed out their retirement plan. "Cashing out" is defined as a participant taking their account balance as a cash distribution (as opposed to staying in tile plan or rolling over the account balance into another qualified plan or IRA). To calculate this measure, divide those who took a cash distribution in the last 12 months by the total number of terminated participants during" the last 12 months.

FIG. 11d

11. What percentage of plan participants has established a Personal Retirement Savings Goal?
Being requested here is the percentage of participants whom have established a Personal Retirement Savings Goal. FBi defines a personal savings goal as an established and documented goal against which progress can be measured. A participant's Personal Retirement Savings Goal could result from an education and communication process (including advice), or it could be the result of a financial plan, or any number of other approaches. Documentation of the goal is the key against which this measure should be judged: A Personal Retirement Savings Goal may come in the form of a dollar amount and/or income replacement level. To calculate this measure, divide the number of participants with a Personal Retirement Savings Goal by the total number of participants in plan.

12. What percentage of plan participants are on track to achieve their personal retirement savings goal?
Being requested here is the percentage of participants who have established a Personal Retirement Savings Goal that are on track to meet it. FBi defines a Personal Retirement Savings Goal as an established and documented goal against which progress can be measured (see "What percentage of plan participants have established a Personal Retirement Savings Goal?" for more details). FBi defines "on track to meet that goal" as those participants who based on their current and future savings and a reasonable investment rate of return, will achieve their Personal Retirement Savings Goal. To calculate this measure, divide the number of participants on track to reach their .goal by the total number of participants with an established goal.

Design

Plan design provisions relate to plan eligibility, employee and employer contributions, investments structure and distributions.

1. Does the plan have a service requirement to determine plan eligibility?
Being requested is whether the plan has a service requirement. Service Requirements tie plan eligibility to length of employment. Service requirements cannot be longer than 12 months.

2. Does the plan have an age requirement to determine plan eligibility?
Being requested is whether the plan has an age requirement. Age requirements tie plan eligibility to the age of the employee. Age requirements cannot exceed age 21.

3. What is the maximum pre-tax employee contribution allowed by the plan?
Being requested is the maximum pre-tax contribution allowed by the plan. While all plans are subject to the IRS contribution limits, some plans further limit contributions to a maximum percentage of employee pay.

4. Does the plan offer auto deferral increase?
Being requested is whether the plan offers auto deferral increase. Auto deferral increase automatically increases participant pre-tax deferrals annually until they reach a maximum contribution level.

5. What is the maximum deferral rate reached through auto increase?
Being requested is the maximum participant deferral rate reached through the plan's auto-increase provision. The maximum deferral level is the level at which no additional automatic increases are made.

FIG. 11e

| |
|---|
| 6. Does the plan allow catch-up contributions?<br>Being requested is whether the plan allows participants who are over the age of 50 to make "catch-up" contributions. Catch-up contributions are additional contributions allowed over and above standard IRS contribution limits. |
| 7. Does the plan allow after-tax contributions?<br>Being requested is whether the plan allows participants to make after-tax, contributions. After-tax contributions consist of money contributed to a retirement account after a participant has paid all applicable state and federal taxes. |
| 8. Does the plan allow ROTH 401(k) contributions?<br>Being requested is whether the plan allows participants to make Roth contributions to their 401(k). A Roth contribution is made using after tax dollars. The Roth 401(k) can offer advantages to high-income individuals who haven't been able to contribute to a Roth IRA because of income restrictions. |
| 9. Does the plan allow "Roll-ins" from other qualified plan?<br>Being requested is whether the plan allows participants to transfer the balances of other qualified retirement plans into this plan. |
| 10. Does the plan apply a vesting schedule to employer matching contributions?<br>Being requested is whether the plan allows participants to transfer the balances of other qualified retirement |
| 11. How many years to 100% vest the employer matching contributions?<br>Being requested is whether the plan allows participants to make after-tax, contributions. After-tax contributions consist of money contributed to a retirement account after a participant has paid all applicable state and federal taxes. |
| 12. Does the plan offer discretionary profit sharing contributions?<br>Being requested is whether the plan allows participants to make Roth contributions to their 401(k). A Roth contribution is made using after tax dollars. The Roth 401(k) can offer advantages to high-income individuals who haven't been able to contribute to a Roth IRA because of income restrictions. |
| 13. Does the plan apply a vesting schedule to employer discretionary profit sharing contributions?<br>Being requested is whether the plan allows participants to transfer the balances of other qualified retirement . A vesting schedule. |
| 14. How many years to 100% vest the employer matchingdiscretionary profit sharing contributions?<br>Being requested is whether the plan allows participants to make after-tax, contributions. After-tax contributions consist of money contributed to a retirement account after a participant has paid all applicable state and federal taxes. |
| 12. Does the plan offer an employer required contributions?<br>Being requested is whether the plan makes required contributions as feature its design. A required basic contribution relates to certain conditions of the plan that necessitate monies be contributed by the employer annually . |

FIG. 11f

| |
|---|
| 16. Does the plan apply a vesting schedule to employer required contributions?<br>Being requested is whether the plan allows participants to transfer the balances of other qualified retirement |
| 17. How many years to 100% vest the employer required contributions?<br>Being requested is whether the plan allows participants to make after-tax, contributions. After-tax contributions consist of money contributed to a retirement account after a participant has paid all applicable state and federal taxes. |
| 18. What is the maximum number of loans per participant allowed ?<br>Being requested is the maximum number of loans allowed by the plan. Not all plans have a loan provision. |
| 19. Does the plan allow in-service withdrawals?<br>Being requested is whether the plan allows participants to transfer the balances of other qualified retirement . |
| 20. Does the plan allow hardship withdrawals?<br>Being requested is whether the plan allows hardship withdrawals. |
| 21. Does the plan offer installment payments as a distribution option for participants at retirement?<br>Being requested is whether the plan allows installment payments as a distribution option for participants at retirement |
| 22. Does the plan offer annuity distribution option for participants at retirement?<br>Being requested is whether the plan allows annuity distribution option for participants at retirement. |

| Investments |
|---|
| Search by:<br>Plan investments are added to the system using a search tool. Each query searches against the Morningstar Database (mutual funds and variable annuities), the evestmentAlliance database (separate account and commingled funds), and the existing bank of user defined securities held in the system. Investment searches are conducted using either investment name and in the case of mutual funds — Ticker Symbols. |

FIG. 11g

Mutual Fund Searches

FBi recommends using ticker symbols for mutual fund searches. You can search for more than one mutual fund by placing multiple ticker symbols in the search bars. Separated by commas. Other Investment Searches (collective trusts, separate accounts, general account backed products, and annuities (group or variable) begin by placing a partial or complete investment name in the search bar. To further refine the results, choose either an instrument type and/or asset class.

Can't find a Security?

If you cannot locate a plan investment-it may not be in the system. To find out, contact FBi's help desk via email to have them research the

Default Fund

Being requested here is the Fund or Series of Funds that operates as the plan's default choice. A plan's default choice receives the contributions of participants who have not made an investment election or are auto-enrolled into the plan.

Liquidation Charge May Apply

Being requested here is whether or not an investment choice in your plan has potential liquidation charges that result from a plan level decision to remove the choice from the plan. In the case of mutual funds, liquidation charges take the form of Contingent Deferred Sales Charges. In the case of certain group annuity or general account backed products, liquidation charges take the form of surrender or withdrawal charges. An affirmative indication does not mean a charge has or will occur, but that the potential for a charge does exist.

Total Assets

Being requested here is the dollar amount of plan assets held in each plan investment choice.

Closed for Contributions

Being measured here is whether or not any investment options are closed to accepting new contributions from participants. A closed status could be the result of a plan level decision (for example a committee deciding not to allow new contributions to a fund) or alternatively a fund level decision (a money manager decides to close the fund to new monies all together).

Recordkeeper Proprietary

Being measured here is whether or not an investment option is a proprietary investment of the recordkeeper. A proprietary choice is one where the recordkeeper or an affiliate is managing, sub-advising, or packaging an investment product from which they garner a fee.

Is it a Passive Index?

Being measured here is whether an investment choice is passively managed, also known as a ·passive index fund. A passive index fund is one that replicates an underlying market index at a very low cost. The objective of a passive index fund (unlike their actively managed counter

FIG. 11h

| |
|---|
| Fees |
| I) Approaches Used to Pay Plan Fees<br>Service providers are paid using many methods. This section asks qualifying questions by serviceprovider, and-then custom builds a list of fee elements for completion based on your response. |
| a)     How is the Plan's Advisor/Consultant Paid? (Check those that apply)<br>Being captured in this section are the methods used to pay the plan's advisor/consultant. Please Identify the methods used and a tailored set of advisor/consultant fee fields will be generated for completion. If the plan does not have an advisor/consultant, skip this section. |
| From Transactions-Commissions<br>Is the advisor/consultant collecting commissions on plan cash flows? Please check if applicable. A fee field will be added below to collect total commissions paid. |
| From Transactions-Finder's Fee<br>Is the advisor/consultant collecting finder's fee on plan cash flows? Please check if applicable. A fee field will be added below to collect total commissions paid. |
| From Investments = 12b-1 Fee<br>Is the advisor/consultant the broker of record on plan mutual funds and directly collecting 12b-1 fees? Please check if applicable. A fee field will be added below to collect total commissions paid. |
| Wrap Fees—BPS (same across all assets—Level)<br>Is the advisor/consultant collecting wrap fee across all plan assets? Please check if applicable. A fee field will be added below to collect total commissions paid. |
| Wrap Fees—BPS (not same across all assets)<br>Is the advisor/consultant collecting wrap fee that is NOT 100% level across all plan assets? Please check if applicable. A fee field will be added below to collect total commissions paid. |
| Hard Dollars — Sponsor Paid<br>Is the advisor/consultant collecting a hard dollar fee (retainer or otherwise) from the Plan Sponsor direcltly? Please check if applicable. Sponsor paid fee field will be added below for completion. |
| Hard Dollars — Paid from the Plain<br>Is the advisor/consultant collecting a hard dollar fee (retainer or otherwise) from the Plan ? Please check if applicable. Plain paid fee field will be added below for completion. |
| B) How is the Plan's Recordkeeper Paid? (Check those that apply)<br>Being captured in this section are the methods used to pay the recordkeeper. Please Identify the methods used arid a tailored set of recordkeeper fee fields will be generated for completion. If the plan does not have a recordkeeper skip this section. |

FIG. 11i

| |
|---|
| From Investments - Fee offsets from investments as a percentage of assets<br>Is the recordkeeper collecting payments (as a percentage of plan assets) from plan investments as offsets to their fees? Payments collected from investments in include 12b-1 fees, sub-TA fees, other sources of revenue sharing, and internal fee crediting associated with proprietary money management or other sources of revenue. Please check if applicable. A column will be added to the investment table below for completion of the TOTAL INVESTMENT PAYMENT IN BASIS POINTS to recordkeeper by choice. |
| From Investments-Sub-TA fees paid on a per participant account basis<br>Is the recordkeeper collecting sub-TA fees - PAID ON A PER PARTICIPANT ACCOUNT BASIS -on any choices within the plan? Please check if applicable. A column will be added to the investment table below for completion of the sub-TA $'s per participant account by choice where applicable. For each choice where a sub-TA fee $'s per participant account is being paid, indicate the number of participant accounts holding the choice. |
| From Investments-All Collected fee offsets are returned to participants<br>Is the recordkeeper returning all collected fee offsets from investments to participant accounts? Please check if applicable. FBi will consider this in how plan fees are processed in Benchmarks Reports. |
| Wrap Fees - BPS (same across all assets - Level)<br>Is the recordkeeper collecting a level wrap fee across all plan assets? Please check if applicable. A fee field will be added below to collect the wrap amount in basis points. |
| Wrap Fees - BPS (not same across all assets)<br>Is the recordkeeper collecting a wrap fee that is NOT 100% level across all choices? Please check if applicable. A column will be added to the investment table below for completion of the wrap by investment choice. |
| Hard Dollars - Sponsor Paid<br>Is the recordkeeper collecting a hard dollar fee (retainer or otherwise) by the Plan Sponsor directly? Please check if applicable. Sponsor paid fee fields will be added below for completion. |
| Hard Dollars - Plan Paid<br>Is the recordkeeper collecting a hard dollar fee (retainer or otherwise) from the Plan? Please check if applicable. Plan paid fee fields will be added below for completion. |
| c) How is the Plan's TPA Paid? (Check those that apply)<br>Being captured in this section are the methods used to pay the plan's TPA. Please Identify the methods used and a tailored set of fee fields will be generated for completion. If the plan does not have a TPA, skip this section. |
| From Investments --Fee offsets from investments as a percentage of assets<br>Is the TPA collecting payments (as a percentage of plan assets) from plan investments as offsets to their fees? Payments collected from investments include 12b-l fees, sub-TA fees, other sources of revenue sharing, and internal fee crediting associated with proprietary money management or other sources of revenue. Please check if applicable. A column will be added to the Investment table below for completion of the TOTAL INVESTMENT PAYMENT IN BASIS POINTS to TPA by choice. |

FIG. 11j

| |
|---|
| From Investments - Sub-TA fees paid on a per participant account basis<br>Is the TPA collecting sub-TA fees - PAID ON A PER PARTICIPANT ACCOUNT BASIS - on any choices within the plan? Check if applicable. A column will be added to the investment table below for completion of the sub-TA $'s per participant account by choice where applicable. For each choice where a sub-TA fee $'s per participant account is being paid, indicate the number of participant accounts holding the choice. |
| From Investments - All Collected fee offsets are returned to participants<br>Is the TPA returning all collected fee offsets from investments to participant accounts? Please check if applicable. |
| Wrap Fees-BPS (same across all assets-Level)<br>Is the TPA returning all collected fee offsets from investments to participant accounts? Please check if applicable. FBi will consider this in how plan fees are processed in Benchmarks Reports. |
| Wrap Fees-BPS (not same across all assets)<br>Is the TPA collecting a wrap fee that is NOT 100% level across all choices? Please check if applicable. A column will be added to the investment table below for completion of the wrap by investment choice. |
| Hard Dollars-Sponsor Paid<br>Is the TPA collecting a hard dollar fee (retainer or otherwise) by the Plan Sponsor directly? Please check if applicable. Sponsor paid fee fields will be added below for completion. |
| Hard Dollars-Plan Paid<br>Is the TPA collecting a hard dollar fee (retainer or otherwise) from the Plan? Please check if applicable. Plan paid fee fields will be added below for completion. |
| d) Does the plan have an ERISA Spending Account (ESA) or a Plan Reimbursement Expense Account (PERA)?<br>Being captured here is whether the plan uses an ERISA Spending Account (ESA) or a Plan a Plan Reimbursement Expense Account (PERA). ESAs and PERAs support plan sponsor directed spending of excess revenue generated by the plan. |
| 2) Investment Fees at the Fund Level (Data Columns for Completion)<br>Being collected here are the investment related fees paid to the plan's service providers based on the answers to the qualifying questions above. |
| Advisor/consultant Investment Fees-Pays Commissions (check box)<br>Being collected is whether an investment choice pays commission to the advisor/consultant. Total plan commissions will be captured in the Investment Fees at the Plan Level Section. |
| Advisor/consultant Investment Fees-Pays Finder's Fees (check box)<br>Being collected is whether an investment choice pays finder's fees to the advisor/consultant. Total finder's fees will be captured in the Investment Fees at the Plan Level Section. |
| Advisor/consultant Investment Fees-From Investments - 12b-l (bps)<br>Being collected is the 12b-l fee in basis points being paid by an investment choice to the advisor/consultant as the broker of record on the Fund. |

FIG. 11k

| |
|---|
| Advisor/consultant Investment Fees -Wrap Fees (bps)<br>Being collected is the wrap fee in basis points being applied to an investment choice and paid to the advisor/consultant. |
| Recordkeeper Investment Fees - Fee Offsets (BPS)<br>Being collected is the investment fee credit in basis points being paid by an investment choice to the record-keeper as a fee offset. |
| Recordkeeper Investment Fees - Sub-TA Fee ($)/participant<br>Being collected is the sub-TA dollars per participant account being paid by an Investment choice to the record-keeper. |
| Recordkeeper Investment Fees - Wrap Fees (BPS)<br>Being collected is the wrap fee in basis point being applied to an investment choice and paid to the record-keeper. |
| TPA Investment Fees - Fee Offsets (BPS)<br>Being collected is the investment fee credit in basis points being paid by an investment choice to the TPA as a fee offset. |
| TPA Investment Fees - Sub-TA Fee ($)/participant<br>Being collected is the sub-TA dollars per participant account being paid by an investment choice to the TPA. |
| TPA Investment Fees - Wrap Fees (BPS)<br>Being collected is the wrap fee in basis point being applied to an investment choice and paid to the TPA. |
| 3) Investment Fees at the Plan Level<br>Being collected here are fees paid to service providers from investments, but charged or totaled at the plan level. |
| Total Commissions to Advisor/Consultant ($)<br>Being captured are the total dollars in commissions collected by the advisor/consultant in the last 12 months. |
| Total Finders Fees to Advisor/Consultant ($)<br>Being captured are the total dollars in finder's fees collected by the advisor/consultant in the last 12 months. |
| Wrap fees to Advisor/Consultant (bps)<br>Being collected is the wrap fee in basis points being applied to plan assets and paid to the advisor/consultant. |
| Wrap fees to Recordkeeper (bps)<br>Being collected is the wrap fee in basis points being applied to plan assets and paid to the recordkeeper. |

FIG. 11I

| |
|---|
| Wrap fees to TPA (bps)<br>Being collected is the wrap fee in basis points being applied to plan assets and paid to the TPA. |
| 4) Sponsor Paid Fees<br>Being collected here are fees paid by the plan sponsor. |
| Retainer for Advisor/Consultant ($)<br>Being collected here is the annual retainer in dollars paid to the advisor/consultant by the plan sponsor if applicable. |
| Retainer for Recordkeeper ($)<br>Being collected here is the annual retainer in dollars paid to the recordkeeper by the plan sponsor if applicable. |
| Retainer for TPA ($)<br>Being collected here is the annual retainer in dollars paid to the TPA by the plan sponsor if applicable. |
| Retainer for Other Services ($)<br>Being collected here is the annual retainer in dollars paid to other service providers by the plan sponsor if applicable. |
| Other Fees for Advisor/Consultant ($)<br>Being collected here is the annual retainer in dollars paid to other service providers by the plan sponsor if applicable. |
| Other Fees for Recordkeeper ($)<br>Being collected here is a $ total of any additional fees paid to the recordkeeper by the plan sponsor not already captured. |
| Other Fees for TPA ($)<br>Being collected here is a $total of any additional fees paid to the TPA by the plan sponsor not already captured. |
| Other Fees for Other Services ($)<br>Being collected here is a $ total of any additional fees paid to other service providers by the plan sponsor. |
| 5) Plan Paid Fees<br>Being collected here are fees paid by the plan that were not already captured. |
| Retainer for Advisor/Consultant ($)<br>BeingcollectedhereistheannualretainerindollarspaidtotheadVisor/consultantbytheplanifapplicable. |
| Retainer for Recordkeeper ($)<br>Being collected here is the annual retainer in dollars paid to the recordkeeper by the plan if applicable. |

FIG. 11m

| |
|---|
| Retainer for TPA ($)<br>Being collected is the annual retainer in dollars paid to the TPA by the plan if applicable. |
| Retainer for Other Services ($)<br>Being collected here is the annual retainer in dollars paid to other service providers by the plan if applicable. |
| Other Fees for Advisor/Consultant ($)<br>Being collected here is a $ total of any additional fees paid to the advisor/consultant by the plan not already captured. |
| Other Fees for Recordkeeper ($)<br>Being collected here is a $ total of any additional fees paid to the recordkeeper by the plan not already captured. This includes all fees that may exist including float revenue. |
| Other Fees for TPA ($)<br>Being collected here is the annual retainer in dollars paid to the TPA by the plan sponsor if applicable. |
| Other Fees for Other Services ($)<br>Being collected here is the annual retainer in dollars paid to other service providers by the plan sponsor if applicable. |
| Other Fees for Other Services ($)<br>Being collected here are fees paid by participants. |
| Annual per participant charge ($)<br>Being collected here are fees by participant for recordkeeping services. |
| Annual per participant advice charge ($)<br>Being collected here is the annual fee per participant in the plan's advice program. |
| Loan origination charge (per occurrence) ($)<br>Being collected here is the per occurrence participant loan fee. |
| Loan maintenance charge (annual) ($)<br>Being collected here is the annual loan maintenance fee. |
| Hardship approval fee (per occurrence) ($)<br>Being collected here is the per occurrence fee to participants for taking a hardship withdrawal. |
| QDRO approval fee (per occurrence) ($)<br>Being collected here is the per occurrence fee to participants for a QDRO approval. |
| QDRO processing fee (per occurrence) ($)<br>Being collected here is the per occurrence fee to participants for a QDRO processing. |

FIG. 11n

| |
|---|
| Periodic payment processing fee (per occurrence) ($)<br>Being collected here is the per occurrence feeto participants for processing periodic payments. |
| Non-periodic payment processing fee (per occurrence) ($)<br>Being collected here is the per occurrence fee to participants for processing non-periodic payments (distributions). |
| 7) ERISA Spending Account<br>Being collected here is a brief profile of the plan's ERISA Spending Account (ESA)/Plan a Plan Reimbursement Expense Account (PERA). |
| Recordkeeper credited amount<br>Being collected is the $ amount that was credited over the last 12 months to theESA or PERA. |
| Expense categories for the last 12 months<br>Being collected is how the ESA dollars were spent over this period. |
| Year end remainder handling<br>Being collected is how any ESA dollars left over are disposed of. |

| Managed Accounts |
|---|
| 1. Does the Plan have a Managed Accounts Program?<br>Being collected is whether the plan has a managed account program. A managed account program is an Internet based service where by an investment advisor creates, implements, and monitors a personalized retirement plan for participants. The service is an elective one and results in additional fees. |
| 2. If yes, complete the following regarding the Plan's managed account program. Please complete the following list of questions for your plan's managed account program.<br><br>a) Total plan dollars invested in the managed account program<br>Being collected here is the total amount of plan assets invested in the managed account program.<br><br>b) Number of participants using a managed account<br>Being collected here is the number of participants using the managed account program.<br><br>c) Annual Plan Sponsor Paid Fee for Managed Account Program ($)<br>Being collected here is the annual plan sponsor paid fee for offering the managed account program to plan participants.<br><br>d) Minimum Annual Managed Account Fee Per Participant ($)<br>Being collected here is the minimum account fee that a participant would pay to access the service.<br><br>e) Fee for a $10,000 account invested in the managed Account program (basis points)<br>Being collected here is the fee in basis points that would be applied to an account with a $10,000 balance. To calculate this fee apply the plan's managed account fee schedule (and associated breaks) to a $10,000 account.<br>f) Fee for a $25,000 account invested in the managed Account program (basis points)<br>Being collected here is the fee in basis points that would be applied to an account with a $25,000 balance. |

FIG. 11o

To calculate this fee - apply the plan's managed account fee schedule (and associated breaks) to a $25,000 account.

g) Fee for a $50,000 account invested in the managed Account program (basis points)
Being collected here is the fee in basis points that would be applied to an account with a $50,000 balance. To calculate this fee - apply the plan's managed account fee schedule (and associated breaks) to a $50,000 account.

h) Fee for a $100,000 account invested in the managed Account program (basis points)
Being collected here is the fee in basis points that would be applied to an account with a $100,000 balance. To calculate this fee - apply the plan's managed account fee schedule (and associated breaks) to a $100,000 account.

i) Fee for a $250,000 account invested in the managed Account program (basis points)
Being collected here is the fee in basis points that would be applied to an account with a $250,000 balance. To calculate this fee - apply the plan's managed account fee schedule (and associated breaks) to a $250,000 account.

j) Fee for a $500,000 account invested in the managed Account program (basis points)
Being collected here is the fee in basis points that would be applied to an account with a $500,000 balance. To calculate this fee - apply the plan's managed account fee schedule (and associated breaks) to a $500,000 account.

k) Provider of investment advice for managed account service
Being collected here is the Firm that provides the investment advisory services for the plan's managed account program.

l) Percentage of the managed account fees credited to the Managed Account Provider
Being collected here is the percentage of the total managed account fees generated by the plan that go to the plan's advice provider. If some revenue is shared with the recordkeeper, it could be less than 100%.

m) Percentage of the managed account fees credited to the Recordkeeper
Being collected here is the percentage of the managed account fees generated by the plan that go to the recordkeeper or their affiliates.

n) Total fees paid for Managed Accounts ($)
Being collected here is the total dollar amount of managed account fees generated by the plan in the last 12 months.

Self Directed Accounts

1. Does the plan have a self directed account?
Being collected is whether the plan has a self directed account program. A self directed account is a plan Investment option where the participant can invest in securities (mutual funds or otherwise) that are not on the plan's core menu offering. This, can take the form of a mutual fund trading window, or a self directed brokerage account.

2. If yes, complete the following regarding your self-directed account. Please complete this following list of question for your self-directed account program.

a) Total plan dollars invested in self directed account program ($)
Being collected here is the total amount of plan assets held in the self directed account program.

b) Annual plan sponsor paid fee for SDA ($)
Being collected here is the annual plan sponsor paid fee for offering a self program to plan participants.

FIG. 11p c) Annual fee per participant to use the SDA ($)
Being collected here is the annual account fee that each participant pays to have a self directed account program.

d) Fee for Internet placed transactions (stock or fund) ($)
Being collected here is the $ amount per internet transaction charged within the self directed account program. If certain mutual funds can be purchases at no cost, provide the fee for when one does apply.

e) Fee for 800 Operator Assisted transactions (stock or fund) ($)
Being collected here is the $ amount per operator assisted transaction charged within the self directed account program.

f) Percentage of the SDA fees credited to the SDA Provider
Being collected here is the percentage of fees generated by the self directed account credited to the self directed account provider.

g) Percentage of the SDA fees credited to the Recordkeeper
Being collected here is the percentage of fees generated by the self directed account credited to the recordkeeper.

h) Provider of Self Directed Account service
Being collected here is the firm that provides the self directed account services to the plan.

i) Number of participants using
Being collected here is the number of participants with a self directed account.

FIG. 11q

Step 2 - Dashboard

Search Criteria

By Report Type: [All ⇩]    By Data Status: [All ⇩]    [SEARCH]

Plan List:

| Sponsor | Plan Name | Plan Assets | Record keeper Name | Choose Report | Data Entry Method | Plan Data Status | Report Date |
|---|---|---|---|---|---|---|---|
| AFD Test R3 (RK Direct) | AFD Test R3 401(K) (Direct) | $1,500,000.00 | American Funds | Fees, Plan Design, and Participant Success Measures ⇩ | Self | Record keeper Review | Next Scheduled: 07/31/2009 |
| AFD Test R3 (Premier TPA) | AFD Test R3 401(K) (Premier TPA) | $2,500,000.00 | American Funds | Fees, Plan Design, and Participant Success Measures ⇩ | Self | Record keeper Review | Next Scheduled: 07/31/2009 |
| AFD Test R2 (Premier) | AFD Test R2 401(K) Plan (Premier) | $3,500,000.00 | American Funds | Fees, Plan Design, and Participant Success Measures ⇩ | Self | Record keeper Review | Next Scheduled: 07/31/2009 |
| AFD Test R3 | AFD Test R3 401(K) | $3,500,000.00 | | Fees, Plan Design, and Participant Success Measures ⇩ | Self | Record keeper | Next Scheduled: |

FIG. 12a

| AFD_Test R4 (Premier) | Plan (Premier) | $3,500,000.00 | American Funds | Fees, Plan Design, and Participant Success Measures [+] | Self | Review | 07/31/2009 |
| --- | --- | --- | --- | --- | --- | --- | --- |
| AFD_Test R4_401 (k) Plan (Premier) | | | | | | Record keeper Review | Next Scheduled: 07/31/2009 |

Show [10] records per page          Records |< < 1 > >| to 5 of 5

Copyright 2009, Fiduciary Benchmarks, Inc. All Rights Reserved.

FIG. 12b

Home   Sponsors   Plans   Dashboard   Welcome, Advisorconsultant, Jim of Advisorconsultant, Inc   Logout   Change Password

— 194

Choose Plan Data Entry Method

⇩Show intro

| Sponsor: Test 2 [Edit] | Plan: Test 2 Plan |
| Record keeper: XXXXXXXXXXXX Plan Services | TPA: Not Applicable |
| | Plan Type: 401K |

Plan Data Entry Method

Would you like to send a request to your Record keeper/TPA to complete the data request?

○ Yes, please send the request to the Record keeper/TPA      ◉ No, I will complete it myself

— 195                                                          — 196

[GO BACK]   [CANCEL]   [SAVE & CONTINUE] — 197

Copyright 2009, Fiduciary Benchmarks, Inc. All Rights Reserved.

FIG. 13

Home  Sponsors  Plans  Dashboard  Welcome, Advisorconsultant, Jim of Advisorconsultant, Inc  Logout  Change Password

— 199

Step 3 - Edit Plan Data - Basic Information

| Sponsor: AFD Test R3 (RK Direct) [Edit] | Plan: AFD Test R3 401 (K) (Direct) | Plan Type: 401K |
| Record keeper: American Funds | TPA: WT Benefits, LLC | |

202 — Basic Info  203 — Success Measures  204 — Design  205 — Investments  206 — Fees  207 — Managed Account  208 — Self Directed Account ▸Show Intro

Basic Plan Information

1. How large is the plan in dollars?
   $1,500,000.00

2. How many participants does the plan have?
   100

3. Does the plan use Auto Enrollment?
   ○ Yes - New Hires   ○ Yes - All Employees   ◉ No   ○ Not Applicable 4. Does the plan provide Employer Matching Contributions?
   ○ Yes - % Match   ○ Yes - Other Match   ◉ No   ○ Not Applicable

FIG. 14a

5. If applicable, what is the maximum match the plan provides as a percentage of employee pay?

6. If applicable, how much would an employee contribute to maximize the employer match as a percentage of pay?

7. When was the last comprehensive review of this Plan's fees and services or when the plan last went to bid (MM/DD/YYYY)? Please indicate the most recent date of the two.

8. What is the Plan's three-digit ID Number (found on Line 1b of Tax form 5500)?

[ GO BACK ]  [ CANCEL ]  [ SAVE & CONTINUE ]

Copyright 2009, Fiduciary Benchmarks, Inc. All Rights Reserved.

| Select ⇵ |
|---|
| Skip this question if buying Report 2 - Fees, Plan Design, and Success Measures – it will be calculated automatically. |
| 6. What percentage of PLAN ASSETS are invested in automatically diversified options? ⓘ |
| This includes the following: target retirement date funds, risk based funds, balanced funds, plan assets invested in managed account programs, and other asset allocation programs. |
| Select ⇵ |
| 7. What percentage of plan assets are invested through the Plan's Advise programs? ⓘ |
| Select ⇵ |
| 8. What percentage of plan participants are invested through the Plan's Advise programs? ⓘ |
| Select ⇵ |
| 9. What percentage of plan participants are using Auto re-balancing? ⓘ |
| Select ⇵ |
| 10. What percentage of plan participants terminated in the last 12 months "cashed out" their retirement plan? ⓘ |
| Note: These are participants that chose NOT to stay in the plan and DID NOT "roll over" their account to an IRA or another qualified plan. |
| Select ⇵ |
| 11. What percentage of plan participants have established a Personal Retirement Savings Goal? ⓘ |
| Note: this is an advanced success measure, which would result from measurement focused education and communication efforts. Many plans may not track it. |
| Select ⇵ |
| 12. What percentage of plan participants are on track to achieve their personal retirement savings goal? ⓘ |
| Note: This is an advanced success measure, which would result from measurement focused education and communication efforts. Many plans may not track it. |
| Select ⇵ |

[ GO BACK ]    [ CANCEL ]    [ SAVE & CONTINUE ]

Copyright 2009, Fiduciary Benchmarks, Inc. All Rights Reserved.

Home    Sponsors    Plans    Dashboard    Welcome, Advisorconsultant, Jim of Advisorconsultant, Inc    Logout    Change Password

Step 3 – Edit Plan Data – Design Provision

Sponsor: AFD Test R3 (RK Direct) [Edit]　　　　Plan: AFD Test R3 401 (K) (Direct)　　　　Plan Type: 401K
Record keeper: American Funds　　　　　　　　TPA: WT Benefits, LLC Show Intro Basic Info    Success Measures    Design    Investments    Fees    Managed Account    Self Directed Account

Plan Design

1. Does the plan have a service requirement to determine plan eligibility?
   [Select ▼]

2. Does the plan have an age requirement to determine plan eligibility?
   [Select ▼]

3. What is the maximum pre-tax employee contribution allowed by the plan?

4. Does the plan offer auto deferral increase?
   [Select ▼]

5. What is the maximum deferral rate reached through auto increase?

FIG. 14f

6. Does the plan allow catch-up contributions?
Select

7. Does the plan allow after-tax contributions?
Select

8. Does the plan allow ROTH 401 (k) contributions?
Select

9. Does the plan allow "Roll-in" from other qualified plan?
Select

10. Does the plan apply a vesting schedule to employer matching contributions?
Select 11. How many years to 100% vest the employer matching contribution?

12. Does the plan offer discretionary profit sharing contributions?
Select

13. Does the plan apply a vesting schedule to employer discretionary profit sharing contributions?

14. How many years to 100% vest the employer discretionary profit sharing contribution?

15. Does the plan offer an employer required contribution?
Select

16. Does the plan apply a vesting schedule to the employer required contribution?

17. How many years to 100% vest the employer required contribution?

| | | R3 | | | | | ☐ | ☒ | ☐ | |
|---|---|---|---|---|---|---|---|---|---|---|
| ☒ | 200 | American Funds Trgt Date Ret 2010 R3 | Mutual Fund | RCATX | Target Date 2000-2010 | | ☐ | 150,000.00 | ☐ | ☒ | No | ☐ |
| ☒ | 202 | American Funds Trgt Date Ret 2020 R3 | Mutual Fund | RCCTX | Target Date 2016-2020 | | ☐ | 75,000.00 | ☐ | ☒ | No | ☐ |
| ☒ | 204 | American Funds Trgt Date Ret 2030 R3 | Mutual Fund | RCETX | Target Date 2026-2030 | | ☐ | 75,000.00 | ☐ | ☒ | No | ☐ |
| ☒ | 206 | American Funds Trgt Date Ret 2040 R3 | Mutual Fund | RCKTX | Target Date 2036-2040 | | ☐ | 45,000.00 | ☐ | ☒ | No | ☐ |
| ☐ | 208 | American Funds Trgt Date Ret 2050 R3 | Mutual Fund | RCITX | Target Date 2050+ | | ☐ | 15,000.00 | ☐ | ☒ | No | ☐ |
| ☐ | 235 | American Funds Washington Mutual R3 | Mutual Fund | RWMCX | Large Value | | ☐ | 480,000.00 | ☐ | ☒ | No | ☐ |
| ☐ | 80 | American Funds Growth Fund of Amer R3 | Mutual Fund | RGACX | Large Growth | | ☐ | 105,000.00 | ☐ | ☒ | No | ☐ |
| ☐ | 29051 | American Funds New Economy R3 | Mutual Fund | RNGCX | Large Growth | | ☐ | 180,000.00 | ☐ | ☒ | No | ☐ |
| ☐ | 274481 | American Funds EuroPacific Gr R3 | Mutual Fund | RERCX | Foreign Large Blend | | ☐ | 75,000.00 | ☐ | ☒ | No | ☐ |
| ☐ | 196 | American Funds Capital World G/I R3 | Mutual Fund | RWICX | World Stock | | ☐ | 45,000.00 | ☐ | ☒ | No | ☐ |
| ☐ | 191 | The Cash Management Trust of American R3 | Mutual Fund | RKCXX | Money Market Tax-Free | | ☐ | 75,000.00 | ☐ | ☒ | No | ☐ |
| ☐ | 496529 | Forfeitures | | | Forfeitures | S&P 500 Index | NA | 0.00 | NA | NA | NA | ☐ |

FIG. 14j

| | | Self-Directed Brokerage | S&P 500 Index | NA | | | | |
|---|---|---|---|---|---|---|---|---|
| ☐ | 49474 | Self-Directed Brokerage | S&P 500 Index | NA | 0.00 | ☐ | NA | ☐ |
| ☐ | 49473 | Company Stock | S&P 500 Index | NA | 0.00 | ☐ | NA | ☐ |
| ☐ | 49472 | Participant Loans | S&P 500 Index | NA | 0.00 | NA | NA | ☐ |
| | | | | | 1,500,000.00 | | | |

Investment performance information as of 03/31/2009

[GO BACK]  [CANCEL]  [SAVE & CONTINUE]

Copyright 2009, Fiduciary Benchmark Inc. All Rights Reserved.

FIG. 14k

Home   Sponsors   Plans   Dashboard   Welcome, Advisorconsultant, Jim of Advisorconsultant, Inc   Logout   Change Password

Step 3 - Edit Plan Data - Fee Details

Sponsor: AFD Test R3 (RK Direct)[Edit]   Plan: AFD Test R3 401 (k) (Direct)   Plan Type: 401K
Record keeper: American Funds   TPA: WT Benefits, LLC

[Show Intro]

Basic Info   Success Measures   Design   Investments   Fees   Managed Account   Self Directed Account 1. Approaches Used to Pay Plan Fees ( Based on your responses, FBi will dynamically build a custom series of fee fields that apply to this plan)

1. How is the Plan's Advisor/Consultant Paid? (Check those that apply)

From Transactions
☐ Commissions
☐ Finder's Fee

From Investments
☐ 12b1 Fees

Wrap Fees
[BPS (same across all assets) ▼]

Hard Dollars
☐ Sponsor Paid
☐ Paid from the Plan

2. How is the Plan's Record keeper paid? (Check those that apply)

From Investments
☐ Fee offsets from investments as a percentage of assets
☒ Sub-TA fees paid on a per participant account basis
☐ All Collected fee offsets are returned to participants Wrap Fees
[Select ▼]

Hard Dollars
☒ Sponsor Paid
☐ Paid from the Plan

3. How is the Plan's TPA paid? (Check those that apply)

From Investments
☒ Fee offsets from investments as a percentage of assets
☐ Sub-TA fees paid on a per participant account basis
☐ All Collected fee offsets are returned to participants Wrap Fees
[Select ▼]

Hard Dollars
☒ Sponsor Paid
☐ Paid from the Plan

FIG. 141

4. Does the plan have an ERISA Spending Account (ESA) or a Plan Reimbursement Expense Account (PERA)?

○ Yes  ● No

2. Investment Fees at the Investment Product Level

| Fund Name | Asset Class | Ticker | Market Value | % Plan | Expense Ratio | Participant Count | Record keeper | | TPA |
|---|---|---|---|---|---|---|---|---|---|
| | | | | | | | Sub-TA fee ($) | Participant ($) Fee offsets (bps) | |
| American Funds Bond Fund of Amer R3 | Intermediate-Term Bond | RBFCX | $180,000.00 | 12.00% | 0.96% | 50 | | 12.0000 | 10.0 |
| American Funds Target Date ret 2010 R3 | Target Date 2000-2010 | RCATX | $150,000.00 | 10.00% | 1.05% | 7 | | 12.0000 | 10.0 |
| American Funds Target Date ret 2020 R3 | Target Date 2016-2020 | RCCTX | $75,000.00 | 5.00% | 1.08% | 9 | | 12.0000 | 10.0 |
| American Funds Target Date ret 2030 R3 | Target Date 2026-2030 | RCETX | $75,000.00 | 5.00% | 1.09% | 6 | | 12.0000 | 10.0 |
| American Funds Target Date ret 2040 R3 | Target Date 2036-2040 | RCKTX | $45,000.00 | 3.00% | 1.10% | 18 | | 12.0000 | 10.0 |
| American Funds Target Date 2050 R3 | Target Date 2050+ | RCTTX | $15,000.00 | 1.00% | 0.82% | 1 | | 12.0000 | 10.0 |
| American Funds Washington Mutual R3 | Large Value | RWMCX | $480,000.00 | 32.00% | 0.01% | 75 | | 12.0000 | 10.0 |
| American Funds Growth Fund of Amer R3 | Large Growth | RGACX | $105,000.00 | 7.00% | 1.16% | 0 | | 12.0000 | 10.0 |
| American Funds New Economy R3 | Large Growth | RNGCX | $180,000.00 | 12.00% | 1.07% | 79 | | 12.0000 | 10.0 |
| American Funds EuroPacific Gr R3 | Foreign Large Blend | RERCX | $75,000.00 | 5.00% | 1.08% | 85 | | 12.0000 | 10.0 |
| American Funds Capital World Gr R3 | World Stock | RMICX | $45,000.00 | 3.00% | 1.01% | 29 | | 12.0000 | 10.0 |
| The Cash Management Trust of America R3 | Money Market-Tax-Free | RXCXX | $75,000.00 | 5.00% | | 45 | | 12.0000 | 10.0 |

3. Investment Fees at the Plan Level

Wrap Fee to Advisor/Consultant (bps)

50.0

4. Sponsor Paid Fees

FIG. 14m

| Retainer for Other Services ($) | Other Fees for Other Services ($) | Retainer for Record keeper ($) | Retainer for TPA ($) | Other Fees for Record keeper ($) | Other Fees for TPA ($) |
|---|---|---|---|---|---|
| | | | .00 | 750.00 | 1,250.00 |

5. Other Plan Paid Fees

| Retainer for Other Services ($) | Other Fees for Other Services ($) |
|---|---|
| | |

6. Other Participant Paid Fees

| Annual per participant charge ($) | Annual per participant advice charge ($) | Loan origination fee (per occurrence) ($) |
|---|---|---|
| | | |

| Annual Loan Maintenance Fees ($) | Hardship approval fee (per occurrence) ($) | QDRO approval fee (per occurrence) ($) |
|---|---|---|
| | | |

| QDRO processing fee (per occurrence) ($) | Periodic payment processing fee (per occurrence) ($) | Non-Periodic payment processing fee (per occurrence) ($) |
|---|---|---|
| | | |

[ GO BACK ]  [ CANCEL ]  [ SAVE & CONTINUE ]

Copyright 2009, Fiduciary Benchmarks, Inc. All Rights Reserved.

FIG. 14n

FIG. 14o g. Fee for a $50,000 account invested in the Managed Account Program (basis points)

h. Fee for a $100,000 account invested in the Managed Account Program (basis points)

i. Fee for a $250,000 account invested in the Managed Account Program (basis points)

j. Fee for a $500,000 account invested in the Managed Account Program (basis points)

k. Provider of investment advice for Managed Account Service l. Percentage of the managed account fees credited to the Managed Account Provider m. Percentage of the managed account fees credited to the Record keeper n. Total fees paid for Managed Accounts

[GO BACK] [CANCEL] [SAVE & CONTINUE]

Copyright 2009, Fiduciary Benchmarks, Inc. All Rights Reserved.

FIG. 14p

Home   Sponsors   Plans   Dashboard   Welcome Advisorconsultant, Jim of Advisorconsultant, Inc   Logout   Change Password

Step 3 - Edit Plan Data - Self Directed Accounts

Sponsor: AFD Test R3 (RK Direct) [Edit]   Plan: AFD Test R3 401 (K) (Direct)   Plan Type: 401K
Record keeper: American Funds   TPA: WT Benefits, LLC Basic Info   Success Measures   Design   Investments   Fees   Managed Account   Self Directed Account

Self Directed Accounts

1. Does the plan have a Self Directed Account?
   ○ Yes  ◉ No

2. If yes, complete the following regarding your Self Directed Account Program.

a. Total plan dollars invested in Self Directed Account.

b. Annual plan sponsor paid fee for SDA c. Annual fee per participant to use the SDA d. Fee for Internet placed transactions (stock or fund)

e. Fee for 800 Operator Assisted transactions (stock or fund)

f. Percentage of the SDA fees credited to the SDA Provider

FIG. 14q g. Percentage of the SDA fees credited to the Record keeper h. Provider of Self Directed Account service i. Number of participants using Self Directed Accounts

[GO BACK]  [CANCEL]  [SAVE & CONTINUE]

Copyright 2009, Fiduciary Benchmarks, Inc. All Rights Reserved.

FIG. 14r

Data Elements for FBI Reports 1 (Fees, Plan Design, and Participant Success Measures)
(FOR CURRENT DATA REQUEST)

Indicate Data Source or If Not Applicable:

| Index | Portal tab | # | Question | Answer(s) | Sources / Applicability | Who Completes? |
|---|---|---|---|---|---|---|
| 1. | Basic Plan Information | 1-1 | How large is the plan in dollars? | $ | | |
| 2. | Basic Plan Information | 1-2 | How many participants does the plan have? | # | | |
| 3. | Basic Plan Information | 1-3 | Does the plan use Auto Enrollment? | Yes - New Hires<br>Yes - All Employees<br>No<br>Not Applicable | | |
| 4. | Basic Plan Information | 1-4 | Does the plan provide Employer Matching Contributions? | Yes - % Match<br>Yes - Other Match<br>No<br>Not Applicable | | |
| 5. | Basic Plan Information | 1-5 | If applicable, what is the maximum match the plan provides as a percentage of employees pay? | % | | |
| 6. | Basic Plan Information | 1-6 | If applicable, how much would an employee contribute to maximize the employer match as a percentage of pay? | % | | |
| 7. | Basic Plan Information | 1-7 | When was the last comprehensive review of this Plan's fees and services or when the plan last went to bid (MM/DD/YYYY)? Please indicate the most recent date of the two. | Date | | |
| 8. | Basic Plan Information | 1-8 | What is the Plan's three-digit ID Number (found on line 1b of Tax form 5500)? | # | | |

FIG. 15a

Data Elements for FBi Report 1 (Fees, Plan Design, and Participant Success Measures)
(FOR CURRENT DATA REQUEST)

Indicate Data Source or If Not Applicable:

| Index | Portal tab | # | Question | Answer(s) | Source / Applicability | Who Completes? |
|---|---|---|---|---|---|---|
| 9. | Success Measures | 2-1 | What is the plan's participation rate? | Don't know<br>Not Applicable<br>1% to 100% (select drop down) | | |
| 10. | Success Measures | 2-2 | What was the Plan's deferral rate for "non-Highly Compensated Employees (non-HCEs)" as of last compliance test? | Don't know<br>Not Applicable<br>1.0% to 20.0% (select drop down) | | |
| 11. | Success Measures | 2-3 | What was the Plan's deferral rate for "Highly Compensated Employees (HCEs)" as of last compliance test? | Don't know<br>Not Applicable<br>1.0% to 20.0% (select drop down) | | |
| 12. | Success Measures | 2-4 | What percentage of plan participants are maximizing the company match? | Don't know<br>Not Applicable<br>1% to 100% (select drop down) | | |
| 13. | Success Measures | 2-5 | What percentage of catch-up eligible participants are catch-up contributions? | Don't know<br>Not Applicable<br>1% to 100% (select drop down) | | |
| 14. | Success Measures | 2-6 | What percentage of PLAN ASSETS are invested in automatically diversified options?<br>Skip this question: if buying Report 2 – Fees, Plan Design and Success Measures – It will be calculated automatically.<br>This includes the following: target retirement data funds, risk based funds, balanced funds, plan assets invested in managed account programs, and other asset allocation programs. | Don't know<br>Not Applicable<br>1% to 100% (select drop down) | | |
| 15. | Success Measures | 2-7 | What percentage of plan participants are using Auto re-balancing? | Don't know<br>Not Applicable<br>1% to 100% (select drop down) | | |
| 16. | Success Measures | 2-8 | What percentage of plan participants terminated in the past 12 months 'cashed out' their retirement plan?<br>Note: These are participants that chose NOT to stay in the plan and DID NOT 'roll over' their account to an IRA or another qualified plan. | Don't know<br>Not Applicable<br>1% to 100% (select drop down) | | |
| 17. | Success Measures | 2-9 | What percentage of plan participants have established a Personal Retirement Saving Goals?<br>Note: This is an advanced success measure, which would result from measurement focused education and communication efforts. Many plans may not track it. | Don't know<br>Not Applicable<br>1% to 100% (select drop down) | | |
| 18. | Success Measures | 2-10 | What percentage of plan participants are on track to achieve their personal retirement saving goal?<br>Note: This is an advanced success measure, which would result from measurement focused education and communication efforts. Many plans may not track it. | Don't know<br>Not Applicable<br>1% to 100% (select drop down) | | |

FIG. 15b

Data Elements for FBi Report 1 (Fees, Plan Design and Participant Success Measures)
(FOR CURRENT DATA REQUEST)

| Index | Portal tab | # | Question | Answer(s) | Indicate Data Source or if Not Applicable: Source / Applicability | Who Completes? |
|---|---|---|---|---|---|---|
| 19. | Success Measures | 3-1 | Does the Plan have a service requirement to determine plan eligibility? | Don't know<br>Not Applicable<br>1 to 12 months (select drop down) | | |
| 20. | | 3-2 | Does the plan have an age requirement to determine plan eligibility? | Don't know<br>Not Applicable<br>16 to 21 years (select drop down) | | |
| 21. | | 3-3 | What is the maximum pre-tax employee contribution allowed by the plan? | Don't know<br>Not Applicable<br>10% or pay to 100% of pay (select drop down) | | |
| 22. | | 3-4 | Does the plan offer auto deferral increases? | Don't know<br>Not Applicable<br>No<br>Yes | | |
| 23. | | 3-5 | What is the maximum deferral rate reached through auto increases? | Don't know<br>Not Applicable<br>1% of pay to >20% of pay (select drop down) | | |
| 24. | | 3-6 | Does the plan allow catch-up contributions? | Don't know<br>Not Applicable<br>No<br>Yes | | |
| 25. | | 3-7 | Does the plan allow after-tax contributions? | Yes<br>No<br>Not Applicable<br>Don't know | | |
| 26. | | 3-8 | Does the plan allow ROTH 401(k) contributions? | Yes<br>No<br>Not Applicable<br>Don't know | | |
| 27. | | 3-9 | Does the plan allow "roll-ins" from other qualified plans? | Yes<br>No<br>Not Applicable<br>Don't know | | |
| 28. | | 3-10 | Does the plan apply a vesting schedule to employer matching contributions? | Yes - Graded<br>Yes - Cliff<br>Yes - other<br>No<br>Not Applicable<br>Don't know | | |
| 29. | | 3-11 | How many years to 100% vest the employer matching contributions? | Don't know<br>Not Applicable<br>1 year to 5 year (select drop down) | | |

FIG. 15c

Data Elements for FBi Report 1 (Fees, Plan Design, and Participant Success Measures)
(FOR CURRENT DATA REQUEST)

| Index | Portal tab | # | Question | Answer(s) | Source / Applicability | Indicate Data Source or If Not Applicable: Who Completes? |
|---|---|---|---|---|---|---|
| 30. | Plan Design | 3-12 | Does the plan offer discretionary profit sharing contributions? | Not Applicable / Don't know / No / Yes | | |
| 31. | Plan Design | 3-13 | Does the plan apply a vesting schedule to employer discretionary profit sharing contributions? | Yes - Graded / Yes - Cliff / Yes - Other / No Not Applicable / Don't know | | |
| 32. | Plan Design | 3-14 | How many years to 100% vest the employer discretionary profit sharing contribution? | Not Applicable / Don't know / 1 year to 6 years (select drop down) | | |
| 33. | Plan Design | 3-15 | Does the plan offer an employer required contributions? | Not Applicable / Don't know / No / Yes | | |
| 34. | Plan Design | 3-16 | Does the plan apply a vesting schedule to the employer required contributions? | Yes - Graded / Yes - Cliff / Yes - Other / No / Not Applicable / Don't know | | |
| 35. | Plan Design | 3-17 | How many years to 100% vest the employer required contribution? | Not Applicable / Don't know / 1 year to 6 years (select pull down) | | |
| 36. | Plan Design | 3-18 | What is the maximum number of loans per participant allowed? | Not Applicable / Loans not allowed / Don't know / 1 loan to more than 10 loans (select drop down) | | |
| 37. | Plan Design | 3-19 | Does the plan allow in-service withdrawals? | Not Applicable / Don't know / No / Yes | | |
| 38. | Plan Design | 3-20 | Does the plan allow hardship withdrawals? | Not Applicable / Don't know / No / Yes | | |
| 39. | Plan Design | 3-21 | Does the plan offer installment payments as a distribution option for participants at retirement? | Not Applicable / Don't know / No / Yes | | |
| 40. | Plan Design | 3-22 | Does the plan offer an annuity distribution option for participants at retirement? | Not Applicable / Don't know / No / Yes | | |

FIG. 15d

Data Elements for FBi Report 1 (Fees, Plan Design, and Participant Success Measures)
(FOR CURRENT DATA REQUEST)

| Index | Portal tab | # | Question | Answer(s) | Indicate Data Source or if Not Applicable: Source / Applicability | Who Completes? |
|---|---|---|---|---|---|---|
| 41. | Investments | 4-1 | For each plan investment choice | Fund ticker | | |
| 42. | Investments | 4-2 | For each plan investment choice | Fund name | | |
| 43. | Investments | 4-3 | For each plan investment choice | Default fund in the plan? | | |
| 44. | Investments | 4-4 | For each plan investment choice | Liquidation charge may apply if sold? | | |
| 45. | Investments | 4-5 | For each plan investment choice | Total plan assets in security | | |
| 46. | Investments | 4-6 | For each plan investment choice | Closed to new contributions (plan level)? | | |
| 47. | Investments | 4-7 | For each plan investment choice | Proprietary to the record keeper? | | |

FIG. 15e

Data Elements for FBI Reports 1 (Fees, Plan Design, and Participant Success Measures)
(FOR CURRENT DATA REQUEST)

| Index | Portal tab | # | Question | Answer(s) | Source / Applicability | Indicate Data Source or If Not Applicable: Who Completes? |
|---|---|---|---|---|---|---|
| 48. | Fees | 5-1 | Advisor compensation sources | Commissions | | |
| 49. | Fees | 5-2 | Advisor compensation sources | Finders fees | | |
| 50. | Fees | 5-3 | Advisor compensation sources | 12b-1 fees (broker of record) | | |
| 51. | Fees | 5-4 | Advisor compensation sources | Asset based compensation - level wrap | | |
| 52. | Fees | 5-5 | Advisor compensation sources | Asset based compensation - non – level wrap | | |
| 53. | Fees | 5-6 | Advisor compensation sources | Hard dollars - plan paid | | |
| 54. | Fees | 5-7 | Advisor compensation sources | Hard dollars - sponsor paid | | |
| 55. | Fees | 5-8 | Record keeper compensation sources | Fee offsets from investments as a % of assets | | |
| 56. | Fees | 5-9 | Record keeper compensation sources | Sub - TA fees on a per participant account basis | | |
| 57. | Fees | 5-10 | Record keeper compensation sources | All collected fee offsets are returned to parts. | | |
| 58. | Fees | 5-11 | Record keeper compensation sources | Asset based compensation - level wrap | | |
| 59. | Fees | 5-12 | Record keeper compensation sources | Asset based compensation - non - level wrap | | |
| 60. | Fees | 5-13 | Record keeper compensation sources | Hard dollars - plan paid | | |
| 61. | Fees | 5-14 | Record keeper compensation sources | Hard dollars - sponsor paid | | |
| 62. | Fees | 5-15 | TPA compensation sources | Fee offsets from investments as a % of assets | | |
| 63. | Fees | 5-16 | TPA compensation sources | Sub - TA fees on a per participant account basis | | |
| 64. | Fees | 5-17 | TPA compensation sources | All collected fee offsets are returned to parts. | | |
| 65. | Fees | 5-18 | TPA compensation sources | Asset based compensation - level wrap | | |
| 66. | Fees | 5-19 | TPA compensation sources | Asset based compensation - non - level wrap | | |
| 67. | Fees | 5-20 | TPA compensation sources | Hard dollars - plan paid | | |
| 68. | Fees | 5-21 | TPA compensation sources | Hard dollars - sponsor paid | | |
| 69. | Fees | 5-22 | Plan has an ERISA Spending Account (ESA) or a Plan Reimbursement Expense Account (PERA)? | Yes, No | | |

FIG. 15f

Data Elements for FSI: Report 1 (Fees, Plan Design, and Participant Success Measures)
(FOR CURRENT DATA REQUEST)

Indicate Data Source or 8 Not Applicable

| Index | Portal tab | # | Question | Answer(s) | Source / Applicability | Who Completes? |
|---|---|---|---|---|---|---|
| 70. | Fees | 5-23 | Investment Fees at the Investment Product Level - Advisor | Payor commission to advisor | | |
| 71. | Fees | 5-24 | Investment Fees at the Investment Product Level - Advisor | Pays finders fees to advisor | | |
| 72. | Fees | 5-25 | Investment Fees at the Investment Product Level - Advisor | 12b-1 Fee to advisor (advisor broker of record) | | |
| 73. | Fees | 5-26 | Investment Fees at the Investment Product Level - Advisor | Wrap fees (not same across all choices) | | |
| 74. | Fees | 5-27 | Investment Fees at the Investment Product Level - RK | Fee offsets to record keeper | | |
| 75. | Fees | 5-28 | Investment Fees at the Investment Product Level - RK | Sub - TA/participant | | |
| 76. | Fees | 5-29 | Investment Fees at the Investment Product Level - RK | Number of participants owning fund | | |
| 77. | Fees | 5-30 | Investment Fees at the Investment Product Level - RK | Wrap fees (not same across all choices) | | |
| 78. | Fees | 5-31 | Investment Fees at the Investment Product Level - TPA | Fee offsets to TPA | | |
| 79. | Fees | 5-32 | Investment Fees at the Investment Product Level - TPA | Sub - TA/participant | | |
| 80. | Fees | 5-33 | Investment Fees at the Investment Product Level - TPA | Number of participants owning fund | | |
| 81. | Fees | 5-34 | Investment Fees at the Investment Product Level - TPA | Wrap fees (not same across all choices) | | |
| 82. | Fees | 5-35 | Investment Fees at the Plan Level - Advisor | Total commissions $ | | |
| 83. | Fees | 5-36 | Investment Fees at the Plan Level - Advisor | Total finders fees $ | | |
| 84. | Fees | 5-37 | Investment Fees at the Plan Level - Advisor/consultant | Wrap fee (bns) | | |
| 85. | Fees | 5-38 | Investment Fees at the Plan Level - Record keeper | Wrap fee (bps) | | |
| 86. | Fees | 5-39 | Investment Fees at the Plan Level - TPA | Wrap fee (bns) | | |
| 87. | Fees | 5-40 | Other Plan Paid Fees - Rebates for advisor/consultant | $ | | |
| 88. | Fees | 5-41 | Other Plan Paid Fees - Other fees for advisor/consultant | $ | | |
| 89. | Fees | 5-42 | Other Plan Paid Fees - Rebates fees for record keeper | $ | | |
| 90. | Fees | 5-43 | Other Plan Paid Fees - Other fees for record keeper | $ | | |
| 91. | Fees | 5-44 | Other Plan Paid Fees - Rebates fees for TPA | $ | | |
| 92. | Fees | 5-45 | Other Plan Paid Fees - Other fees for TPA | $ | | |
| 93. | Fees | 5-46 | Other Plan Paid Fees - Rebates fees for others | $ | | |
| 94. | Fees | 5-47 | Other Plan Paid Fees - Other fees for others | $ | | |
| 95. | Fees | 5-48 | Other Sponsor Paid Fees - Rebates for advisor/consultant | $ | | |
| 96. | Fees | 5-49 | Other Sponsor Paid Fees - Other fees for advisor/consultant | $ | | |
| 97. | Fees | 5-50 | Other Sponsor Paid Fees - Rebates fees for record keeper | $ | | |
| 98. | Fees | 5-51 | Other Sponsor Paid Fees - Other fees for record keeper | $ | | |
| 99. | Fees | 5-52 | Other Sponsor Paid Fees - Rebates fees for TPA | $ | | |
| 100. | Fees | 5-53 | Other Sponsor Paid Fees - Other fees for TPA | $ | | |
| 101. | Fees | 5-54 | Other Sponsor Paid Fees - Rebates fees for others | $ | | |
| 102. | Fees | 5-55 | Other Sponsor Paid Fees - Other fees for others | $ | | |
| 103. | Fees | 5-56 | ERISA Spending Account - Record keeper credited amount | $ | | |
| 104. | Fees | 5-57 | ERISA Spending Account - Expense categories used for the last 12 months | Plan Administration Services (including compliance)<br>Plan Document Services<br>Start-up, Conversion, and M&A Services<br>Trust and Custody Services<br>Company Stock Services<br>Plan communication Services<br>On-Site Education Services<br>Advisor/Consultant Services<br>Accountant Fee<br>Attorney Fees<br>Trustee Fee | | |

FIG. 15g

Data Elements for FB: Report 1 (Fees, Plan Design, and Participant Success Measures)
(FOR CURRENT DATA REQUEST)

| Index | Portal tab | # | Question | Answer(s) | Indicate Data Sources or if Not Applicable: Source / Applicability | Who Completes? |
|---|---|---|---|---|---|---|
| 105. | Fees | 5-58 | ERISA Spending Account - Year end remainder handling | Carries over to next year<br>Reverts back to record keeper<br>Credited back to participant accounts | | |
| 106. | Fees | 5-59 | Other Participant Paid Fees - Annual per participant charge | $ | | |
| 107. | Fees | 5-60 | Other Participant Paid Fees - Annual per participant service charge | $ | | |
| 108. | Fees | 5-61 | Other Participant Paid Fees - Loan origination fee (per occurrence) | $ | | |
| 109. | Fees | 5-62 | Other Participant Paid Fees - Annual Loan Maintenance Fee | $ | | |
| 110. | Fees | 5-63 | Other Participant Paid Fees - Hardship approval fee (per occurrence) | $ | | |
| 111. | Fees | 5-64 | Other Participant Paid Fees - QDRO approval fee (per occurrence) | $ | | |
| 112. | Fees | 5-65 | Other Participant Paid Fees - QDRO processing fee (per occurrence) | $ | | |
| 113. | Fees | 5-66 | Other Participant Paid Fees - Periodic payment processing fee (per occurrence) | $ | | |
| 114. | Fees | 5-67 | Other Participant Paid Fees - Non - Periodic payment processing fee (per occurrence) | $ | | |

FIG. 15h

Data Elements for FBi Report 1 (Fees, Plan Design, and Participant Success Measures)
(FOR CURRENT DATA REQUEST)

| Index | Portal tab | # | Question | Answer(s) | Indicate Data Source or if Not Applicable: | |
|---|---|---|---|---|---|---|
| | | | | | Source / Applicability | Who Completes? |
| 115. | Managed Account | 6-1 | 1. Does the plan have a Managed Account Program? | Yes, No | | |
| 116. | Managed Account | 6-2 | a) Total plan dollars invested in the Managed Account Program | $ | | |
| 117. | Managed Account | 6-2 | b) number of participants using a managed account | # | | |
| 118. | Managed Account | 6-2 | c) Annual Plan Sponsor Paid Fee for Managed Account Program | $ | | |
| 119. | Managed Account | 6-2 | d) Minimum Annual Managed Account Fee Per Participant | $ | | |
| 120. | Managed Account | 6-2 | e) Fee for a $10,000 account invested in the managed Account program | bps | | |
| 121. | Managed Account | 6-2 | f) Fee for a $25,000 account invested in the managed Account program | bps | | |
| 122. | Managed Account | 6-2 | g) Fee for a $50,000 account invested in the managed account program | bps | | |
| 123. | Managed Account | 6-2 | h) Fee for a $100,000 account invested in the managed account program | bps | | |
| 124. | Managed Account | 6-2 | i) Fee for a $250,000 account invested in the managed account program | bps | | |
| 125. | Managed Account | 6-2 | j) Fee for a $500,000 account invested in the managed account program | bps | | |
| 126. | Managed Account | 6-2 | k) Provider of investment advice for the managed account program | fill in | | |
| 127. | Managed Account | 6-2 | l) Percentage of the managed account fees credited to the managed account provider | % | | |
| 128. | Managed Account | 6-2 | m) Percentage of the managed account fees credited to the record keeper | % | | |
| 129. | Managed Account | 6-2 | n) Total fees paid for Managed Accounts | $ | | |

FIG. 15i

Data Elements for FBI Report 1 (Fees, Plan Design, and Participant Success Measures)
(FOR CURRENT DATA REQUEST)

| Index | Portal tab | # | Question | Answer(s) | Indicate Data Source or if Not Applicable: Source / Applicability | Who Completes? |
|---|---|---|---|---|---|---|
| 130. | Self Directed Account | 7-1 | 1. Does the plan have a Self Directed Account? | Yes, No | | |
| 131. | Self Directed Account | 7-2 | a) Total plan dollars invested in the Self Directed Account program? | $ | | |
| 132. | Self Directed Account | 7-2 | b) Annual plan sponsor paid fee for SDA | $ | | |
| 133. | Self Directed Account | 7-2 | c) Annual fee per participant to use the SDA | $ | | |
| 134. | Self Directed Account | 7-2 | d) Fee for internet placed transactions (stock or fund) | $ | | |
| 135. | Self Directed Account | 7-2 | e) Fee for 800 Operator Assisted transactions (stock or fund) | $ | | |
| 136. | Self Directed Account | 7-2 | f) Percentage of the SDA fees credited to the SDA Provider | % | | |
| 137. | Self Directed Account | 7-2 | g) Percentage of the SDA fees credited to the record keeper | % | | |
| 138. | Self Directed Account | 7-2 | h) Provider of Self Directed Account service | fill in | | |
| 139. | Self Directed Account | 7-2 | i) Number of participants using Self Directed Accounts | # | | |

FIG. 15j

Data Elements for FBi Report 2 (Sponsor and Advisor Provided Services)
(for reference in advance of possible future data requests)

Indicate Data Source or If Not Applicable:

| Index | Portal tab | # | Question | Answer(s) | Source / Applicability | Who Completes? |
|---|---|---|---|---|---|---|
| 1. | Plan Design and Admin. Support Provided | 8-1 | Alert plan decision makers of important regulatory and rules changes | If provided, check those delivering service:<br>___ Record keeper<br>___ Advisor/Consultant<br>___ TPA<br>___ Other<br><br>Hot Button issue (opinion)? ___ Yes ___ No | | |
| 2. | Plan Design and Admin. Support Provided | 8-2 | Assists in design of plan's eligibility provision, including use of Auto Enrollment | If provided, check those delivering service:<br>___ Record keeper<br>___ Advisor/Consultant<br>___ TPA<br>___ Other<br><br>Hot Button issue (opinion)? ___ Yes ___ No | | |
| 3. | Plan Design and Admin. Support Provided | 8-3 | Assists in design of plan's Employee Contribution structures, including Roth or use of Auto increases | If provided, check those delivering service:<br>___ Record keeper<br>___ Advisor/Consultant<br>___ TPA<br>___ Other<br><br>Hot Button issue (opinion)? ___ Yes ___ No | | |
| 4. | Plan Design and Admin. Support Provided | 8-4 | Assists in design of plan's Employer Contribution approach, including use of employer match | If provided, check those delivering service:<br>___ Record keeper<br>___ Advisor/Consultant<br>___ TPA<br>___ Other<br><br>Hot Button issue (opinion)? ___ Yes ___ No | | |
| 5. | Plan Design and Admin. Support Provided | 8-5 | Assists in design of plan's loan and withdrawal policy | If provided, check those delivering service:<br>___ Record keeper<br>___ Advisor/Consultant<br>___ TPA<br>___ Other<br><br>Hot Button issue (opinion)? ___ Yes ___ No | | |

FIG. 16a

Data Elements for FBi Report 2 (Sponsor and Advisor Provided Services)
(for reference in advance of possible future data requests)

| Index | Portal tab | # | Question | Answer(s) | Source / Applicability | Who Completes? |
|---|---|---|---|---|---|---|
| 6. | Plan Design and Admin. Support Provided | 8-6 | Aids in structuring plan's distribution options, including possible use of installments and annuities | If provided, check those delivering service:<br>___ Record keeper<br>___ Advisor/Consultant<br>___ TPA<br>___ Other<br><br>Hot Button Issue (opinion)? ___ Yes ___ No | | |
| 7. | Plan Design and Admin. Support Provided | 8-7 | Helps monitor ongoing performance of record keeper | If provided, check those delivering service:<br>___ Record keeper<br>___ Advisor/Consultant<br>___ TPA<br>___ Other<br><br>Hot Button Issue (opinion)? ___ Yes ___ No | | |
| 8. | Plan Design and Admin. Support Provided | 8-9 | Carries out a record keeping search with appropriate recommendation to plan sponsor | If provided, check those delivering service:<br>___ Record keeper<br>___ Advisor/Consultant<br>___ TPA<br>___ Other<br><br>Hot Button Issue (opinion)? ___ Yes ___ No | | |
| 9. | Plan Design and Admin. Support Provided | 8-10 | Assesses benefits of outsourcing all retirement plans to your record keeper | If provided, check those delivering service:<br>___ Record keeper<br>___ Advisor/Consultant<br>___ TPA<br>___ Other<br><br>Hot Button Issue (opinion)? ___ Yes ___ No | | |

Indicate Data Source or if Not Applicable.

FIG. 16b

Data Elements for FBI Report 2 (Sponsor and Advisor Provided Services)
(for reference in advance of possible future data requests)

| Index | Portal tab | # | Question | Answer(s) | Indicate Data Source or if Not Applicable: Source / Applicability | Who Completes? |
|---|---|---|---|---|---|---|
| 10. | Communications Support Provided | 9-1 | Assists with setting and monitoring goals for plan participation rates | If provided, check those delivering service: ___ Record keeper ___ Advisor/Consultant ___ TPA ___ Other<br><br>Hot Button issue (opinion)? ___ Yes ___ No | | |
| 11. | Communications Support Provided | 9-2 | Assists with setting and monitoring goals for participant deferral percentages for Non - HCEs | If provided, check those delivering service: ___ Record keeper ___ Advisor/Consultant ___ TPA ___ Other<br><br>Hot Button issue (opinion)? ___ Yes ___ No | | |
| 12. | Communications Support Provided | 9-3 | Assists with setting and monitoring goals for number of participants obtaining maximum company match | If provided, check those delivering service: ___ Record keeper ___ Advisor/Consultant ___ TPA ___ Other<br><br>Hot Button issue (opinion)? ___ Yes ___ No | | |
| 13. | Communications Support Provided | 9-4 | Assists with setting and monitoring goals for number of participants in Automatically Diversified Options | If provided, check those delivering service: ___ Record keeper ___ Advisor/Consultant ___ TPA ___ Other<br><br>Hot Button issue (opinion)? ___ Yes ___ No | | |
| 14. | Communications Support Provided | 9-5 | Assists with setting and monitoring goals for a number of participants using advice program | If provided, check those delivering service: ___ Record keeper ___ Advisor/Consultant ___ TPA ___ Other<br><br>Hot Button issue (opinion)? ___ Yes ___ No | | |

FIG. 16c

Data Elements for FBI Report 2 (Sponsor and Advisor Provided Services)
(for reference in advance of possible future data requests.)

Indicate Data Source or if Not Applicable:

| Index | Portal tab | # | Question | Answer(s) | Source / Applicability | Who Completes? |
|---|---|---|---|---|---|---|
| 15. | Communications Support Provided | 9-6 | Assists with setting and monitoring goals for participant diversification | If provided, check those delivering service:<br>___Record keeper<br>___Advisor/Consultant<br>___TPA<br>___Other<br><br>Hot Button issue (opinion)? ___Yes ___No | | |
| 16. | Communications Support Provided | 9-7 | Assists with setting and monitoring goals for the number of participants not cashing out | If provided, check those delivering service:<br>___Record keeper<br>___Advisor/Consultant<br>___TPA<br>___Other<br><br>Hot Button issue (opinion)? ___Yes ___No | | |
| 17. | Communications Support Provided | 9-8 | Assists with setting and monitoring goals for number of participants establishing a retirement goal | If provided, check those delivering service:<br>___Record keeper<br>___Advisor/Consultant<br>___TPA<br>___Other<br><br>Hot Button issue (opinion)? ___Yes ___No | | |
| 18. | Communications Support Provided | 9-9 | Assists with setting and monitoring goals for number of participants on track to attain a retirement goal | If provided, check those delivering service:<br>___Record keeper<br>___Advisor/Consultant<br>___TPA<br>___Other<br><br>Hot Button issue (opinion)? ___Yes ___No | | |

FIG. 16d

Data Elements for FBi Report 2 (Sponsor and Advisor Provided Services)
(for reference in advance of possible future data requests)

Indicate Data Source or if Not Applicable:

| Index | Portlet tab | # | Question | Answer(s) | Source / Applicability | Who Completes? |
|---|---|---|---|---|---|---|
| 19. | Investment Support Provided | 10-1 | Helps develop the investment policy statement | If provided, check those delivering service:<br>___Record keeper<br>___Advisor/Consultant<br>___TPA<br>___Other<br><br>Hot Button Issue (opinion)? ___ Yes ___ No | | |
| 20. | Investment Support Provided | 10-2 | Aids in the examination of whether a plan is 404(c) compliant | If provided, check those delivering service:<br>___Record keeper<br>___Advisor/Consultant<br>___TPA<br>___Other<br><br>Hot Button Issue (opinion)? ___ Yes ___ No | | |
| 21. | Investment Support Provided | 10-3 | Helps plan sponsor to determine the number and type of investment funds to offer | If provided, check those delivering service:<br>___Record keeper<br>___Advisor/Consultant<br>___TPA<br>___Other<br><br>Hot Button Issue (opinion)? ___ Yes ___ No | | |
| 22. | Investment Support Provided | 10-4 | Assists with selection of the default fund | If provided, check those delivering service:<br>___Record keeper<br>___Advisor/Consultant<br>___TPA<br>___Other<br><br>Hot Button Issue (opinion)? ___ Yes ___ No | | |
| 24. | Investment Support Provided | 10-5 | Helps determine the proper fund benchmarks and documenting any benchmark changes | If provided, check those delivering service:<br>___Record keeper<br>___Advisor/Consultant<br>___TPA<br>___Other<br><br>Hot Button Issue (opinion)? ___ Yes ___ No | | |

FIG. 16e

Data Elements for FBi Report 2 (Sponsor and Advisor Provided Services)
(for reference in advance of possible future data requests)

| Index | Portal tab | # | Question | Answer(s) | Indicate Data Source or if Not Applicable: Source / Applicability | Who Completes? |
|---|---|---|---|---|---|---|
| 25. | Investments Support Provided | 10-6 | Assists in consideration to offer an advice program | If provided, check those delivering service:<br>___ Record keeper<br>___ Advisor/Consultant<br>___ TPA<br>___ Other<br><br>Hot Button Issue (opinion)? ___ Yes ___ No | | |
| 26. | Investments Support Provided | 10-7 | Assists in consideration to offer Managed Accounts | If provided, check those delivering service:<br>___ Record keeper<br>___ Advisor/Consultant<br>___ TPA<br>___ Other<br><br>Hot Button Issue (opinion)? ___ Yes ___ No | | |
| 27. | Investments Support Provided | 10-8 | Assists in consideration to offer Self-Directed Account | If provided, check those delivering service:<br>___ Record keeper<br>___ Advisor/Consultant<br>___ TPA<br>___ Other<br><br>Hot Button Issue (opinion)? ___ Yes ___ No | | |
| 28. | Investments Support Provided | 10-9 | Assists in consideration to offer an annuity option | If provided, check those delivering service:<br>___ Record keeper<br>___ Advisor/Consultant<br>___ TPA<br>___ Other<br><br>Hot Button Issue (opinion)? ___ Yes ___ No | | |
| 29. | Investments Support Provided | 10-10 | Helps monitor the Investment policy statement | If provided, check those delivering service:<br>___ Record keeper<br>___ Advisor/Consultant<br>___ TPA<br>___ Other<br><br>Hot Button Issue (opinion)? ___ Yes ___ No | | |

FIG. 16f

Data Elements for FB Report 2 (Sponsor and Advisor Provided Services)
(for reference in advance of possible future data requests)

| Index | Portal tab | # | Question | Answer(s) | Indicate Data Source or if Not Applicable: Source / Applicability | Who Completes? |
|---|---|---|---|---|---|---|
| 30. | Investments Support Provided | 10-11 | Helps monitor ongoing performances of all investment choices | If provided, check those delivering service:<br>__Record keeper<br>__Advisor/Consultant<br>__TPA<br>__Other<br>Hot Button issue (opinion)? __Yes __No | | |
| 31. | Investments Support Provided | 10-12 | Carries out investment manager searches with appropriate recommendation to plan sponsor | If provided, check those delivering service:<br>__Record keeper<br>__Advisor/Consultant<br>__TPA<br>__Other<br>Hot Button issue (opinion)? __Yes __No | | |
| 32. | Investments Support Provided | 10-13 | Helps plan sponsor examine "mapping/blackout" options when replacing an investment manager | If provided, check those delivering service:<br>__Record keeper<br>__Advisor/Consultant<br>__TPA<br>__Other<br>Hot Button issue (opinion)? __Yes __No | | |

FIG. 16g

Data Elements for FBi Report 2 (Sponsor and Advisor Provided Services)
(for reference in advance of possible future data requests)

Indicate Data Source or if Not Applicable

| Index | Portal tab | # | Question | Answer(s) | Source / Applicability | Who Completes? |
|---|---|---|---|---|---|---|
| 33. | Fees Support Provided | 11-1 | Analyzes and makes specific recommendation for how to contract with all service providers | If provided, check those delivering service:<br>___ Record keeper<br>___ Advisor/Consultant<br>___ TPA<br>___ Other<br>Hot Button Issue (opinion)? ___ Yes ___ No | | |
| 34. | Fees Support Provided | 11-2 | Helps plan sponsor makes sure all participants share equitably in the cost of administering the plan | If provided, check those delivering service:<br>___ Record keeper<br>___ Advisor/Consultant<br>___ TPA<br>___ Other<br>Hot Button Issue (opinion)? ___ Yes ___ No | | |
| 35. | Fees Support Provided | 11-3 | Helps plan sponsor make sure all plan fees paid to all parties are FULLY DISCLOSED | If provided, check those delivering service:<br>___ Record keeper<br>___ Advisor/Consultant<br>___ TPA<br>___ Other<br>Hot Button Issue (opinion)? ___ Yes ___ No | | |
| 36. | Fees Support Provided | 11-4 | Helps plan sponsor make sure all plan fees paid to all parties are REASONABLE | If provided, check those delivering service:<br>___ Record keeper<br>___ Advisor/Consultant<br>___ TPA<br>___ Other<br>Hot Button Issue (opinion)? ___ Yes ___ No | | |
| 37. | Fees Support Provided | 11-5 | Helps plan sponsor make sure that only "qualified" expenses are being paid by the plan | If provided, check those delivering service:<br>___ Record keeper<br>___ Advisor/Consultant<br>___ TPA<br>___ Other<br>Hot Button Issue (opinion)? ___ Yes ___ No | | |

FIG. 16h

Data Elements for FBi Report 2 (Sponsor and Advisor Provided Services)
(for reference in advance of possible future data requests)

Indicate Data Source or If Not Applicable:

| Index | Portal tab | # | Question | Answer(s) | Source / Applicability | Who Completes? |
|---|---|---|---|---|---|---|
| 38. | Fees Support Provided | 11-6 | Helps plan sponsor determine which expenses should be assessed against the ERISA spending account | If provided, check those delivering service:<br>__Record keeper<br>__Advisor/Consultant<br>__TPA<br>__Other<br><br>Hot Button Issue (opinion)? __Yes __No | | |
| 39. | Fees Support Provided | 11-7 | Helps plan sponsor determine what to do with excess ERISA account credits | If provided, check those delivering service:<br>__Record keeper<br>__Advisor/Consultant<br>__TPA<br>__Other<br><br>Hot Button Issue (opinion)? __Yes __No | | |
| 40. | Fees Support Provided | 11-8 | Provides participants with an annual fee disclosure statement | If provided, check those delivering service:<br>__Record keeper<br>__Advisor/Consultant<br>__TPA<br>__Other<br><br>Hot Button Issue (opinion)? __Yes __No | | |

FIG. 16i

Data Elements for FBi Report 2 (Sponsor and Advisor Provided Services)
(for reference in advance of possible future data requests)

| Index | Portal tab | # | Question | Answer(s) | Indicate Data Source or If Not Applicable: Source / Applicability | Who Completes? |
|---|---|---|---|---|---|---|
| 41. | Company Stock Support Provided | 12-1 | Identifies a source or sources of independent research on your company stock | If provided, check those delivering services:<br>__Record keeper<br>__Advisor/Consultant<br>__TPA<br>__Other<br><br>Hot Button Issue (opinion)? __Yes __No | | |
| 42. | Company Stock Support Provided | 12-2 | Evaluates the diversification rules in your plan design | If provided, check those delivering services:<br>__Record keeper<br>__Advisor/Consultant<br>__TPA<br>__Other<br><br>Hot Button Issue (opinion)? __Yes __No | | |
| 43. | Company Stock Support Provided | 12-3 | Assesses pros and cons of share versus unit accounting | If provided, check those delivering services:<br>__Record keeper<br>__Advisor/Consultant<br>__TPA<br>__Other<br><br>Hot Button Issue (opinion)? __Yes __No | | |
| 44. | Company Stock Support Provided | 12-4 | Assesses amount of cash to hold in the company stock fund | If provided, check those delivering services:<br>__Record keeper<br>__Advisor/Consultant<br>__TPA<br>__Other<br><br>Hot Button Issue (opinion)? __Yes __No | | |
| 45. | Company Stock Support Provided | 12-5 | Helps design the company stock dividend feature of your plan | If provided, check those delivering services:<br>__Record keeper<br>__Advisor/Consultant<br>__TPA<br>__Other<br><br>Hot Button Issue (opinion)? __Yes __No | | |

FIG. 16j

Data Elements for FBI Report 2 (Sponsor and Advisor Provided Services)
(for reference in advance of possible future data requests)

| Index | Portal tab | # | Question | Answer(s) | Source / Applicability | Who Completes? |
|---|---|---|---|---|---|---|
| 46. | Company Stock Support Provided | 12-6 | Helps participants address the Net Unrealized Appreciation issues upon termination | If provided, check those delivering services:<br>___ Record keeper<br>___ Advisor/Consultant<br>___ TPA<br>___ Other<br>Hot Button issue (opinion)? ___ Yes ___ No | | |
| 47. | Company Stock Support Provided | 12-7 | Designs a behavioral finance program to encourage diversification | If provided, check those delivering services:<br>___ Record keeper<br>___ Advisor/Consultant<br>___ TPA<br>___ Other<br>Hot Button issue (opinion)? ___ Yes ___ No | | |

Indicate Data Source or if Not Applicable:

FIG. 16k

Data Elements for FBi Report 2 (Sponsor and Advisor Provided Services)
(for references in advances of possible future data requests)

| Index | Portal tab | # | Question | Answer(s) | Source / Applicability | Who Completes? |
|---|---|---|---|---|---|---|
| 48. | Additional Advisor/Consultant Service Provided | 13-1 | Acts as a Fiduciary under 1940 Act | ___ Yes | | Advisor/Consultant |
| 49. | Additional Advisor/Consultant Service Provided | 13-2 | Acts as a Fiduciary under ERISA | ___ Yes | | Advisor/Consultant |
| 50. | Additional Advisor/Consultant Service Provided | 13-3 | Provides Financial Planning Services | ___ Yes | | Advisor/Consultant |
| 51. | Additional Advisor/Consultant Service Provided | 13-4 | Provides Group Meetings | ___ Yes | | Advisor/Consultant |
| 52. | Additional Advisor/Consultant Service Provided | 13-5 | Number of Group Meetings | ___ # | | Advisor/Consultant |
| 53. | Additional Advisor/Consultant Service Provided | 13-6 | Provides One – on – One – Meetings | ___ Yes | | Advisor/Consultant |
| 54. | Additional Advisor/Consultant Service Provided | 13-7 | Number of One – on – One – Meetings (fill in) | ___ # | | Advisor/Consultant |
| 55. | Additional Advisor/Consultant Service Provided | 13-8 | Builds and manages risk - based or target retirement date portfolios from core funds | ___ Yes | | Advisor/Consultant |
| 56. | Additional Advisor/Consultant Service Provided | 13-9 | Cost for building and managing risk - based or target retirement date portfolios from core funds | Percentage of assets: ___ % Flat fee: $___ | | Advisor/Consultant |

FIG. 16l

Data Elements for FBi Report 2 (Sponsor and Advisor Provided Services)
(for reference in advance of possible future data requests)

| Index | Portal tab | # | Question | Answer(s) | Indicate Data Source or if Not Applicable: Sources / Applicability | Who Completes? |
|---|---|---|---|---|---|---|
| 57. | Level of Satisfaction - Record Keeper Services - Team | 14-1 | Rate the service team's overall expertise and knowledge level | ___A True Expert<br>___Adds Value<br>___Satisfactory<br>___Needs Improvement | | Advisor/Consultant or Sponsor |
| 58. | Level of Satisfaction - Record Keeper Services - Team | 14-2 | Rate the service team's overall approach | ___An Advocate<br>___Proactive<br>___Satisfactory<br>___Needs Improvement | | Advisor/Consultant or Sponsor |
| 59. | Level of Satisfaction - Record Keeper Services - Team | 14-3 | Has turnover in the service team negatively impacted service quality? | ___Not at all<br>___A Little<br>___A Lot<br>___Not Applicable | | Advisor/Consultant or Sponsor |
| 60. | Level of Satisfaction - Record Keeper Services - Team | 14-4 | Does the frequency with which the service team to create most the Plan's needs? | ___Yes<br>___Almost<br>___No<br>___Not Applicable | | Advisor/Consultant or Sponsor |
| 61. | Level of Satisfaction - Record Keeper Services - Team | 14-5 | What is the overall assessment of the service team? | ___Insightful and adds value<br>___Adds Value<br>___Satisfactory<br>___Needs Improvement<br>___Not Applicable | | Advisor/Consultant or Sponsor |
| 62. | Level of Satisfaction - Record Keeper Services - Team | 14-6 | Does the service team's work product meet the Plan's needs? | ___World Class<br>___Very Good<br>___Satisfactory<br>___Needs Improvement<br>___Not Applicable | | Advisor/Consultant or Sponsor |
| 63. | Level of Satisfaction - Record Keeper Services - Internet | 15-1 | Availability | ___World Class<br>___Very Good<br>___Satisfactory<br>___Needs Improvement<br>___Not Applicable | | Advisor/Consultant or Sponsor |
| 64. | Level of Satisfaction - Record Keeper Services - Internet | 15-2 | Speed | ___World Class<br>___Very Good<br>___Satisfactory<br>___Needs Improvement<br>___Not Applicable | | Advisor/Consultant or Sponsor |

FIG. 16m

Data Elements for FBI Report 2 (Sponsor and Advisor Provided Services)
(for reference in advance of possible future data requests)

Indicate Data Source or if Not Applicable

| Index | Pocket tab | # | Question | Answer(s) | Source / Applicability | Who Completes? |
|---|---|---|---|---|---|---|
| 65. | Level of Satisfaction - Participant Services - Internet | 15-3 | Easy to find what you want | World Class<br>___Very Good<br>___Satisfactory<br>___Needs Improvement<br>___Not Applicable | | Advisor/Consultant or Sponsor |
| 66. | Level of Satisfaction - Participant Services - Internet | 15-4 | Range of available information | World Class<br>___Very Good<br>___Satisfactory<br>___Needs Improvement<br>___Not Applicable | | Advisor/Consultant or Sponsor |
| 67. | Level of Satisfaction - Participant Services - Internet | 15-5 | Quality of information available | World Class<br>___Very Good<br>___Satisfactory<br>___Needs Improvement<br>___Not Applicable | | Advisor/Consultant or Sponsor |
| 68. | Level of Satisfaction - Participant Services - Internet | 15-6 | Ease of conducting a transaction | World Class<br>___Very Good<br>___Satisfactory<br>___Needs Improvement<br>___Not Applicable | | Advisor/Consultant or Sponsor |
| 69. | Level of Satisfaction - Participant Services - Internet | 15-7 | Ease of using the advice program | World Class<br>___Very Good<br>___Satisfactory<br>___Needs Improvement<br>___Not Applicable | | Advisor/Consultant or Sponsor |
| 70. | Level of Satisfaction - Participant Services - Internet | 15-8 | Range of educational materials | World Class<br>___Very Good<br>___Satisfactory<br>___Needs Improvement<br>___Not Applicable | | Advisor/Consultant or Sponsor |
| 71. | Level of Satisfaction - Participant Services - Internet | 15-9 | Quality of educational materials | World Class<br>___Very Good<br>___Satisfactory<br>___Needs Improvement<br>___Not Applicable | | Advisor/Consultant or Sponsor |

FIG. 16n

Data Elements for FBi Report 2 (Sponsor and Advisor Provided Services)
(for reference in advance of possible future data requests)

Indicate Data Source or if Not Applicable:

| Index | Portal tab | # | Question | Answer(s) | Source / Applicability | Who Completes? |
|---|---|---|---|---|---|---|
| 72. | Level of Satisfaction - Participant Services - Internet | 15-10 | OVERALL SATISFACTION - Internet Services | ___World Class<br>___Very Good<br>___Satisfactory<br>___Needs Improvement<br>___Not Applicable | | Advisor/Consultant or Sponsor |
| 73. | Level of Satisfaction - Participant Services - 800 number | 16-1 | Hours of Availability | ___World Class<br>___Very Good<br>___Satisfactory<br>___Needs Improvement<br>___Not Applicable | | Advisor/Consultant or Sponsor |
| 74. | Level of Satisfaction - Participant Services - 800 number | 16-2 | Answers call in an acceptable amount of time | ___World Class<br>___Very Good<br>___Satisfactory<br>___Needs Improvement<br>___Not Applicable | | Advisor/Consultant or Sponsor |
| 75. | Level of Satisfaction - Participant Services - 800 number | 16-3 | Ease of use of automated phone system | ___World Class<br>___Very Good<br>___Satisfactory<br>___Needs Improvement<br>___Not Applicable | | Advisor/Consultant or Sponsor |
| 76. | Level of Satisfaction - Participant Services - 800 number | 16-4 | Range of services of automated phone system | ___World Class<br>___Very Good<br>___Satisfactory<br>___Needs Improvement<br>___Not Applicable | | Advisor/Consultant or Sponsor |
| 77. | Level of Satisfaction - Participant Services - 800 number | 16-5 | Ease of accessing a customer service representative | ___World Class<br>___Very Good<br>___Satisfactory<br>___Needs Improvement<br>___Not Applicable | | Advisor/Consultant or Sponsor |
| 78. | Level of Satisfaction - Participant Services - 800 number | 16-6 | Phone rep's knowledge of your retirement plan | ___World Class<br>___Very Good<br>___Satisfactory<br>___Needs Improvement<br>___Not Applicable | | Advisor/Consultant or Sponsor |

FIG. 16o

Data Elements for FBi Report 2 (Sponsor and Advisor Provided Services)
(for reference in advance of possible future data requests)

| Index | Portal tab | # | Question | Answer(s) | Indicate Data Source or if Not Applicable. Source / Applicability | Who Completes? |
|---|---|---|---|---|---|---|
| 79. | Level of Satisfaction - Participant Services - 800 number | 16-7 | Able to resolve an issue on the first call | __World Class __Very Good __Satisfactory __Needs improvement __Not Applicable | | Advisor/Consultant or Sponsor |
| 80. | Level of Satisfaction - Participant Services - 800 number | 16-8 | Processes transaction accurately | __World Class __Very Good __Satisfactory __Needs improvement __Not Applicable | | Advisor/Consultant or Sponsor |
| 81. | Level of Satisfaction - Participant Services - 800 number | 16-9 | Treats our participants as valued customers | __World Class __Very Good __Satisfactory __Needs improvement __Not Applicable | | Advisor/Consultant or Sponsor |
| 82. | Level of Satisfaction - Participant Services - 800 number | 16-10 | OVERALL SATISFACTION - Phone Services | __World Class __Very Good __Satisfactory __Needs improvement __Not Applicable | | Advisor/Consultant or Sponsor |
| 83. | Level of Satisfaction - Participant Services - Print Materials | 17-1 | Participant statements | __World Class __Very Good __Satisfactory __Needs improvement __Not Applicable | | Advisor/Consultant or Sponsor |
| 84. | Level of Satisfaction - Participant Services - Print Materials | 17-2 | Enrollment kits | __World Class __Very Good __Satisfactory __Needs improvement __Not Applicable | | Advisor/Consultant or Sponsor |
| 85. | Level of Satisfaction - Participant Services - Print Materials | 17-3 | Newsletters and other education materials | __World Class __Very Good __Satisfactory __Needs improvement __Not Applicable | | Advisor/Consultant or Sponsor |

FIG. 16p

Data Elements for FBi Report 2 (Sponsor and Advisor Provided Services)
(for reference in advance of possible future data requests)

| Index | Portal tab | # | Question | Answer(s) | Source / Applicability | Who Completes? |
|---|---|---|---|---|---|---|
| 86. | Level of Satisfaction - Participant Services - Print Materials | 17-4 | Loan paperwork | __World Class __Very Good __Satisfactory __Needs Improvement __Not Applicable | | Advisor/Consultant or Sponsor |
| 87. | Level of Satisfaction - Participant Services - Print Materials | 17-5 | Withdrawal paperwork | __World Class __Very Good __Satisfactory __Needs Improvement __Not Applicable | | Advisor/Consultant or Sponsor |
| 88. | Level of Satisfaction - Participant Services - Print Materials | 17-6 | Distribution paperwork | __World Class __Very Good __Satisfactory __Needs Improvement __Not Applicable | | Advisor/Consultant or Sponsor |
| 89. | Level of Satisfaction - Participant Services - Print Materials | 17-7 | Confirmations | __World Class __Very Good __Satisfactory __Needs Improvement __Not Applicable | | Advisor/Consultant or Sponsor |
| 90. | Level of Satisfaction - Participant Services - Print Materials | 17-8 | OVERALL SATISFACTION - Print materials | __World Class __Very Good __Satisfactory __Needs Improvement __Not Applicable | | Advisor/Consultant or Sponsor |
| 91. | Level of Satisfaction - Participant Services - In-person services | 18-1 | Availability of group workshops | __World Class __Very Good __Satisfactory __Needs Improvement __Not Applicable | | Advisor/Consultant or Sponsor |
| 92. | Level of Satisfaction - Participant Services - In-person services | 18-2 | Accuracy of content of group workshops | __World Class __Very Good __Satisfactory __Needs Improvement __Not Applicable | | Advisor/Consultant or Sponsor |

FIG. 16q

Data Elements for FBI Report 2 (Sponsor and Advisor Provided Services)
(for reference in advance of possible future data requests)

| Index | Portal tab | # | Question | Answer(s) | Indicate Data Source or if Not Applicable: Source / Applicability | Who Completes? |
|---|---|---|---|---|---|---|
| 93. | Level of Satisfaction - Participant Services - in person services | 18-3 | Range and clarity of content for group workshops | __World Class __Very Good __Satisfactory __Needs improvement __Not Applicable | | Advisor/Consultant or Sponsor |
| 94. | Level of Satisfaction - Participant Services - in person services | 18-4 | Willingness to answer questions in group workshops | __World Class __Very Good __Satisfactory __Needs improvement __Not Applicable | | Advisor/Consultant or Sponsor |
| 95. | Level of Satisfaction - Participant Services - in person services | 18-5 | OVERALL SATISFACTION - Group workshops | __World Class __Very Good __Satisfactory __Needs improvement __Not Applicable | | Advisor/Consultant or Sponsor |
| 96. | Level of Satisfaction - Participant Services - in person services | 18-6 | Availability of one - on - one meetings | __World Class __Very Good __Satisfactory __Needs improvement __Not Applicable | | Advisor/Consultant or Sponsor |
| 97. | Level of Satisfaction - Participant Services - in person services | 18-7 | Accuracy of content of one - on - one meetings | __World Class __Very Good __Satisfactory __Needs improvement __Not Applicable | | Advisor/Consultant or Sponsor |
| 98. | Level of Satisfaction - Participant Services - in person services | 18-8 | Range and clarity of content for one - on - one meetings | __World Class __Very Good __Satisfactory __Needs improvement __Not Applicable | | Advisor/Consultant or Sponsor |
| 99. | Level of Satisfaction - Participant Services - in person services | 18-9 | Willingness to answer questions for one - on - one meetings | __World Class __Very Good __Satisfactory __Needs improvement __Not Applicable | | Advisor/Consultant or Sponsor |

FIG. 16r

Data Elements for FBi Report 2 (Sponsor and Advisor Provided Services)
(for reference in advances of possibles future data requests)

| Index | Portal tab | # | Question | Answers | Source / Applicability Indicate Data Source or If Not Applicable: | Who Completes? |
|---|---|---|---|---|---|---|
| 100. | Level of Satisfaction - Participant Services - in person services | 18-10 | OVERALL SATISFACTION - one - on - one meetings | World Class / Very Good / Satisfactory / Needs Improvement / Not Applicable | | Advisor/Consultant or Sponsor |
| 101. | Level of Satisfaction - Plan Services - Plan Sponsor Portal | 19-1 | Availability | World Class / Very Good / Satisfactory / Needs Improvement / Not Applicable | | Advisor/Consultant or Sponsor |
| 102. | Level of Satisfaction - Plan Services - Plan Sponsor Portal | 19-2 | Speed | World Class / Very Good / Satisfactory / Needs Improvement / Not Applicable | | Advisor/Consultant or Sponsor |
| 103. | Level of Satisfaction - Plan Services - Plan Sponsor Portal | 19-3 | Ease of use | World Class / Very Good / Satisfactory / Needs Improvement / Not Applicable | | Advisor/Consultant or Sponsor |
| 104. | Level of Satisfaction - Plan Services - Plan Sponsor Portal | 19-4 | Range of information | World Class / Very Good / Satisfactory / Needs Improvement / Not Applicable | | Advisor/Consultant or Sponsor |
| 105. | Level of Satisfaction - Plan Services - Plan Sponsor Portal | 19-5 | Quality of information | World Class / Very Good / Satisfactory / Needs Improvement / Not Applicable | | Advisor/Consultant or Sponsor |
| 106. | Level of Satisfaction - Plan Services - Plan Sponsor Portal | 19-6 | Range of available reports | World Class / Very Good / Satisfactory / Needs Improvement / Not Applicable | | Advisor/Consultant or Sponsor |

FIG. 16s

Data Elements for FBi Report 2 (Sponsor and Advisor Provided Services)
(for reference in advances of possible future data requests)

| Index | Portal tab | # | Question | Answer(s) | Source / Applicability | Who Completes? |
|---|---|---|---|---|---|---|
| 107. | Level of Satisfaction - Plan Services - Plan Sponsor Portal | 19-7 | Ad hoc reporting tool | __World Class<br>__Very Good<br>__Satisfactory<br>__Needs Improvement<br>__Not Applicable | | Advisor/Consultant or Sponsor |
| 108. | Level of Satisfaction - Plan Services - Plan Sponsor Portal | 19-8 | Range of educational materials | __World Class<br>__Very Good<br>__Satisfactory<br>__Needs Improvement<br>__Not Applicable | | Advisor/Consultant or Sponsor |
| 109. | Level of Satisfaction - Plan Services - Plan Sponsor Portal | 19-9 | Clarity of educational materials | __World Class<br>__Very Good<br>__Satisfactory<br>__Needs Improvement<br>__Not Applicable | | Advisor/Consultant or Sponsor |
| 110. | Level of Satisfaction - Plan Services - Plan Sponsor Portal | 19-10 | OVERALL SATISFACTION -Sponsor Portal | __World Class<br>__Very Good<br>__Satisfactory<br>__Needs Improvement<br>__Not Applicable | | Advisor/Consultant or Sponsor |
| 111. | Level of Satisfaction - Plan Services - Plan Sponsor Reporting | 20-1 | Accuracy | __World Class<br>__Very Good<br>__Satisfactory<br>__Needs Improvement<br>__Not Applicable | | Advisor/Consultant or Sponsor |
| 112. | Level of Satisfaction - Plan Services - Plan Sponsor Reporting | 20-2 | Timeliness | __World Class<br>__Very Good<br>__Satisfactory<br>__Needs Improvement<br>__Not Applicable | | Advisor/Consultant or Sponsor |
| 113. | Level of Satisfaction - Plan Services - Plan Sponsor Reporting | 20-3 | Quantity | __World Class<br>__Very Good<br>__Satisfactory<br>__Needs Improvement<br>__Not Applicable | | Advisor/Consultant or Sponsor |

FIG. 16t

Data Elements for FBi Report 2 (Sponsor and Advisor Provided Services)
(for reference in advance of possible future data request.)

| Index | Portal tab | # | Question | Answer(s) | Source / Applicability | Indicate Data Source or if Not Applicable: Who Completes? |
|---|---|---|---|---|---|---|
| 114. | Level of Satisfaction - Plan Services - Plan Sponsor Reporting | 20-4 | Clarity | __World Class __Very Good __Satisfactory __Needs Improvement __Not Applicable | | Advisor/Consultant or Sponsor |
| 115. | Level of Satisfaction - Plan Services - Plan Sponsor Reporting | 20-5 | OVERALL SATISFACTION - Sponsor Reports | __World Class __Very Good __Satisfactory __Needs Improvement __Not Applicable | | Advisor/Consultant or Sponsor |
| 116. | Level of Satisfaction - Plan Services -Admin Transactions (flexibility, accuracy, timeliness, and responsiveness) | 21-1 | Enrolling employees in the plan | __World Class __Very Good __Satisfactory __Needs Improvement __Not Applicable | | Advisor/Consultant or Sponsor |
| 117. | Level of Satisfaction - Plan Services -Admin Transactions (flexibility, accuracy, timeliness, and responsiveness) | 21-2 | Processing employees contributions | __World Class __Very Good __Satisfactory __Needs Improvement __Not Applicable | | Advisor/Consultant or Sponsor |
| 118. | Level of Satisfaction - Plan Services -Admin Transactions (flexibility, accuracy, timeliness, and responsiveness) | 21-3 | Processing employer contributions | __World Class __Very Good __Satisfactory __Needs Improvement __Not Applicable | | Advisor/Consultant or Sponsor |
| 119. | Level of Satisfaction - Plan Services -Admin Transactions (flexibility, accuracy, timeliness, and responsiveness) | 21-4 | Processing loans, withdrawals, distributions etc. | __World Class __Very Good __Satisfactory __Needs Improvement __Not Applicable | | Advisor/Consultant or Sponsor |
| 120. | Level of Satisfaction - Plan Services -Admin Transactions (flexibility, accuracy, timeliness, and responsiveness) | 21-5 | Producing participant statements | __World Class __Very Good __Satisfactory __Needs Improvement __Not Applicable | | Advisor/Consultant or Sponsor |

FIG. 16u

Data Elements for FBi Report 2 (Sponsor and Advisor Provided Services)
(for reference in advance of possible future data requests)

| Index | Portal tab | # | Question | Answer(s) | Source / Applicability | Who Completes? |
|---|---|---|---|---|---|---|
| 121. | Level of Satisfaction - Plan Services - Admin Transactions (flexibility, accuracy, timeliness and responsiveness) | 21-6 | Producing compliance testing | __World Class __Very Good __Satisfactory __Needs Improvement __Not Applicable | | Advisor/Consultant or Sponsor |
| 122. | Level of Satisfaction - Plan Services - Admin Transactions (flexibility, accuracy, timeliness and responsiveness) | 21-7 | producing year - end 5500 and audit package | __World Class __Very Good __Satisfactory __Needs Improvement __Not Applicable | | Advisor/Consultant or Sponsor |
| 123. | Level of Satisfaction - Plan Services - Admin Transactions (flexibility, accuracy, timeliness and responsiveness) | 21-8 | OVERALL SATISFACTION - Plan Administration | __World Class __Very Good __Satisfactory __Needs Improvement __Not Applicable | | Advisor/Consultant or Sponsor |
| 124. | Level of Satisfaction - Plan Services-Sponsor Education (such as webinars, newsletters, legislative updates) | 22-1 | Accuracy | __World Class __Very Good __Satisfactory __Needs Improvement __Not Applicable | | Advisor/Consultant or Sponsor |
| 125. | Level of Satisfaction - Plan Services-Sponsor Education (such as webinars, newsletters, legislative updates) | 22-2 | Timeliness | __World Class __Very Good __Satisfactory __Needs Improvement __Not Applicable | | Advisor/Consultant or Sponsor |
| 126. | Level of Satisfaction - Plan Services-Sponsor Education (such as webinars, newsletters, legislative updates) | 22-3 | Quantity | __World Class __Very Good __Satisfactory __Needs Improvement __Not Applicable | | Advisor/Consultant or Sponsor |
| 127. | Level of Satisfaction - Plan Services-Sponsor Education (such as webinars, newsletters, legislative updates) | 22-4 | Clarity | __World Class __Very Good __Satisfactory __Needs Improvement __Not Applicable | | Advisor/Consultant or Sponsor |

Indicate Data Source or if Not Applicable.

FIG. 16v

Data Elements for FBI Report 2 (Sponsor and Advisor Provided Services)
(for reference in advances of possible future data requests)

| Index | Portal tab | # | Question | Answer(s) | Source / Applicability | Who Completes? |
|---|---|---|---|---|---|---|
| 128. | Level of Satisfaction - Plan Services-Sponsor Education (such as webinars, newsletters, legislative updates) | 22.5 | OVERALL SATISFACTION - Educational Services | - World Class<br>- Very Good<br>- Satisfactory<br>- Needs Improvement<br>- Not Applicable | Indicate Data Source or if Not Applicable: | Advisor/Consultant or Sponsor |

FIG. 16w

Data Elements for FBI Report 3 (Plan and Participant Services)
(for reference in advance of possible future data requests)

Indicate Data Source or if Not Applicable.

| Index: Portal tab | # | Question | Answer(s) | Source / Applicability | Who Completes? |
|---|---|---|---|---|---|
| 1. Plan Driven Services | 223-1 | Processes Fund Additions/Deletions | If provided, check those delivering service:<br>___ Record keeper<br>___ TPA<br>___ Other | | |
| 2. Plan Driven Services | 223-2 | Conducts ADP/ACP Tests | If provided, check those delivering service:<br>___ Record keeper<br>___ TPA<br>___ Other | | |
| 3. Plan Driven Services | 223-3 | Makes Plan Design Changes | If provided, check those delivering service:<br>___ Record keeper<br>___ TPA<br>___ Other | | |
| 4. Plan Driven Services | 223-4 | Processes Mergers/Acquisitions/Divestitures | If provided, check those delivering service:<br>___ Record keeper<br>___ TPA<br>___ Other | | |
| 5. Plan Driven Services | 223-5 | Provides Plan Sponsor Reports | If provided, check those delivering service:<br>___ Record keeper<br>___ TPA<br>___ Other | | |
| 6. Plan Driven Services | 223-6 | Offers Company Stock Trustee Services | If provided, check those delivering service:<br>___ Record keeper<br>___ TPA<br>___ Other | | |
| 7. Plan Driven Services | 223-7 | Offers Company Stock Custody Services | If provided, check those delivering service:<br>___ Record keeper<br>___ TPA<br>___ Other | | |
| 8. Plan Driven Services | 223-8 | Calculates Company Stock NAVs | If provided, check those delivering service:<br>___ Record keeper<br>___ TPA<br>___ Other | | |
| 9. Plan Driven Services | 223-9 | Calculates Company Performance | If provided, check those delivering service:<br>___ Record keeper<br>___ TPA<br>___ Other | | |

FIG. 17a

Data Elements for FBI Report 3 (Plan and Participant Services)
(for reference in advance of possible future data request)

| Index | Portal tab | # | Question | Answer(s) | Source / Applicability | Indicate Data Source or if Not Applicable: Who Completes? |
|---|---|---|---|---|---|---|
| 10. | Plan Driven Services | 23-10: Calculates Company Stock Proxy Labels | | If provided, check those delivering services:<br>___Record keeper<br>___TPA<br>___Other | | |
| 11. | Plan Driven Services | 23-11: Processes Payroll Files | | If provided, check those delivering services:<br>___Record keeper<br>___TPA<br>___Other | | |
| 12. | Plan Driven Services | 23-12: Conducts 415 Test | | If provided, check those delivering services:<br>___Record keeper<br>___TPA<br>___Other | | |
| 13. | Plan Driven Services | 23-13: Offers Online Access for Plan Sponsor to Trust System | | If provided, check those delivering services:<br>___Record keeper<br>___TPA<br>___Other | | |
| 14. | Plan Driven Services | 23-14: Provides Video | | If provided, check those delivering services:<br>___Record keeper<br>___TPA<br>___Other | | |
| 15. | Plan Driven Services | 23-15: Provides Trustee Services | | If provided, check those delivering services:<br>___Record keeper<br>___TPA<br>___Other | | |
| 16. | Plan Driven Services | 23-16: Provides Custodial Services | | If provided, check those delivering services:<br>___Record keeper<br>___TPA<br>___Other | | |
| 17. | Plan Driven Services | 23-17: Processes Signatures - Ready 5500 | | If provided, check those delivering services:<br>___Record keeper<br>___TPA<br>___Other | | |
| 18. | Plan Driven Services | 23-18: Conducts Annual Audit | | If provided, check those delivering services:<br>___Record keeper<br>___TPA<br>___Other | | |

FIG. 17b

Data Elements for FBI Report 3 (Plan and Participant Services)
(for references in advance of possible future data requests)

| Index | Portal tab | # | Question | Answer(s) | Indicate Data Source or if Not Applicable. | Who Completes? |
|---|---|---|---|---|---|---|
| 19. | Plan Driven Services | 23-19 | Provides Plan Document | If provided, check those delivering service:<br>__Record keeper<br>__TPA<br>__Other | | |
| 20. | Plan Driven Services | 23-20 | Makes Plan Admendments | If provided, check those delivering service:<br>__Record keeper<br>__TPA<br>__Other | | |
| 21. | Plan Driven Services | 23-21 | Sends Determination Letters | If provided, check those delivering service:<br>__Record keeper<br>__TPA<br>__Other | | |
| 22. | Plan Driven Services | 23-22 | Provides Summary Plan Description | If provided, check those delivering service:<br>__Record keeper<br>__TPA<br>__Other | | |
| 23. | Plan Driven Services | 23-23 | Calculates Employer Profit-Sharing Contribution | If provided, check those delivering service:<br>__Record keeper<br>__TPA<br>__Other | | |
| 24. | Plan Driven Services | 23-24 | Calculates Employer Matching Contribution | If provided, check those delivering service:<br>__Record keeper<br>__TPA<br>__Other | | |
| 25. | Plan Driven Services | 23-25 | Manages Start Up or Conversion | If provided, check those delivering service:<br>__Record keeper<br>__TPA<br>__Other | | |
| 26. | Plan Driven Services | 23-26 | Conducts Top - Heavy Testing | If provided, check those delivering service:<br>__Record keeper<br>__TPA<br>__Other | | |
| 27. | Plan Driven Services | 23-27 | Conducts 410 (b) Testing | If provided, check those delivering service:<br>__Record keeper<br>__TPA<br>__Other | | |

FIG. 17c

Data Elements for FBI Report 3 (Plan and Participant Services)
(for references in advances of possible future data requests )

Indicate Data Source or If Not Applicable:

| Index | Portal tab | # | Question | Answer(s) | Source / Applicability | Who Completes? |
|---|---|---|---|---|---|---|
| 29. | Plan Driven Services | 23-28 | Conducts 401 (a)4 Testing | If provided, check those delivering service:<br>☐ Record keeper<br>☐ TPA<br>☐ Other | | |
| 30. | Plan Driven Services | 23-28 | Provides NAV Calculation Services | If provided, check those delivering services:<br>☐ Record keeper<br>☐ TPA<br>☐ Other | | |

FIG. 17d

Data Elements for FBI Report 3 (Plan and Participant Services)
(for reference in advance of possible future data requests)

| Index | Portal tab | # | Question | Answer(s) | Indicate Data Source or if Not Applicable: Source / Applicability | Who Completes? |
|---|---|---|---|---|---|---|
| 31. | Participant Driven Administration Services | 24-1 | Originates loans | If provided, check those delivering service: ___Record keeper ___TPA ___Other | | |
| 32. | Participant Driven Administration Services | 24-2 | Provides Participant Record keeping - Actives | If provided, check those delivering service: ___Record keeper ___TPA ___Other | | |
| 33. | Participant Driven Administration Services | 24-3 | Provides Loan Maintenance (payments, payoffs and defaults) | If provided, check those delivering service: ___Record keeper ___TPA ___Other | | |
| 34. | Participant Driven Administration Services | 24-4 | Provides Participant record keeping - Terminateds | If provided, check those delivering service: ___Record keeper ___TPA ___Other | | |
| 35. | Participant Driven Administration Services | 24-5 | Monitors 402 (g) Limit on Contributions | If provided, check those delivering service: ___Record keeper ___TPA ___Other | | |
| 36. | Participant Driven Administration Services | 24-6 | Monitors 414 (s) Limit on Compensation | If provided, check those delivering service: ___Record keeper ___TPA ___Other | | |
| 37. | Participant Driven Administration Services | 24-7 | Processes QDROs | If provided, check those delivering service: ___Record keeper ___TPA ___Other | | |
| 38. | Participant Driven Administration Services | 24-8 | Processes Distributions | If provided, check those delivering service: ___Record keeper ___TPA ___Other | | |
| 39. | Participant Driven Administration Services | 24-9 | Processes In-Service Withdrawals | If provided, check those delivering service: ___Record keeper ___TPA ___Other | | |

FIG. 17e

Data Elements for FBi Report 3 (Plan and Participant Services)
(for reference in advance of possible future data requests)

| Index | Portal tab | # | Question | Answer(s) | Source / Applicability | Who Completes? |
|---|---|---|---|---|---|---|
| | | | | | Indicate Data Source or if Not Applicable: | |
| 40. | Participant Driven Administration Services | 2A-10 | Approves Hardship Withdrawals | If provided, check those delivering service:<br>___Record keeper<br>___TPA<br>___Other | | |
| 41. | Participant Driven Administration Services | 2A-11 | Process 401 (a)(9) Minimum Distributions | If provided, check those delivering service:<br>___Record keeper<br>___TPA<br>___Other | | |
| 42. | Participant Driven Administration Services | 2A-12 | Processes Hardship Withdrawals | If provided, check those delivering service:<br>___Record keeper<br>___TPA<br>___Other | | |
| 43. | Participant Driven Administration Services | 2A-13 | Processes Rollovers | If provided, check those delivering service:<br>___Record keeper<br>___TPA<br>___Other | | |
| 44. | Participant Driven Administration Services | 2A-14 | Processes Investment Transfers | If provided, check those delivering service:<br>___Record keeper<br>___TPA<br>___Other | | |
| 45. | Participant Driven Administration Services | 2A-15 | Approves QDROs | If provided, check those delivering service:<br>___Record keeper<br>___TPA<br>___Other | | |
| 46. | Participant Driven Administration Services | 2A-16 | Mails Enrollment Kit | If provided, check those delivering service:<br>___Record keeper<br>___TPA<br>___Other | | |
| 47. | Participant Driven Administration Services | 2A-17 | Calculates When Employees Become Eligible | If provided, check those delivering service:<br>___Record keeper<br>___TPA<br>___Other | | |

FIG. 17f

Data Elements for FBI Report 3 (Plan and Participant Services)
(for reference in advance of possible future data requests)

Indicate Data Source or If Not Applicable:

| Index | Portal tab | # | Question | Answer(s) | Source / Applicability | Who Completes? |
|---|---|---|---|---|---|---|
| 48. | Participant Driven: Administration Services | 24-18 | Maintains Beneficiary Files | If provided, check those delivering services:<br>___Record keeper<br>___TPA<br>___Other | | |
| 49. | Participant Driven: Administration Services | 25-1 | Delivers Quarterly Statements - Paper Based | If provided, check those delivering service:<br>___Record keeper<br>___TPA<br>___Other<br>If paperless, check here:___<br>If customized, check level of customization:<br>___Standard = Designed for general use<br>___Branded = Includes plan sponsor branding /logo<br>___Customized = completely customized for the Plan Sponsor | | |
| 50. | Participant Driven: Administration Services | 25-2 | Delivers Quarterly Statements - Electronic | If provided, check those delivering services:<br>___Record keeper<br>___TPA<br>___Other<br>If paperless, check here:___<br>If customized, check level of customization:<br>___Standard = Designed for general use<br>___Branded = Includes plan sponsor branding /logo<br>___Customized = completely customized for the Plan Sponsor | | |

FIG. 17g

Data Elements for FBi Report 3 (Plan and Participant Services)
(for reference in advance of possible future data requests)

| Index | Portal tab | # | Question | Answer(s) | Indicate Data Source or if Not Applicable Source / Applicability | Who Completes? |
|---|---|---|---|---|---|---|
| 51. | Participant Driven Communications Services | 25-3 | Delivers Investment Advice | If provided, check those delivering services:<br>___ Record keeper<br>___ TPA<br>___ Other<br><br>If paperless, check here: ___<br><br>If customized, check level of customization:<br>Standard = Designed for general use<br>Branded = Includes plan sponsor branding /logo<br>Customized = completely customized for the Plan Sponsor | | |
| 52. | Participant Driven Communications Services | 25-4 | Creates Paper - Based Message Campaigns | If provided, check those delivering services:<br>___ Record keeper<br>___ TPA<br>___ Other<br><br>If paperless, check here: ___<br><br>If customized, check level of customization:<br>Standard = Designed for general use<br>Branded = Includes plan sponsor branding /logo<br>Customized = completely customized for the Plan Sponsor | | |

FIG. 17h

Data Elements for FBI Report 3 (Plan and Participant Services)
(for reference in advance of possible future data requests)

Indicate Data Source or if Not Applicable

| Index | Portal tab | # | Question | Answer(s) | Source / Applicability | Who Completes? |
|---|---|---|---|---|---|---|
| 53. | Participant Driven Communications Services | 25-5 | Provides Internet Services | If provided, check those delivering service: ___Record keeper ___TPA ___Other  If paperless, check here: ___  If customized, check level of customization: ___Standard = Designed for general use ___Branded = Includes plan sponsor branding /logo ___Customized = completely customized for the Plan Sponsor | | |
| 54. | Participant Driven Communications Services | 25-6 | Provides 800- Number Services | If provided, check those delivering service: ___Record keeper ___TPA ___Other  If paperless, check here: ___  If customized, check level of customization: ___Standard = Designed for general use ___Branded = Includes plan sponsor branding /logo ___Customized = completely customized for the Plan Sponsor | | |

FIG. 17i

Data Elements for FBI Report 3 (Plan and Participant Services)
(for reference in advance of possible future data requests)

Indicate Data Source or If Not Applicable:

| Index | Portal tab | # | Question | Answer(s) | Source / Applicability | Who Completes? |
|---|---|---|---|---|---|---|
| 55. | Participant Driven Communications Services | 25-7 | Delivers Newsletter | If provided, check those delivering services:<br>___Record keeper<br>___TPA<br>___Other<br><br>If paperless, check here:___<br><br>If customized, check level of customization:<br>___Standard = Designed for general use<br>___Branded = includes plan sponsor branding /logo<br>___Customized = completely customized for the Plan Sponsor | | |
| 56. | Participant Driven Communications Services | 25-8 | Produces Enrollment Kits | If provided, check those delivering services:<br>___Record keeper<br>___TPA<br>___Other<br><br>If paperless, check here:___<br><br>If customized, check level of customization:<br>___Standard = Designed for general use<br>___Branded = includes plan sponsor branding /logo<br>___Customized = completely customized for the Plan Sponsor | | |

FIG. 17j

Data Elements for FBi Report 3 (Plan and Participant Services)
(for reference in advance of possible future data requests)

Indicate Data Source or if Not Applicable:

| Index | Portal tab | # | Question | Answer(s) | Source / Applicability | Who Completes? |
|---|---|---|---|---|---|---|
| 57. | Participant Driven Communications Services | 25-9 | Creates Electronic Message Campaigns | If provided, check those delivering service:<br>__Record keeper<br>__TPA<br>__Other<br><br>If paperless, check here:___<br><br>If customized, check level of customization:<br>__Standard = Designed for general use<br>__Branded = includes plan sponsor branding /logo<br>__Customized = completely customized for the Plan Sponsor | | |
| 58. | Participant Driven Communications Services | 25-10 | Provides Personal Access Codes | If provided, check those delivering service:<br>__Record keeper<br>__TPA<br>__Other<br><br>If paperless, check here:___<br><br>If customized, check level of customization:<br>__Standard = Designed for general use<br>__Branded = includes plan sponsor branding /logo<br>__Customized = completely customized for the Plan Sponsor | | |

FIG. 17k

Data Elements for FBI Report 3 (Plan and Participant Services)
(for reference in advance of possible future data requests)

| Index | Portal tab | # | Question | Answer(s) | Source / Applicability | Who Completes? |
|---|---|---|---|---|---|---|
| 59. | Participant Driven Communications Services | 25-11 | Sends Prospectuses | If provided, check those delivering service:<br>__Record keeper<br>__TPA<br>__Other<br><br>If paperless, check here:__<br><br>If customized, check level of customization:<br>__Standard = Designed for general use<br>__Branded = Includes plan sponsor branding /logo<br>__Customized = completely customized for the Plan sponsor | | |
| 60. | Participant Driven Communications Services | 25-12 | Delivers On-Demand Statements | If provided, check those delivering service:<br>__Record keeper<br>__TPA<br>__Other<br><br>If paperless, check here:__<br><br>If customized, check level of customization:<br>__Standard = Designed for general use<br>__Branded = Includes plan sponsor branding /logo<br>__Customized = completely customized for the Plan sponsor | | |

FIG. 171

Data Elements for FBi Report 3 (Plan and Participant Services)
(for references in advances of possible future data requests)

Indicate Data Source or if Not Applicable.

| Index | Portal tab | # | Question | Answer(s) | Source / Applicability | Who Completes? |
|---|---|---|---|---|---|---|
| 81. | Participant Driven Communications Services | 25-13 | Provides Self-Directed Account Materials | If provided, check those delivering service: <br>__Record keeper <br>__TPA <br>__Other <br><br>If paperless, check here:_____ <br><br>If customized, check level of customization: <br>__Standard = Designed for general use <br>__Branded = Includes plan sponsor branding /logo <br>__Customized = completely customized for the Plan Sponsor | | |
| 82. | Participant Driven Communications Services | 25-14 | Holds Enrollment Meeting/Group Meetings | If provided, check those delivering service: <br>__Record keeper <br>__TPA <br>__Other <br><br>If paperless, check here:_____ <br><br>If customized, check level of customization: <br>__Standard = Designed for general use <br>__Branded = Includes plan sponsor branding /logo <br>__Customized = completely customized for the Plan Sponsor | | |

FIG. 17m

Data Elements for FBi Report 3 (Plan and Participant Services)
(for reference in advance of possible future data requests)

Indicate Data Source or if Not Applicable.

| Index | Portal tab | # | Question | Answer(s) | Source / Applicability | Who Completes? |
|---|---|---|---|---|---|---|
| 63. | Participant Driven Communications Services | 25-15 | Holds One - On - One Meetings | If provided, check those delivering services:<br>___ Record keeper<br>___ TPA<br>___ Other*<br><br>If customized, check level of customization:<br>___ paperless, check here:___<br>Standard = Designed for general use<br>Branded = Includes plan sponsor branding/logo<br>Customized = completely customized for the Plan Sponsor | | |
| 64. | Participant Driven Communications Services | 25-16 | Provides Investment Transfer Confirmations | If provided, check those those delivering services:<br>___ Record keeper<br>___ TPA<br>___ Other*<br><br>If customized, check level of customization:<br>___ paperless, check here:___<br>Standard = Designed for general use<br>Branded = Includes plan sponsor branding/logo<br>Customized = completely customized for the Plan Sponsor | | |

FIG. 17n

Data Elements for FBi Report 3 (Plan and Participant Services)
(for reference in advance of possible future data requests)

Indicate Data Source or if Not Applicable:

| Index | Portal tab | # | Question | Answer(s) | Source / Applicability | Who Completes? |
|---|---|---|---|---|---|---|
| 65. | Participant Driven Communications Services | 25-17 | Produces Annual Benefit Statements | If provided, check those delivering service:<br>___ Record keeper<br>___ TPA<br>___ Other<br><br>If paperless, check here: ___<br><br>If customized, check level of customization:<br>___ Standard = Designed for general use<br>___ Branded = Includes plan sponsor branding /logo<br>___ Customized = completely customized for the Plan Sponsor | | |
| 66. | Participant Driven Communications Services | 25-18 | Produces Quick Enrollment Card | If provided, check those delivering service:<br>___ Record keeper<br>___ TPA<br>___ Other<br><br>If paperless, check here: ___<br><br>If customized, check level of customization:<br>___ Standard = Designed for general use<br>___ Branded = Includes plan sponsor branding /logo<br>___ Customized = completely customized for the Plan Sponsor | | |

FIG. 17o

Data Elements for FBI Report 3 (Plan and Participant Services)
(for reference in advance of possible future data requests)

Indicate Data Source or If Not Applicable

| Index | Portal tab | # | Question | Answer(s) | Source / Applicability | Who Completes? |
|---|---|---|---|---|---|---|
| 68. | Service Volumes-Plan Driven Services-Plan Processing | 26-1 | Number of participants processed due to startup plans or plan conversions (12m) | # | | |
| 69. | Service Volumes-Plan Driven Services-Plan Processing | 26-2 | Number of participants added or subtracted due to merger/acquisition/divestiture activity (12m) | # | | |
| 70. | Service Volumes-Plan Driven Services-Plan Processing | 26-3 | Number of payroll files processed (12m) | # | | |
| 71. | Service Volumes-Plan Driven Services-Plan Processing | 26-4 | Number of fund changes processed (12m) | # | | |
| 72. | Service Volumes-Plan Driven Services-Plan Processing | 26-5 | Number of plan design changes processed (12m) | # | | |
| 73. | Service Volumes-Plan Driven Services-Calculations Performed | 26-6 | Number of employer matching Contribution calculations performed (12m) | # | | |
| 74. | Service Volumes-Plan Driven Services-Calculations Performed | 26-7 | Number of employer profit sharing contributions calculations performed (12m) | # | | |
| 75. | Service Volumes-Plan Driven Services-Calculations Performed | 26-8 | Number of employer other contribution calculations performed (12m) | # | | |
| 76. | Service Volumes-Plan Driven Services-Compliance | 26-9 | Number of ADP/ACP Tests (12m) | # | | |
| 77. | Service Volumes-Plan Driven Services-Compliance | 26-10 | Number of 415 Tests (12m) | # | | |
| 78. | Service Volumes-Plan Driven Services-Compliance | 26-11 | Number of Top-Heavy Tests Conducted (12m) | # | | |
| 79. | Service Volumes-Plan Driven Services-Compliance | 26-12 | Number of 410(b) Tests Conducted (12m) | # | | |
| 80. | Service Volumes-Plan Driven Services-Compliance | 26-13 | Number of 401(a) Tests Conducted (12m) | # | | |
| 81. | Service Volumes-Plan Driven Services-Other | 26-14 | Number of Plan Sponsor Reports Provided (12m) | # | | |

FIG. 17p

Data Elements for FBI Report 3 (Plan and Participant Services)
(for reference in advance of possible future data requests)

| Index | Portal tab | # | Question | Answer(s) | Source / Applicability | Who Completes? |
|---|---|---|---|---|---|---|
| 82. | Service Volumes- Participant Driven Services-Participant Counts | 27-1 | Number of active plan participants with an account balance | # | | |
| 83. | Service Volumes- Participant Driven Services- Administration Participant Counts | 27-2 | Number of new plan participants ADDED to plan during period (12m) | # | | |
| 84. | Service Volumes- Participant Driven Services- Administration Participant Counts | 27-3 | Number of terminated plan participants with an account balance (12m) | # | | |
| 85. | Service Volumes- Participant Driven Services- Administration Participant Counts | 27-4 | Number of plan participants TERMINATED during period (12m) | # | | |
| 86. | Service Volumes- Participant Driven | 27-5 | Number of newly eligible employees processed (12m) | # | | |
| 87. | Service Volumes- Participant Driven Services- Administration Distribution approval and processing | 27-6 | Number of new loans processed (12m) | # | | |
| 88. | Service Volumes- Participant Driven Services- Administration Distribution approval and processing | 27-7 | Number of outstanding loans maintained | # | | |
| 89. | Service Volumes- Participant Driven Services- Administration Distribution approval and processing | 27-8 | Number of in service withdrawals processed (12m) | # | | |

Indicate Data Source or if Not Applicable:

FIG. 17q

Data Elements for FBI Report 3 (Plan and Participant Services)
(for reference in advance of possible future data requests)

| Index | Portal tab | # | Question | Answer(s) | Source / Applicability | Who Completes? |
|---|---|---|---|---|---|---|
| 90. | Service Volumes- Participant Driven Services- Administration Distribution approval and processing | 27-9 | Number of hardships approvals processed (12m) | # | | |
| 91. | Service Volumes- Participant Driven Services- Administration Distribution approval and processing | 27-10 | Number of hardship withdrawals processed (12m) | # | | |
| 92. | Service Volumes- Participant Driven Services- Administration Distribution approval and processing | 27-11 | Number of Other Distributions processed (12m) | # | | |
| 93. | Service Volumes- Participant Driven Services- Administration Distribution approval and processing | 27-12 | Number of QDRO approvals processed (12m) | # | | |

Indicate Data Source or if Not Applicable

FIG. 17r

Data Elements for FBI Report 3 (Plan and Participant Services)
(for references in advance of possible future data requests)

| Index | Portal tab | # | Question | Answer(s) | Indicate Data Source or if Not Applicable: Source / Applicability | Who Completes? |
|---|---|---|---|---|---|---|
| 94. | Service Volumes- Participant Driven Services- Administration Distribution approval and processing | 27-13 | Number of QDROs processed (12m) | # | | |
| 95. | Service Volumes- Participant Driven Services- Administration Distribution approval and processing | 27-14 | Number of Minimum Required Distributions processed (12m) | # | | |
| 96. | Service Volumes- Participant Driven Services- Administration Other Processing | 27-15 | Number of investment transfers processed (12m) | # | | |
| 97. | Service Volumes- Participant Driven Services- Administration Other Processing | 27-16 | Number of rollovers into the plan processed (12m) | # | | |
| 98. | Service Volumes- Participant Driven Services- Administration Other Processing | 27-17 | Number of beneficiary files maintained (12m) | # | | |
| 99. | Service Volumes- Participant Driven Services- Administration Other Processing | 27-18 | Number of enrollment kits mailed (12m) | # | | |
| 100. | Service Volumes- Participant Driven Services- Communications- Statements | 27-19 | Number of Paper Statements Sent to Each Participant | # | | |
| 101. | Service Volumes- Participant Driven Services- Communications- Statements | 27-20 | Number of Electronic Statements Sent to Each Participant | # | | |

FIG. 17s

Data Elements for FB1 Report 3 (Plan and Participant Services)
(for reference in advance of possible future data requests)

| Index | Portal tab | # | Question | Answer(s) | Indicate Data Source or if Not Applicable | |
|---|---|---|---|---|---|---|
| | | | | | Source / Applicability | Who Completes? |
| 102. | Service Volumes-Participant Driven Services-Communications-Statements | 27-21 | Number of on demand statements accessed | # | | |
| 103. | Service Volumes-Participant Driven Services-Communications-Web/VRU | 27-22 | Number of participant website sessions | # | | |
| 104. | Service Volumes-Participant Driven Services-Communications-Web/VRU | 27-23 | Number of participant phone calls taken | # | | |
| 105. | Service Volumes-Participant Driven Services-Communications-Web/VRU | 27-24 | Number of Newsletters Provided | # | | |
| 106. | Service Volumes-Participant Driven Services-Communications - Print & Video | 27-25 | Number of prospectuses sent | # | | |
| 107. | Service Volumes-Participant Driven Services-Communications - Print & Video | 27-26 | Number of Self Directed Account materials packages sent | # | | |
| 108. | Service Volumes-Participant Driven Services-Communications - Print & Video | 27-27 | Number of quick enroll cards sent | # | | |
| 109. | Service Volumes-Participant Driven Services-Communications - Print & Video | 27-28 | Number of Videos Provided | # | | |
| 110. | Service Volumes-Participant Driven Services-Communications-Face to Face | 27-29 | Number of Enrollment / Group meetings | # | | |

FIG. 17t

Data Elements for FB1 Report 3 (Plan and Participant Services)
(for references in advance of possible future data requests)

| Index | Portal tab | # | Question | Answer(s) | Indicate Data Source or if Not Applicable: | |
|---|---|---|---|---|---|---|
| | | | | | Source / Applicability | Who Completes? |
| 111. | Service Volumes-Participant Driven Services-Communications- Face to Face | 27-30 | Number of One-on-One Meetings | # | | |
| 112. | Service Volumes-Participant Driven Services-Communications-Campaigns | 27-31 | Number of Paper-Based Message Campaigns Provided | # | | |
| 113. | Service Volumes-Participant Driven Services-Communications-Campaigns | 27-32 | Number of Electronic Message Campaigns Provided | # | | |
| 114. | Accuracy Standards-Contributions | 28-1 | Payroll Tapes accuracy | % | | |
| 115. | Accuracy Standards-Contributions | 28-2 | Employer Match Calculations accuracy | % | | |
| 116. | Accuracy Standards-Contributions | 28-3 | Profit Sharing Calculations accuracy | % | | |
| 117. | Accuracy Standards-Contributions | 28-4 | Required Contribution Calculations accuracy | % | | |
| 118. | Accuracy Standards-Distribution Processing | 28-5 | Loan accuracy | % | | |
| 119. | Accuracy Standards-Distribution Processing | 28-6 | In-Service Withdrawals accuracy | % | | |
| 120. | Accuracy Standards-Distribution Processing | 28-7 | Hardship Withdrawals accuracy | % | | |
| 121. | Accuracy Standards-Distribution Processing | 28-8 | Termination Paperwork accuracy | % | | |
| 122. | Accuracy Standards-Distribution Processing | 28-9 | QDROs accuracy | % | | |
| 123. | Accuracy Standards-Distribution Processing | 28-10 | MRDs accuracy | % | | |
| 124. | Accuracy Standards-Compliance | 28-11 | ADP/ACP testing accuracy | % | | |
| 125. | Accuracy Standards-Compliance | 28-12 | 415 testing accuracy | % | | |

FIG. 17u

Data Elements for FBI Report 3 (Plan and Participant Services)
(for reference in advance of possible future data requests)

| Index | Portal tab | # | Question | Answer(s) | Indicate Data Source or If Not Applicable: Source / Applicability | Who Completes? |
|---|---|---|---|---|---|---|
| 126. | Accuracy Standards- Compliance | 28-13 | 5500 accuracy | % | | |
| 127. | Accuracy Standards- Communications | 28-14 | Newsletter accuracy | % | | |
| 128. | Accuracy Standards- Communications | 28-15 | Paper Based Campaigns accuracy | % | | |
| 129. | Accuracy Standards- Communications | 28-16 | Quarterly Statement accuracy | % | | |
| 130. | Accuracy Standards- Communications | 28-17 | Annual Statements accuracy | % | | |
| 131. | Timeliness Standards- Participant Driven Services - Eligibility | 29-1 | Quick Enrollment Card Sent | # of days | | |
| 132. | Timeliness Standards- Participant Driven Services - Eligibility | 29-2 | Enrollment Kits Sent | # of days | | |
| 133. | Timeliness Standards- Participant Driven Services - Eligibility | 29-3 | Personal Access Codes Sent | # of days | | |
| 134. | Timeliness Standards- Participant Driven Services - Investment | 29-4 | Prospectuses Sent | # of days | | |
| 135. | Timeliness Standards- Participant Driven Services - Investment | 29-5 | Self Directed Account Materials Sent | # of days | | |
| 136. | Timeliness Standards- Participant Driven Services - Investment | 29-6 | Newsletter Sent | # of days | | |
| 137. | Timeliness Standards- Participant Driven Services - Investment | 29-7 | Investment Transfer Confirmations Sent | # of days | | |
| 138. | Timeliness Standards- Participant Driven Services - Loans | 29-8 | New Loan Paperwork Processed | # of days | | |
| 139. | Timeliness Standards- Participant Driven Services - Loans | 29-9 | Loan Coupons Books Sent | # of days | | |

FIG. 17v

Data Elements for FBi Report 3 (Plan and Participant Services)
(for reference in advance of possible future data requests)

| Index | Portal tab | # | Question | Answer(s) | Indicate Data Source or If Not Applicable: | |
|---|---|---|---|---|---|---|
| | | | | | Source / Applicability | Who Completes? |
| 140. | Timeliness Standards- Participant Driven Services - Loans | 29-10 | Loan Default Letters Sent | # of days | | |
| 141. | Timeliness Standards- Participant Driven Services - Loans | 29-11 | Loan Payoff Letters Sent | # of days | | |
| 142. | Timeliness Standards- Participant Driven Services - Loans | 29-12 | Loans Check Sent | # of days | | |
| 143. | Timeliness Standards- Participant Driven Services - Inservice Withdrawal | 29-13 | In-Service Withdrawal Paperwork Processed | # of days | | |
| 144. | Timeliness Standards- Participant Driven Services - Inservice Withdrawal | 29-14 | In-Service Withdrawals Check Processed | # of days | | |
| 145. | Timeliness Standards- Participant Driven Services - Hardship Withdrawal | 29-15 | Hardship Withdrawal Paperwork Processed | # of days | | |
| 146. | Timeliness Standards- Participant Driven Services - Hardship Withdrawal | 29-16 | Hardship Withdrawals Check Sent | # of days | | |
| 147. | Timeliness Standards- Participant Driven Services - Terminations Distributions | 29-17 | Termination Paperwork Processed | # of days | | |
| 148. | Timeliness Standards- Participant Driven Services - Terminations Distributions | 29-18 | Terminations Check Sent | # of days | | |

FIG. 17w

Data Elements for FBi Report 3 (Plan and Participant Services)
(for reference in advance of possible future data requests)

| Index | Portal tab | # | Question | Answer(s) | Source / Applicability | Who Completes? |
|---|---|---|---|---|---|---|
| | | | | | Indicate Data Source or if Not Applicable | |
| 149. | Timeliness Standards - Participant Driven Services - Other Processing | 29-19 | QDROs Processed | # of days | | |
| 150. | Timeliness Standards - Participant Driven Services - Other Processing | 29-20 | MRDs Processed | # of days | | |
| 151. | Timeliness Standards - Participant Driven Services - Statements | 29-21 | On Demand Statements Availability Post Quarter End | # of days | | |
| 152. | Timeliness Standards - Participant Driven Services - Statements | 29-22 | Quarterly Statements Sent | # of days | | |
| 153. | Timeliness Standards - Participant Driven Services - Statements | 29-23 | Annual Statements Sent | # of days | | |
| 154. | Timeliness Standards - Participant Driven Services - 800 number | 29-24 | 800-Number Hours Per Week Available | Hours | | |
| 155. | Timeliness Standards - Participant Driven Services - 800 number | 29-25 | 800-Number average speed to Rep in seconds | Seconds | | |
| 156. | Timeliness Standards - Plan Driven Services - Contributions | 30-1 | Processing of Payroll Tapes | # of days | | |
| 157. | Timeliness Standards - Plan Driven Services - Contributions | 30-2 | Employer Match Calculations | # of days | | |
| 158. | Timeliness Standards - Plan Driven Services - Contributions | 30-3 | Profit Sharing Calculations | # of days | | |
| 159. | Timeliness Standards - Plan Driven Services - Contributions | 30-4 | Required Contribution Calculations | # of days | | |

FIG. 17x

Data Elements for FBi Report 3 (Plan and Participant Services)
(for reference in advance of possible future data requests)

| Index | Portal tab | # | Question | Answer(s) | Indicate Data Source or if Not Applicable: | |
|---|---|---|---|---|---|---|
| | | | | | Source / Applicability | Who Completes? |
| 160. | Timeliness Standards- Plan Driven Services - Investment Changes | 30-5 | Adding/Changing a Fund | # of days | | |
| 161. | Timeliness Standards- Plan Driven Services - Compliance | 30-6 | ADP/ACP Testing | # of days | | |
| 162. | Timeliness Standards- Plan Driven Services - Compliance | 30-7 | 415 Testing | # of days | | |
| 163. | Timeliness Standards- Plan Driven Services - Compliance | 30-8 | Top-Heavy Testing | # of days | | |
| 164. | Timeliness Standards- Plan Driven Services - Compliance | 30-9 | 410(b) Testing | # of days | | |
| 165. | Timeliness Standards- Plan Driven Services - Compliance | 30-10 | 410(a) Testing | # of days | | |
| 166. | Timeliness Standards- Plan Driven Services - Compliance | 30-11 | Proxy Voting on Mutual Funds | # of days | | |
| 167. | Timeliness Standards- Plan Driven Services - Compliance | 30-12 | Signature-ready 5500 | # of days | | |
| 168. | Timeliness Standards- Plan Driven Services - Other Communications | 30-13 | Electronic Messaging Campaigns Developed | # of days | | |
| 169. | Timeliness Standards- Plan Driven Services - Other Communications | 30-14 | Paper-Based Messaging Campaigns Developed | # of days | | |

FIG. 17y

Data Elements for FBi Report 3 (Plan and Participant Services)
(for reference in advance of possible future data requests)

| Index | Portal tab | # | Question | Answer(s) | Source / Applicability | Who Completes? |
|---|---|---|---|---|---|---|
| 170. | Timeliness Standards - Plan Driven Services - Other Communications | 30-15 | Group Meetings Scheduled | # of days | | |
| 171. | Timeliness Standards - Plan Driven Services - Other Communications | 30-16 | Merger/Aquisitions/Divestiture Processing | # of days | | |

Indicate Data Source or If Not Applicable:

FIG. 17z

SYSTEM AND METHOD FOR EVALUATING DEFINED CONTRIBUTION PLANS

CROSS-REFERENCE TO RELATED APPLICATION

This application claims priority from U.S. Provisional Patent Application Ser. No. 61/218,313, filed Jun. 18, 2009, which is incorporated herein by reference in its entirety.

BACKGROUND

According to the U.S. Census Bureau, 24 million baby boomers will retire over the next ten years. Traditionally, Defined Benefit (DB) Plans (i.e., employer-provided pensions) were an employee's primary source for income during their retirement. In recent years, however, employers and the retirement industry as a whole have shifted away from DB Plans toward Defined Contribution (DC) Plans, such as 401(k) Plans, profit sharing Plans, money purchase Plans and the like.

Today, there are literally hundreds of thousands of different 401(k) Plans, each having any number of Plan designs, services, and fees associated with them. In addition, ERISA requires that Plan Sponsors ensure that Plan fees are "reasonable." To do this, Plan Sponsors traditionally employ a laborious Request for Proposal (RFP) process that is not only expensive and time consuming but is also limiting in terms of the ability of a Plan Sponsor to compare one Plan to another. Consequently, Plan Sponsors using traditional methods may not be able to determine whether or not the fees that are charged to a DC Plan are reasonable and equitable in view of the services the Plan receives as compared to the fees and services associated with other Plans.

For example, a DC Plan, such as a 401(k) Plan, may pay fees to a number of entities that provide services to the Plan Sponsor, such as fees that pay for record keeping, fees that pay for advisors/consultants, fees that pay for investment managers, and fees paid to others for a variety of services. In addition, Plan fees may include different types of fees, such as investment fees, commissions, finders' fees, managed account fees. Exacerbating the difficulty of determining how much, to whom, and when fees are paid is the fact that many of the fees associated with a given Plan are completely hidden to the Plan Sponsor.

That said, fees may contribute only one aspect of determining the "value" of a given Plan to a Plan Sponsor. The Plan Sponsor may be willing to pay higher fees, for example, if the services that the Plan receives in return are better than the average for similarly constructed Plans. Likewise, the Plan Sponsor may be less willing to pay higher fees if the services that the Plan receives in return are less than average for similarly constructed Plans. Consequently, a method and system for comparing DC Plans and which takes into account not only the fees that are paid for various services that a Plan receives, but also the quantity and quality of services that the Plan receives would assist Plan Sponsors, Recordkeepers, Advisor/Consultants, and the like in evaluating a given Plan against other similarly structured Plans.

A challenge to making this comparison is determining what "other" Plans should be used for this comparison, as well as what features, aspects, and considerations of the "other" Plans that should be used in order to make an apples-to-apples comparison of a selected Plan's fees, design, support and services. Another challenge is determining how best to display and/or report the comparison in a meaningful manner to quickly identify a given Plan's quantitative and qualitative aspects relative to the "other" Plans.

Once a meaningful comparison is made, the various aspects and features of a given Plan may become transparent to the Plan Sponsor so as to make an informed decision as to the Plan's overall value, as well as to lead to clearer documentation of fiduciary objectives, better assistance for Plan Participants, lower potential levels of litigation, and objectively manage Plan fees and services.

SUMMARY OF THE INVENTION

A method of evaluating a retirement plan is disclosed comprising the steps of receiving a plurality of data corresponding to a plurality of retirement plans, storing the data in memory on at least one web-accessible computer, determining a subset of the plurality of retirement plans, comparing characteristics of the selected retirement plan to corresponding characteristics of the subset of the plurality of retirement plans, selecting at least one report for reporting the comparison of the selected retirement plan to the subset of the plurality of retirement plans, and automatically generating the selected at least one report.

In one embodiment, the step of determining the subset of the plurality of retirement plans comprises identifying the characteristics of the selected retirement plan that correspond to at least one factor, and identifying which of the plurality of retirement plans have characteristics that correspond to the at least one factor and which are identical to the identified characteristics of the selected retirement plan or which correspond to a predefined range bracketing the identified characteristics of the selected retirement plan. The at least one factor may comprise at least one of an amount of plan assets, a number of plan participants, a last year the plan was bid or reviewed, a type of company industry, a plan type, whether the plan includes an automatic participant enrollment feature, whether the plan includes an employer match feature, a percentage of plan assets held in index funds, and a percentage of plan assets held in managed accounts.

In an embodiment, the step of comparing characteristics of the selected retirement plan to corresponding characteristics of the subset of the plurality of retirement plans comprises comparing fees paid by the selected retirement plan against fees paid by the subset of the plurality of retirement plans. In another embodiment, the step of comparing characteristics of the selected retirement plan to corresponding characteristics of the subset of the plurality of retirement plans comprises comparing at least one investment option of the selected retirement plan against at least one investment option of the subset of the plurality of retirement plans. In a further embodiment, the step of comparing characteristics of the selected retirement plan to corresponding characteristics of the subset of the plurality of retirement plans comprises comparing the complexity of the selected retirement plan against the complexity of the subset of the plurality of retirement plans. In another embodiment, the step of comparing characteristics of the selected retirement plan to corresponding characteristics of the subset of the plurality of retirement plans comprises comparing at least one participant success measure of the selected retirement plan against the corresponding at least one success measure of the subset of the plurality of retirement plans.

In one embodiment, the at least one report is pre-configured or is user-customizable. The method may further comprise a web portal interface for receiving the plurality of data from a user, the web portal interface dynamically including and excluding data entry fields according to selections received by the user.

In an embodiment, the characteristics of the selected retirement plan include at least one fee. The method may further comprise the step of identifying the at least one fee associated with the selected retirement plan. In another embodiment, the characteristics of the selected retirement plan include at least one source for at least one fee. The method may further comprise the step of identifying the at least one source for the at least one fee associated with the selected retirement plan. The step of identifying the at least one source for the at least one fee may comprise identifying imbedded fees associated with the selected retirement plan.

A computer system for evaluating a retirement plan is disclosed comprising a computer server having a database, the database comprising a plurality of data defining a plurality of characteristics of each of a plurality of retirement plans, a computer-readable medium encoded with a first computer program executable by a computer for determining a subset of the plurality of retirement plans having characteristics comparable to characteristics of a selected retirement plan, a computer-readable medium encoded with a second computer program executable by the computer for permitting the selection of at least one report, and a computer-readable medium encoded with a third computer program executable by the computer for automatically generating the selected at least one report, where the at least one report comprises a comparison of the characteristics of the selected retirement plan against the characteristics of the subset of the plurality of retirement plans.

In one embodiment, the subset of the plurality of retirement plans is determined by identifying the characteristics of the selected retirement plan that correspond to at least one factor, and identifying which of the plurality of retirement plans have characteristics that correspond to the at least one factor and which are identical to the identified characteristics of the selected retirement plan or which correspond to a predefined range bracketing the identified characteristics of the selected retirement plan.

The at least one factor may comprise at least one of an amount of plan assets, a number of plan participants, a last year the plan was bid or reviewed, a type of company industry, a plan type, whether the plan includes an automatic participant enrollment feature, whether the plan includes an employer match feature, a percentage of plan assets held in index funds, and a percentage of plan assets held in managed accounts.

In an embodiment, the comparison of the characteristics of the selected retirement plan comprises a comparison of the fees paid by the selected retirement plan against the fees paid by the subset of the plurality of retirement plans. In another embodiment, the comparison of the characteristics of the selected retirement plan comprises a comparison of at least one investment option of the selected retirement plan against at least one investment option of the subset of the plurality of retirement plans. In a further embodiment, the comparison of the characteristics of the selected retirement plan comprises a comparison of the complexity of the selected retirement plan against the complexity of the subset of the plurality of retirement plans. In another embodiment, the comparison of the characteristics of the selected retirement plan comprises a comparison of at least one participant success measure of the selected retirement plan against the corresponding at least one success measure of the subset of the plurality of retirement plans. The computer system may further include a web portal interface for receiving retirement plan data.

A retirement plan comparison report is disclosed comprising a first data set corresponding to a selected retirement plan and a second data set corresponding to a subset of a plurality of retirement plans. The subset of the plurality of retirement plans is determined by identifying characteristics of the selected retirement plan that correspond to at least one factor, and identifying which of the plurality of retirement plans have characteristics corresponding to the at least one factor and which are identical to the identified characteristics of the selected retirement plan or which correspond to a predefined range bracketing the identified characteristics of the selected retirement plan. The retirement plan comparison report additionally includes a comparison of the first data set against the second data set comprising a comparison of at least one of participant success measures, fees paid, plan design provisions, plan complexity, fiduciary oversight services, fiduciary best practices services, plan-driven services, participant-driven services, timeliness of provided services, and accuracy of provided services.

In one embodiment, the comparison of the first data set and against the second data set is one of qualitative and quantitative.

The at least one factor may comprise at least one of an amount of plan assets, a number of plan participants, a last year the plan was bid or reviewed, a type of company industry, a plan type, whether the plan includes an automatic participant enrollment feature, whether the plan includes an employer match feature, a percentage of plan assets held in index funds, and a percentage of plan assets held in managed accounts.

In one embodiment, participant success measures comprises at least one of a participation rate, an average deferral percentage for non-highly compensated employees, an average deferral percentage for non-highly compensated employees, an average deferral percentage for highly compensated employees, a percentage of participants maximizing a company match feature, a percentage of assets in automatically diversified options, a percent of eligible participants making catch-up contributions, a percentage of participants using an automatic rebalance option, a percentage of participants using an automatic investment selection feature, a percentage of terminated participants that have not cashed out their assets, a percentage of participants with a personal retirement goal, and a percentage of participants on track to achieve their personal goal.

Fees paid may comprise at least one of fees paid at a plan sponsor level, fees paid at a participant level, and fees paid at a plan level. A comparison of the fees paid may comprise determining a reasonableness of the fees paid in view of a qualitative assessment of the selected retirement plan and of the subset of the plurality of retirement plans.

Plan complexity may comprise at least one of plan eligibility features, employee contribution features, employer contribution features, plan investment features, and plan distribution features. Fiduciary oversight services may comprise at least one of plan design services, plan administration services, plan communications services, plan investment services, plan fee services, and plan company stock services.

BRIEF DESCRIPTION OF THE DRAWINGS

For a better understanding of the invention, reference may be had to preferred embodiments shown in the following drawings in which:

FIGS. 6a-6j illustrate yet another embodiment of a report that may be output from the embodiment shown in FIG. 1;

FIG. 8 illustrates one embodiment of a user registration screen;

FIG. 10 illustrates one embodiment of an "Add a Plan" screen;

FIGS. 11a-11q illustrate an embodiment of a "Guide To Survey Questions And Data Elements;"

FIGS. 12a-12b illustrate an embodiment of a Plan summary and selection screen;

FIG. 13 illustrates an embodiment of a data entry screen;

FIGS. 14a-14s illustrate embodiments of Plan data input screens;

FIGS. 15a-15j illustrate embodiments of data elements corresponding to a first exemplary report;

FIGS. 16a-16w illustrate embodiments of data elements corresponding to a second exemplary report; and FIGS. 17a-17z illustrate embodiments of data elements corresponding to a third exemplary report.

DEFINITIONS

"Plan" means any Defined Contribution Plan, including, 401(k), 403(b), 457, profit sharing, and money purchase Plans.

"Plan Sponsor" means the employer or offeror of the Plan to the Plan Participant.

"Plan Participant" means the employee or beneficiary of the Plan.

"Plan Advisor" means anyone who provides consulting services to the Plan Sponsor, such as how and where to invest Plan assets.

"Service Provider" means any provider of any service to or for the Plan, including, Record keeper; Advisor/Consultant; Investment manager; and Managed Accounts Provider and other service providers.

"Record keeper" means anyone who keeps records for a Plan.

"Investment Manager" means anyone who manages Plan investment options.

"Managed Accounts Provider" means a Service Provider that offers an Internet-based service comprising the creation, implementation, and monitoring of personalized retirement plans for Plan Participants. The services offered by a Managed Accounts Provider are elective in nature and result in additional fees to a given Plan.

"Other Provider" means other providers of services to the Plan, including, legal, accountant, and tax services.

"Third Party Administrator" means anyone who designs and/or administers 401(k) Plans for Plan Sponsors, and who may ensure compliance with ERISA and the IRS.

"TPA" means Third Party Administrator.

DETAILED DESCRIPTION

Figure 1:
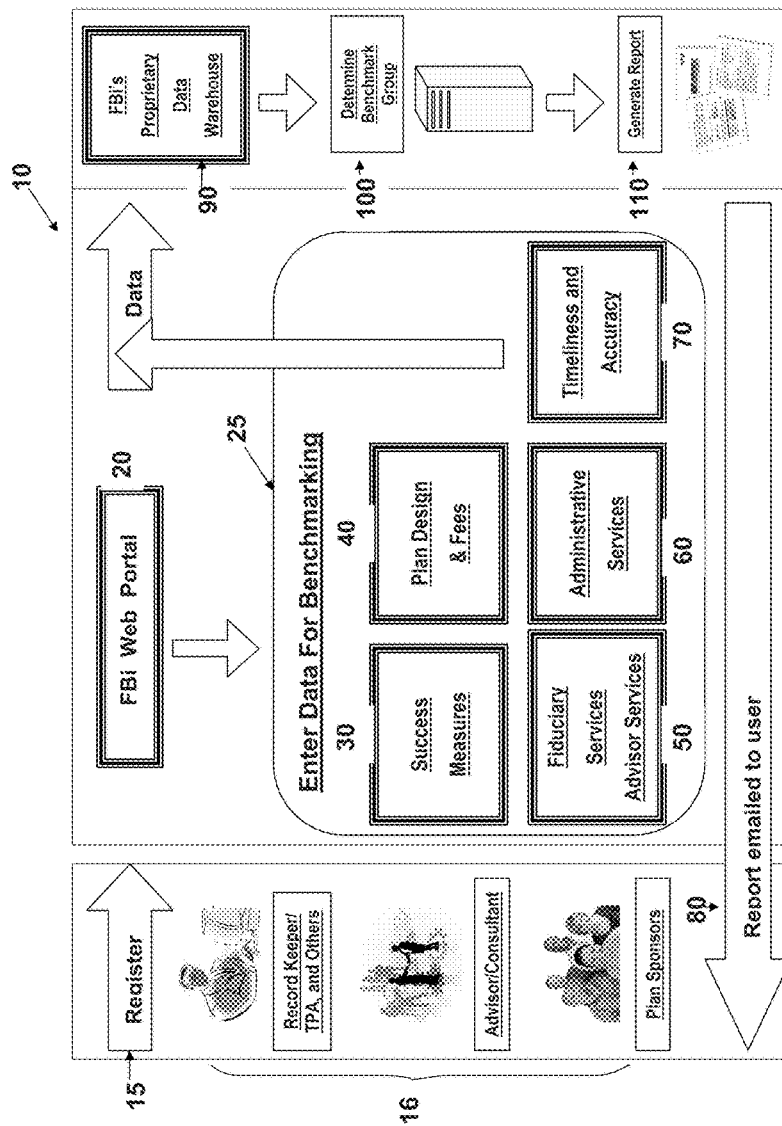
FIG. 1 illustrates one embodiment of the present invention.

Turning now to the figures, wherein like reference numerals refer to like elements, there is illustrated in FIG. 1 one embodiment of the present invention. In the embodiment of FIG. 1, system 10 includes a web-based user interface portal 20 for entering a variety of Plan, for example, data 25, into database 90 by a User 16, comprising at least one of, for example, a Plan Sponsor, a Recordkeeper, a Third Party Administrator, and an Advisor Consultant, registration/login module 15 to permit authenticated login access to authorize a User 16 of system 10, a data entry module for facilitating the entry of Plan data 25 into system 10, database 90 for storage and retrieval of a Plan data 25 for a multitude of Plans, Benchmark Group module 100 for determining an appropriate Benchmark Group of Plans that are similar in size, fees, features and services, among others, to the Plan, report generation engine 110 for generating a selected report on demand or at predetermined intervals as may be selected by User 16, and delivery means 80 for delivering the selected report to User 16.

As shown in FIG. 1, Plan data 25 that may be entered into system 10 may include, for example, success measures data 30 (e.g., Plan participation rate), Plan design and fees data 40 (e.g., fees to Recordkeepers and Plan eligibility information), investment data (not shown) (e.g., investment offering information), fiduciary services, advisor services, and advisor satisfaction data 50 (e.g., Advisor/Consultant support services and fee information), administrative services data 60 (e.g., Participant-driven administration services), and timeliness and accuracy factors data 70 (e.g., factors that might be Participant-driven or Plan-driven). Each of these will be discussed in more detail below.

Figure 2:
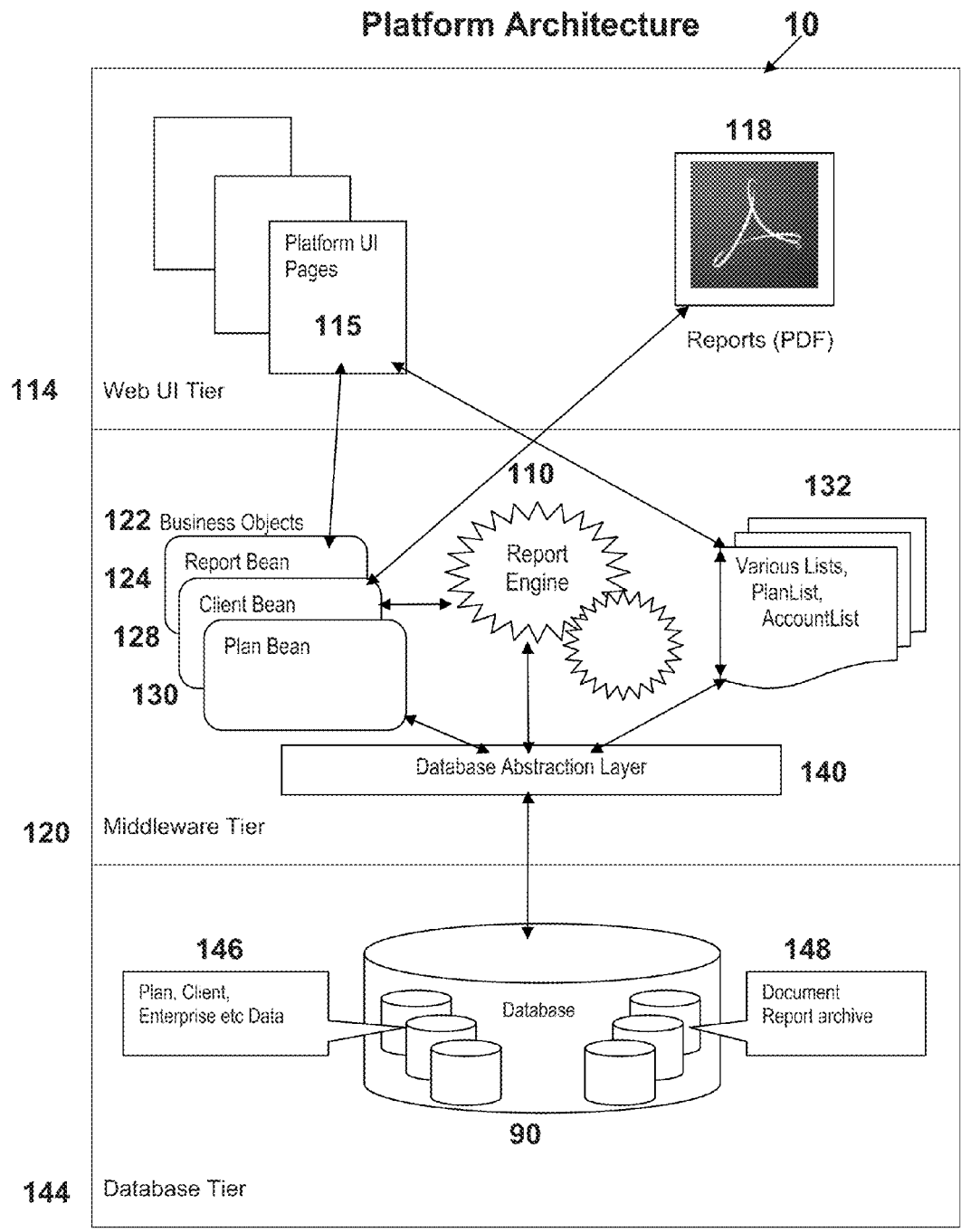
FIG. 2 illustrates one embodiment of a platform architecture of the system shown in FIG. 1.

Moving to FIG. 2, there is shown an exemplary platform architecture for system 10. For example, system 10 may include web user interface tier 114, middleware tier 120, and database tier 144. Web user interface tier 114 may include platform user interface pages 115 for interacting with system 10, and particularly, for entering Plan data 25 into database 90, and for selecting one or more pre-styled reports 118 or for selecting one or more options for customizing a user-customizable report 118.

As shown in FIG. 2, middleware tier 120 may include various business objects 122, various list functions 132, database abstraction layer 140, and report generation engine 110. Business objects 122 may further comprise a report bean 124, a client bean 128, a Plan bean 130, and other objects, such as a Benchmark Group bean (not shown). Each of these business objects 122 may include software, one or more CPU's and memory to perform the functions of displaying HTML user interface pages 115 in a web browser and dynamically interacting with User 16, acquiring Plan data 25 or other input data or input selections from User 16, temporarily storing all input data in memory, real-time automatically and dynamically adjusting or manipulating user interface pages 115 in response to various user selections and/or data input by toggling on and off subsequent input fields and selections according to pre-programmed rules, and causing the permanent storage of input data and user selections in database 90. Consequently, User 16 may enter Plan data 25 after logging into web portal 20 and, using user interface pages 115, interact with business objects 122 of middleware tier 120.

By way of example, when entering data, such as Plan data 25, Plan bean 130 may temporarily receive and store the Plan data in middleware memory until such time as the User 16 has entered all of the Plan data. Upon clicking a "Save and Continue" button, for example, on a web page by User 16, software of business object 122 may then command the permanent storage of the data into database 90 of database tier 144. Similarly, when User 16 enters information about themselves, for example, after registering as a "new user" in web portal 20, client bean 128 may present user interface pages 115 having various fields for entering such items as user name, address, etc. Once User 16 has completed entering data about itself on a particular web page, client bean 128 may then cause this data to be permanently stored in database 90 when User 16 clicks on a "Save and Continue" button to, for example, cause the system to display another web page or data entry screen.

Instead of entering data, User 16 may also be presented with various objects 132 connected to various lists stored in database 90. For example, User 16 may select an icon on a user interface page 115 that calls up and displays previously entered and stored Plan list data, user data, or account information data from database 90. Consequently, various objects 132 may comprise read-only functions for retrieving previously entered data from database 90 and displaying this data in user interface pages 115.

Also shown in FIG. 2 is database 90 of database tier 144. Database 90 may be configured for permanently storing Plan, client (e.g., user) data 146 and the like as well as permanently storing any other documents, such as previously prepared reports 118 for later recall should User 16 so elect.

Figure 3:
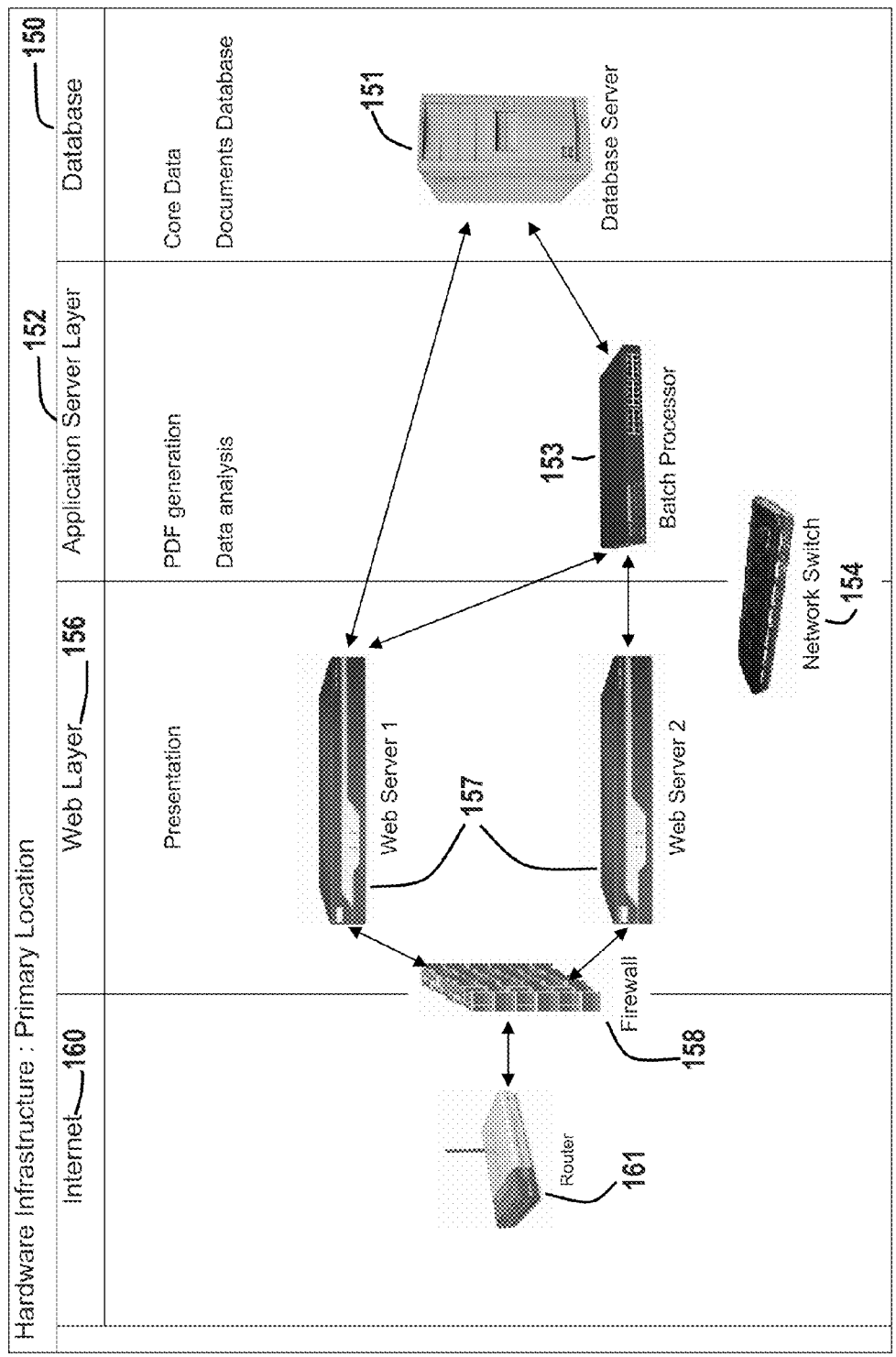
FIG. 3 illustrates one embodiment of a hardware infrastructure for the embodiment shown in FIG. 1.

FIG. 3 shows one embodiment of a hardware infrastructure that may be employed for the operation of system 10, comprising database layer 150, application server layer 152, web layer 156, and Internet layer 160. For example, database layer 150 may include database server 151 comprising database 90 which may include various data 146 and documents 148. Database server 151 may be connected to batch processor 153 of application server layer 152. Batch processor 153 may execute business objects 122, various objects 132, and report generation engine 110 to, for example, execute software programs to analyze, store data or for generating reports.

Batch processor 153 may be connected to web layer 156 comprising one or more web servers 157 for communicating with User 16 via the Internet. As shown in FIG. 3, web server 157 may operate behind firewall 158 to protect data stored on database 90 from malicious attack. Communication web server 157 may operate to deliver various web pages and other documents to User 16 using a web browser and who may be logged into web portal 20. Such web pages may include platform user interface pages 115. The software represented by business objects 122 may be executed by batch processor 153 and temporarily stored in batch processor 153 as previously described.

In addition, when a user selects or requests a particular report 118, batch processor 153, through business objects 122, may execute software of report generation engine 110 to generate the selected report using data stored on database server 151 of database 90. When such software completes the preparation of the selected report 118, system 10 may then communicate that report back to User 16 through business objects 122 and through web server 157 and post the selected report 118 on web portal 20 for retrieval or download by User 16 subject to, for example, entering into a payment arrangement with the operator or administrator of web portal 20 before system 10 releases or otherwise allows access to report 118 by User 16. Consequently, at some point prior to User 16 obtaining a deliverable, such as a selected report 118, User 16 may be asked to provide payment to the operator or administrator of web portal 20. Alternatively, access to system 10 by User 16 may be in the form of a subscription spanning a particular time period, such as a month or a year. In this way, either a limited or unlimited quantity of reports 118, as determined by the subscription arrangement, may be delivered to User 16 within the subscription period.

Alternatively, as shown in FIG. 1, system 10 may communicate the selected report 118 to User 16 by sending the selected report 118 as an attachment, such as a PDF, to an email to User 16. In another embodiment, system 10 may communicate the selected report 118 to User 16 by causing the selected report 118 to display in a web browser on a computer screen operated by User 16. Such display may be effected in real-time or near real time, depending on how quickly system 10 can perform the calculations necessary to generate the selected report 118 and transmit the selected report 118 to User 16's computer, as well as the connectivity and available bandwidth that exists between User 16's computer and the hardware elements of system 10 that generate and transmit the selected report 118. In another embodiment, system 10 may communicate the selected report 118 to User 16 using any other electronic or tangible means (e.g., via CD, flash drive, etc.) as may be selected by User 16. In yet another embodiment, system 10 may communicate the selected report 118 to User 16 via cellular communications, facsimile communications, radio frequency, Wi-Fi, satellite communications, and the like. User 16 may also schedule the delivery of a selected report 118 at scheduled times or intervals as may be selected by User 16 in web portal 20.

As shown in FIG. 3, network router 161 of internet layer 160 may operate to complete the transmission of various web pages and documents, such as user selected reports to platform user interface pages 115. Also shown in FIG. 3 is network switch 154, which may operate to connect multiple computers together behind the firewall 158. Lastly, as shown in FIG. 3, database server 151 may be directly connected to web server 157 to permit various objects 132 to communicate previously entered data from database 90 to User 16 without any processing of the data.

In one embodiment, report generation engine 110 prepares one or more reports 118 using various software means, including Big Faceless Java Report Generator (available at http://big.faceless.org/), which takes XML data, such as Plan data 25 stored in database 90, and converts such data into PDF format. In another embodiment, report generation engine 110 uses Microsoft Excel to create charts and tables, which may be assembled using, for example, Microsoft Publisher and output to, for example, PDF and delivered to User 16 as described above. Report 118 may alternatively be formatted for delivery to User 16 as JPEG, TIFF, as a Microsoft Word document, as HTML web pages, or any other report format suitable for displaying comparison information between a selected Plan and a suitable Benchmark Group on either a computer display or in hard copy form.

In one embodiment, database 90 may manage and store all data that it acquires using, for example, a MySQL database with a standby server. In one embodiment, all of the data that is stored on database 90 may be centrally stored on database server 151. In another embodiment, data may be stored on many database servers 151 distributed and/or located throughout the world.

Data may make its way into database 90 of system 10 by any number of different ways. As shown in FIG. 1, data may be directly entered by User 16 into system 10 via web portal 20. Alternatively, system 10 may collect Plan data 25 through automated direct data feeds, which may be scheduled on demand or at regular or irregular intervals, through uploads from third party investment databases, or through proprietary processing of government Plan databases. Data entry through web portal 20 may also be performed by an Advisor/Consultant, a Recordkeeper, or by any other Service Provider of a particular Plan, and in some instances the Plan Sponsor may enter the data themselves. Alternatively, Plan data 25 may be entered by the operator or administrator of database 90, or by a subcontracted third party.

To ensure that Plan comparisons against a Benchmark Group of Plans are as relevant and accurate as possible, system 10 may collect and report current, actual Plan data. In one embodiment, fee and service data for a particular Plan must have been bid or reviewed within the last three years to avoid stale data from becoming part of the Benchmark Group of Plans. Entry of data within a given time period may help to ensure that system 10 acquires only relatively new or current information. For example, system 10 may restrict data entry on web portal 20 to Plan data that is less than a prescribed time period, such as less than three months old. Similarly, system 10 may restrict data from automatic data feeds to real Plan data that is less than, for example, one month old. Some information, such as platform data from, for example, Recordkeepers, may be updated quarterly, or at any other interval, in system 10. Basic investment information may be updated monthly, for example, from the Service Provider.

To compare a given Plan against a database of Plans, system 10 may take into consideration a number of "fee components" and a number of "value components." "Fee components" may include, for example, fees to a Plan's Recordkeepers, fees to Advisor, Consultants of the Plan, fees to money managers or investment managers of Plan assets, and fees to other Service Providers. "Value components" may include various measures of a Plan Participant's success at meeting their goals, Plan complexity, the type and quality of fiduciary support, the type and number of Plan services that the Plan includes, the type and number of Participant services that the Plan includes, and the type and quality of various service standards of the Plan.

To construct one or more reports 118 that compare a given Plan against a computer-selected group of plans (a "Benchmark Group of Plans") selected from a database of Plans, and in particular a given Plan's fees, services, and overall value as compared to other, similarly structured Plans, a multi-step process may be employed comprising: (1) determining a Benchmark Group of Plans, (2) comparing Plan fees to the fees associated with the Benchmark Group of Plans, (3) comparing Plan value to the value associated with the Benchmark Group of Plans, and (4) determining the reasonableness of the Plan's fees in view of the Plan's value. This multi-step process may involve more than or fewer than these steps depending on what specific comparisons and/or reports may be desired by User 16.

The first step is to determine a Benchmark Group of Plans comprising a number of Plans from database 90 that are most similar to the given Plan. This task of determining a Benchmark Group of Plans from database 90, which may comprise potentially hundreds of thousands of plans and millions of records, is challenging at least because Defined Contribution Plans come in a myriad of shapes and sizes, where no two Plans are exactly identical. However, system 10 may consider a number of "sort factors," such as relative Plan size and relative number of Plan Participants, to quickly identify from database 90 which Plans are most similar to the given Plan.

In one embodiment, the Benchmark Group of Plans may be determined from approximately nine relevant sort factors, including the dollar amount of Plan assets, the number of Plan Participants, the last year that the Plan Sponsor or Recordkeeper, for example, reviewed its Plan or bid on a Plan, the relevant company industry of the Plan Sponsor, the Plan type, whether or not the Plan uses automatic enrollment for Plan participants, whether and how much the employer matches contributions to the Plan from Plan participants, the percent of Plan assets invested in Index funds, and the percent of Plan assets in managed accounts, so as to filter database 90 of potentially hundreds of thousands of Plans to the Plans that are most relevant for comparison purposes to the selected Plan. Other embodiments may require more or fewer number of sort factors to determine a relevant Benchmark Group of Plans.

System 10 may determine a Benchmark Group of Plans that is tailored to the given Plan's characteristics. For example, system 10 may identify plans in database 90 with similar economic profiles, cost structures and designs. By grouping plans in this way, system 10 may generate one or more reports 118 that enable a Plan Sponsor, for example, to accurately assess a given Plan's fees, support, services, and success measures relative to the Benchmark Group of Plans.

For example, Plan size and number of Plan Participants may be selected as within a similar range of sizes and number of Participants to ensure matching economic profiles. In addition, by considering only those Plans that have bid or reviewed fees and services within, for example, three years may help to ensure that the Benchmark Group of Plans reflect relatively current assessment of the marketplace. It may also be inappropriate to compare a Plan with 100% passive investments to one with 100% active investments because the 100% passive Plan may have substantially lower costs due to the fiduciary's belief in indexing. However, costs associated with a 100% passive Plan may be high when compared to other passively managed Plans. Therefore, under certain circumstances, it may be useful to compare Plans with similar active/passive investment ratios. It may also be useful to compare Plans with similar exposure to Managed Accounts because Managed Accounts provide Plan Participants with an important additional service, albeit at higher structural costs. A Plan's participation and deferral rates can be directly related to the presence of an employer match or use of "auto" features. Consequently, grouping Plans of similar designs may help to determine what additional factors may generate better Participant behaviors. Establishing a Benchmark Group of Plans and comparing the Plan to the Benchmark Group of Plans in this way ensures an apples-to-apples comparison of various aspects of the Plan to those in the Benchmark Group of Plans, leading to better, more informed decision making by, for example, a Plan Sponsor.

To arrive at a Benchmark Group of Plans, system 10 may employ pre-programmed rules that may flexibly set the criteria for each sort factor depending on the system's analysis of the makeup of the plans in database 90. For example, system 10 may set ranges of the dollar amount of Plan assets to 0 to $20 million, $21-$50 million, $51-$100 million, etc., depending on the distribution of Plans that fall into each respective range or "bin." System 10 may change these ranges as new Plan data is stored in database 90. Thus, some ranges may become smaller or larger to distribute the universe of plans in database 90 into meaningful ranges for comparison purposes. During the report generation phase, the software of system 10 may analyze Plan data 25 for the given Plan and determines, given the universe of plans in database 90 at the time, what the respective ranges for each of the sort factors should be as well as which and how many sort factors will be used to filter database 90 to arrive at the Benchmark Group of Plans. In another embodiment, the ranges applied to the sort factors is fixed regardless of the make up of and quantity of the universe of plans in database 90. In yet another embodiment, which and how many sort factors that system 10 uses to filter database 90 is fixed regardless of the make up of and quantity of the universe of plans in database 90. In still another embodiment, the ranges applied to the sort factors and the number of sort factors used to filter database 90 are selectable by User 16. In this way, User 16 may control, to some extent, not only the determination of the Benchmark Group of Plans but the resulting comparison output reflected in the one or more Reports 118 that User 16 chooses to receive.

Once a Benchmark Group of Plans is determined by system 10, system 10 may then examine a number of measures that may indicate how well Plan Participants are preparing for retirement according to their retirement goals. Such "Participant Success Measures" may include, for example, the Plan's current participation rate, the average deferral percentage for non-highly compensated employees, the average deferral percentage for highly compensated employees, the percentage of participants maximizing the available company match, the percentage of Plan assets in automatically diversified options, the percent of eligible participants making catch up contributions, the percentage of participants using an auto rebalance option or investment selections, the percentage of terminated participants that have not cashed out their assets in the Plan, the percentage of participants with a personal retirement goal, and the percentage of participants on track to achieve their personal goal.

The companies and entities that provide retirement plan services may widely vary. In addition, the companies and entities that provide retirement plan services may provide such services on an a la carte basis as well as by bundling a number of services together, often with varying fee structures and approaches for charging and collecting fees or compensation for the services rendered. Thus, a process for comparing a given Plan against a database of Plans may involve identifying and considering the numerous, often disparate approaches to how fees are charged to a Plan, and unifying the fee types into an apples-to-apples structure for comparison.

To do this, one step in comparing a given Plan to a Benchmark Group of Plans is to identify all fees and the sources for all fees that are being paid by the Plan in question. Plan level fees may be paid to a number of Service Providers including, for example, to Recordkeepers, Advisor/Consultants, investment managers, and to a number of other providers of services to the Plan. Fees charged to a Plan at the Service Provider level may come from a variety of sources, such as investment fees, commissions, finders' fees, managed account fees, and a variety of other potentially hidden (i.e., imbedded) fees. Fees at the investment level include the fees paid directly through investments in the Plan, and are often charged as a percentage of Plan assets. Fees at the Participant level include for Participant-elected services like loans, distributions and self-directed brokerage transactions. Since some fees are paid by the Plan and others are paid by the Plan Sponsor, including all fees related to the Plan regardless of who pays the fee is one way to ensure accurate Plan comparisons.

Depending on the selected report 118, system 10 may then determine a Plan's design features and associated complexity and compare these to the Benchmark Group of Plans. Plan design features may relate to Plan eligibility, employee and employer contributions, invests structure and distributions. System 10 may assign a "cost factor" to each Plan, which may be totaled and compared to the cost factors of plans in the Benchmark Group of Plans. Although Plan design complexity may be neither good nor bad, what may be important to know is whether the costs associated with a complex Plan are in line with, or better than, the cost to administer similarly complex Plans.

System 10 may also identify the fiduciary oversight and best practices support a Plan is receiving. Categories that may be considered include, for example, Plan design and administration, communications, investments, fees, and, if applicable, company stock. Information considering comparison of these categories to the Benchmark Group of Plans may be summarized at both the Plan and Service Provider levels.

System 10 may also identify the additional services the Plan is receiving from the Advisor/Consultant. Additional Advisor/Consultant services may include, for example, fiduciary status of advisor, participant education and communication efforts (including numbers and type of meetings such as whether in group sessions or one on one). In addition, the Advisor/Consultant services may include providing, for example, newsletters for Participants on a quarterly basis or some other interval, providing a website with financial Planning tools for Participant use, and whether or not the Advisor/Consultant accepts phone calls directly from Participants to address Plan questions.

System 10 may also make available a multi-part "Assessment of Satisfaction" survey that may solicit opinions on the Plan Recordkeeper's Services Team, Participant's services and Sponsor services.

System 10 may also examine the Plan and Participant services that are being provided to the Plan. Such services may include, for example, Plan-driven services, Participant-driven administration services and Participant-driven communication services. System 10 may also assign a "difficulty factor" to each service. To compare services of a given Plan against the Benchmark Group of Plans, system 10 may multiply the number of transactions for each service ("called volumes") by the degree of difficulty ("difficulty factor") assigned to each service. The system 10 may sum these amounts and the Plan's total may then be compared to the total of other Plans in the Benchmark Group.

System 10 may also consider various service standards of the Plan's Recordkeeper, such as timeliness and accuracy of the services that are provided. Accuracy standards may include various service categories such as, for example, contributions, distribution processing, compliance, and communications. Examples of contributions may include processing of payroll tapes, employer match calculations, profit sharing calculations, and required contribution calculations. Examples of distribution processing may include new loans, in-service withdrawals, hardship withdrawals, termination distributions, QDRO's, and MRD's. Examples of compliance may include ADP/ACP testing, 415 testing, and signature ready 5500. Examples of communications many include, for example, newsletters, custom communication campaigns, quarterly statements, and annual statements.

As for timeliness standards, system 10 may consider both Participant-driven and Plan-driven standards. Examples of Participant-driven standards may include eligibility information, investment information, loans, in-service withdrawals, hardship withdrawals, termination distributions, other processing such as for QDRO's and MRD's, and statements. Examples of Plan-driven categories that system 10 may consider include contributions, investment changes, compliance, other communications, and Plan events.

System 10 may summarize all of the fees and services provided by the Plan's Recordkeeper and Advisor/Consultant, respectively, on a single page of a selected report 118 for easy review by User 16.

As shown in Table 1 below, system 10 may generate one of a number of different pre-styled reports 118 comparing a given Plan against a Benchmark Group of Plans, as selected by User 16. In one embodiment, one or more reports 118 may be configured using "Data Categories" as indicated in Table 1. In another embodiment, reports 118 may be configured using any combination of the "Data Categories" shown in Table 1. In yet another embodiment, individual "Data Categories" may be selected by User 16 to create one or more customizable Reports 118. In still another embodiment, additional or fewer "Data Categories" may be used or selected than those shown in Table 1.

TABLE 1

| Data Category | Benchmarks Report 1 Fees, Plan Design, and Participant Success Measures | Benchmarks Report 2 Sponsor and Advisor Provided Services | Benchmarks Report 3 Plan and Participant Services Report |
|---|---|---|---|
| Basic Plan Information | ● | ● | ● |
| Participant Success Measures | ● | | |
| Plan Design Features | ● | | |
| Plan Investment Choices-Type | ● | | |
| Plan Investment Choices-Fees | ● | | |
| Other Fees | ● | | |
| Sponsor Fiduciary Support | | ● | |
| Advisor Provided Services | | ● | |
| Satisfaction-Recordkeeper Services | | ● | |
| Plan-Driven Services | | | ● |
| Participant-Driven Administration | | | ● |
| Participant-Driven Communications | | | ● |
| Service Volumes | | | ● |
| Accuracy & Timeliness Standards | | | ● |

As described above, system 10 may provide User 16 with one of a number of pre-styled reports, each relying on a unique set of Plan data. In one embodiment, as shown in Table 1 above, system 10 may generate Benchmark Report 1 entitled, "Fees, Plan Design and Participant Success Measures," which may compare a given Plan against a Benchmark Group of Plans by comparing, for example, "Basic Plan information," Participant Success Measures" information, "Plan Design Features" information, "Plan Investment Choices—Type" information, "Plan Investment choices—Fees information," and other fees. Another exemplary report 118 identified in Table 1 is Benchmarks Report 2, entitled "Sponsor and Advisor Provided Services," which may compare a given Plan against a Benchmark Group of Plans by comparing, for example, "Basic Plan Information," "Sponsor Fiduciary Support," "Advisor Provided Services," and "Satisfaction—Recordkeeper Services." Yet another exemplary report 118 identified in Table 1 is Benchmarks Report 3 entitled, "Plan and Participant Services Report," which may compare a given Plan against a Benchmark Group of Plans by comparing, for example, "Basic Plan information," "Plan-Driven Services," "Participant-Driven Administration," "Participant-Driven Communications," "Service Volumes," and "Accuracy and Timeliness Standards."

As shown in Tables 2-15 below, each of these "Data Categories" may individually comprise a number of subcategories or items of information that User 16 may enter into system 10 or that system 10 may acquire. In one embodiment, "Basic Plan information" may include 18 different items of information relating to the Plan, as shown in Table 2 below. Tables 2-15 are, in essence, a roadmap of the type and extent of data fed into system 10 about a given plan.

Basic Plan Information

TABLE 2

Basic Plan Information

1) Plan type
2) Recordkeeper
3) Plan size - dollars
4) # of Plan participants
5) Auto enrollment used?
6) Employer Match offered?
7) Max employer match?
8) Participant contribution to reach max match?
9) Supported by Advisor/Consultant?
10) Advisor/consultant Firm name (if applicable)
11) Supported by a TPA?
12) TPA Firm Name (if applicable)
13) Date of most recent fees/services review
14) Plan Sponsor Name
15) Plan Name (from Form 5500)
16) Plan's three digit ID number (from Form 5500)
17) Plan Sponsor Tax ID Number (from Form 5500)
18) Plan Sponsor principal business activity (from Form 5500)

Participant Success Measures

TABLE 3

Participant Success Measures

1) Participation rate
2) Deferral rate for non-highly compensated employees
3) Deferral rate for highly compensated employees
4) % of participants getting maximum match
5) % of eligible participants making catch-up contributions
6) % of Plan assets invested in auto-diversified options
7) % of participants using auto re-balancing of investments
8) % of terminated participants "cashing out"
9) % of participants with a personal retirement savings goal
10) % of participants on track to achieve savings goal Plan Design Features

TABLE 4

Plan Design Provisions

1) Eligibility - Service Requirement applies?
2) Eligibility - Age requirement applies?
3) Maximum pre-tax contribution allowed?
4) Auto deferral increase offered?
5) Maximum deferral rate reached through auto increase?
6) Catch-up contributions allowed?
7) After-tax contributions allowed?
8) ROTH contributions allowed?
9) Roll-ins" allowed?
10) Vesting schedule applies to employer match?
11) # of years to fully vest employer match?
12) Discretionary profit sharing contributions offered?
13) Vesting schedule applies to discretionary contributions?
14) # of years to fully vest discretionary contributions?
15) Employer required contributions made?
16) Vesting schedule applies to employer required contribution?
17) # of years to fully vest employer required contribution?
18) Maximum number of loans per participant?
19) Allows in-service withdrawals?
20) Allows hardship withdrawals?
21) Allows installment payments?
22) Offers an annuity distribution option at retirement?

Plan Investment Choices—Type

TABLE 5

Plan Investment Choices - Type

For each choice WITH a Ticker Symbol - Provide the following:
    1) Ticker symbol or CUSIP
    2) Dollar value of Plan assets invested
    3) Portion of total expense ratio to Recordkeeper (fee offset)
    4) Portion of total expense ratio refunded to participants
    5) Portion of total expense ratio to TPA (fee offset)
    6) Portion of total expense ratio to Advisor (Fee offset)
For each choice WITHOUT a Ticker Symbol - Provide the following:
    1) Vehicle type
    2) Asset class
    3) Name of choice
    4) Dollar value of Plan assets invested
    5) Total expense Ratio
    6) Portion of total expense ratio to Recordkeeper (fee offset)
    7) Portion of total expense ratio refunded to participants
    8) Portion of total expense ratio to TPA (fee offset)
    9) Portion of total expense ratio to Advisor (Fee offset)
    10) Portion of the total expense ratio to Others
Other information:
    1) The "as of date" of data provided
    2) Total Plan assets in participant loans
    3) Identify Plan default choice or series from Plan choice list Plan Investment Choices—Fees

TABLE 6

Plan Investment choices - Fees

For each Plan choice - identify where the answer is yes:
    1) Accepts new contributions
    2) Proprietary to the Recordkeeper
    3) Passive index fund
    4) Pays commissions to Advisor/Consultant
    5) Pays finder's fees to Advisor/Consultant
    6) Contingent deferred sales charges apply
    7) Wrap fees apply (same or different by choice)
    8) Sub-TA fees paid on a per account basis apply
If applicable - provide the following at the PLAN LEVEL
    1) Total amount of commissions paid to Advisor/Consultant
    2) Total amount of finder's fees paid to Advisor/Consultant
    3) Wrap amount to Recordkeeper
    4) Wrap amount to TPA
    5) Wrap amount to Advisor/Consultant
If applicable - provide the following by the CHOICE LEVEL
    1) Wrap amount to Recordkeeper
    2) Wrap amount to TPA
    3) Wrap Amount to Advisor/Consultant
    4) Sub-TA $ per account
    5) Who collects Sub-TA fee (Recordkeeper or TPA)
    6) Where Sub-TA applies - # of participants owning choice Plan Investment Choices—Fees

TABLE 7

Additional Fees to Recordkeeper:

1) Annual retainer fee ($)
2) Total Other Fees ($)
3) Portion of fees Plan paid vs. sponsor paid ($)

Additional Fees to TPA:

1) Annual retainer fee ($)
2) Total Other Fees ($)
3) Portion of fees Plan paid vs. sponsor paid ($)

Additional Fees to Advisor/Consultant:

1) Annual retainer fee ($)
2) Plan service fees paid by the Recordkeeper (BPS)
3) Total Other Fees ($)
4) Portion of fees Plan paid vs. sponsor paid ($)

TABLE 7-continued

Additional Fees Other Service Providers:

1) Annual retainer fee ($)
2) Total Other Fees ($)
3) Portion of fees Plan paid vs. sponsor paid ($)

Participant Paid Fees:

1) Annual per participant charge ($)
2) Annual per participant advice charge ($)
3) Loan origination fee - per occurrence ($)
4) Loan maintenance fee - annual ($)
5) Hardship approval fee - per occurrence ($)
6) QDRO approval fee - per occurrence ($)
7) QDRO processing fee - per occurrence ($)
8) Periodic payment processing fee - per occurrence ($)
9) Non-periodic payment processing fee - per occurrence ($)

Managed Account Program:

1) Plan has a managed account program?
2) Total Plan $ invested in program
3) Number of participants using program
4) Annual Plan sponsor paid fee
5) Minimum annual managed account fee per participant
6) Fee for a $10,000 account in basis points
7) Fee for a $25,000 account in basis points
8) Fee for a $50,000 account in basis points
9) Fee for a $100,000 account in basis points
10) Fee for a $250,000 account in basis points
11) Fee for a $500,000 account in basis points
12) Provider of investment advice for managed accounts?
13) % of fees credited to managed accounts provider
14) % of fees credited to Recordkeeper
15) Total $ fees paid for managed accounts by the Plan Annual per participant charge ($)

Self Directed Account Program

1) Plan has a self directed account (SDA) program?
2) Total Plan $ invested in SDA program
3) Annual Plan sponsor paid fee to offer SDA ($)
4) Annual fee per participant to use the SDA ($)
5) Fee for internet placed transactions - stock or fund ($)
6) Fee for 800 # operator assisted transactions - stock or fund ($)
7) % of the SDA fees credited to the SDA provider
8) % of the SDA fees credited to the Recordkeeper
9) Provider of the self directed account service
10) # of participants with SDA accounts ERISA Spending Account 1) Plan has an ERISA spending account?
2) $ credited to account by Service Provider
3) How was ERISA account used in last 12 months?
4) What approach is used to deal with yearend remainders?

Sponsor Fiduciary Support

TABLE 8

Section 1 - Plan Design & Administration Support Provided

For each item, indicate who provides service (Recordkeeper, Advisor/Consultant, TPA, or Other) and if the services is a "Hot Button" issue for the Plan (yes/no)?
    1) Alerts Plan decision makers of important regulatory and rules changes
    2) Assists in design of Plan's eligibility provision, including use of Auto Enrollment
    3) Assists in design of Plan's Employee Contribution structures, including Roth or use of Auto Increase
    4) Assists in design of Plan's Employer Contribution approach, including use of employer match
    5) Assists in design of Plan's loan and withdrawal policy
    6) Aids in structuring Plan's distribution options, including possible use of installments and annuities
    7) Helps monitor ongoing performance of Recordkeeper

TABLE 8-continued

8) Carries out a recordkeeping search with appropriate recommendation to Plan sponsor
9) Assesses benefits of outsourcing all retirement Plans to your Recordkeeper Section 2 - Communications Support Provided (yes/no)

For each item, indicate who provides service (Recordkeeper, Advisor/Consultant, TPA, or Other) and if the services is a "Hot Button" issue for the Plan (yes/no)?
1) Assists with setting and monitoring goals for Plan participation rates
2) Assists with setting and monitoring goals for participant deferral percentages for Non-HCEs
3) Assists with setting and monitoring goals for number of participants obtaining maximum company match
4) Assists with setting and monitoring goals for number of participants in Automatically Diversified Options
5) Assists with setting and monitoring goals for number of participants using advice program
6) Assists with setting and monitoring goals for participant diversification
7) Assists with setting and monitoring goals for the number of participants not cashing out
8) Assists with setting and monitoring goals for number of participants establishing a retirement goal
9) Assists with setting and monitoring goals for number of participants on track to attain a retirement goal Section 3 - Investments Support Provided (yes/no)

For each item, indicate who provides service (Recordkeeper, Advisor/Consultant, TPA, or Other) and if the services is a "Hot Button" issue for the Plan (yes/no)?
1) Helps develop the investment policy statement
2) Aids in the examination of whether a Plan is 404(c) compliant
3) Helps Plan sponsor to determine the number and type of investment funds to offer
4) Assists with selection of the default fund
5) Builds and manages risk-based or target retirement date portfolios from core funds
6) Helps determine the proper fund benchmarks and documenting any benchmark changes
7) Assists in consideration to offer an advice program
8) Assists in consideration to offer Managed Accounts
9) Assists in consideration to offer Self-Directed Account
10) Assists in consideration to offer an annuity option
11) Helps monitor the investment policy statement
12) Helps monitor ongoing performance of all investment choices
13) Carries out investment manager searches with appropriate recommendation to Plan sponsor
14) Helps Plan sponsor examine "mapping/blackout" options when replacing an investment manager Sections 4 - Fees Support Provided (yes/no)

For each item, indicate who provides service (Recordkeeper, Advisor/Consultant, TPA, or Other) and if the services is a "Hot Button" issue for the Plan (yes/no)?
1) Analyzes and makes specific recommendation for how to contract with all Service Providers
2) Helps Plan sponsor make sure all participants share equitably in the cost of administering the Plan
3) Helps Plan sponsor make sure all Plan fees paid to all parties are FULLY DISCLOSED
4) Helps Plan sponsor make sure all Plan fees paid to all parties are REASONABLE
5) Helps Plan sponsor make sure that only "qualified" expenses are being paid by the Plan
6) Helps Plan sponsor determine which expenses should be assessed against the ERISA spending account
7) Helps Plan sponsor determine what to do with excess ERISA account credits
8) Provides participants with an annual fee disclosure statement Section 5 - Company Stock Support Provided (if applicable) (yes/no)

For each item, indicate who provides service (Recordkeeper, Advisor/Consultant, TPA, or Other) and if the services is a "Hot Button" issue for the Plan (yes/no)?

TABLE 8-continued

1) Identifies a source or sources of independent research on your company stock
2) Evaluates the diversification rules in your Plan design
3) Assesses pros and cons of share versus unit accounting
4) Assesses amount of cash to hold in the company stock fund
5) Helps design the company stock dividend feature of your Plan
6) Helps participants address the Net Unrealized Appreciation issue upon termination
7) Designs a behavioral finance program to encourage diversification Advisor Provided Services

TABLE 9

Additional Advisor/Consultant services provided (yes/no)

1) Acts as a Fiduciary under 1940 Act
2) Acts as a Fiduciary under ERISA
3) Provides Financial Planning Services
4) Provides Group Meetings
5) Number of Group Meetings (fill in)
6) Provides One-on-One Meetings
7) Number of One-on-One Meetings (fill in)

Satisfaction—Recordkeeper Services

TABLE 10

Level of Satisfaction - Recordkeeper Service Team

1) Rate the service team's overall expertise and knowledge level (Responses: A True Expert, Adds Value, Satisfactory, Needs Improvement)
2) Rate the service team's overall approach (Responses: An Advocate, Proactive, Satisfactory, Needs Improvement)
3) Has turnover in the service team negatively impacted service quality? (Responses: Not at all, A little, A lot, Not applicable)
4) Does the frequency with which the service team is onsite meet the Plan's needs?(Responses: Yes, Almost, No, Not applicable)
5) What is the overall assessment of the service team? (Responses: Insightful and Adds Value, Adds Value, Satisfactory, Needs Improvement, Not applicable)
6) Does the service team's work product meet the Plan's needs? (Responses: World Class, Very Good, Satisfactory, Needs Improvement, Not applicable)

Level of Satisfaction - Participant Services - part A

Internet Services
1) Availability
2) Speed
3) Easy to find what you want
4) Range of available information
5) Quality of information available
6) Ease of conducting a transaction
7) Ease of using the advice program
8) Range of educational materials
9) Quality of educational materials
10) OVERALL SATISFACTION - Internet Services 800 Number Phone Services
1) Hours of availability
2) Answers call in an acceptable amount of time
3) Ease of use of automated phone system
4) Range of services of automated phone system
5) Ease of accessing a customer service representative
6) Phone rep's knowledge of your retirement Plan
7) Able to resolve an issue on the first call
8) Processes transactions accurately
9) Treats our participants as valued customers
10) OVERALL SATISFACTION - Phone Services Level of Satisfaction - Participant Services - part B Participant Print Materials (content, clarity, accuracy, timeliness)
1) Participant statements
2) Enrollment Kits

TABLE 10-continued

3) Newsletters and other education materials
   4) Loan paperwork
   5) Withdrawal paperwork
   6) Distribution paperwork
   7) Confirmations
   8) OVERALL SATISFACTION - Print Materials
In Person Services
   1) Availability of group workshops
   2) Accuracy of content of group workshops
   3) Range and clarity of content for group workshops
   4) Willingness to answer questions in group workshops
   5) OVERALL SATISFACTION - Group Workshops
   6) Availability of one-on-one meetings
   7) Accuracy of content of one-on-one meetings
   8) Range and clarity of content for one-on-one meetings
   9) Willingness to answer questions for one-on-one meetings
  10) OVERALL SATISFACTION - one-on-one meetings

Level of Satisfaction - Plan Services - Part A

Plan Sponsor Portal
   1) Availability
   2) Speed
   3) Ease of use
   4) Range of information
   5) Quality of information
   6) Range of available reports
   7) Ad hoc reporting tool
   8) Range of educational materials
   9) Clarity of educational materials
  10) OVERALL SATISFACTION - Sponsor Portal
Plan Sponsor Reporting
   1) Accuracy
   2) Timeliness
   3) Quantity
   4) Clarity
   5) OVERALL SATISFACTION - Sponsor Reports

Level of Satisfaction - Plan Services - Part B

Administrative Transactions
(flexibility, accuracy, timeliness, responsiveness)
   1) Enrolling employees in the Plan
   2) Processing employee contributions
   3) Processing employer contributions
   4) Processing loans, withdrawals, distributions, etc.
   5) Producing participant statements
   6) Producing compliance testing
   7) Producing year-end 5500 and audit package
   8) OVERALL SATISFACTION - Plan Administration
Plan Sponsor Education
(Services such as webinars, newsletters, and legislative updates)
   1) Accuracy
   2) Timeliness
   3) Quantity
   4) Clarity
   5) OVERALL SATISFACTION - Educational Services

Plan-Driven Services

TABLE 11

Plan-Driven Services - For each service indicate the following:

Service Provided (Yes/No)?
   Who provides service (Recordkeeper, TPA, or Other Service Provider)?
   1) Processes Fund Additions/Deletions
   2) Conducts ADP/ACP Tests
   3) Makes Plan Design Changes
   4) Processes Mergers/Acquisition/Divestitures
   5) Provides Plan Sponsor Reports
   6) Offers Company Stock Trustee Services
   7) Offers Company Stock Custody Services
   8) Calculates Company Stock NAVs
   9) Calculates Company Performance
  10) Calculates Company Stock Proxy Labels
  11) Processes Payroll Files

TABLE 11-continued

Plan-Driven Services - For each service indicate the following:

12) Conducts 415 Test
  13) Offers Online Access for Plan Sponsor to Trust System
  14) Provides Video
  15) Provides Trustee Services
  16) Provides Custodial Services
  17) Processes Signature-Ready 5500
  18) Conducts Annual Audit
  19) Provides Plan Document
  20) Makes Plan Amendments
  21) Sends Determination Letters
  22) Provides Summary Plan Description
  23) Calculates Employer Profit-Sharing Contribution
  24) Calculates Employer Matching Contribution
  25) Manages Start Up or Conversion
  26) Conducts Top-Heavy Testing
  27) Conducts 410(b) Testing
  28) Conducts 401(a)4 Testing
  29) Provides NAV Calculation Services

Participant-Driven Administration

TABLE 12

Participant-Driven Administration - For each service, indicate the following:

Service Provided (Yes/No)?
   Who provides service (Recordkeeper, TPA, or Other Service Provider)?
   1) Originates Loans
   2) Provides Participant Recordkeeping - Actives
   3) Provides Loan Maintenance (payments, payoffs, defaults)
   4) Provides Participant Recordkeeping - Terminateds
   5) Monitors 402(g) Limit on Contributions
   6) Monitors 414(s) Limit on Compensation
   7) Processes QDROs
   8) Processes Distributions
   9) Processes In-Service Withdrawals
  10) Approves Hardship Withdrawals
  11) Processes 401(a)(9) Minimum Distributions
  12) Processes Hardship Withdrawals
  13) Processes Rollovers
  14) Processes Investment Transfers
  15) Approves QDROs
  16) Mails Enrollment Kit
  18) Maintains Beneficiary Files

Participant-Driven Communications

TABLE 13

Participant-Driven Communications - For each service, indicate the following (where applicable):

Service Provided (Yes/No)?
   Who provides service (Recordkeeper, TPA, or Other Service Provider)?
   Is the service paperless?
   Is the service customized? (Standard = Designed for general use, Branded = includes Plan sponsor branding/logo, and Customized = completely customized for the Plan Sponsor)
   1) Delivers Quarterly Statements - Paper Based
   2) Delivers Quarterly Statements - Electronic
   3) Delivers Investment Advice
   4) Creates Paper-Based Message Campaigns
   5) Provides Internet Services
   6) Provides 800-Number Services
   7) Delivers Newsletter
   8) Produces Enrollment Kits
   9) Creates Electronic Message Campaigns
  10) Provides Personal Access Codes
  11) Sends Prospectuses
  12) Delivers On-Demand Statements
  13) Provides Self-Directed Account Materials
  14) Holds Enrollment Meeting/Group Meetings

TABLE 13-continued

Participant-Driven Communications - For each service, indicate the following (where applicable):

15) Holds One-on-One Meetings
16) Provides Investment Transfer Confirmations
17) Produces Annual Benefit Statements
18) Produces Quick Enrollment Card

Service Volumes

TABLE 14

Service Volumes - Plan-Driven Services

Provide the requested number of each item. For activity based items, provide the totals for the 12 months ending the "as of" date of this submission.

Plan Processing

1) Number of participants processed due to startup Plans or Plan conversions
2) Number of participants added or subtracted due to merger/acquisition/divestiture activity
3) Number of payroll files processed
4) Number of fund changes processed
5) Number of Plan design changes processed

Calculations Performed

6) Number of employer matching Contribution calculations performed
7) Number of employer profit sharing contribution calculations performed
8) Number of employer other contribution calculations performed

Compliance

9) Number of ADP/ACP Tests
10) Number of 415 Tests
11) Number of Top-Heavy Tests Conducted
12) Number of 410(b) Tests Conducted
13) Number of 401(a)4 Tests Conducted

Other

14) Number of Plan Sponsor Reports Provided

Service Volumes - Participant-Driven Services

Provide the requested number of each item. For activity based items, provide the totals for the 12 months ending the "as of" date of this submission.

Administration
Participant Counts

1) Number of active Plan participants with an account balance
2) Number of new Plan participants ADDED to Plan during period
3) Number of terminated Plan participants with an account balance
4) Number of Plan participants TERMINATED during period
5) Number of newly eligible employees processed

Distributions Approval and Processing

6) Number of new loans processed
7) Number of outstanding loans maintained
8) Number of in service withdrawals processed
9) Number of hardship approvals processed
10) Number of hardship withdrawals processed
11) Number of Other Distributions processed
12) Number of QDRO approvals processed
13) Number of QDROs processed
14) Number of Minimum Required Distributions processed

Other Processing

15) Number of investment transfers processed
16) Number of rollovers into the Plan processed
17) Number of beneficiary files maintained
18) Number of enrollment kits mailed

Communications
Statements

1) Number of Paper Statements Sent to Each Participant
2) Number of Electronic Statements Sent to Each Participant
3) Number of on demand statements accessed

TABLE 14-continued

Web and VRU Use

4) Number of participant website sessions
5) Number of participant phone calls taken
6) Number of Newsletters Provided

Print Materials & Video

7) Number of prospectuses sent
8) Number of Self Directed Account materials packages sent
9) Number of quick enroll cards sent
10) Number of Videos Provided

Face to Face

11) Number of Enrollment/Group meetings
12) Number of One-on-One Meetings

Campaigns

13) Number of Paper-Based Message Campaigns Provided
14) Number of Electronic Message Campaigns Provided

Accuracy and Timeliness Standards

TABLE 15

Accuracy and Timeliness Standards

Accuracy Standards (fill in percent)

Contributions

1) Payroll Tapes accuracy
2) Employer Match Calculations accuracy
3) Profit Sharing Calculations accuracy
4) Required Contribution Calculations accuracy

Distribution Processing

5) Loan accuracy
6) In-Service Withdrawals accuracy
7) Hardship Withdrawals accuracy
8) Termination Paperwork accuracy
9) QDROs accuracy
10) MRDs accuracy

Compliance

11) ADP/ACP testing accuracy
12) 415 testing accuracy
13) 5500 accuracy

Communications

14) Newsletter accuracy
15) Paper Based Campaigns accuracy
16) Quarterly Statement accuracy
17) Annual Statements accuracy Timeliness Standards - Participant-Driven Services
(fill in # of days unless otherwise noted)

Eligibility Information

1) Quick Enrollment Card Sent
2) Enrollment Kits Sent
3) Personal Access Codes Sent

Investment Information

4) Prospectuses Sent
5) Self Directed Account Materials Sent
6) Newsletter Sent
7) Investment Transfer Confirmations Sent

Loans

8) New Loan Paperwork Processed
9) Loan Coupon Books Sent
10) Loan Default Letters Sent
11) Loan Payoff Letters Sent
12) Loan Check Sent

In-Service Withdrawals

13) In-Service Withdrawal Paperwork Processed
14) In-Service Withdrawals Check Processed TABLE 15-continued Accuracy and Timeliness Standards Hardship Withdrawals 15) Hardship Withdrawal Paperwork Processed
16) Hardship Withdrawals Check Sent Termination Distributions 17) Termination Paperwork Processed
18) Terminations Check Sent Other Processing 19) QDROs Processed
20) MRDs Processed Statements 21) On Demand Statements Availability Post Quarter End
22) Quarterly Statements Sent
23) Annual Statements Sent 800-Number Service Standards (hours or # of seconds)

24) 800-Number Hours Per Week Available
25) 800 Number average speed to Rep in seconds Timeliness Standards - Plan Driven Services (fill in # of days)

Contributions

1) Processing of Payroll Tapes
2) Employer Match Calculations
3) Profit Sharing Calculations
4) Required Contribution Calculations Investment Changes 5) Adding/Changing a Fund Compliance 6) ADP/ACP Testing
7) 415 Testing
8) Top-Heavy Testing
9) 410(b) Testing
10) 401(a)4 Testing
11) Proxy Voting on Mutual Funds
12) Signature-ready 5500

Other Communications

13) Electronic Messaging Campaigns Developed
14) Paper-Based Messaging Campaigns Developed
15) Group Meetings Plan Events 16) Merger/Acquisitions/Divestiture Processing Once all of the relevant information is entered into database 90 about a given Plan, system 10 may then process a request for a given report 118, as selected by User 16. For example, if User 16 selects Report 1 from within web portal 20, system 10 then may generate Report 1 for any given Plan that User 16 is associated with.

Figure 4A:
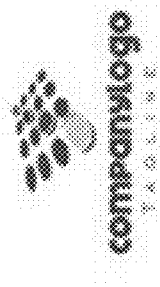
FIGS. 4a-4z illustrate an exemplary report as may be output by the embodiment shown in FIG. 1.
Figure 4E:
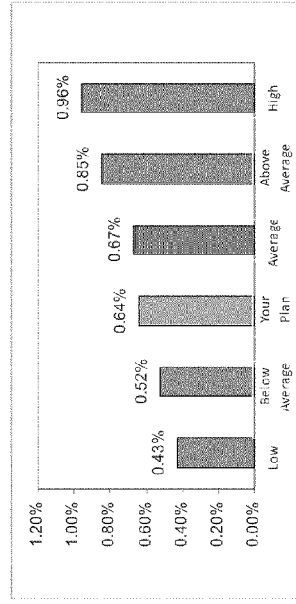

One exemplary report 118 is shown in FIGS. 4a through 4z, which is entitled "Fees, Plan Design and Participant Success Measures." This report includes a Table of Contents, such as shown in FIG. 4b, an analysis of how the Benchmark Group was determined in comparison to the given Plan, as shown in FIG. 4c, as well as a number of individual reports and/or report summaries relating to Plan fees, Plan design, and "Participant Success Measures," as shown in FIGS. 4e-4x. In FIG. 4y, there is shown an exemplary glossary page to assist User 16 in understanding certain terms used throughout the report. In FIG. 4z, there is shown an exemplary disclosure page providing, for example, various disclaimers and information concerning report 118. As discussed below, FIG. 4z may be customized in its content. If desired, the disclosure page shown in FIG. 4z may also be excluded from report 118.

In the exemplary report shown in FIG. 4c, there is illustrated various sort factors that system 10 considered when determining the Benchmark Group of Plans corresponding to the given Plan from which all subsequent comparisons are made and illustrated throughout the report. As shown in Column (1) of Table 1 of FIG. 4c, system 10 considered nine sort factors as being most relevant to arrive at the Benchmark Group of 576 similar Plans filtered from a database of hundreds of thousands of Plans.

As illustrated in Column (2) of Table 1 on FIG. 4c, the Plan being compared to the Benchmark Group of Plans is identified as having $54.86 million in Plan assets, 1,085 Plan Participants, was last reviewed in 2006, has "manufacturing" as the industry of the Plan's Sponsor, is a 401(k) Plan, uses automatic enrollment into the Plan for new hires, has a 3% maximum employer matching contribution, has 9% of Plan assets in index investment funds, and has 15% of Plan assets in managed accounts.

As shown in Column (3) of Table 1 of FIG. 4c, system 10 determined the Benchmark Group of Plans to be all Plans from database 90 that had Plan assets of between $50 million and $100 million and between 1,000 and 1,500 participants, were each reviewed within the last three (3) years, 100% of the Benchmark Group of Plans are in manufacturing, 100% of the Benchmark Group of Plans are 401(k) Plans, 100% of the Benchmark Group of Plans use auto enrollment for new hires, each of the Benchmark Group of Plans have as the maximum matching contribution somewhere between 2% to 3%, the Benchmark Group of Plans all have between 1% to 10% of their Plan assets in index funds, and each of the Benchmark Group of Plans have between 10% to 20% of Plan assets in managed accounts.

Table 2 of FIG. 4c illustrates what percent of the Benchmark Group use a particular Service Provider type, as well as the given Plan's specific Service Providers by provider type. For example, as shown in Column (2) of Table 2, 100% of the Benchmark Group of Plans uses a Recordkeeper as a Service Provider, 51% use an Advisor/Consultant, 28% use a Third Party Administrator, and 27% of the Benchmark Group of Plans employs other Service Providers.

FIG. d illustrates another embodiment of the report page shown in FIG. 4c. For example, FIG. 4d shows a different set of sort factors that system 10 considered when determining the Benchmark Group of Plans corresponding to the given Plan from which all subsequent comparisons may be made and illustrated throughout the report. As shown in Column (1) of Table 1 of FIG. 4d, system 10 considered nine sort factors as being most relevant to arrive at the Benchmark Group of 41 similar Plans, as illustrated in this example, that were filtered from a database of hundreds of thousands of Plans. Column (1) of FIG. 4d further shows that the Sort Factors for this embodiment includes a Yes/No answer (Table 1 Column (2)) to the question of whether the Benchmark Group of Plans include employer match, as opposed to the embodiment shown in FIG. 4c which attempts to quantify a Maximum Employer Matching Contribution. In this embodiment, 80% of the Benchmark Group of Plans has an Employer Matching component to the Plan (Table 1-Column (3)).

FIG. 4e illustrates an exemplary "Plan Fees Summary" page of Report 1, which provides an overall summary of the Plan's fees as compared to the fees charged to the Benchmark Group of Plans. Column (2) of Table 1 of FIG. 4e illustrates the fees charged to a given Plan by source of those fees. In the exemplary embodiment of Table 1, investment fees totaled $268,493, which represents 72% of the total fee outlay for the Plan as shown at the bottom of Column (3). Table 1, Column (4) refers User 16 to a detail page "A-2" of Report 1 for a breakdown of all of the Plan's investment fees. In this embodiment, detail page "A-2" is shown in FIG. 4*l* of Report 1.

FIG. 4*l*, for example, shows a number of core investment funds as shown in Row (1), a number of automatically diversified funds as shown in Row (2) of Table 1, and a pair of other types of funds of the Plan, shown in Row (3) of Table 1.

Column (2) of Table 1 of FIG. 4*l* illustrates the percentage of the Benchmark Group of Plans that held the corresponding category of asset as shown in Column (1) of Table 1. For example, in Row (a), Column (2) of Table 1, 89% of the Benchmark Group of Plans held a "stable value" asset category of funds.

Column (3) of Table 1 of FIG. 4*l* illustrates the total expense, by percent and by Service Provider, charged to the Plan for each category of investment. Column (4) of Table 1 of FIG. 4*l* shows the combined Service Provider fee per investment category.

Adjacent to Column (4) in Table 1 is Column (5), which shows a percentage breakdown of the total expense charged to the Benchmark Group of Plans for each of the category of investments. System 10, for example, resolves the Benchmark Group of Plan's total expense by percent per fund category, where the Benchmark Group of Plans are ranked in groupings or "bins" labeled "Low," "Below Average," "Average," "Above Average," and "High," each representing the $5^{th}$ percentile, $25^{th}$ percentile, $50^{th}$ percentile—median, $75^{th}$ percentile, and $95^{th}$ percentile, respectively, of the Benchmark Group of Plans, as also shown in, for example, Table 1 of FIG. 4*b*. Consequently, the use of the term "Average," whether alone or with any other term, is a descriptive use rather than a mathematical use of the term.

In Column (6) of Table 1 of FIG. 4*l*, system 10 computes the difference between the total investment fees of Column (4) and the average fees charged to the Benchmark Group per investment category. As shown in Column (6), Row (a) of Table 1, the total investment fee of 0.30% (as shown in Column (4), Row (a)), is 0.08% more expensive than the average Benchmark Group fees of 0.22%. Consequently, by examining Column (6), User 16 may quickly determine how many investments in the Plan exceed the median of the Benchmark Group of Plans and by how much.

FIG. 4*m* illustrates another embodiment of the report page shown in FIG. 4*l*. For example, Table 1 of FIG. 4*m* includes Column (1), which indicates the total credit, by percent, credited to the Plan's participants for each category of investment. In addition, Table 1 of FIG. 4*m* includes Column (2), which indicates the total expense, by percent, charged to the Plan as a credit to the government for each category of investment.

Returning to FIG. 4*e*, there is shown in Table 2 an exemplary distribution of total investment fees in dollars and in percent, by Service Provider. As shown in Column (4) of Table 2 of FIG. 4*e*, User 16 is referred to various pages in the appendix of Report 1 to review the breakdown of the fees for each Service Provider. For example, to obtain the breakdown of the total investment fees for Recordkeepers of the Plan as compared to the Benchmark Group of Plans, Table 2 refers User 16 to detail page "A-3," which is illustrated in Report 1 as FIG. 4*n*.

Referring to Table 1 of FIG. 4*n*, there is illustrated various types of Recordkeeper fees, by percent, by type of fee per investment fund, as shown in Column (1). Column (2) of Table 1 is the calculated total investment fee for the Recordkeeper per fund.

Column (3) of Table 1 represents the distribution, using the same "bins" identified in FIG. 4*l*, of Recordkeeper fees, by percent, of the Benchmark Group of Plans. Column (4) represents the difference in percent from the respective values in Column (2), representing the total fees for Recordkeepers per investment fund, relative to the average Recordkeeper fees of the Benchmark Group of Plans. Column (5) of Table 1 shows the percentage of Plans in the Benchmark Group of Plans that pay fees to the Recordkeeper. By illustrating the data as shown in Table 1, User 16 or other fiduciary to the Plan may quickly determine what needs to be changed or improved about the Plan.

FIG. 4*o* illustrates another embodiment of the report page shown in FIG. 4*n*. For example, Table 1 of FIG. 4*o* includes other types of Recordkeeper fees, by percent, by type of fee per investment fund, as shown in Column (1). For example, Table 1 shows credits paid to ERISA, credits paid to Participants, and payments made to Advisors, in percent, per investment fund.

Returning to FIG. 4*e*, Table 3 shows a graphical representation of how the total fees of the Plan compare to the Benchmark Group, in percent. For example, Table 3 shows that the total Plan fees of 0.64% is slightly below the average of the Benchmark Group, which is 0.67%. Table 3, therefore, shows how numerical data (via the numerical amount positioned over respective bars in the histogram) can be blended together with an easily discernable qualitative ranking of the Plan (via the relative magnitude of each graphical bar and the lateral position of the Plan on the histogram) relative to the Benchmark Group of Plans.

Table 4 of FIG. 4*e* illustrates in words how the Plan fees compare to the Benchmark Group of Plans. For example, Table 4 illustrates that this particular Plan's fees are 0.03% less per year than the average in the Benchmark Group, which is equal to about $16,458 less per year, which is $15 less per participant per year.

FIG. 4*f* summarizes the fees paid to the Plan's primary Service Providers, such as Record keepers, Advisor/Consultants, and Investment Managers. As before, the summary tables for each Service Provider shown in FIG. 4*f* refer User 16 to various detail pages in the appendix for a further breakdown of these fees.

FIG. 4*g* provides a high-level comparison of the investment expenses for this Plan as compared to the Benchmark Group of Plans. While investment expenses may be the largest component of Plan costs, these costs should be considered in conjunction with the performance of the investments in the Plan. While not shown in FIG. 4*g*, investment performance relative to Plan costs may be another comparison that can be made. In any event, Table 1 of FIG. 4*g* indicates that, in this exemplary case, nine funds in the Plan are well below average in the Benchmark Group of Plans in terms of the total expense ratio, two funds are below average, four funds are above average, and six funds are well above average. Thus, in this example, roughly half of the funds in the Plan are average or below in terms of total expense ratios, while the other half of the funds that are offered in the Plan are above average in total expense ratios.

Table 2 of FIG. 4*g* shows a graphical summary how this particular Plan's total investment expense compares to the Benchmark Group of Plans, which in this case, are 0.02% less than average.

FIG. 4*h* reflects the Plan's relative complexity, which may be an indicator of how the Plan's design compares to other Plan designs of the Benchmark Group's.

Table 1 of FIG. 4*h* is arranged in a series of five columns and a number of rows, where the rows reflect various Plan provisions, which may be assigned a maximum cost income factor. Column (2) indicates whether this particular Plan has the Plan provisions and type shown in Column (1). Column (3) represents the percentage of Plans in the Benchmark Group of Plans with a "Yes" for the specific Plan provision. Column (4) indicates the maximum cost impact factor from 1 to 5 that system 10 assigns to each respective Plan provision identified in Column (1). A maximum cost impact factor expresses how much difficulty a certain Plan provision adds to a Plan's design. For example, a Plan with a higher number of investment options compared to the industry norm may receive a maximum cost impact factor of 5, whereas a Plan with a relatively low number of investment options may receive only 1 point, thereby indicating that the cost should be less to administer that particular Plan. Column (5) shows this particular Plan's cost impact factor for each of the respective Plan provisions identified in Column (1).

Tables 2 and 3 show a graphical summary and a written summary, respectively, of how the Plan compares in complexity to the Benchmark Group of Plans. Table 2 of FIG. 4h, for example, in this exemplary case, indicates that the Benchmark Group of Plans range from a low of 20 points to a high of 50 points with an average of 35 points in terms of the Plan complexity. In addition, Table 2 shows that the Plan being compared to the Benchmark Group of Plans had 43 points, which is above the Benchmark Group average.

FIG. 4i reflects 10 recognized industry statistics for various "Participant Success Measures," as shown in Table 1. In Column (2) of Table 1 of FIG. 4i, system 10 determined the percentage of Plans in the Benchmark Group of Plans that have each of the respective "Participant Success Measures" shown in Column (1). For example, in Column (2) Row (a), 100 percent of the Benchmark Group of Plans reports that they measure the plan's current participation rate against the available pool of plan participants. Column (3) of Table 1 shows how this particular Plan compares to the Benchmark Group of Plans with respect to each of the "Participant Success Measures" identified in Column (1). For example, Column (3) Row (a) indicates that this particular Plan has an 81 percent participation rate, which is 21 percent higher than the average participation rate of 60%, as shown in Column (4) Row (a) and Column (5) Row (a).

Table 2 of FIG. 4i shows what percentage of Plans in the Benchmark Group of Plans have particular numbers of "Participant Success Measures." For example, in Column (1) of Table 2 of FIG. 4i, 4 percent of the Benchmark Group of Plans reported "zero" as the number of "Participant Success Measures" that were average or better. Column (2) indicates that 33 percent of the Benchmark Group of Plans had at least three out of the ten "Participant Success Measures" that were average or better. By contrast, Column (3) shows that this particular Plan ranks average or better in five out of the ten categories of "Participant Success Measures" listed in Column (1), as indicated by the highlighted cell in Column (3).

Table 3 of FIG. 4i summarizes the "Participant Success Measures" for easy review by User 16. In this case, this particular Plan ranks average or better in five out of ten categories. In addition, 77 percent of the Plans in the Benchmark Group rank lower than this particular Plan, and 9 percent of Plans rank above this particular Plan.

FIG. 4k is a summary of the investment offering of this particular Plan and how it compares to the Benchmark Group of Plans. FIG. 4k may be helpful to Plan Sponsors and their Advisors in comparing the scope of their investment offerings relative to other, comparable Plans. FIG. 4k may also provide additional details on investment program fees.

FIGS. 4p, 4r, and 4t provide comparison detail information regarding investment fees paid to Advisor/Consultants, to Investment Managers, and to Others, respectively. The arrangement and content of the tables in FIGS. 4p, 4r, and 4t are similar to that shown and discussed above for FIG. 4n.

Referring to FIGS. 4q and 4s, there is illustrated another embodiment of the report pages shown in FIGS. 4p and 4r, respectively. For example, Table 1 of FIG. 4q reduces the number of columns in the section entitled, "Disclosure of Advisor/Consultant Fee in percent" to just the total fee paid to the Advisor/Consultant, by percent, per investment fund (Column (1)). Similarly, Table 1 of FIG. 4s reduces the number of columns in the section entitled, "Disclosure of Investment Manager Fee in percent" to just the total fee paid to the Investment Manager, by percent, per investment fund (Column (1)). In this way, User 16 may more quickly ascertain the Advisor/Consultant Fee and the Investment Manager Fee for the Plan, particularly if User 16 is less interested in knowing the individual components that make up these fees.

FIG. 4u shows the percentage of Participants using Managed Accounts in this Plan as compared to the Benchmark Group of Plans, as shown in Table 1. In addition, Table 1 shows the percentage of assets held in Managed Accounts in this Plan as well as how it compares to the Benchmark Group of Plans. The percentage of Participants using Managed Accounts and the percentage of assets held in Managed Accounts for the Benchmark Group of Plans is shown in a distribution of qualitatively labeled groupings or "bins."

Table 2 of FIG. 4u shows the fee disclosure and an indication of reasonableness of those fees for the Plan's Managed Accounts relative to the Benchmark Group of Plans. The total fees paid for managed accounts is shown in Column (1) Row (a), and in this exemplary case, this particular Plan has $49,374 paid for Managed Accounts. Fifty percent of the total fees paid for Managed Accounts are paid to the Recordkeeper or their affiliates, and the other fifty percent of these fees are paid to the Managed Account Provider identified in Table 1. This compares to 51 percent and 49 percent respectively for the Benchmark Group average, as shown in Column (2), Rows (b) and (c).

FIG. 4v is arranged similarly to FIG. 4u, and represents information for "Self Directed Accounts" relative to the Benchmark Group of Plans.

FIG. 4w provides a detailed analysis of the Other fees being paid by Participants, the Plan, or the Plan sponsor. For example, Table 1 of FIG. 4w shows various Participant Paid fees in Column (1), and the percentage of Plans in the Benchmark Group that pay each of these respective fees, as shown in Column (2). Column (3) shows this exemplary Plan's unit cost for each of the Participant-paid fees in Column (1) as compared to the Benchmark Group unit cost, as shown in each of the columns in item 4. Column (5) shows the difference between this particular Plan's unit cost and the Benchmark Group average unit cost for each of the Participant-paid fees identified in Column (1).

FIG. 4x is a summary of various responses from the Benchmark Group of Plans to basic ERISA "Spending Account" questions. For example, in Table 1 of FIG. 4x, 12 percent of the Benchmark Group of Plans reported that they do have an ERISA spending account. Table 2 shows the Benchmark Group's responses to a question of "What are the most common expenses paid from ERISA spending accounts?," while Table 3 shows the Benchmark Group's response to the question of, "If a remainder exists at year end, how is it disbursed?"

In summary, Report 1 may include a number of individualized reports that either summarize or provide detail to any number of aspects of a Defined Contribution Plan as well as how that Defined Contribution Plan compares to a Benchmark Group of Plans that system 10 determines according to criteria relating to a selected group of "sort factors." In addition, the Benchmark Group may be represented by groupings or "bins" labeled "High," "Above Average," "Average," "Below Average" and "Low," representing the $95^{th}$ percentile, $75^{th}$ percentile, $50^{th}$ percentile—median, $25^{th}$ percentile, and $5^{th}$ percentile, respectively, of the Benchmark Group of Plans, as also shown in, for example, Table 1 of FIG. 4b. Consequently, the use of the term "Average" in any report, whether alone or with any other term, is a descriptive use rather than a mathematical use of the term. Various reports may also present comparison data between a given Plan and a Benchmark Group of Plans using both or either qualitative measures and quantitative measures and which may further be summarized in a way that enables User 16 to quickly and easily ascertain the Plans' relative position on any given measurement or aspect.

Taking FIG. 4g as a representative example, Table 3 shows a detailed, numerical comparison of the total expense ratio of the Plan relative to the Benchmark Group of Plans, and percent. Although a User 16 may want to have at their disposal the various data represented in Columns (1) and (2), reflecting the Plan's total expense ratio and the difference of the Plan's total expense ratio relative to the average of the Benchmark Group, respectively, User 16 may instead want to merely refer to either Tables 1 or 2 of FIG. 4g, which summarize the story told in Table 3. Table 1, for example, visually represents how many of the particular funds are well below average in expenses, below average in expense, above average in expenses or well above average in expenses to help User 16 to form a quick opinion as to the position of the Plan relative to the Benchmark Group of Plans.

Similarly, Table 2 graphically and numerically shows how the Plan's total investment expense compares to the Benchmark Group, where color coding and/or shading may help to show that the fees of the Plan are 0.02 percent less than the average of the Benchmark Group of Plans. In addition, Table 2 shows how the Plan qualitatively compares to the Benchmark Group due to the Plan's relative placement on the histogram. Table 2 also shows the magnitude of the differences between the Plan and the Benchmark Group of Plans, and how the 0.49 percent magnitude of the Plan compares to the Benchmark Group range of 0.40 percent to 0.61 percent.

As indicated above, each of reports 118 numbers 1, 2, or 3 may be preprogrammed and selected for delivery or viewing by User 16. In addition, each of the various "reports" or "charts" within reports 118 may also be individually selected by User 16 via, for example, web portal 20. Consequently, User 16 may cause system 10 to build any report 118 comprising any number of reports, summaries, charts, and the like, as may be selected or requested by User 16. Although not shown, an "Exception Report," which can form a separate report 118 or be part of one of the pre-programmed reports 1, 2 or 3 identified in Table 1 above, can also be generated by system 10 to summarize, for example, the top five strengths of the Plan and the top five weaknesses of the Plan as compared to the Benchmark Group of Plans. In this way, User 16 may quickly identify which aspects of the Plan need no further attention as well as those aspects that may need prompt attention to correct identified deficiencies.

"Trending" is another area that may be useful to User 16. For example, while each of reports 118 numbers 1, 2, and 3 comprise snapshots of a given Plan against a Benchmark Group of Plans, it may also be important to show, for example, how the Plan's services measure over time. System 10 may generate a "Trend Report," which may compare any measurable aspect of a Plan to, for example, one or more prior years or prior reports, and which may project a trend going forward. In one embodiment, a "Trend Report" may comprise information regarding the participation rate of a Plan or for a Benchmark Group of Plans for the years 2007, 2008, and 2009. The "Trend Report" may also include a projection as to what may be expected for 2010. For example, if the Plan Participant participation rate for either the Plan or the Benchmark Group of Plans was 68% in 2007, 70% in 2008, and 72% in 2009, a "Trend Report" may be able to project that the participation rate will be 74% for 2010.

Figure 5A:
FIGS. 5a-5q illustrate another embodiment of a report that may be output from the embodiment shown in FIG. 1.

Turning now to FIG. 5a-FIG. 5q, there is shown another exemplary report 118 entitled, "Sponsor and Advisor Provided Services" comprising "Basic Plan Information," "Sponsor Fiduciary Support," "Advisor Provided Services," and "Satisfaction—Recordkeeper Services." These categories are shown in Table 1. The layout of the report shown in FIGS. 5a-5q is similar to that shown in FIGS. 4a-4z, except as may be driven by the specific Data Category that is being compared to the Benchmark Group of Plans or the manner in which data is presented. In addition, color coding and/or shading, as described above, may be used in various ways to enable a single column of data, for example, to carry additional meaning.

Referring to FIG. 5j, there is shown a summary of the "Additional Advisor/Consultant Services" provided to the Plan as compared to the Benchmark Group of Plans. Among the tables shown in FIG. 5j, there is also shown Table 1, which can output "free form" data that the Advisor/Consultant inputs into database 90. For example, if the Advisor/Consultant provides additional services that are not otherwise covered by any of the pre-prepared questions during input of Plan data 25, then system 10 may be programmed to include "free form" fields in one or more web pages of web portal 20 to allow the Advisor/Consultant to enter information of their own choosing about additional services that they provide to the Plan. The output of such "free form" fields may be reflected in Table 1 of FIG. 5j.

Referring to FIGS. 5k-5m, there is shown an exemplary summary of the "Advisor/Consultant Services" provided to the Plan as compared to the Benchmark Group of Plans. Column (1) of Table 1 on FIGS. 5k-5l, for example, quickly identifies to User 16 the types of services that the Plan receives from the Advisor/Consultant. Column (2) of Table 1 of FIGS. 5k-5l shows what percentage of the Benchmark Group of Plans also receive the itemized list of services to enable User 16 to quickly compare the services it receives against those of the Benchmark Group of Plans. In addition, Column (3) of Table 1 of FIGS. 5k-5l shows a comparison of the fee, if paid, that the Advisor/Consultant receives for providing the itemized list of services shown in Table 1. FIG. 5m is an exemplary summary of additional services that an Advisor/Consultant may provide that are not otherwise identified on FIGS. 5k-5l.

Referring to FIG. 5o, there is shown the qualitative results of the satisfaction survey that the Plan Sponsor completed or that the Advisor/Consultant completed on behalf of the Plan Sponsor. In particular, FIG. 5o shows the relative satisfaction by the Plan Sponsor of the Recordkeeper service team. In one exemplary response to the question, "What is the overall assessment of the service team?," the Plan Sponsor reported that the service team "added value" as shown in Table 1. In response to the question, "Does the service team's work product meet the Plan's needs?," the Plan Sponsor responded that the service team's product was "satisfactory," as indicated in Table 2 of FIG. 5o. Although the tables in FIG. 5o show a qualitative measure of a Plan Sponsor's satisfaction with the Recordkeeper's service team performance, quantitative measures can also be used, such as through the use of a quantitative rating system (e.g., rating each question on a scale of 1 to 5, or 1 to 10, for example). In an alternative embodiment, a blend of qualitative and quantitative measures is used. In another embodiment, only quantitative measures are used.

FIGS. 5d-5i show various "Fiduciary Oversight and Best Practice Support" reports. Every Plan has a named fiduciary whose job is to make sure the Plan complies with all laws. The exemplary reports illustrated in FIGS. 5d-5i may help raise awareness of issues to minimize fiduciary liability as well as improve the performance of the Plan.

Figure 5E:
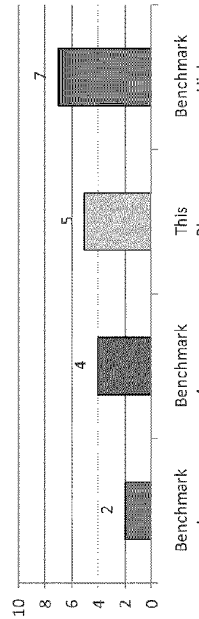
Figure 5F:
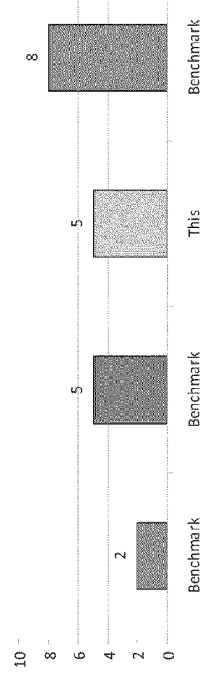
Figure 5G:
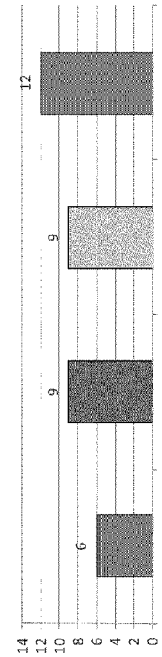
Figure 5H:
Figure 5I:

Table 1 of FIG. 5e, for example, shows whether the Plan's Service Providers provide the services identified in Column (1). Taking this one step further, a Plan fiduciary may want to know how well a particular service is actually being provided to the Plan. Thus, qualitative and quantitative measures may be employed to ascertain not only the existence of a particular service to a Plan, but how well that service is being performed by the Service Provider as compared to the Benchmark Group of Plans.

Figure 6A:
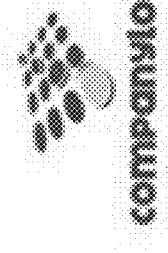
Figure 6E:

Another exemplary report as shown is FIGS. 6a-FIG. 6j entitled, "Plan and Participant Services." This report, identified in Table 1 above, may include comparisons of the Plan against the Benchmark Group of Plans with respect to "Plan-Driven Services," "Participant-driven Administration," and "Participant-driven Communications," as shown on FIGS. 6e-FIG. 6g, respectively. Examples of "Plan-driven Services" include Plan design changes, mergers and acquisitions, and ADP/ACP testing. Examples of "Participant-driven Administration Services" include loans, withdrawals, and QDRO's. Examples of "Participant-driven Communications" include quarterly statements and 800 number customer support.

On FIG. 6d, there are shown three summary tables for each of these three types of Plan services. Table 1 of FIG. 6d shows how the Plan's "Plan-driven Services" compares to the Benchmark Group, which for this particular Plan, exceeds the benchmark average of 24,000 points by 3,457 points. "Points" (or "score") is determined by system 10 by multiplying the number of transactions for each service (called "volumes") by the degree of difficulty to complete that work (called "difficulty factor"). For example, if 26 payrolls are processed in a Plan year with each payroll having a complexity factor of 50, the service's "score" for payroll processing would be 13,000 points. Or, if only 5 percent of Plan Participants took a loan and each loan had a complexity factor of 75, the service's "score" for loans would be 3.75. Thus, adding the individual scores for all services allows for a comparison of the amount of work being done for the Plan as compared to the Benchmark Group of Plans.

FIG. 6e is a detail breakdown of the "Plan-driven Services" that are summarized in Table 1 of FIG. 6d. Column (1) of Table 1 of FIG. 6e shows a list of various "Plan-driven Services" to be compared. Column (2) of Table 1 is entitled "Scope of Service" and shows not only the percentage of Plans in the Benchmark Group receiving each service, as identified in Column (1), but also which of the Column (1) services this particular Plan has, as shown by the highlighted cells in Column (2). Thus, in this particular example, the Plan has 24 of the 29 "Plan driven Services" that are listed in Column (1). Column (3) is entitled "Service Volumes" and represents this Plan's "service volume" as compared to the Benchmark Group average. Taking the cell at Column (3), Row (a), for example, Table 1 shows that this Plan processes two fund additions/deletions compared to the Benchmark Group average, which processes only one fund addition/deletion.

Like Column (2), Column (4) also shows two pieces of information: which of the "Plan-driven Services" shown in Column (1) that this Plan Service Provider (i.e., Recordkeeper) provides, and the percentage of the Benchmark Group of Plans that are supported by the provider. Column (5) reflects the same information as Column (4) except that all of the "Other Providers" are grouped together in a Column called "Other." As can be seen from the shaded cells of Columns (4) and (5) of Table 1, the total number of cells must equal the total number of cells shaded in Column (2). Column (6) identifies the name of the "Other" Service Provider adjacent the shaded cells in Column (5).

Column (7) shows the "difficulty factor" that system 10 assigned to each of the Recordkeeper services listed in Column (1). Column (8) shows the Plan's "service volumes" taken from Column (3) for each of the services shown in Column (1) for the Recordkeeper. Column (9) totals the Recordkeeper "Plan-driven Service Score," which is the result of multiplying the items in Column (7) the items in Column (8). At the bottom of Column (9) there is shown the sum total of the Column (9) scores for this Plan (at Row (b)). Just below this total, at Row (c), Column (9), is an identification of the "Low," "Average," and "High" "service scores" for the Benchmark Group of Plans, representing the $5^{th}$ percentile, the $50^{th}$ percentile—median, and $95^{th}$ percentile rankings, respectively, of the Benchmark Group of Plans, for easy comparison of this Plan's score to the Benchmark Group. As before, the use of the term "Average," whether alone or with any other term, is a descriptive use rather than a mathematical use of the term.

Figure 6I:
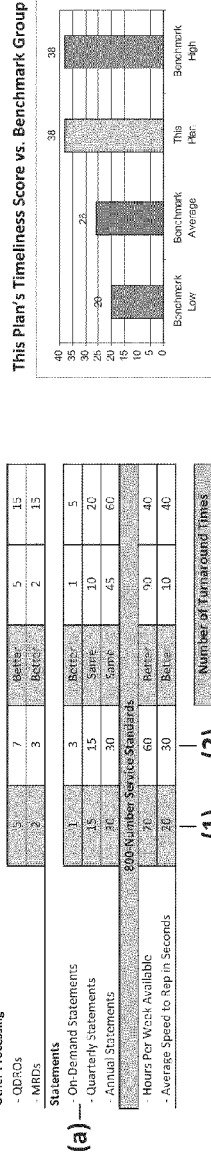

A "Timeliness Standards" report is shown in FIG. 6i. This page compares 41 services of the Plan and reports how well the Plan performs on these measures as compared to the Benchmark Group of Plans. For example, one measure of a Plan's timeliness may be how quickly the Plan executes requests for on-demand Plan Statements. If the Plan executes such requests within one day, and the Benchmark Group of Plan executes such requests within 3 days, such information may be shown in the report of FIG. 6i, such as in Columns (1) and (2) of Row (a) of Table 1. Taking this one step further, system 10 may compare actual Plan metrics against what the Plan's Service Providers agreed to provide to help inform a Plan Sponsor, for example, as to whether the Plan actually receives each of the Plan services within the timeliness guidelines as agreed to by each of the Plan's Service Providers. Thus, if a Plan Participant is supposed to receive an On-Demand Plan Statement within one day of their request, such a report would compare actual delivery statistics of On-Demand Plan Statements against the Plan's design to verify that the Plan is actually receiving the service(s) that it pays for.

As described above, User 16 may select one or more pre-styled reports 118 or select one or more options for customizing a user-customizable report 118. In this way, elements of one or more of Reports 1, 2, and 3 may therefore be combined into a pre-styled report 118 or user-selectable for creating a user-customizable report 118.

In one embodiment, a report template may be created for use or distribution by, for example, a Broker/Dealer who may be associated with, for example, dozens of Advisor/Consultants, where each of the Advisor/Consultants may receive the same basic report type(s) but where such reports are tailored to the particular Advisor/Consultant to whom the report(s) is directed. To create the template, the Broker/Dealer may define customizable aspects of the template to identify a particular Advisor/Consultant to whom a particular report is directed as well as to identify the Broker/Dealer, for example, from whom the report may be distributed. Such customizable aspects may include, for example, customizable fields on the cover page of the report (e.g., FIG. 4a) and the disclosure page of the report (e.g., FIG. 4z). The customizable fields may include, for example, fields 220, 230, as shown on FIG. 4a. Field 220 may comprise, for example, the name or logo of the Broker/Dealer, while field 230 may comprise, for example, the name of the Advisor/Consultant associated with that Broker/Dealer. Similarly, FIG. 4z comprising an exemplary disclosure page of a report shows field 240, which may comprise the name of the Broker/Dealer. By associating, for example, each Advisor/Consultant corresponding to a Broker/Dealer, system 10 may automatically create personalized reports of the same report type that are customized with one or more customized elements described above on one or more pages of the report as well as the report data summarized therein.

In addition, system 10 may dynamically include or exclude entire sections of a given report or, alternatively, various elements of a given report (such as one or more columns or rows on a given sheet) depending on the components of the particular Plan. For example, if the Plan does not have a managed account, then system 10 may automatically exclude any pages or any data elements that pertain to managed accounts.

To access system 10 through web portal 20, a login/user ID and password may be entered into User ID field 167 and password field 168, as shown in a representative login screen 166. Login screen 166 may be a web page on a website operated by, for example, an operator or administrator of database 90 and system 10.

Figure 7:
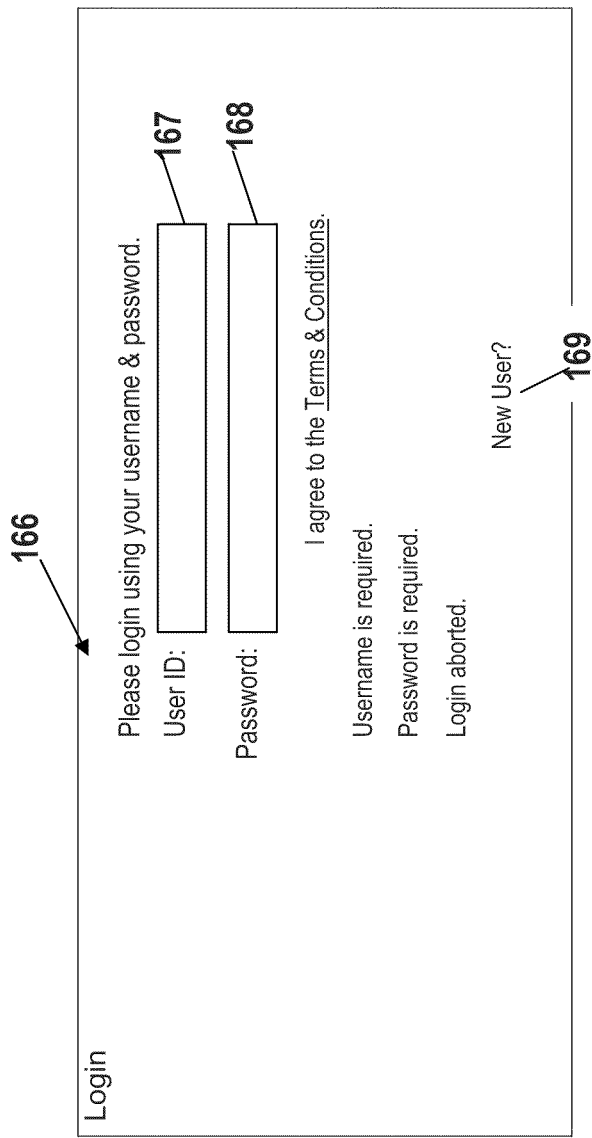
FIG. 7 illustrates one embodiment of a login screen.

If User 16 does not have a login ID or password, system 10 may require that User 16 register to obtain access to system 10. To register, User 16 may select button 169, as shown in FIG. 7, to cause a "User Registration" web page 171 to activate, as shown in FIG. 8. To complete the registration process, User 16 may enter all of the information as requested in various fields on the page, including an email address and a password selected by User 16 to be used for future access to system 10. User 16 may cancel the registration process by selecting the "cancel" button 172. Alternatively, if User 16 is satisfied with the entries on "User Registration" web page 171, User 16 may continue by selecting "Done" button 173.

Figure 9:
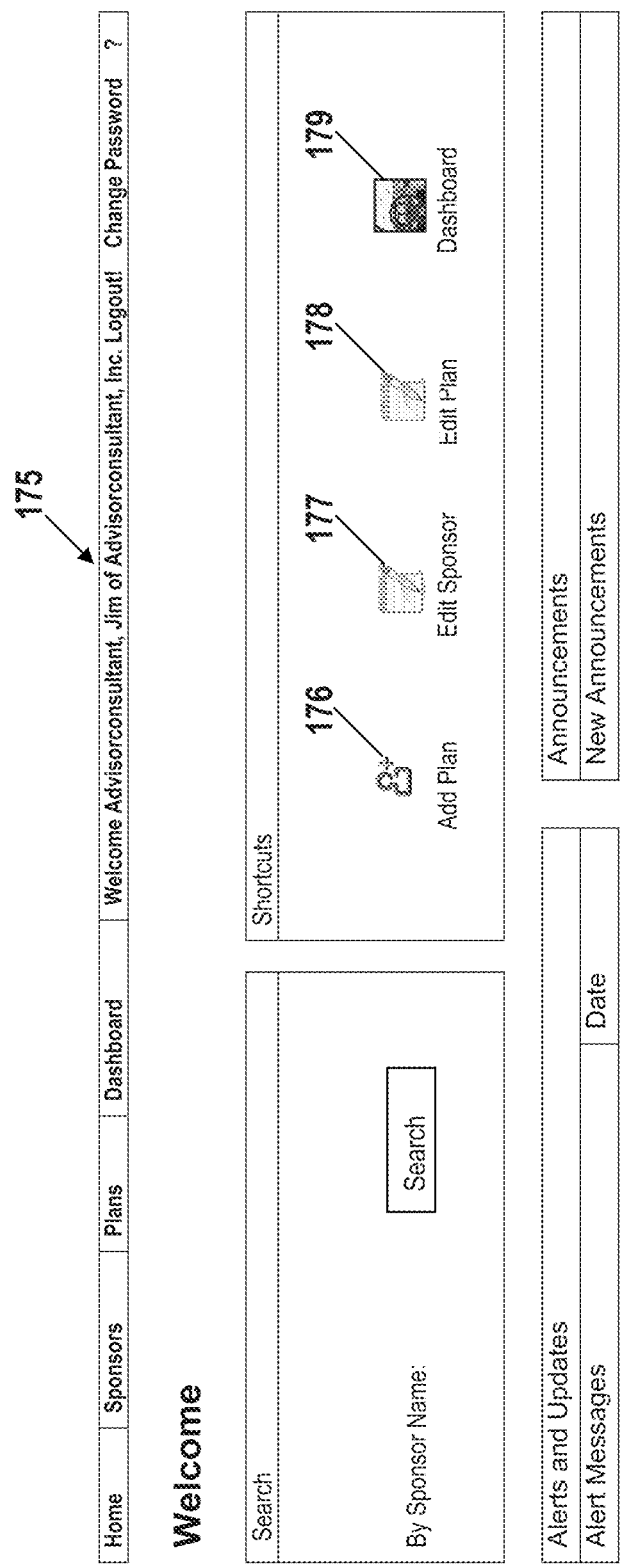
FIG. 9 illustrates one embodiment of a "Welcome" screen.

Upon successful registration or logging into the system using a previously registered login ID and password, system 10 then may display a "Welcome" screen 175 to User 16, as shown in FIG. 9. As shown in FIG. 9, "Welcome" screen 175 may include several icons, that when selected by User 16, may activate preprogrammed functionality in system 10. As shown in FIG. 9, these icons may include an "Add Plan" icon 176, an "Add Sponsor" icon 177, an "Edit Plan" icon 178, and a "Dashboard" icon 179. If User 16 selects "Add Plan" icon 176, system 10 then may activate software comprising Plan bean 130 of middleware tier 120, and may cause the display of an "Add a Plan" screen 181 to User 16, as shown in FIG. 10. The "Add a Plan" screen 181 may be used to enter any kind of Defined Contribution Plan data into database 90. As shown on FIG. 10, the "Add a Plan" screen 181 may include a number of drop-down boxes for selecting one out of a number of pre-programmed choices to ensure uniformity of data in database 90.

Data entered in this page may be stored temporarily in the memory allocated to Plan bean 130. In addition, the software of Plan bean 130 and middleware tier 120 may be programmed to auto-complete certain predetermined fields as User 16 begins to type characters in these fields. For example, the beginning three characters of a Plan Sponsor's name may trigger Plan bean 130 to either populate the remaining fields with a Plan Sponsor's information or may present User 16 with choices for Plan Sponsor names that the three characters match 1—database 90. To do this, software Plan bean 130 may activate a lookup table connected to database 90 to retrieve and populate multiple fields on the fly.

Additional assistance is provided to User 16 for many, if not all, of the data entry fields of system 10. For example, as shown in FIG. 10, icon 182, if selected, may activate software to call up and display a "Guide to Survey Questions and Data Elements," which may be a valuable online resource for User 16 to understand what each particular field is requesting to be input. A representative "Guide" is shown in FIGS. 11a-11j. The software of system 10 may further be configured to "jump" to the precise location in the "guide" that relates to the particular field in question. For example, a user selecting help icon 182 may be shown the appropriate "guide" page that relates to the "Add a Plan" screen 181, and specifically, to "Sponsor Name" 182 shown in FIG. 11a. Likewise, for example, a user selecting help icon 183 relating to the field "Recordkeeper" on "Add a Plan" page 181 of FIG. 10 may be taken directly to the information relating to "Recordkeeper" 183, as shown in FIG. 11a.

To navigate between or among various screens of system 10, User 16 may be presented with "Go Back" button 185, "Cancel" button 186, "Add Another Sponsor" button 187, "Continue" button 188, and "Add more plans with this Sponsor" button 189, as shown in FIG. 10. In addition, various screens may include a "delete" button 184, as is shown in FIG. 10, to enable a Plan Sponsor or Recordkeeper, for example, to delete information concerning a particular Plan from database 90.

If User 16 selects "Add more plans with this Sponsor" button 189, software of Plan bean 130 of system 10 may cause a clean "Add a Plan" screen 181 to display thereby allowing entry of data about another Plan for the same Plan Sponsor. Any data entered into screen 181 will be stored on database 90 upon selection of "Add more plans with this Sponsor" button 189.

If User 16 selects "Continue" button 188, software of Plan bean 130 of system 10 may cause a "Dashboard" screen 190 to be displayed, as shown in FIGS. 12a-12b. "Dashboard" screen 190 may display a concise listing of all of the prior Plans previously entered, and Plans that are in the process of being entered, into database 90, as well as various options selected by User 16. For example, Column (1) shows a list of Plan Sponsors that have been entered into database 90 or are currently being entered or in the process of being entered. Column (2) shows a list of Plan names, Column (3) shows a list of the assets in those Plans, Column (4) shows the name of the Recordkeeper for each respective Plan, Column (5) shows the type of report that the user has selected to receive, if at all. Column (6) of FIGS. 12a-12b shows the type of method for entering data for each respective Plan (either, for example, "self" or "Recordkeeper/TPA") as selected by User 16. Column (7) shows the current status of entry of Plan data. Column (8) shows the next scheduled report date as may be currently scheduled in system 10.

As detailed above, User 16 may select one or more of reports 118 numbers 1, 2, or 3, or all of them, or any portion thereof. If more than one Plan is shown on a particular "Dashboard" screen 190, as is illustrated in FIGS. 12-12b, User 16 may select or deselect which Plans to "benchmark" (i.e., compare to the Benchmark Group of Plans that is uniquely tailored to each individual Plan). In one embodiment, system 10 defaults to benchmarking all of the Plans shown in a given "Dashboard" screen 190, allowing User 16 to deselect those Plans that it does not want to benchmark. In another embodiment, system 10 defaults to benchmarking none of the Plans shown in a given "Dashboard" screen 190, allowing User 16 to select those Plans that it wants to benchmark.

To proceed with entering specific Plan data, User 16 may then select button 191 to cause system 10 to show a "Choose Plan Data Entry Method" screen 194, as shown in FIG. 13. On this particular screen, User 16 may be presented with two options 195, 196 where the selection of one or the other may cause system 10 to show different screens to User 16 for further data entry. For example, if User 16 selects option 195, system 10 may then initiate the display of a screen that requests entry of the Recordkeeper/TPA that User 16 wants to send a request to, to have them enter the respective Plan data. On the other hand, if User 16 selects option 196, then system 10 may then cause "Dashboard" screen 190 to show. At this point, User 16 may be shown a hyperlink called "Edit Plan Data" under "Plan Data Status," which when selected, causes the "Edit Plan Data—Basic Information" screen 199 to display, as shown in FIG. 14a-14b.

If User 16 elects to have the Recordkeeper/TPA enter data about a Plan into system 10, then system 10 sends an email to the identified Recordkeeper/TPA containing a hyperlink to system 10. When the Recordkeeper/TPA selects the hyperlink in the body of the email, system 10 recognizes the connection as being a semi-authenticated user and displays a partially pre-populated version of "Welcome" screen 175 to the Recordkeeper/TPA.

If User 16 is a Plan Sponsor, for example, and elects to self-enter Plan data, User 16 may be given the opportunity at the end of entering all of the Plan data to request that someone else review the data they entered. System 10 may then send an email, as described above, to the requested person to review the Plan data. In this way, a Recordkeeper/TPA, for example, may have dual capability—to respond to a request from a Plan Sponsor or to review data previously entered by someone else, such as a Plan Sponsor, and also to enter data if and when requested to do so.

Figure 14C:
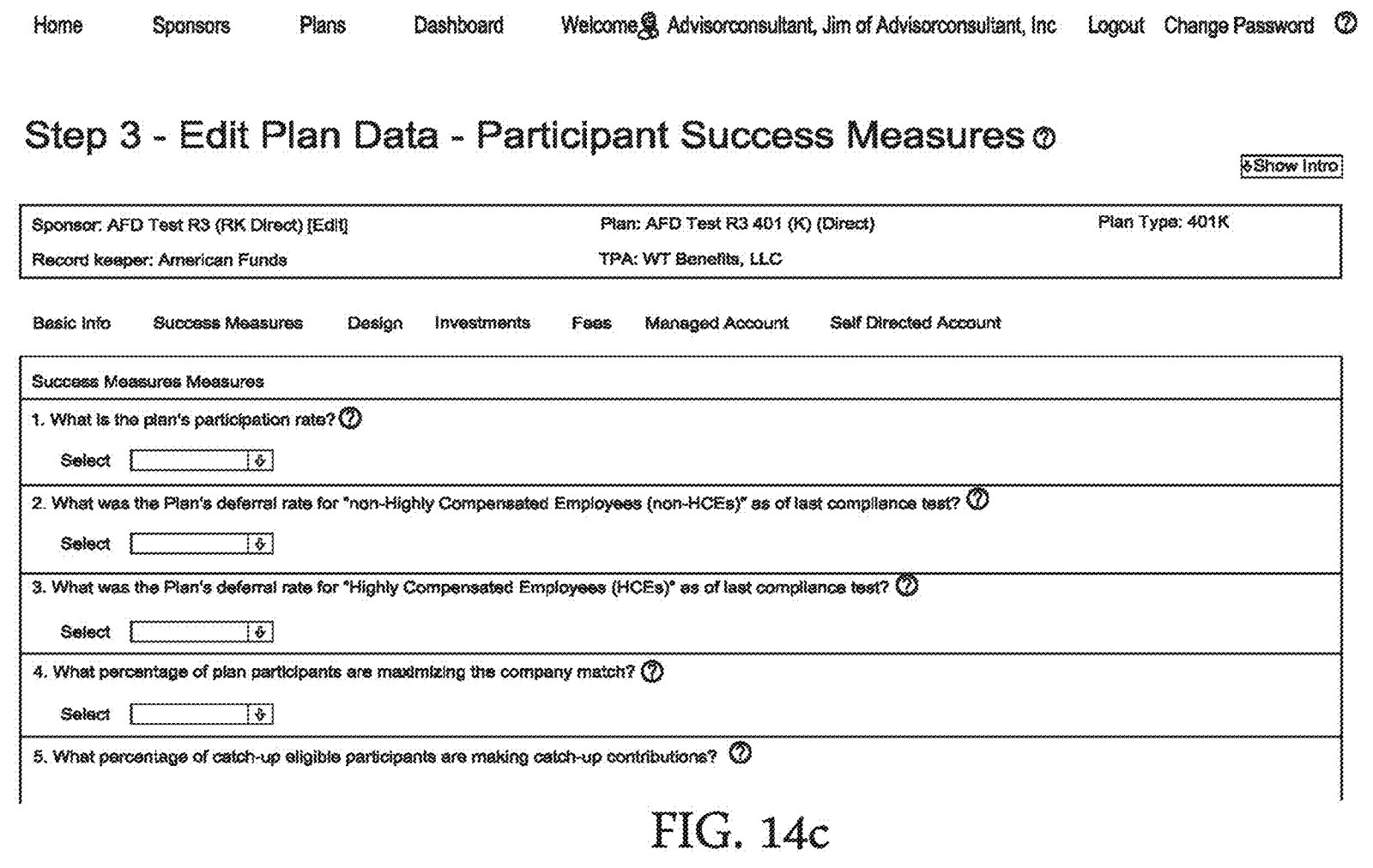
Figure 14H:
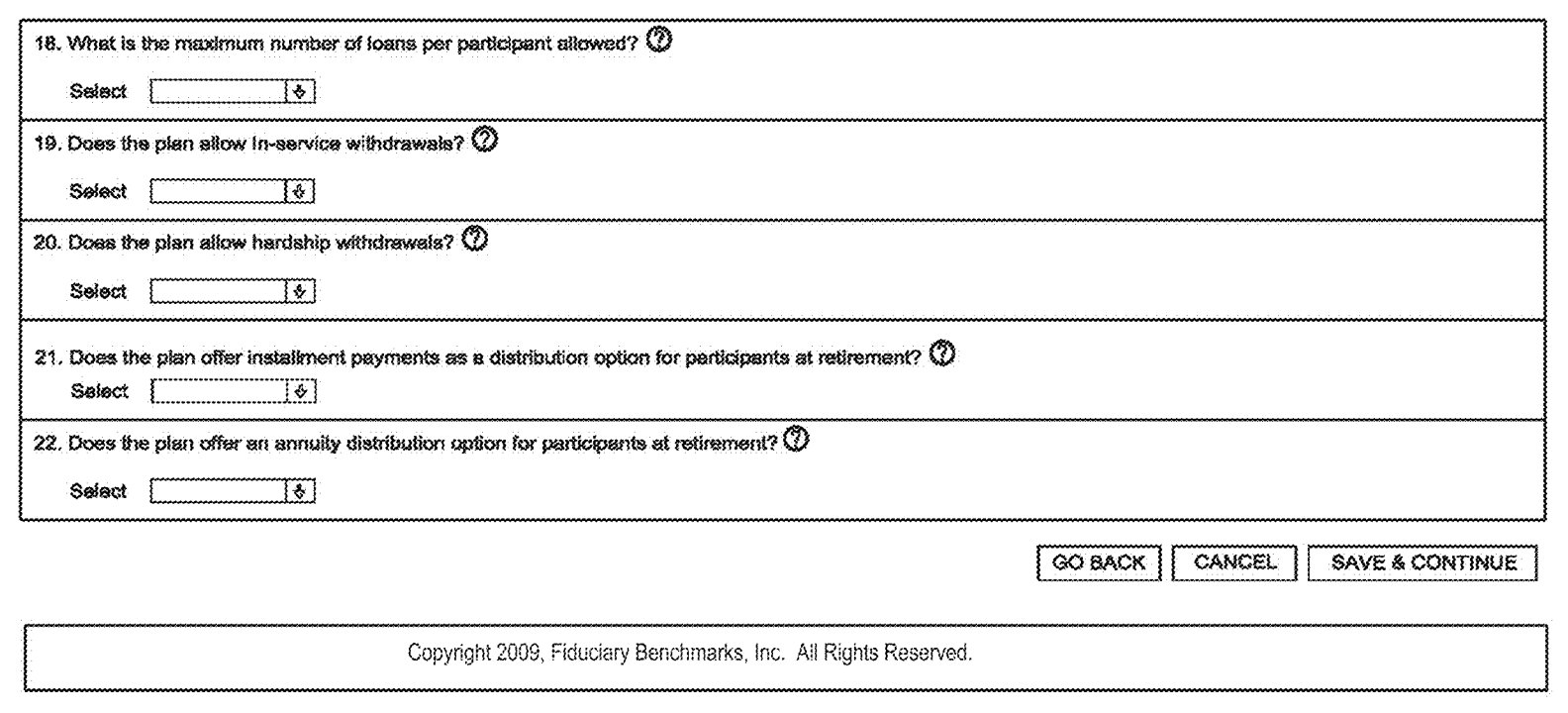
Figure 14I:
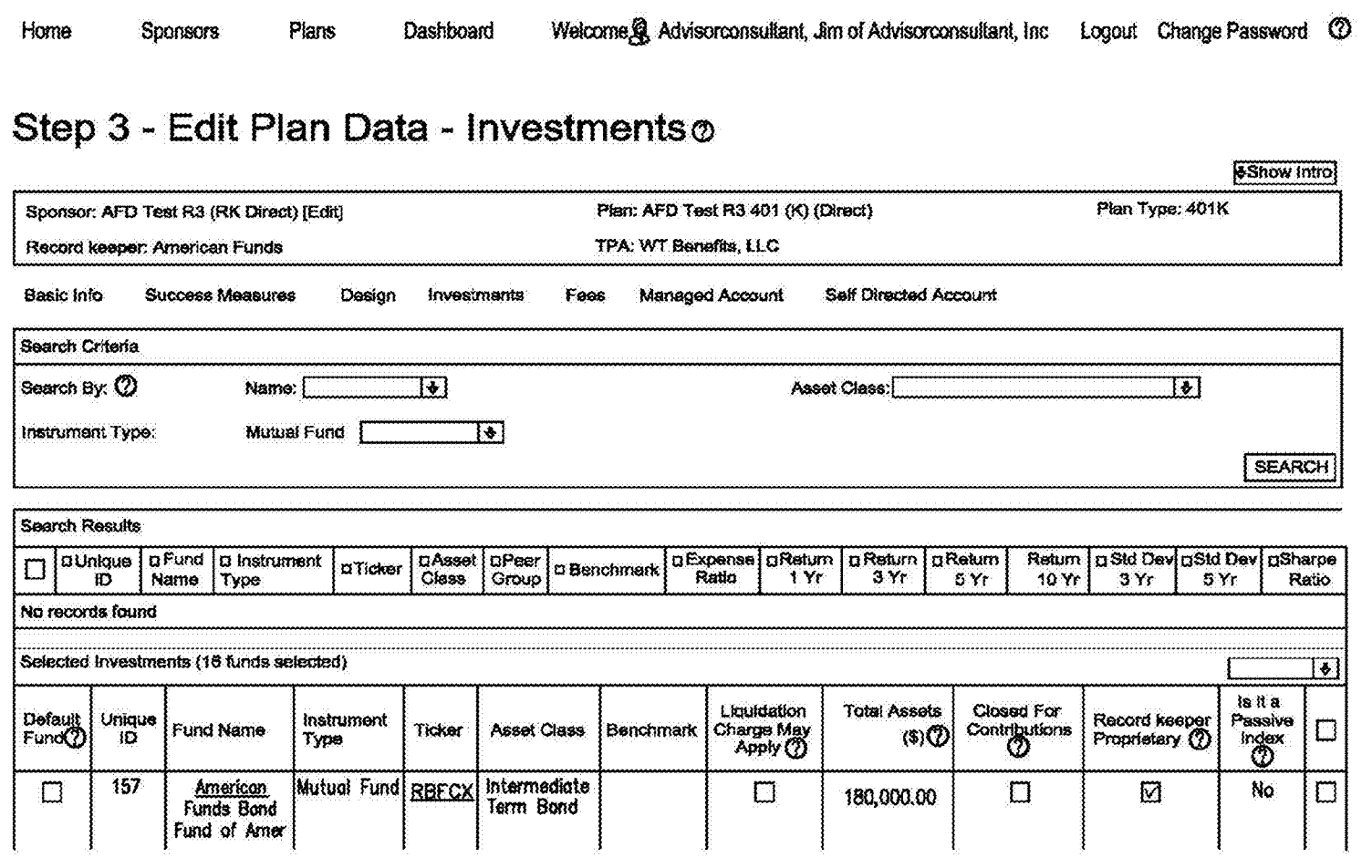
Figure 14O:
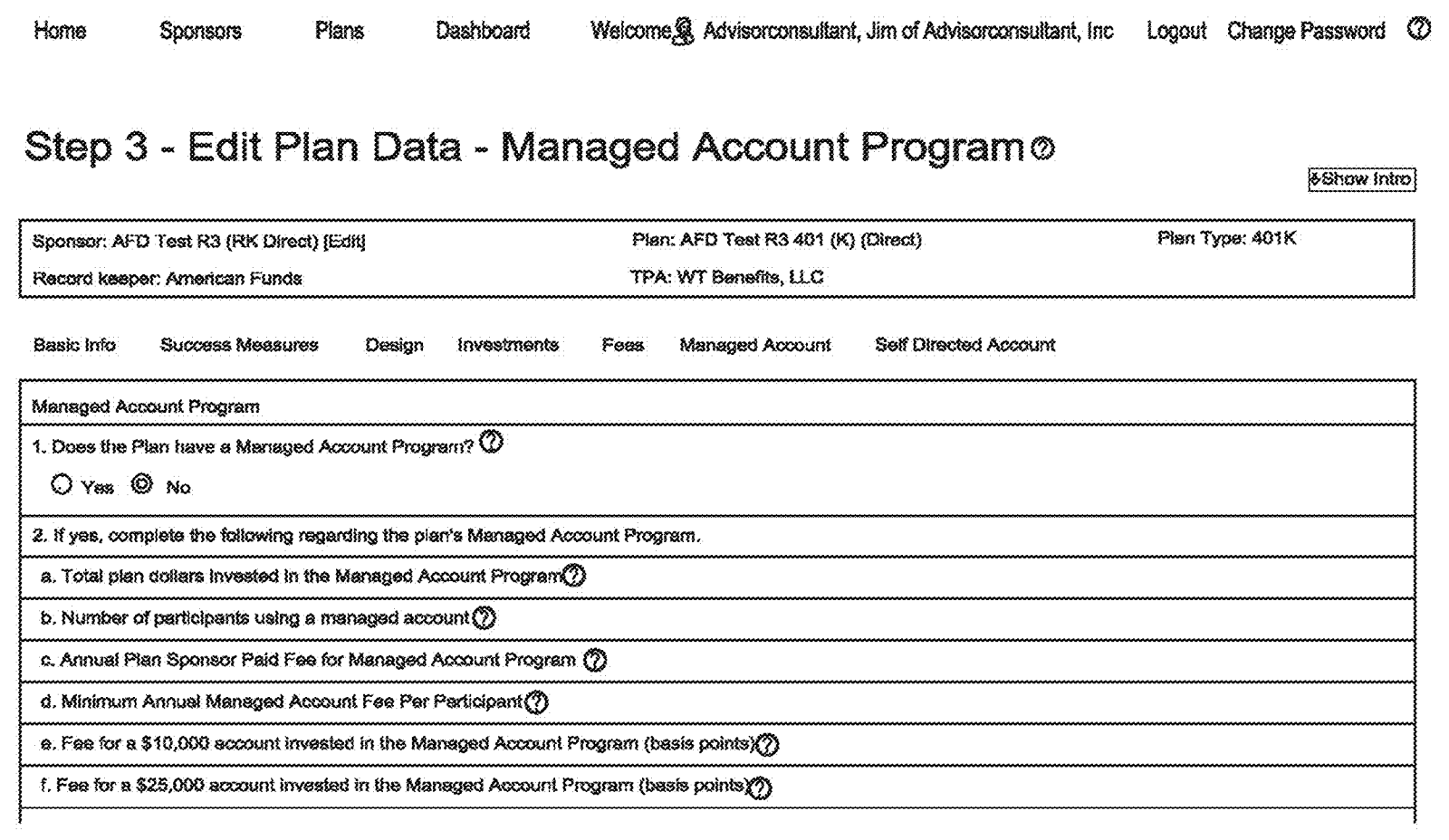
Figure 14S:
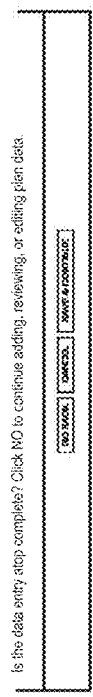

As shown in FIG. 14a, the "Edit Plan Data" screen 199 may have a number of tabs shown near the top of the page, such as "Basic Information" 202, "Success Measures" 203, "Design" 204, "Investments" 205, "Fees" 206, "Managed Account" 207, and "Self Directed Account" 208. Selecting any one of these tabs may cause system 10 to activate the respective data entry screens that relate to the selected tab. In addition, the number and type of tabs that are displayed on the "Edit Plan Data" screen 199 may be dependant on the type of report that is selected in Column (5) of FIG. 12a. For example, if the "Fees, Plan Design, and Participant Success Measures" report is selected in the menu option of Column (5) in FIG. 12a, system 10 may cause to be displayed each of the tabs 202-208 as shown on 14a. However, if User 16 selects any other report in Column (5) of FIG. 12a, more or less tabs 202-208 may be shown on "Edit Plan Data" screen 199 as are necessary to populate and generate the selected report. FIGS. 14a-14s reflect exemplary data input pages for inputting Plan data into system 10.

Once User 16 enters all of the data as is requested on each of the respective screens represented by 202-208, system 10 may then cause all of the data to be permanently stored on database 90.

During entry of data in any of FIGS. 14a-14s, system 10 through its middleware software may dynamically adjust subsequent data entry fields according to a user's response to a current data entry field. By dynamically adjusting subsequent fields, User 16 may not be burdened by having to populate unnecessary fields that do not apply to a given Plan based on the user's entry of data in a current field. To accomplish this, the middleware software of system 10 employs logic to toggle on and off subsequent fields based on responses to a current data entry field.

Taking, for example, question 4 under "Basic Plan Information" on "edit Plan data" screen 199 of FIG. 14a, (i.e. "Does the Plan provide employer matching contributions?") User 16 selects option "No," then middleware software of system 10 may immediately toggle off the data entry field under question 5, which is shown at the top of FIG. 14b. Conversely, if User 16 selects option "Yes —% match," then middleware software of system 10 may immediately toggle on the data entry field underneath question 5, which is shown at the top of FIG. 14b and which asks, "If applicable, what is the maximum match the Plan provides as a percentage of employee pay?" Given the sheer volume of data the system 10 may request to be entered about any given Plan, dynamically toggling on and off fields as needed may dramatically improve the speed at which data is entered and stored into system 10.

FIGS. 15a-15j, FIGS. 16a-16w, and FIGS. 17a-17z reflect exemplary "Data Elements" for report numbers 1-3, respectively (See Table 1 above). Of course, depending on the structure and composition of the pre-programmed reports in system 10 the "Data Elements" shown in FIGS. 15, 16 and 17 may vary from what is shown in these figures.

Although the foregoing describes a system and method for evaluating Defined Contribution plans, it should be understood by one of ordinary skill in the art that the teachings of the present disclosure can be applied to evaluate Defined Benefit plans, and non-qualified retirement plans as well.

While specific embodiments of the invention have been described in detail, it will be appreciated by those skilled in the art that various modifications and alternatives to those details could be developed in light of the overall teachings of the disclosure. Accordingly, the particular invention disclosed is meant to be illustrative only and not limiting as to the scope of the invention which is to be given the full breadth of the appended claims and any equivalents thereof.

What is claimed is:

1. A method of evaluating a retirement plan, comprising the steps of:
   a. receiving data comprising fee data, cost data, and value data corresponding to a plurality of retirement plans;
   b. storing the data in memory on at least one web-accessible computer;
   c. determining from the fee data, via a processor associated with the at least one web-accessible computer, a fee component associated with each of the retirement plans and for each of a plurality of service providers associated with the retirement plans, comprising the steps of
      identifying a plurality of fee sources and an amount of fees associated with each fee source for each of the service providers, and
      for each of the service providers, normalizing the amount of fees associated with each fee source;
   d. determining from the cost data via the processor a cost component associated with each of the retirement plans and for each service provider, comprising the steps of
      determining a plurality of complexity metrics comprising a plan complexity score associated with a plurality of plan design features,
      determining a plurality of plan and participant services metrics comprising an overall services score to quantify an amount of work associated with a plurality of plan-driven services and/or a plurality of participant-driven services provided to the retirement plans by each of the service providers, determining a plurality of accuracy metrics to quantify an accuracy of execution of agreed upon services by each of the service providers associated with the retirement plans, and determining a plurality of timeliness metrics to quantify a timeliness of execution of agreed upon services by each of the service providers associated with the retirement plans;

e. determining from the value data via the processor a value component associated with each of the retirement plans and for each service provider, comprising the steps of determining a plurality of participant success metrics to quantify preparedness for retirement by participants of the retirement plans, and determining a plurality of fiduciary support metrics to quantify an amount of fiduciary oversight and best practices support provided to the retirement plans by each of the service providers;

f. assembling, via the processor, a comparison group from among the plurality of retirement plans; and g. providing, via the processor, a comparison of the fee component, the cost component, and the value component associated with a selected retirement plan to the fee component, cost component, and the value component associated with the comparison group.

2. The method of claim 1, wherein the service provider is a Recordkeeper.

3. The method of claim 1, wherein the service provider is a Third Party Administrator.

4. The method of claim 1, wherein the service provider is an Advisor.

5. The method of claim 1, wherein the service provider is an Investment Manager.

6. The method of claim 1, wherein the fee sources associated with a plan-driven fee component include investment fees.

7. The method of claim 1, wherein the fee sources associated with a plan-driven fee component include commissions.

8. The method of claim 1, wherein the fee sources associated with a plan-driven fee component include Finder's fees.

9. The method of claim 1, wherein the fee sources associated with a plan-driven fee component include Managed Account fees.

10. The method of claim 1, wherein the fee sources associated with a plan-driven fee component include Other fees.

11. The method of claim 1, wherein the fee sources associated with a plan-driven fee component include amounts credited to an ERISA spending account.

12. The method of claim 1, wherein normalizing the amount of fees associated with each fee source includes aggregating the amount of fees associated with a plan-driven fee component, and dividing the aggregated amount of fees by a total amount of assets associated with the selected retirement plan.

13. The method of claim 1, wherein normalizing the amount of fees associated with each fee source includes identifying a unit cost per occurrence for fee sources associated with a participant-driven component.

14. The method of claim 1, wherein the fee sources associated with a participant-driven fee component include annual per participant advice fees.

15. The method of claim 1, wherein the fee sources associated with a participant-driven fee component include loan origination fees per occurrence.

16. The method of claim 1, wherein the fee sources associated with a participant-driven fee component include annual loan maintenance fees.

17. The method of claim 1, wherein the fee sources associated with a participant-driven fee component include hardship approval fee per occurrence.

18. The method of claim 1, wherein the fee sources associated with a participant-driven fee component include QDRO approval fees per occurrence.

19. The method of claim 1, wherein the fee sources associated with a participant-driven fee component include QDRO processing fees per occurrence.

20. The method of claim 1, wherein the fee sources associated with a participant-driven fee component include periodic payment processing fees per occurrence.

21. The method of claim 1, wherein the fee sources associated with a participant-driven fee component include non-periodic payment processing fees per occurrence.

22. The method of claim 1, wherein determining the plurality of complexity metrics comprises the steps of assigning a maximum cost impact factor to each of the plan design features, and for each retirement plan by service provider, summing the maximum cost impact factor associated with each of the plan design features.

23. The method of claim 1, wherein the plan design features include plan eligibility features.

24. The method of claim 1, wherein the plan design features include employee contribution features.

25. The method of claim 1, wherein the plan design features include employer contribution features.

26. The method of claim 1, wherein the plan design features include investment features for participants.

27. The method of claim 1, wherein the plan design features include plan distribution features to participants.

28. The method of claim 1, wherein the overall service score is determined by identifying a frequency with which each of a plurality of services associated with the plan-driven services and/or the participant-driven services is provided by each of the service providers, assigning a difficulty factor to each of the services, multiplying the difficulty factor by the frequency for each of the identified services to obtain a product, and summing the product for each of the services.

29. The method of claim 1, wherein the plurality of participant success metrics includes a participant participation rate.

30. The method of claim 1, wherein the plurality of participant success metrics includes an average deferral percentage for non-highly compensated employees.

31. The method of claim 1, wherein the plurality of participant success metrics includes an average deferral percentage for highly compensated employees.

32. The method of claim 1, wherein the plurality of participant success metrics includes a percent of participants maximizing an employer matching feature.

33. The method of claim 1, wherein the plurality of participant success metrics includes a percent of plan assets in automatically diversified options.

34. The method of claim 1, wherein the plurality of participant success metrics includes a percent of eligible participants making a catch-up contribution.

35. The method of claim 1, wherein the plurality of participant success metrics includes a percent of participants using an auto-rebalance feature.

36. The method of claim 1, wherein the plurality of participant success metrics includes a percent of terminated participants electing not to take, withdraw or transfer assets.

37. The method of claim 1, wherein the plurality of participant success metrics includes a percent of participants with a personal retirement goal.

38. The method of claim 37, wherein the plurality of participant success metrics includes a percent of participants on track to achieve the personal retirement goal.

39. The method of claim 1, wherein the plurality of fiduciary support metrics includes supported plan design and administration features, plan communications features, plan investment features, plan fees features, and plan company stock features.

40. The method of claim 1, wherein the plurality of accuracy metrics includes a plurality of accuracy standards for executing the agreed upon services.

41. The method of claim 1, wherein the plurality of timeliness metrics includes a plurality of timeliness standards for executing the agreed upon services.

42. The method of claim 1, wherein assembling a comparison group includes
- identifying characteristics from among the fee component, the cost component, and the value component associated with the selected retirement plan that correspond to a plurality of factors, and
- identifying which of the plurality of retirement plans have characteristics that correspond to each of the factors and which are identical to the identified characteristics of the selected retirement plan or which correspond to a predefined range bracketing the identified characteristics of the selected retirement plan.

43. A method of evaluating a retirement plan, comprising the steps of:
- a. receiving data corresponding to a plurality of retirement plans;
- b. storing the data in memory on at least one web-accessible computer;
- c. determining from the data, via a processor associated with the at least one web-accessible computer, a fee component associated with each of the retirement plans and for each of a plurality of service providers associated with the retirement plans, comprising the steps of
  - identifying a plurality of fee sources and an amount of fees associated with each fee source for each of the service providers, and
  - for each of the service providers, normalizing the amount of fees associated with each fee source;
- d. determining from the data via the processor a cost component associated with each of the retirement plans and for each service provider, comprising the step of
  - determining a plurality of complexity metrics, a plurality of plan and participant services metrics, a plurality of accuracy metrics, and/or a plurality of timeliness metrics,
- e. determining from the data via the processor a value component associated with each of the retirement plans and for each service provider, comprising the step of
  - determining a plurality of participant success metrics, and/or a plurality of fiduciary support metrics;
- f. assembling, via the processor, a comparison group from among the plurality of retirement plans; and
- g. providing, via the processor, a comparison of the fee component, the cost component, and the value component associated with a selected retirement plan to the fee component, cost component, and the value component associated with the comparison group.

44. A method of evaluating a retirement plan, comprising the steps of:
- a. receiving data corresponding to a plurality of retirement plans;
- b. storing the data in memory on at least one web-accessible computer;
- c. determining from the data, via a processor associated with the at least one web-accessible computer, a fee component, a cost component, and a value component associated with each of the retirement plans and for each of a plurality of service providers associated with the retirement plans;
- d. assembling, via the processor, a comparison group from among the plurality of retirement plans;
- e. providing, via the processor, a comparison of the fee component, the cost component, and the value component associated with a selected retirement plan to the fee component, cost component, and the value component associated with the comparison group; and
- f. delivering via the processor and via email to a user at least one report comprising the comparison.

* * * * *